Nov. 7, 1961 W. S. ROHLAND ET AL 3,008,123
APPARATUS FOR ANALYZING INTELLIGENCE MANIFESTATIONS
Filed April 2, 1956 51 Sheets-Sheet 4

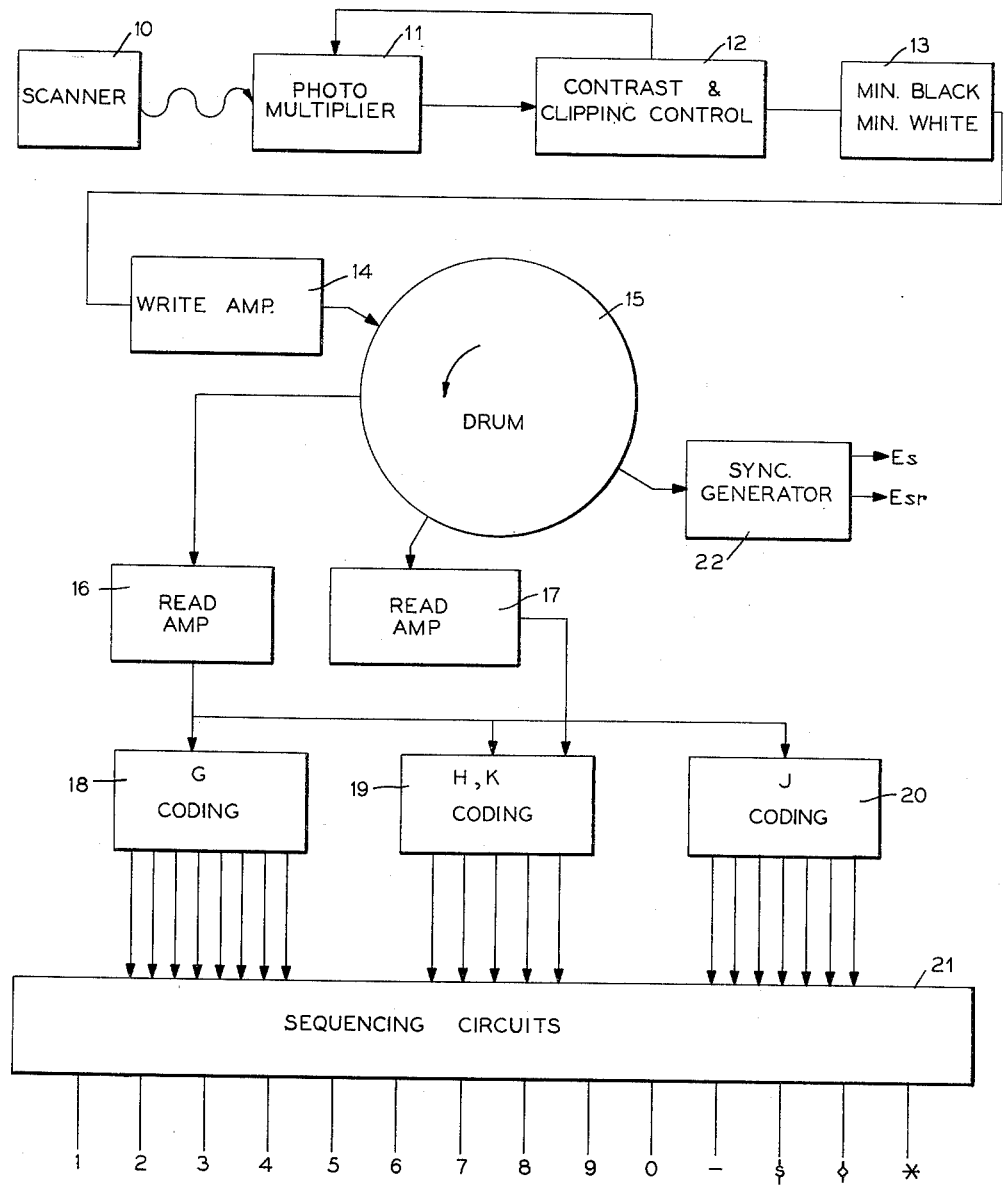
FIG_1_

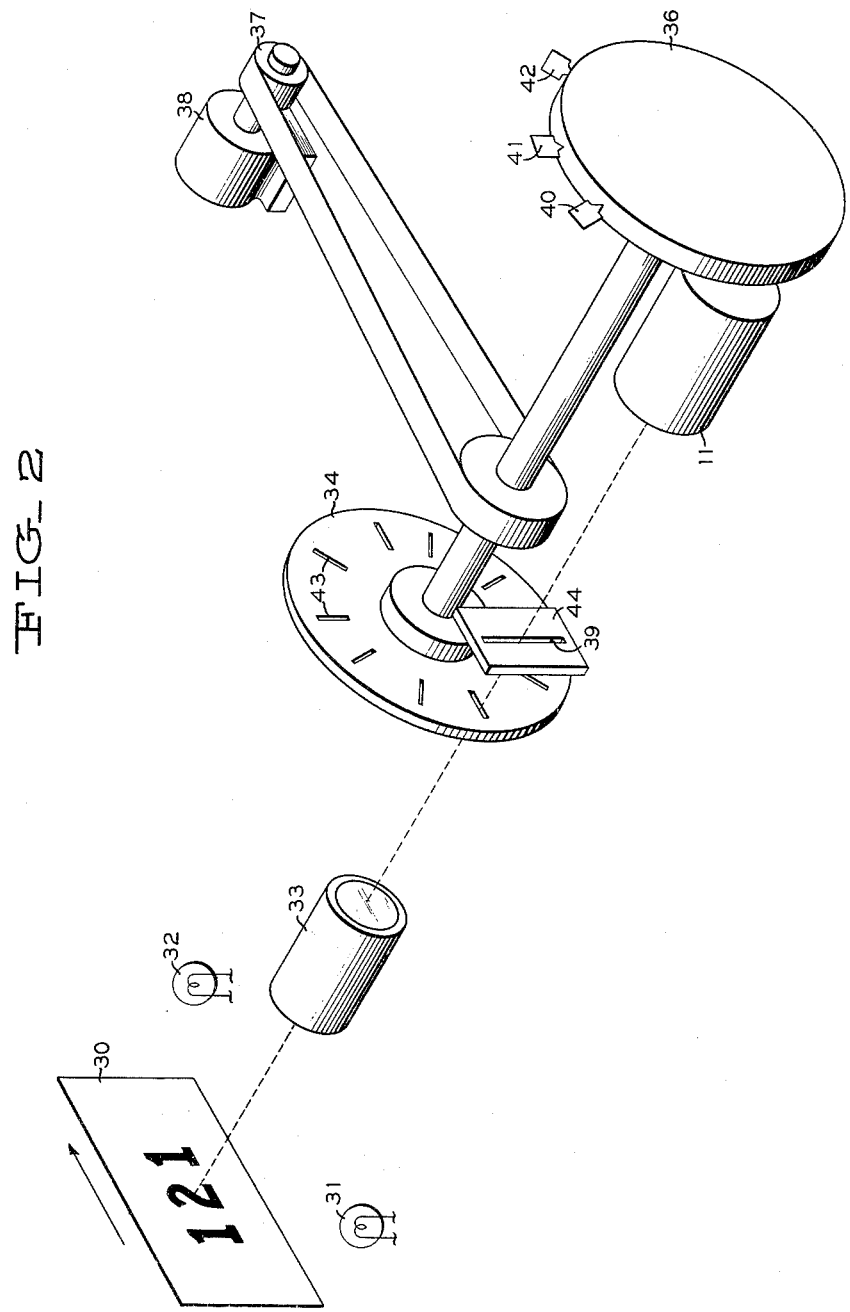

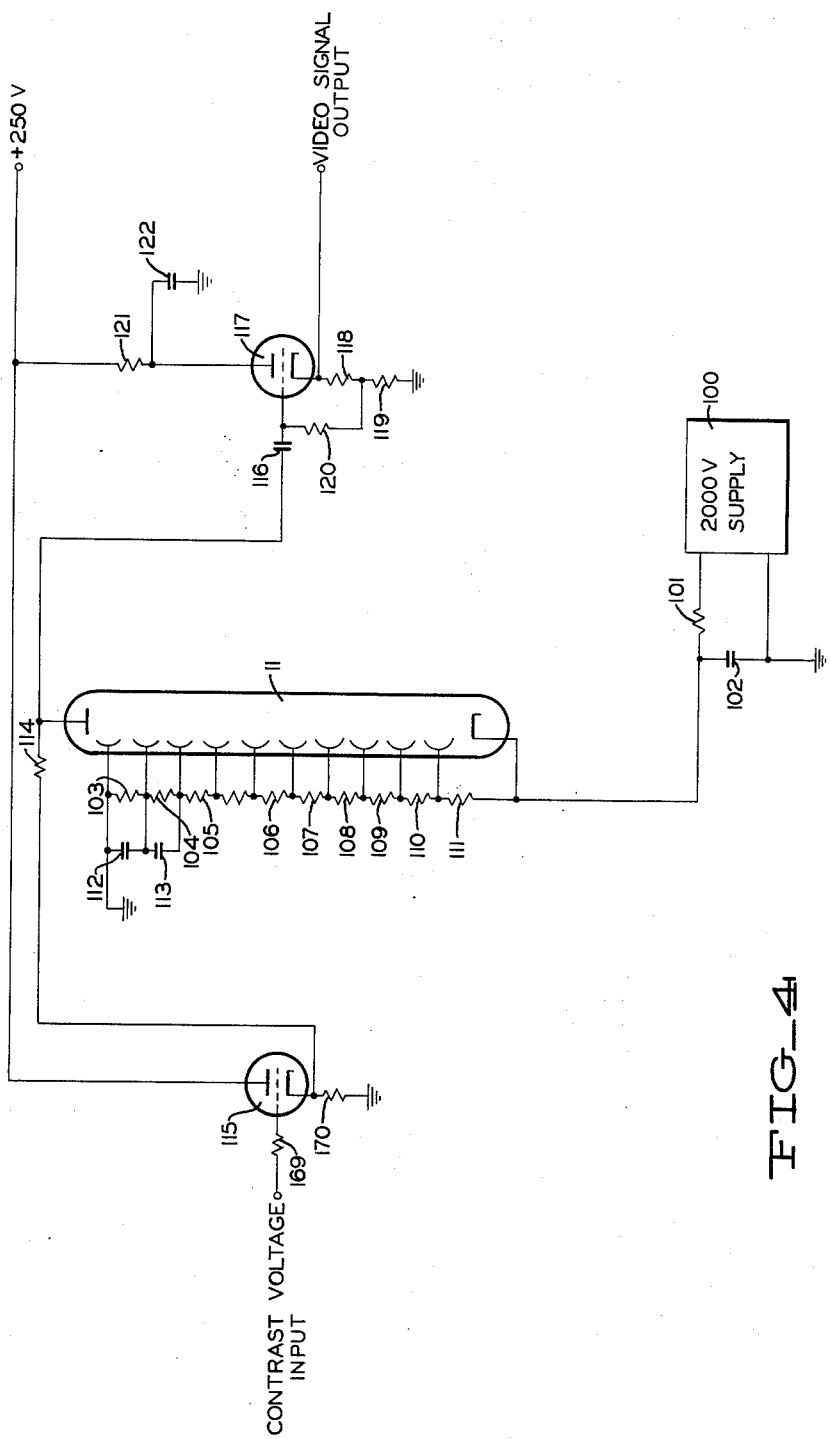

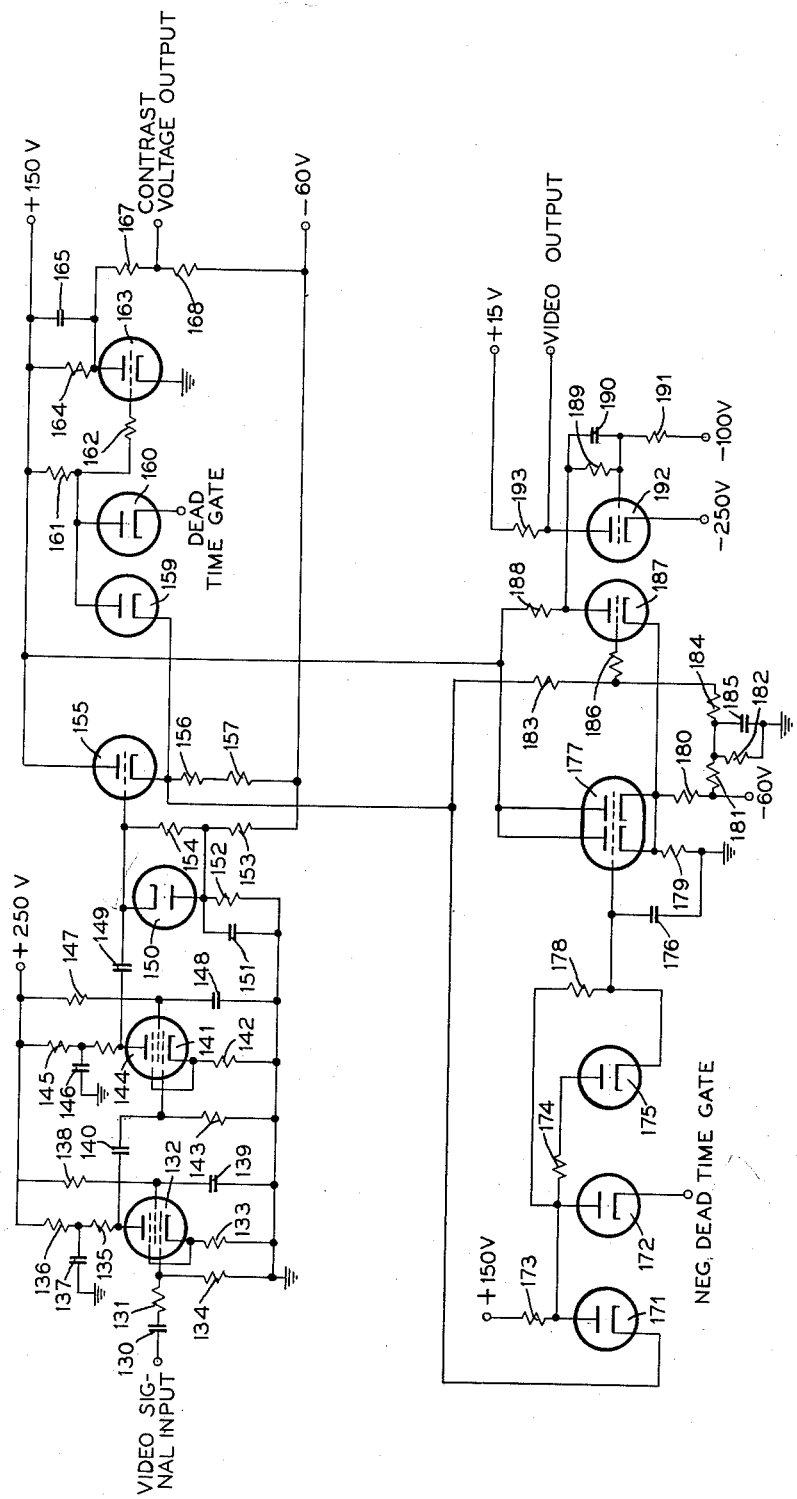

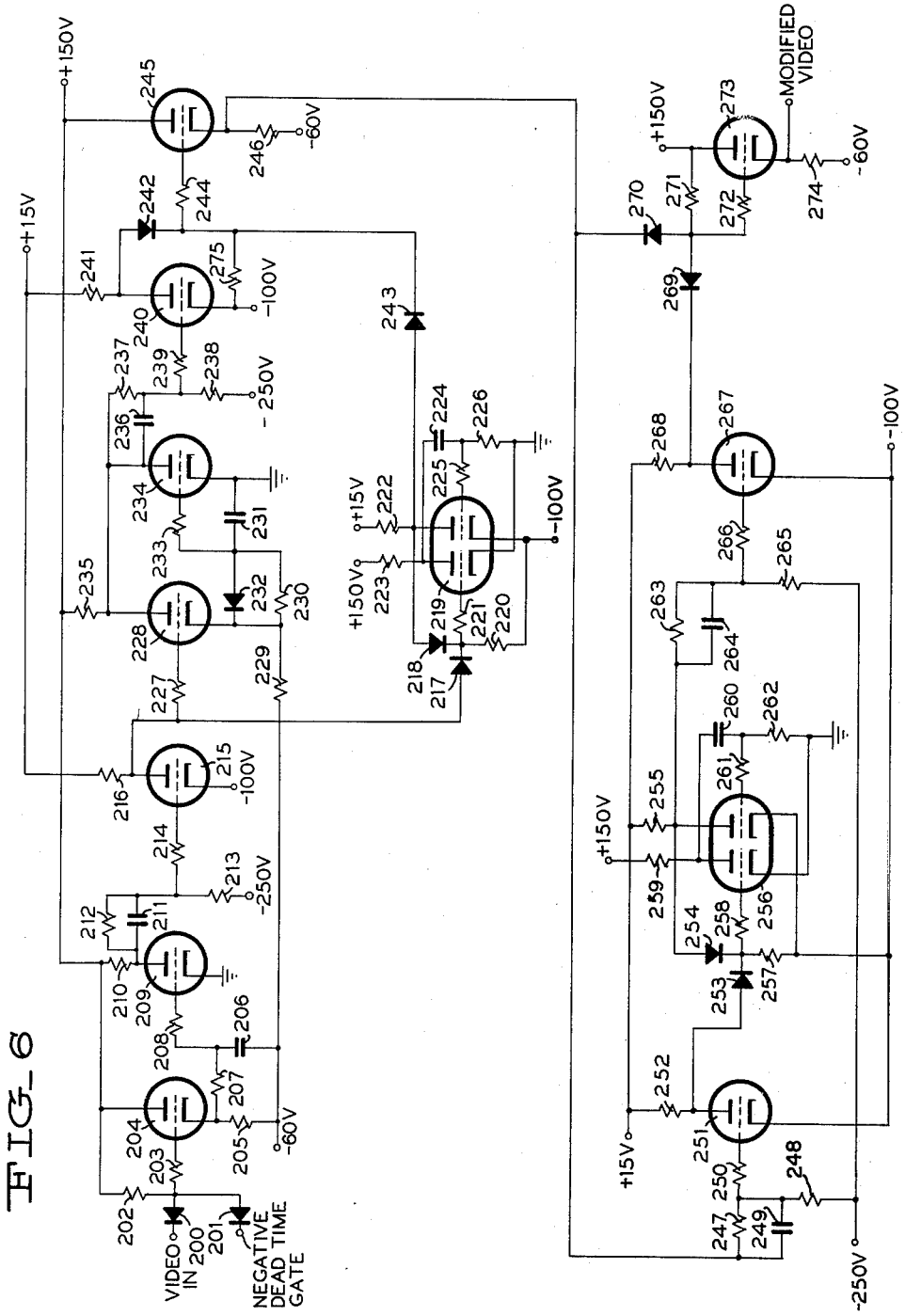

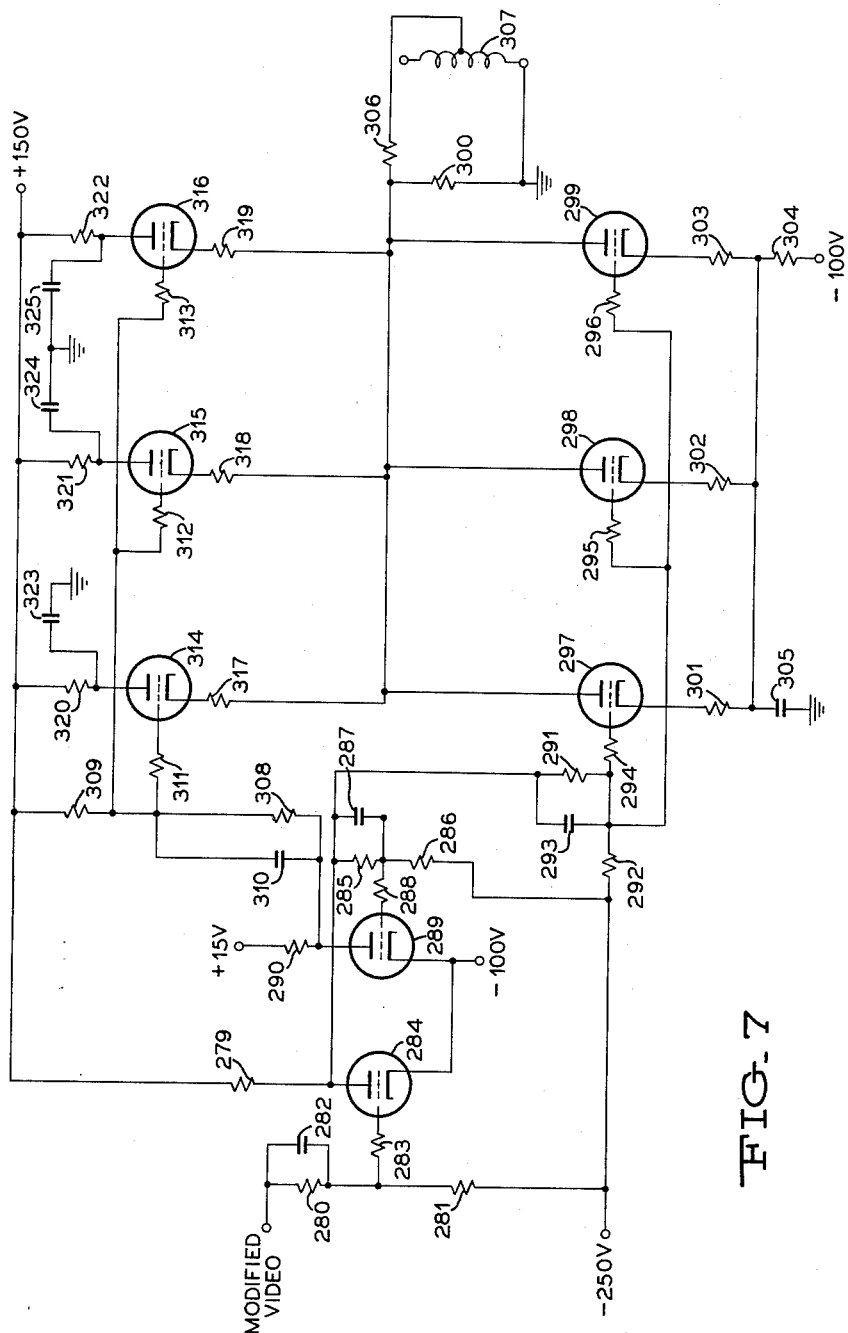

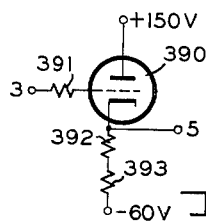
FIG_9a  FIG_9b
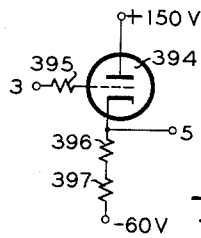
FIG_10a  FIG_10b
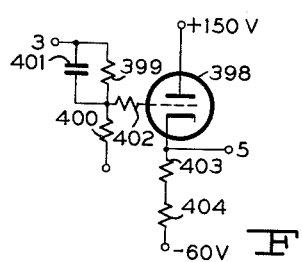
FIG_11a  FIG_11b
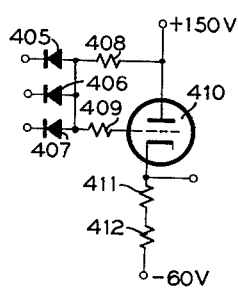
FIG_12a
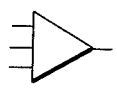
FIG_12b  FIG_12c

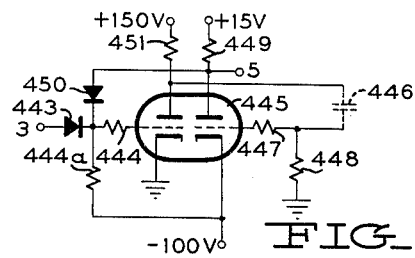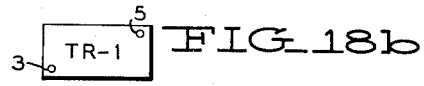
FIG_18a  FIG_18b
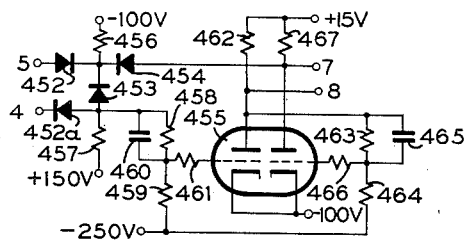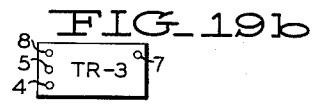
FIG_19a  FIG_19b
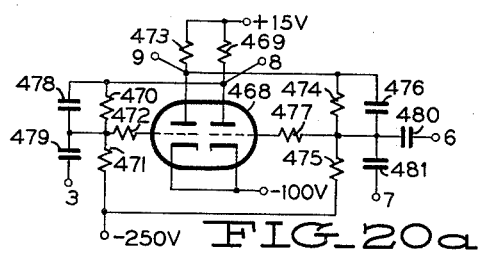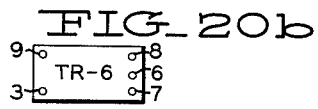
FIG_20a  FIG_20b
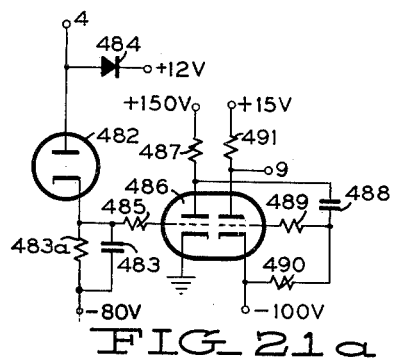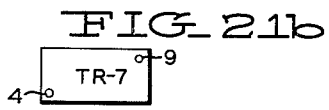
FIG_21a  FIG_21b

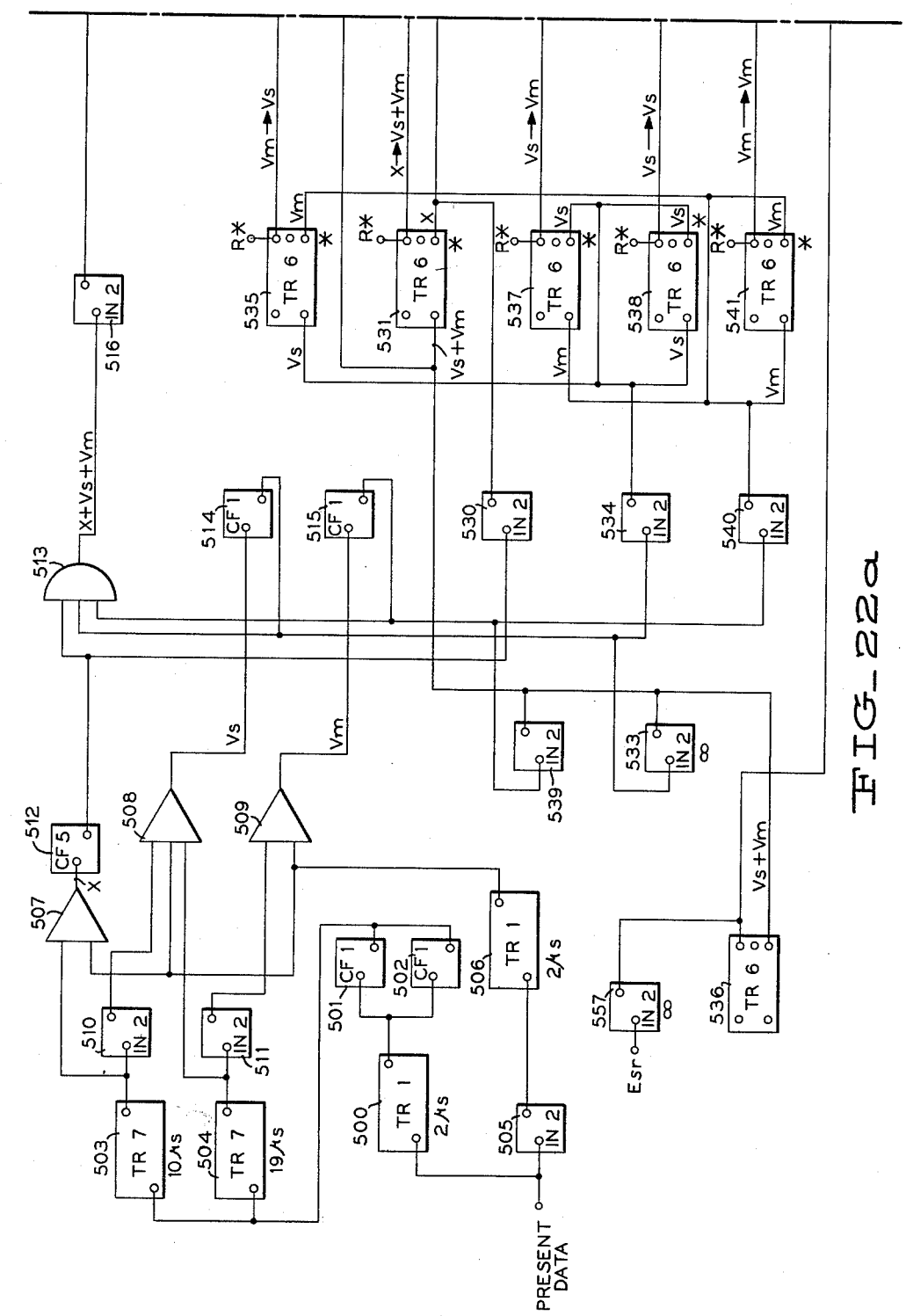

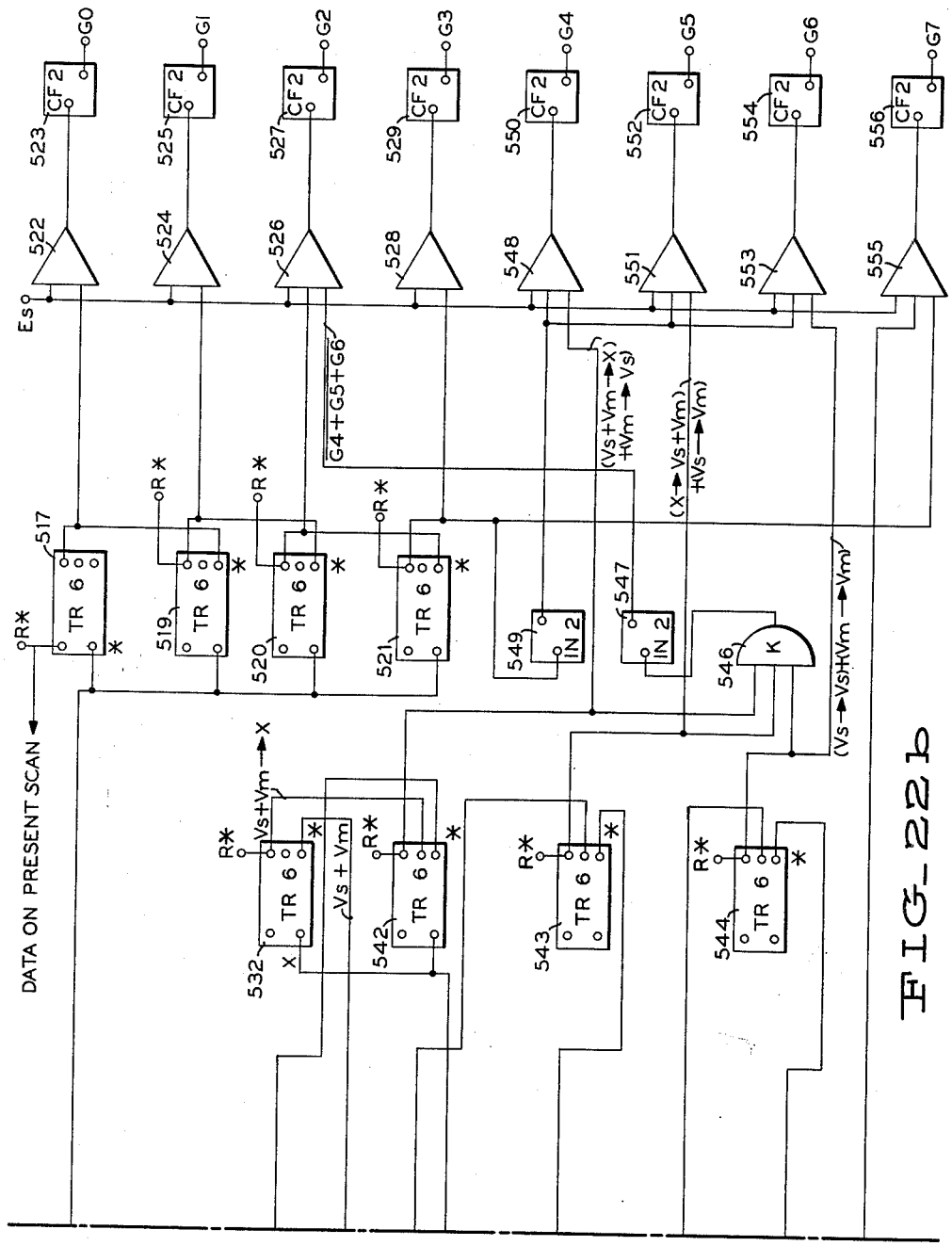
FIG_22b

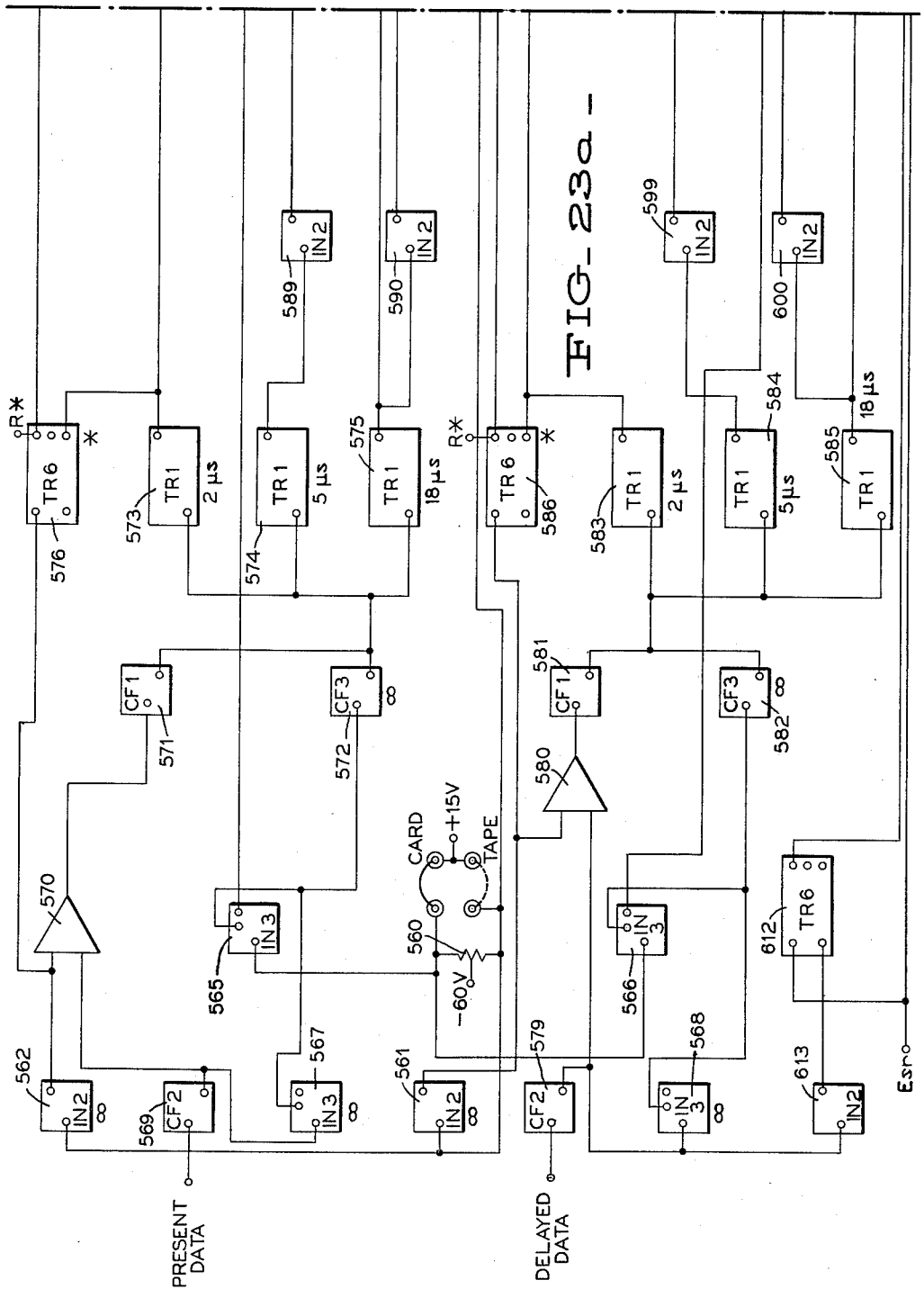

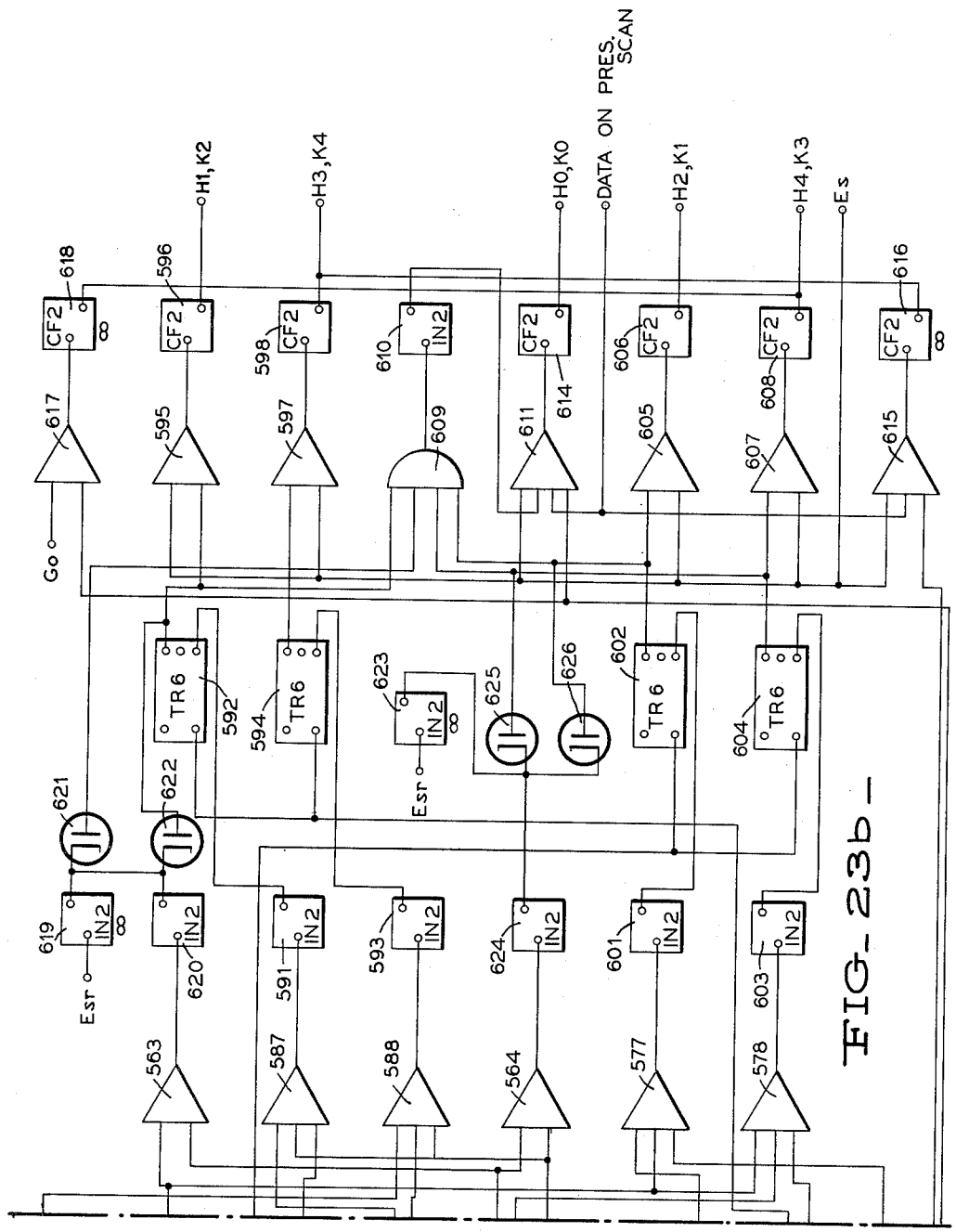

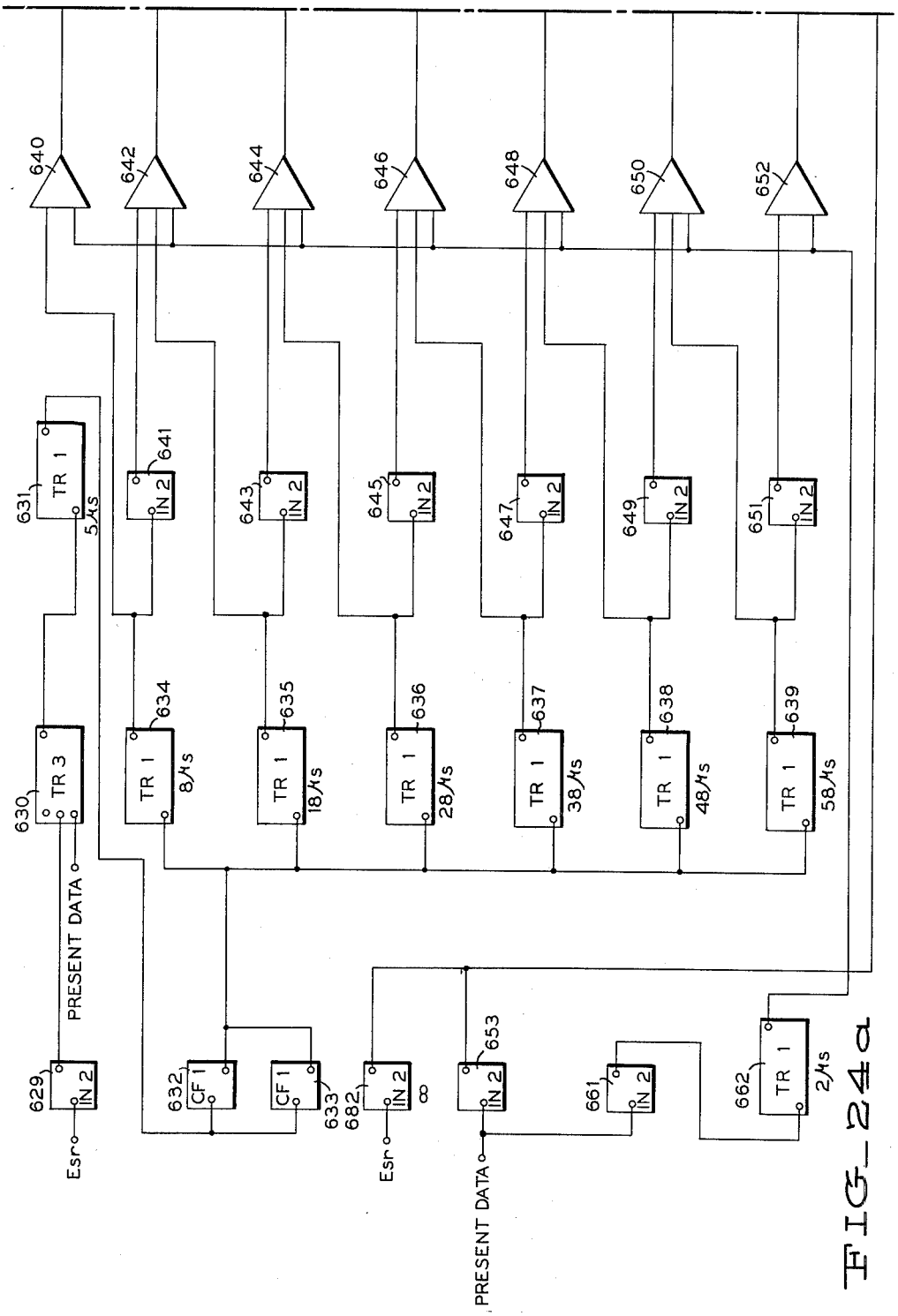

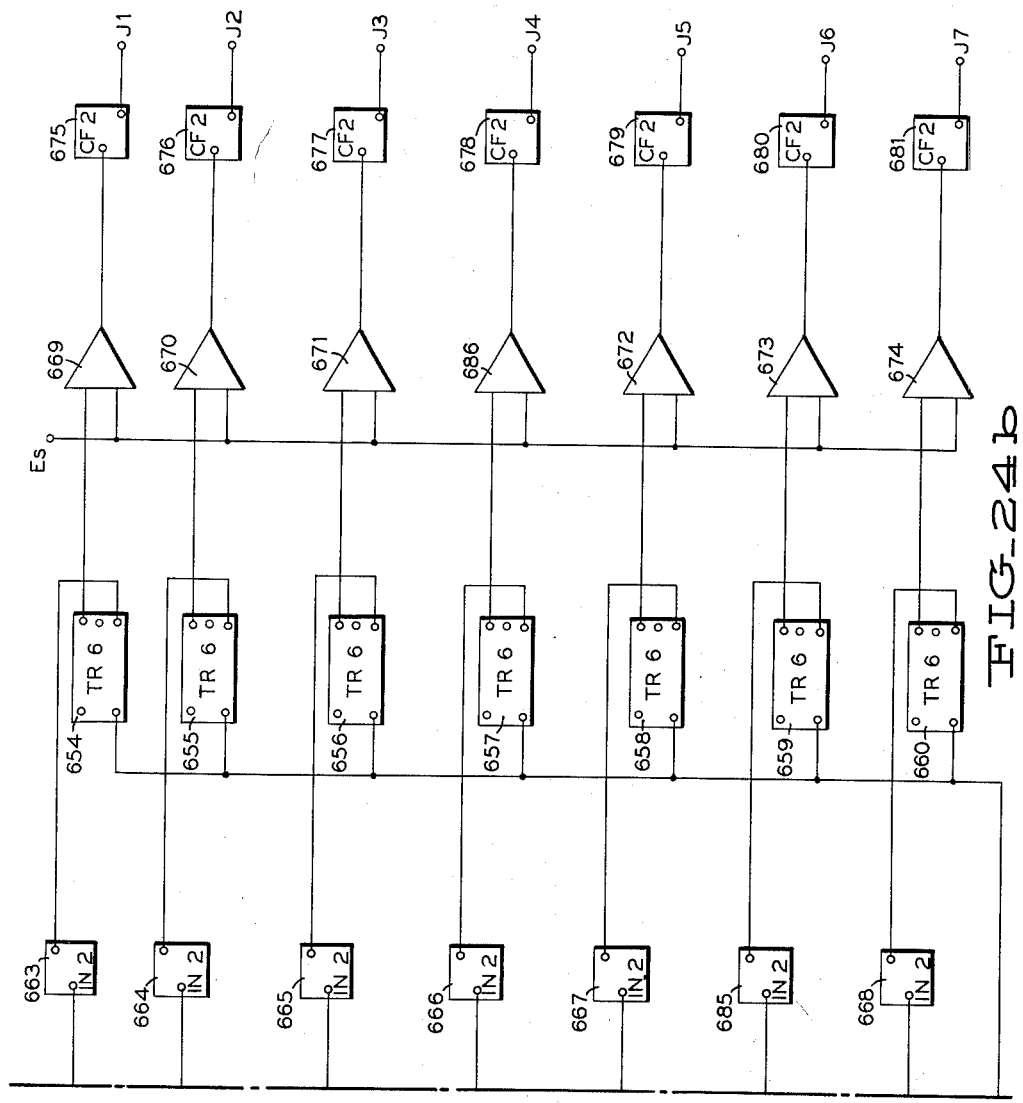

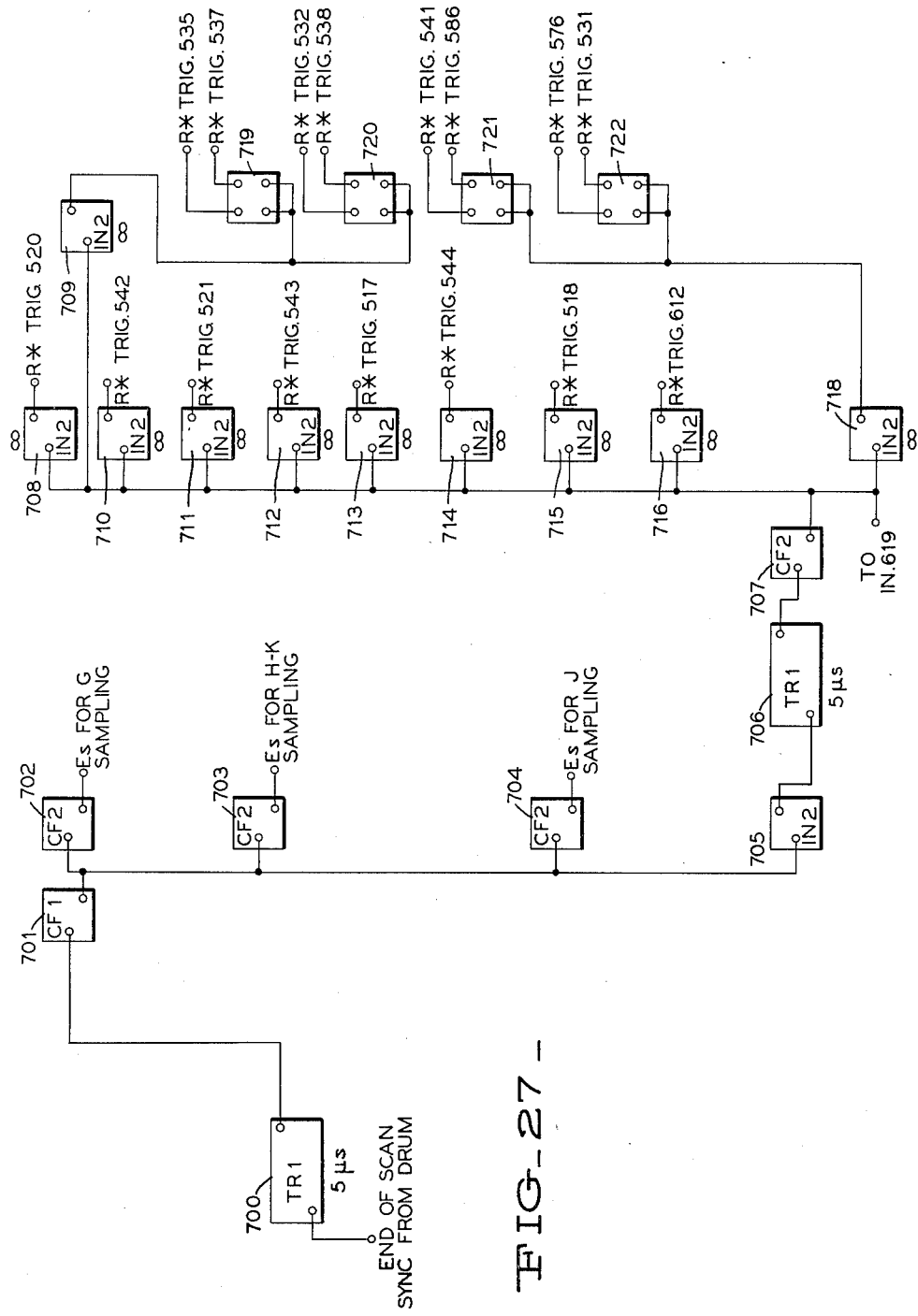
FIG_27_1

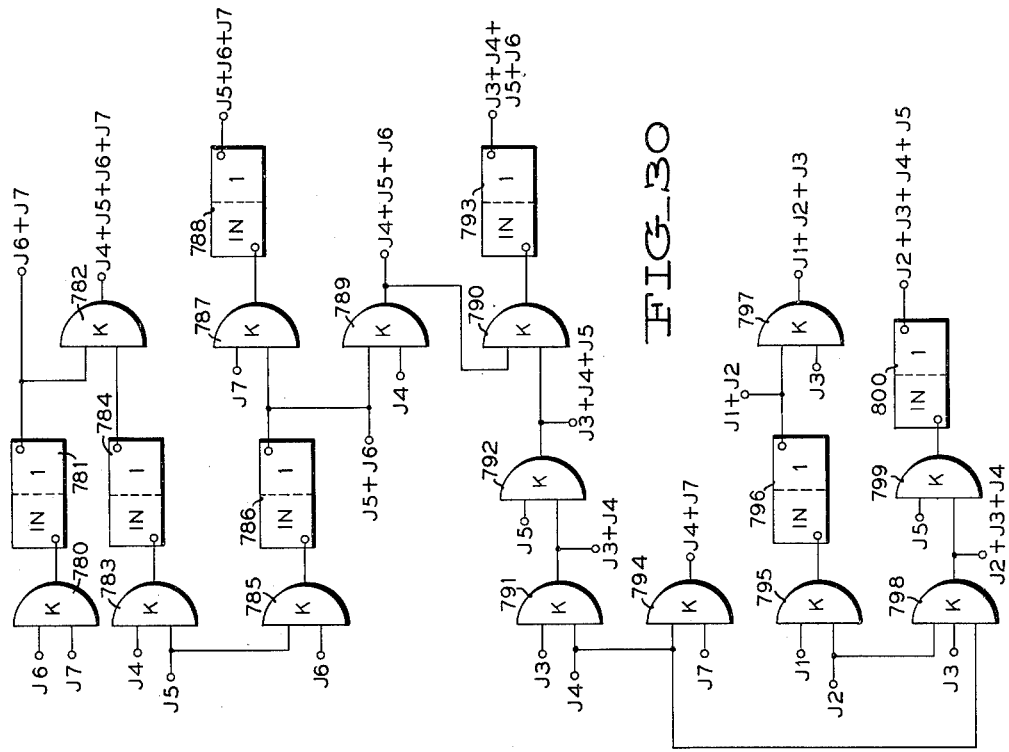
FIG_30
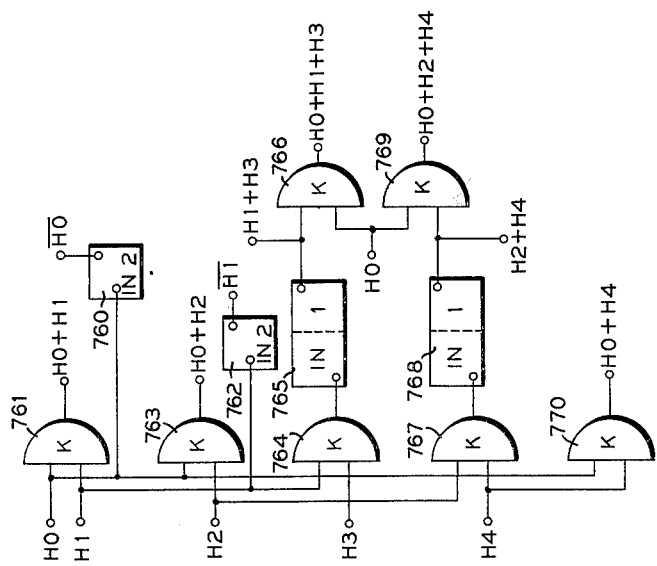
FIG_29

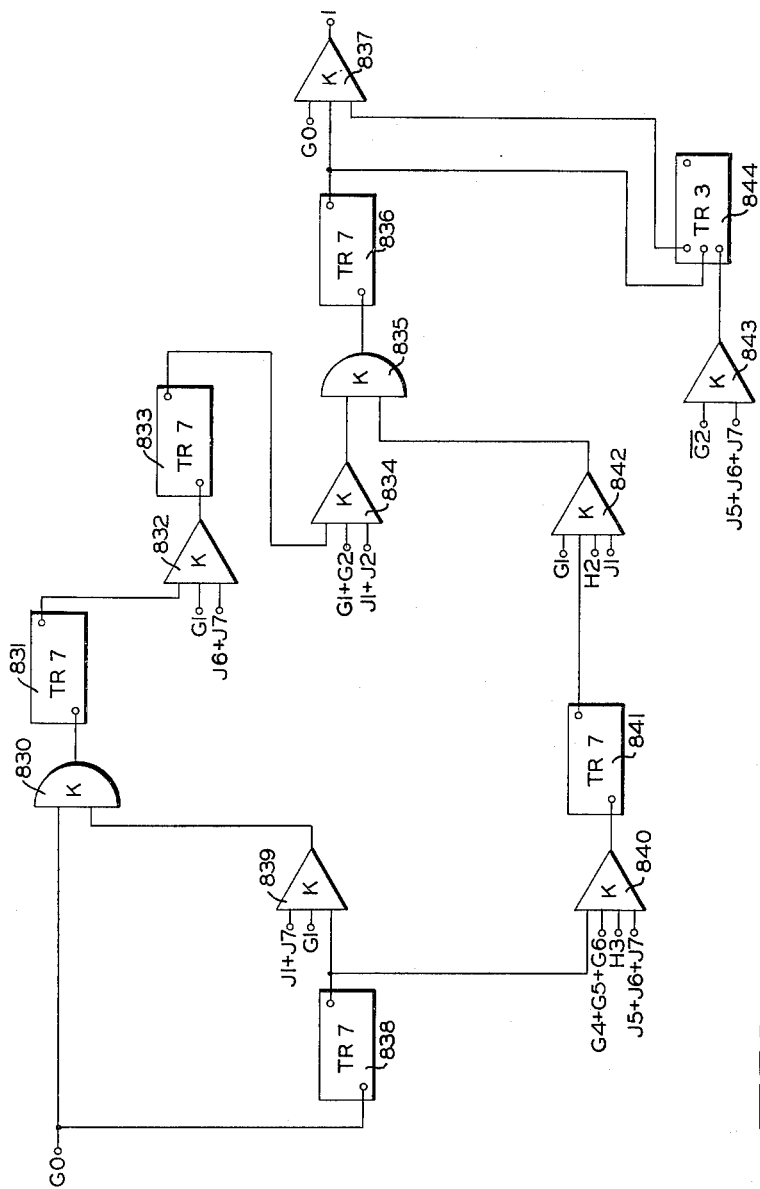
FIG_31

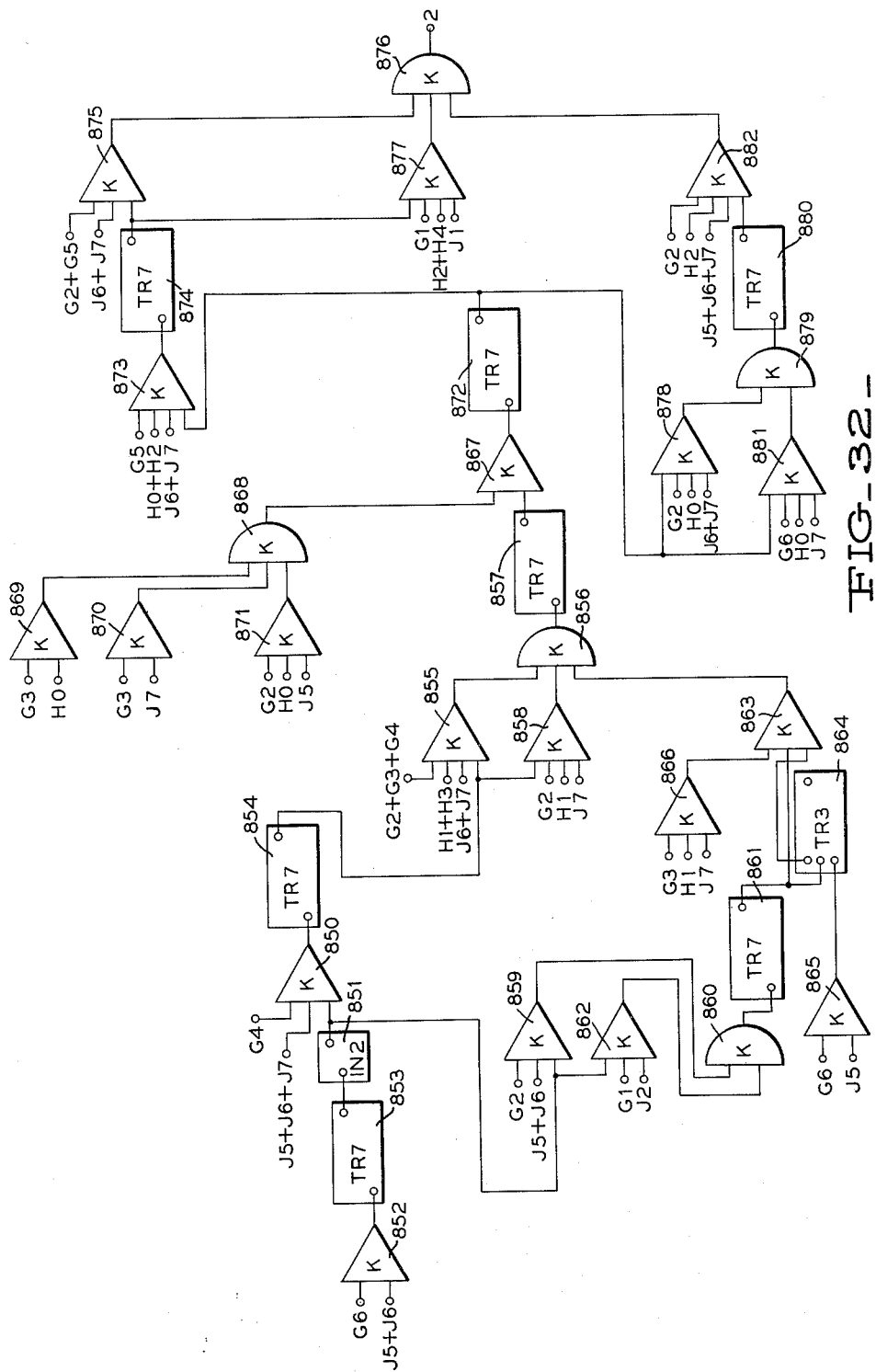

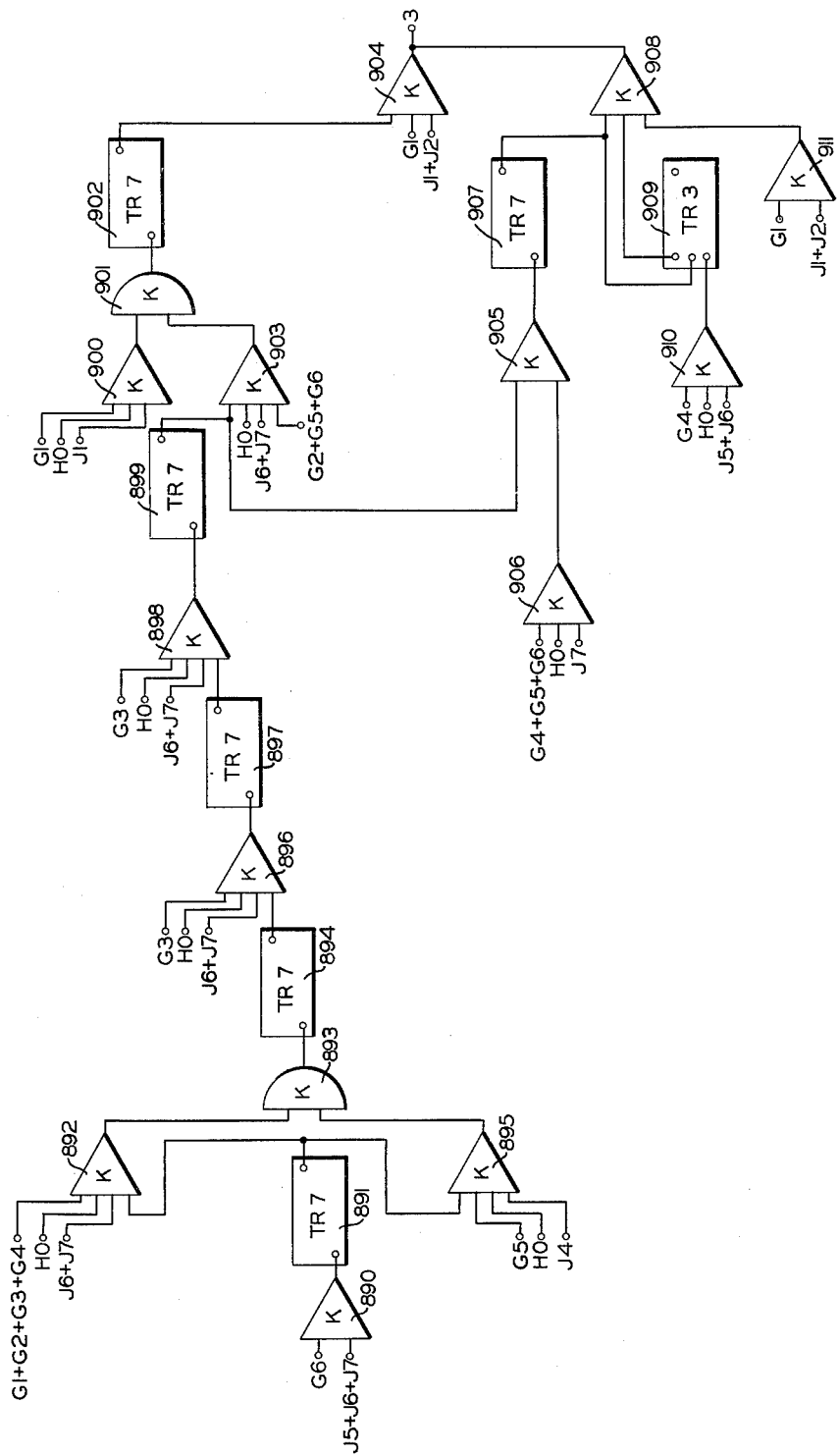
FIG_33

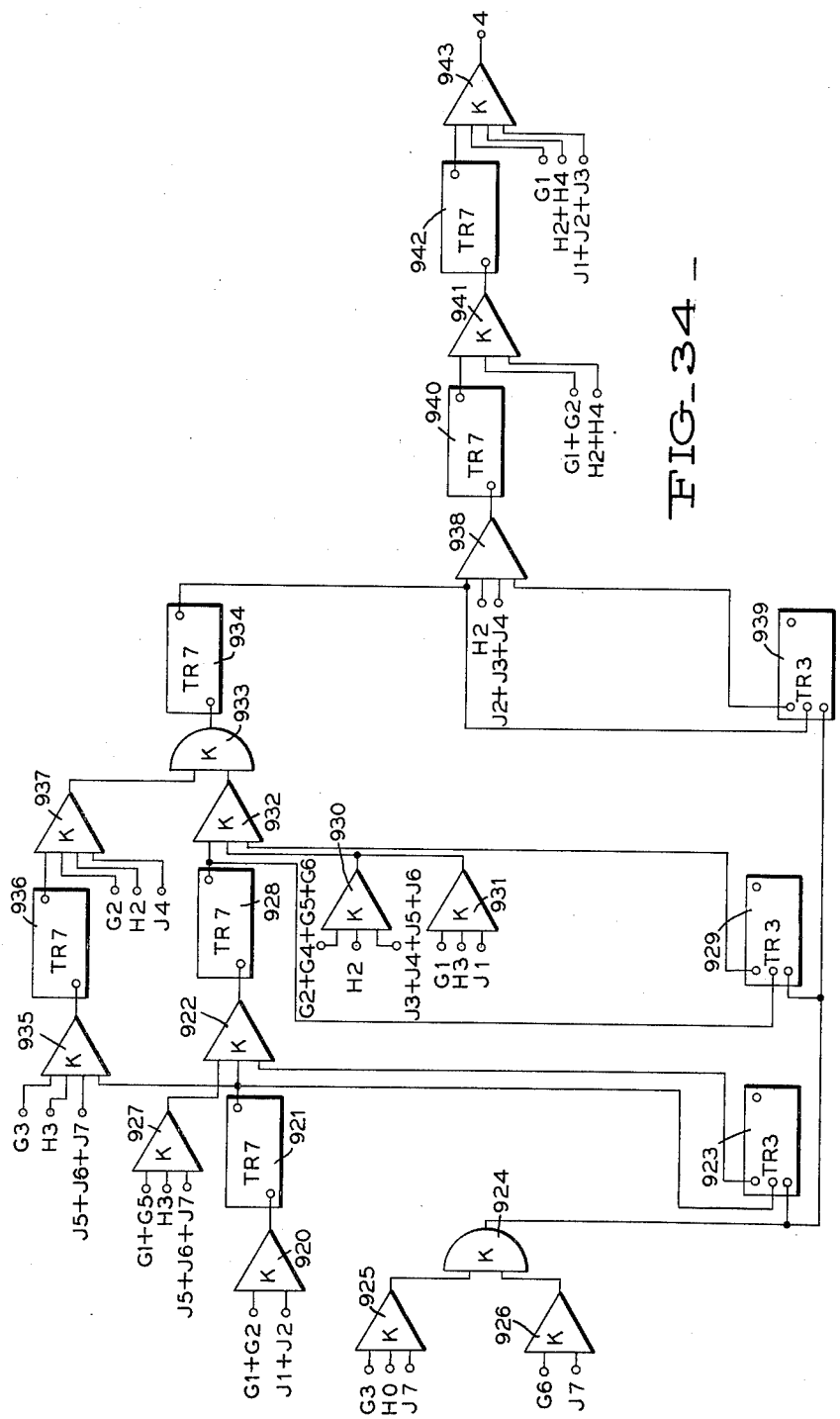

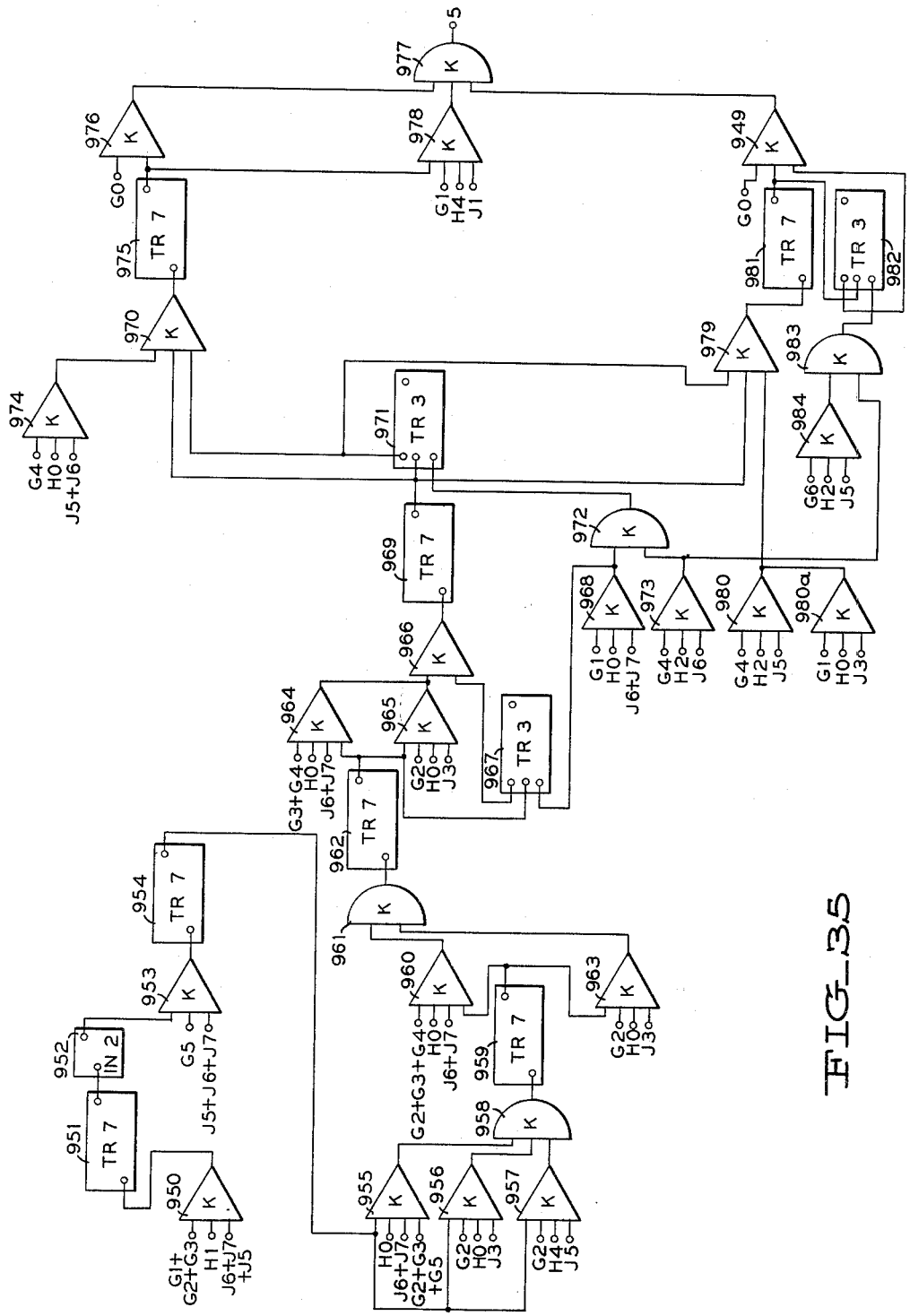

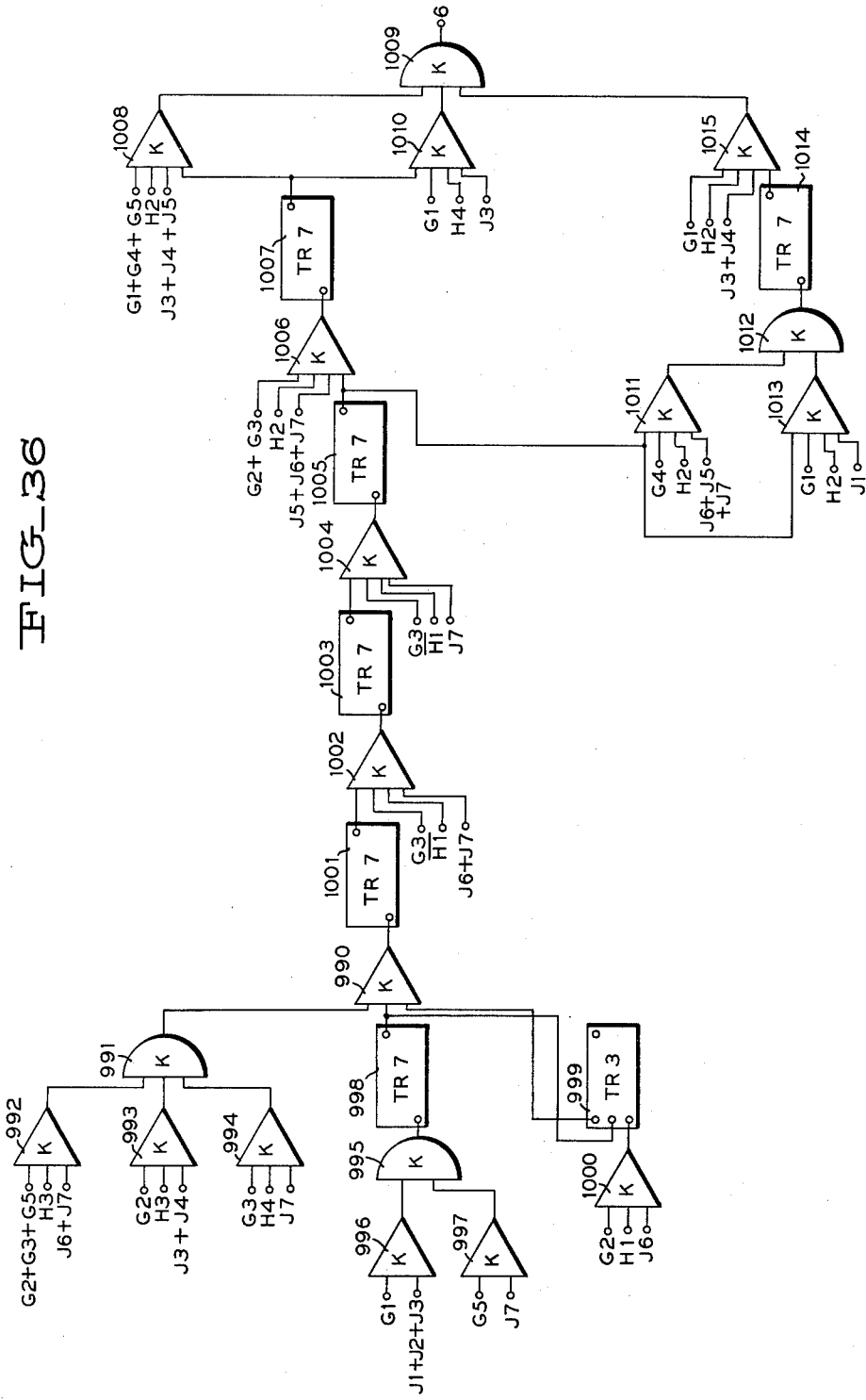
FIG_36

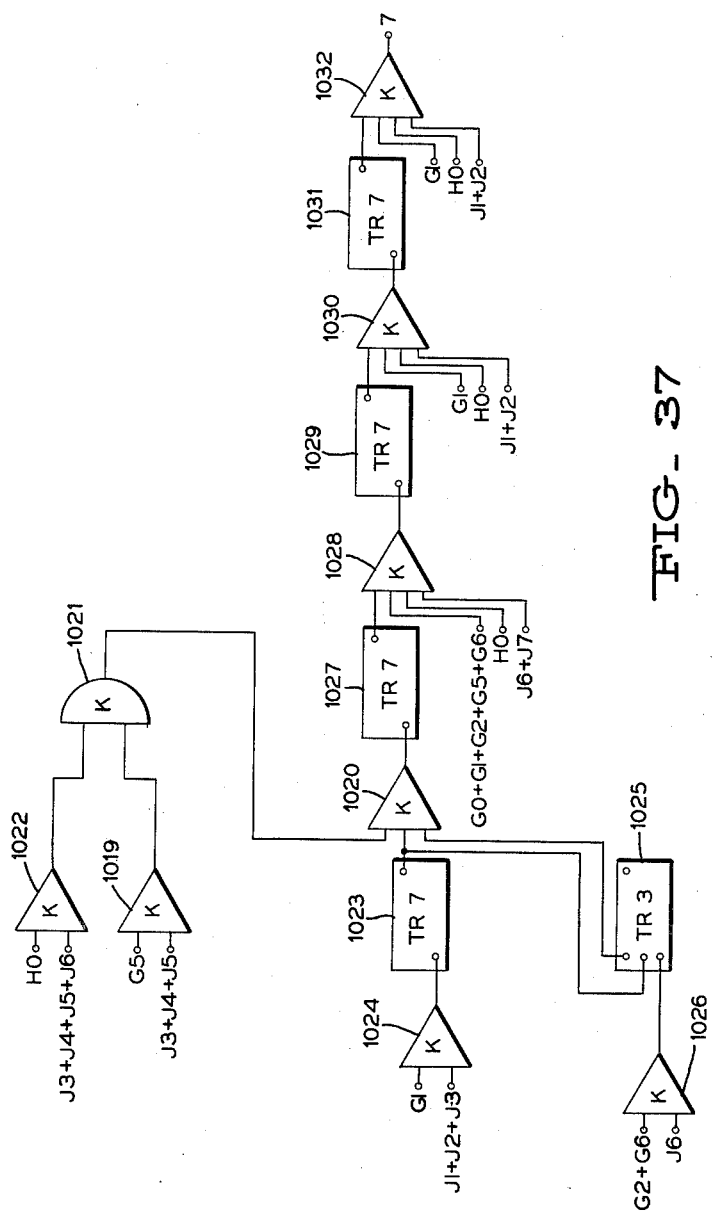

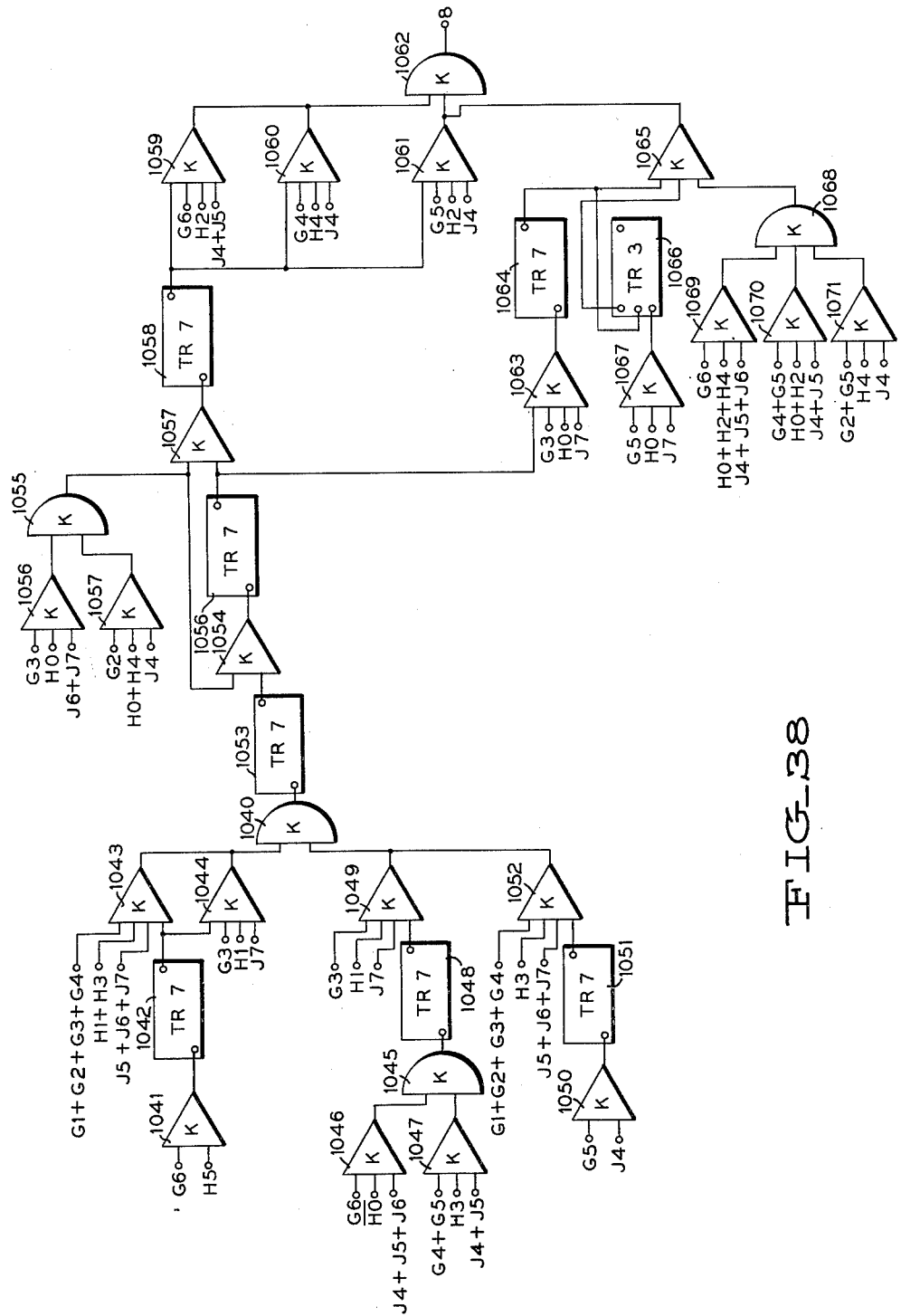
FIG_38

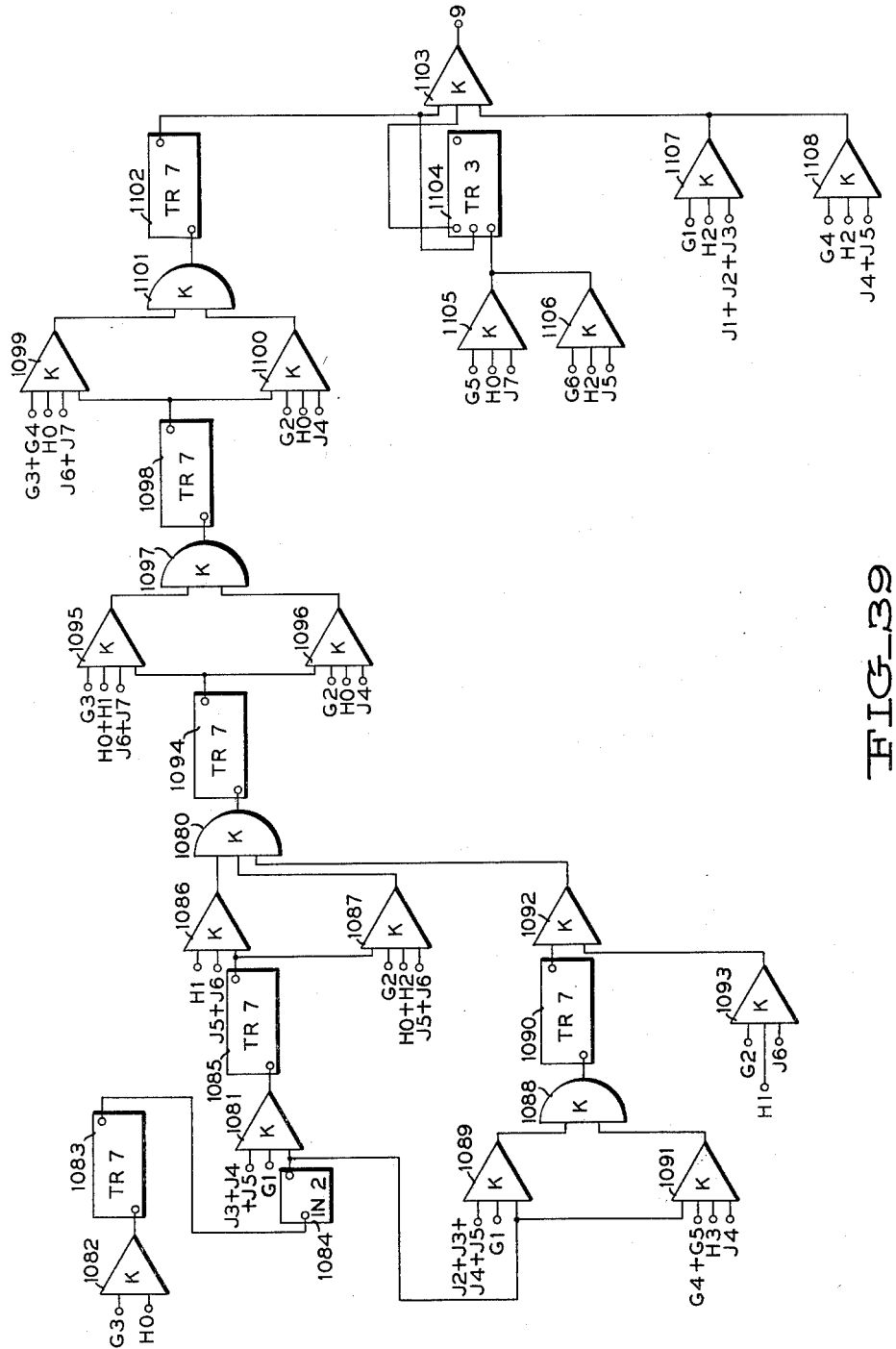
FIG_39

FIG_42.

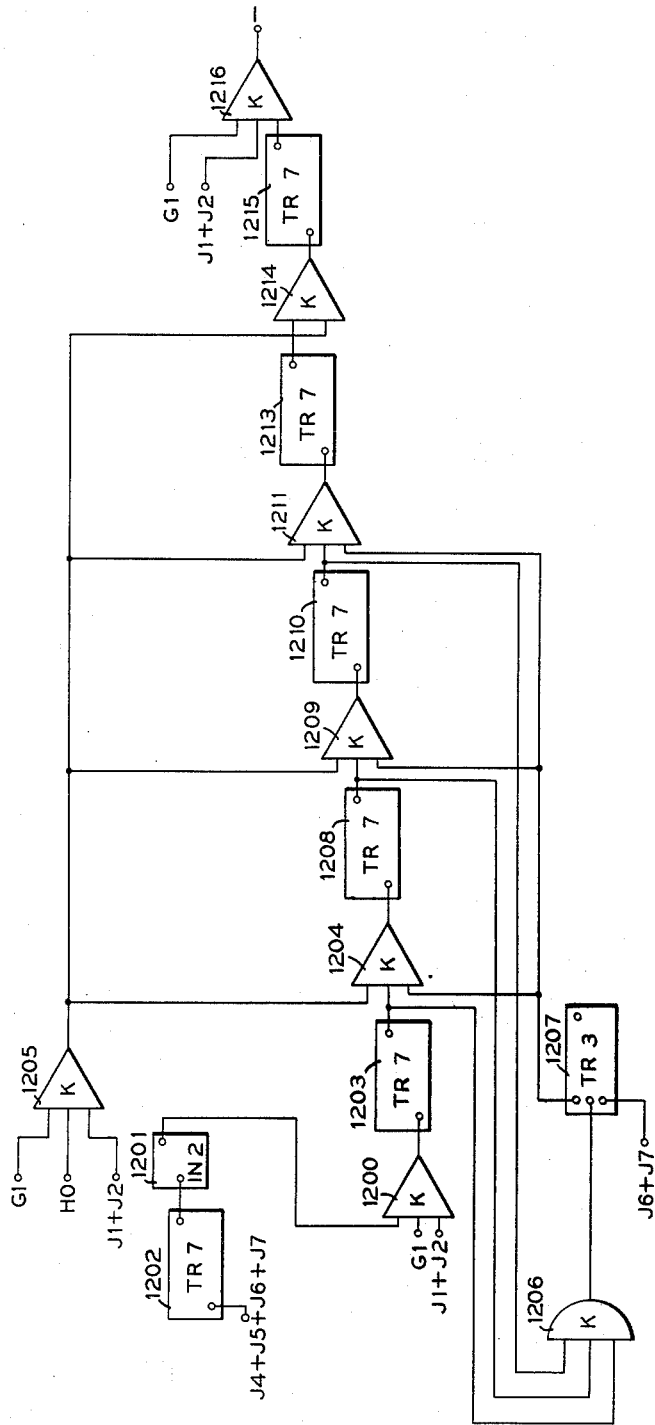
FIG_44

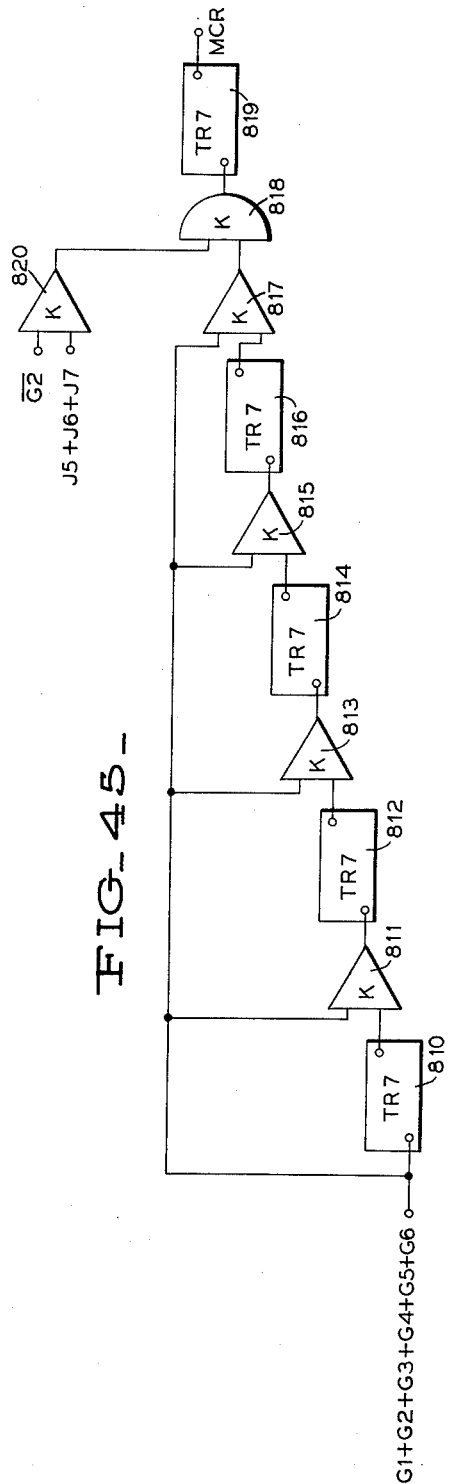
FIG-45-

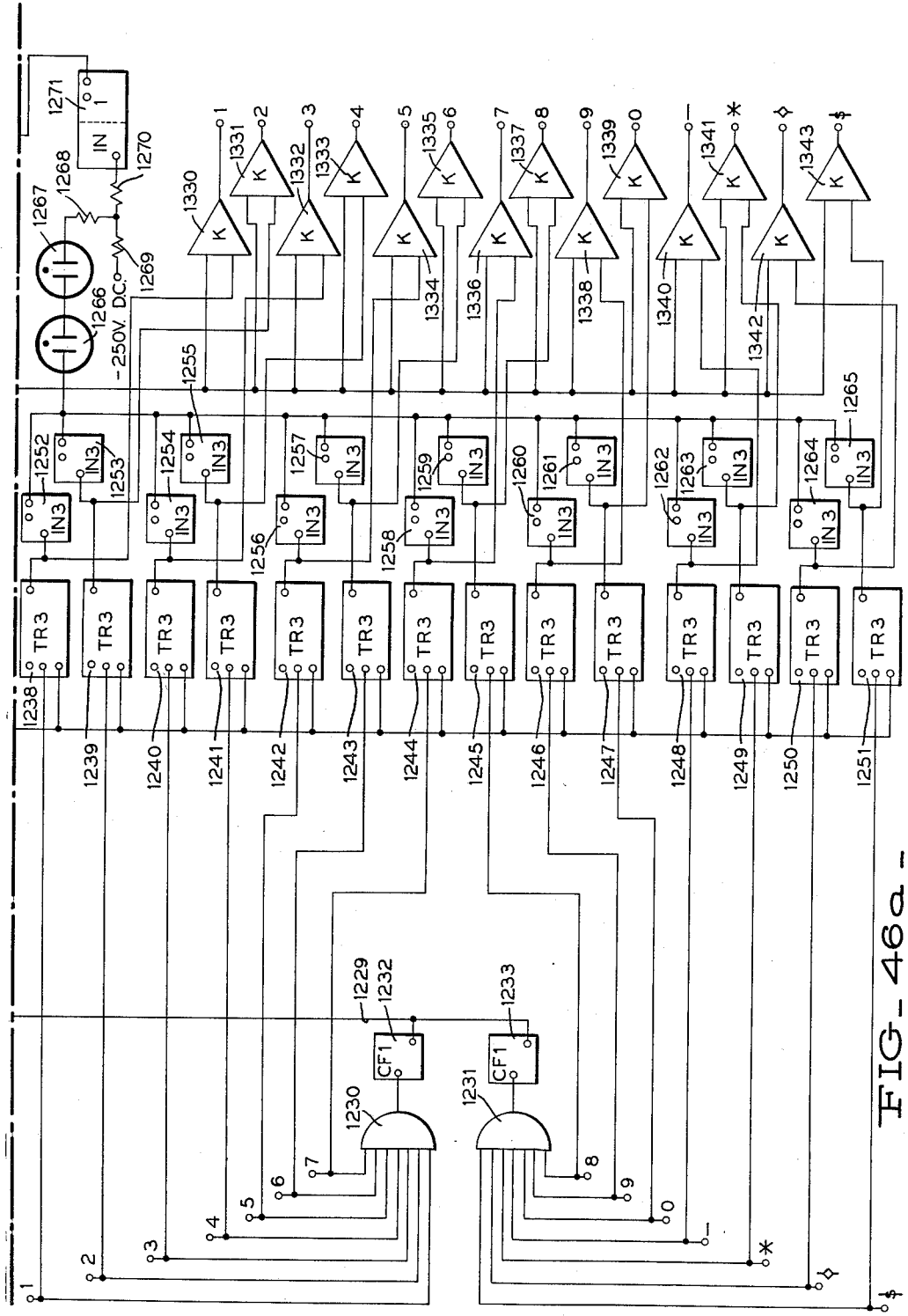
FIG_46a

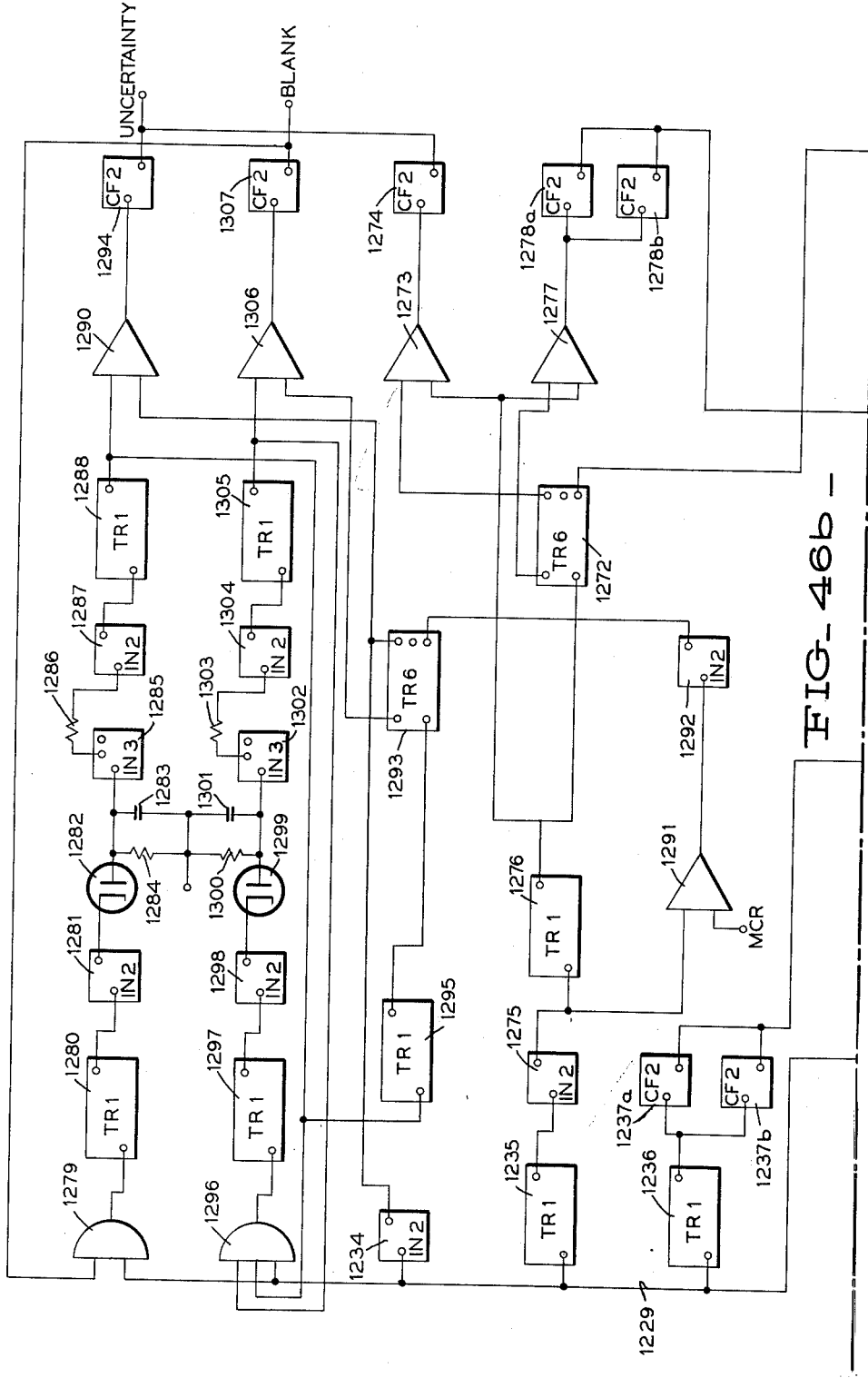
FIG_46b_

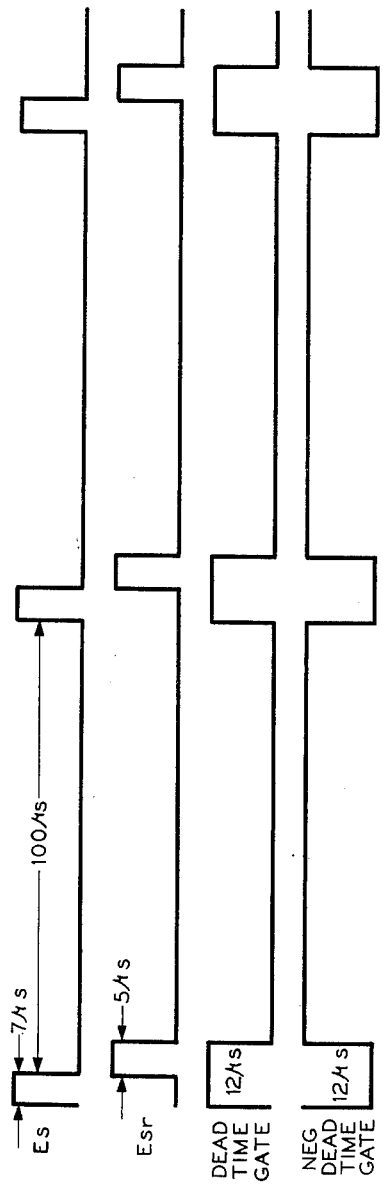
FIG_47
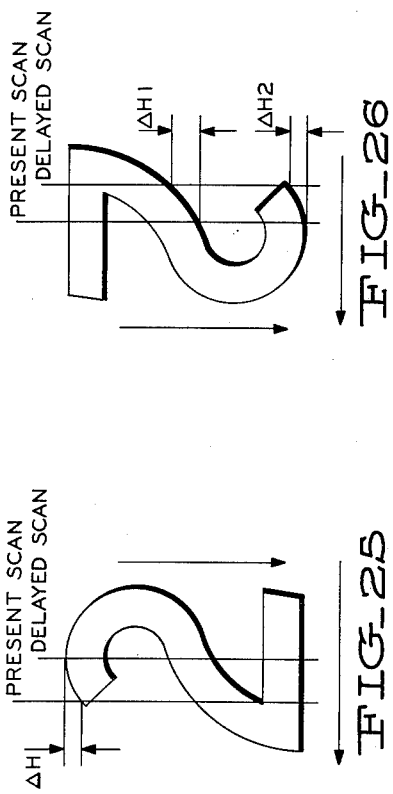
FIG_26
FIG_25
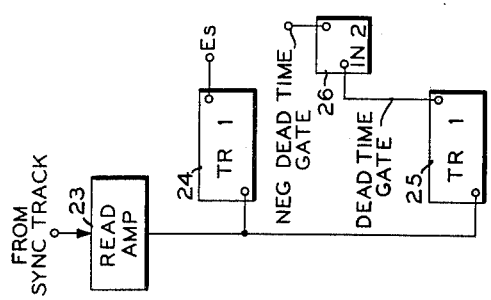
FIG_48

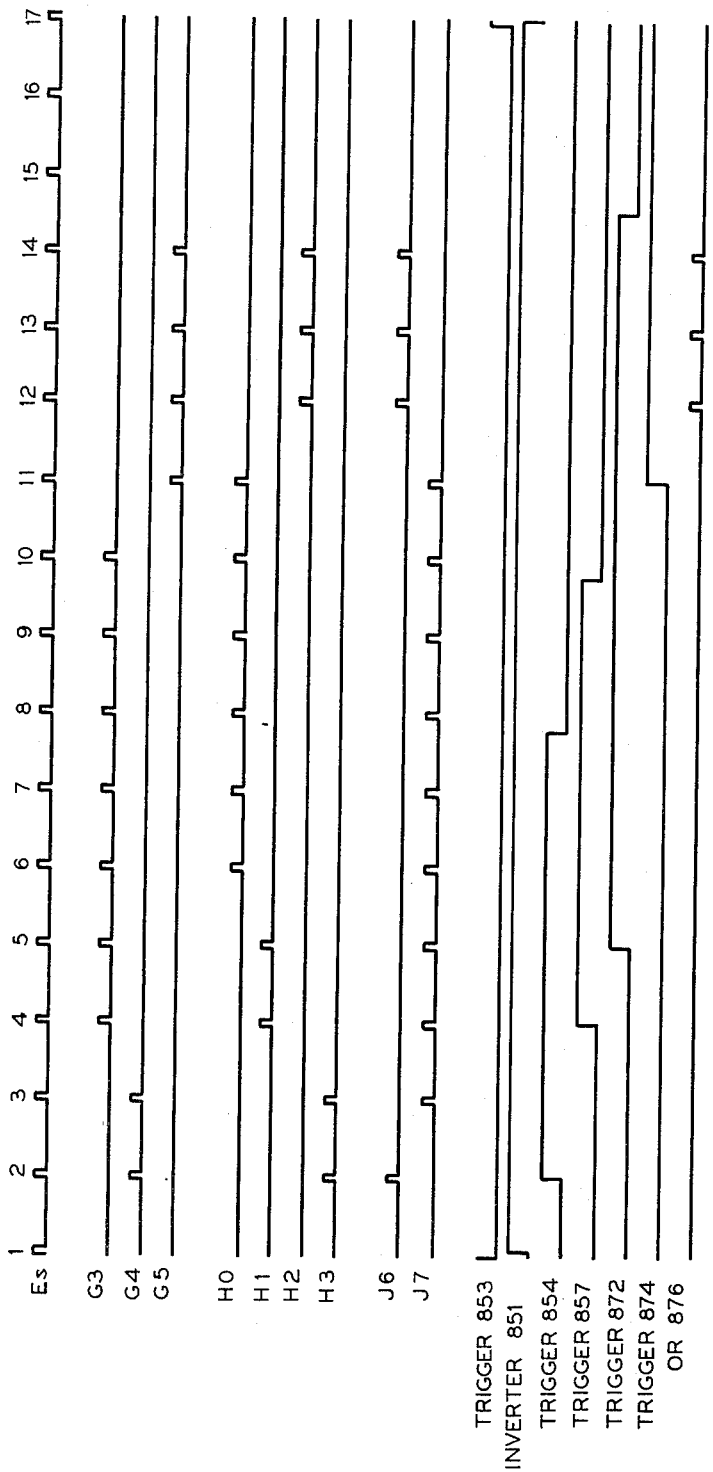
FIG_49

FIG_53

FIG_54

FIG_55

FIG. 58

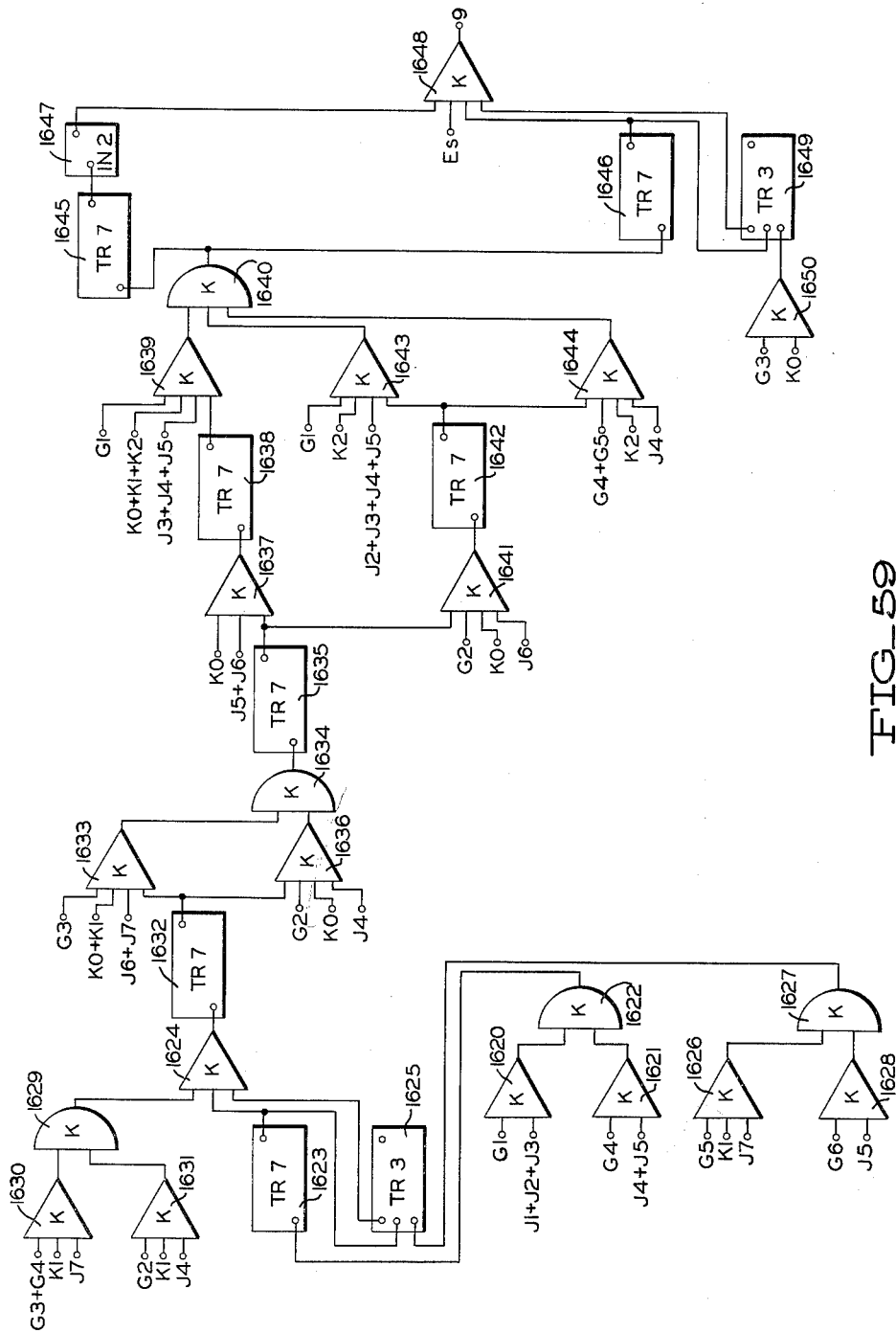
FIG_59

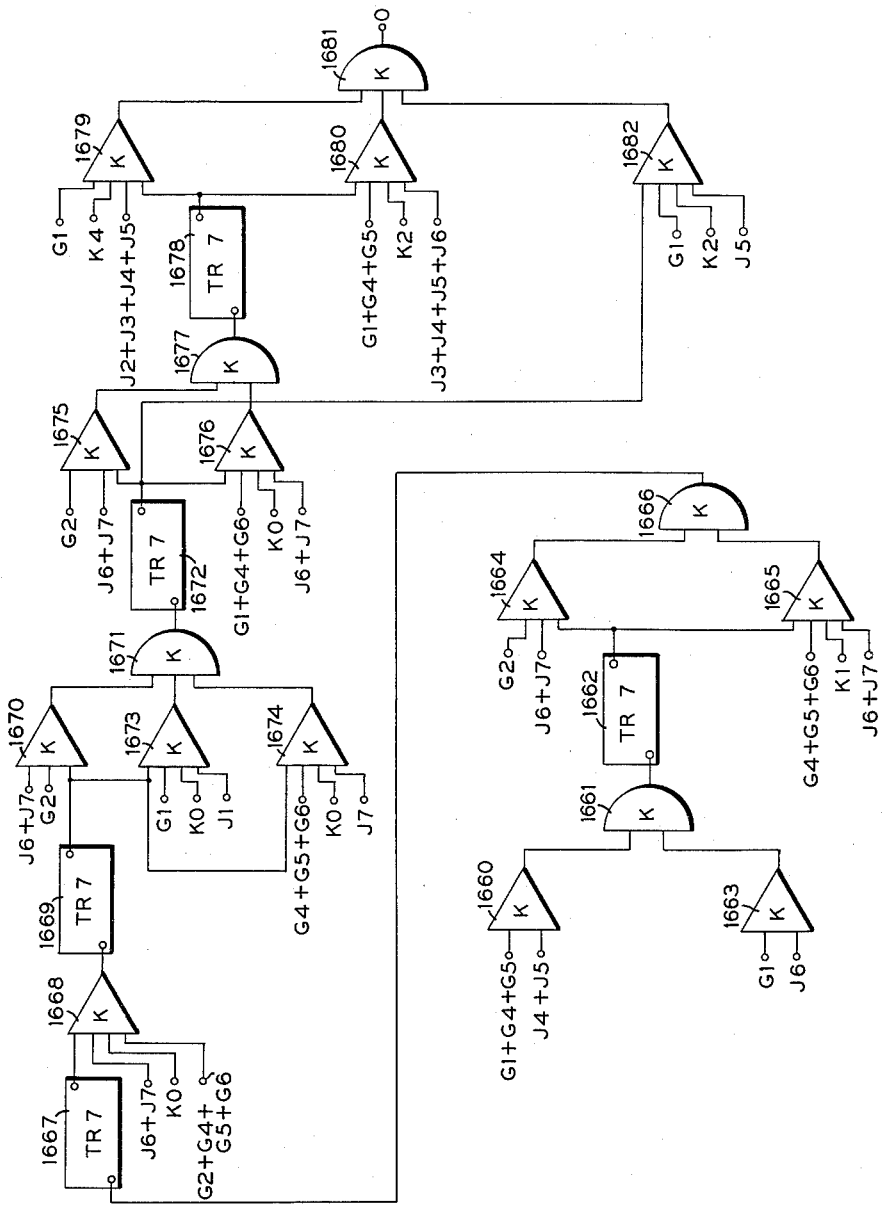
FIG_60

United States Patent Office

3,008,123
Patented Nov. 7, 1961

3,008,123
APPARATUS FOR ANALYZING INTELLIGENCE MANIFESTATIONS
William S. Rohland, Endicott, and Evon C. Greanias, Vestal, N.Y., assignors to International Business Machines Corporation, New York, N.Y., a corporation of New York
Filed Apr. 2, 1956, Ser. No. 575,424
19 Claims. (Cl. 340—149)

The present invention relates to apparatus for analyzing intelligence manifestations and recognizing patterns or sequences therein to produce identification signals, and particularly to such an apparatus suitable for use in identifying character manifestations which may appear on a document.

The primary object of this invention is to provide an improved information analyzing system.

One of the most basic sources of information in the business and scientific fields is a printed document. The information in this document is normally transcribed manually into some media, such as punched cards or tape, so as to be suitable for machine use. In the present invention, the information on the document is in the form of character manifestations is scanned by suitable apparatus to produce signal patterns which are analyzed to identify the character manifestations scanned.

Many attempts have been made in the past to produce apparatus for sensing indicia manifestations such as printed or otherwise formed characters. These characters may be alphabetic letters, numerals or various special symbols. Early attempts in in sensing characters involved the use of a beam of light which progressively traversed the character and caused the characteristics of the area traversed to control the operation of a light sensitive device. The logic used to identify the character was generally dependent on the times which certain unique portions of the character were sensed by the scanning beam. Such systems were relatively slow and were limited to the sensing of characters properly positioned in relation to the scanning beam and many times such characters had to be specially formed. Other attempts were made along similar lines on characters which were specially formed with code marks either above or below the character. Although this provided a relatively simple means of identifying characters, little commercial use resulted due at least in part to the extensive conversion necessary in printing equipment to produce the specially formed characters. Then too, the document was not entirely suitable from an appearance standpoint to be used as a business document.

A later approach to sensing characters involved the so-called mask matching technique. In this approach, an opaque disc, having a plurality of openings therein in the form of character outlines, is disposed between an illuminated document, having printed characters thereon, and a photocell. When the photocell senses the fact that a match exists between a particular character outline on the disc and the character outline on the document, an output signal is produced indicative of the identity of the character.

The present invention is an improvement on application Serial No. 575,425, filed April 2, 1956, for Evon C. Greanias and Arthur Hamburgen, and assigned to the assignee of the present invention. In the referenced application, vertical scans were made through a character, the successive scans progressing across the character from one side to the other. The scanning apparatus produced varying signal levels which distinguish the character portions from the background.

In the afore-mentioned application, the video signals from the photomultiplier were sampled a predetermined number of times during each scan and supplied to a number of circuits which encoded the video signals to produce signature components. One group of the signature components related to various lengths of vertical lines detected on two adjacent scans. Another group of signature components related to the size of the included white area between two crossovers on each of two adjacent scans. Still another group of the signature components related to the number of crossovers obtained on two adjacent scans through the character. The requirement of particular conditions on two adjacent scans was made to assure that valid signals were received.

The signature component signals were each entered into a separate delay line and progressively advanced down the delay line on a periodic basis. A matrix of switching devices was provided to "look" at the signals at particular points in certain ones of the delay lines to produce indications of certain coincidences of signature components.

An additional group of signature components was produced in the afore-mentioned application which related to the upper contour of the character being scanned. The circuit compared the position of the portion of the upper contour sensed on one scan with the position of the portion of the upper contour sensed on the immediate previous scan.

The signature component signals relating to the upper contour of the character and those relating to the vertical lines, the included white areas and the number of crossovers were fed to a plurality of sequencing circuits which also received the outputs from the matrix of the switching devices afore-mentioned, as well as signals from various points in the delay lines. There was provided a sequence circuit for each character which was to be identified. When a particular combination of signals were indicated as being in existence at a sequence circuit, an output signal was produced indicating the identity of a particular character. That is, each sequence circuit would only produce an output signal when at a particular instant, the proper input signals were indicated as being in existence.

So that a large number of type fonts could be identified by each of the sequence circuits, alternate requirements were made in each circuit so that several different conditions could still result in producing an output signal.

The present invention differs from the afore-mentioned Greanias et al. application in both the logic used to encode the video signals, the circuitry utilized to perform the encoding operation, and the sequencing circuits. In the present invention, the video signals obtained in scanning the character are improved and fed to a circuit which produces minimum black and minimum white signals. Each black signal indicates that a portion of the character was sensed by the scanning means while each white signal indicates that a portion of the background surrounding the character was sensed. These signals are entered into storage on a magnetic drum. The information stored on the drum is taken off at a first station to produce what may be termed PRESENT DATA. A predetermined period of time later, the information on the drum is taken off at a second station to produce what may be termed DELAYED DATA. The signals in the DELAYED DATA are the same as those previously supplied three scans earlier as PRESENT DATA. Thus, it is possible to learn simultaneously what is happening on a so-called present scan as well as what happened three scans previously.

There is provided a first circuit which receives the PRESENT DATA signals and looks for signals indicating that the scanning mechanism looked at portions of the character of particular ranges of lengths during a scan, and that a certain number of different portions of the character was sensed during a scan. In addition to this, the circuit detects the sequence during a scan in which character portions of different or similar ranges of lengths are sensed. For example, the circuit may sense the fact that one, two or three different portions of a character were sensed during a scan, that a short portion was sensed followed by the sensing of another short portion or a longer portion, or that a relatively long portion was sensed followed by the sensing of a long portion or a shorter portion. The output signals from this circuit are termed G signals.

The PRESENT DATA and DELAYED DATA signals described above are supplied to another circuit which produces signals indicative of various positional relationships between the upper contour of the character as defined by the PRESENT DATA and the upper contour of the character as defined by the DELAYED DATA. One of the novel aspects of this circuit is that it can produce its output signals regardless of whether the characters are scanned from the top to the bottom in scans which progress from right to left across the character, or whether the characters are scanned from bottom to top in scans which progress from left to right across the character. The output signals from this circuit are termed H signals or K signals depending on the method of scanning.

Another circuit is provided which receives the PRESENT DATA signals and indicates therefrom which range, out of several ranges of distances, the distance between the upper and lower contours of a character sensed during a scan falls within. The output signals from this circuit are termed J signals.

The G, H and K and J signals described above are adapted to be fed to a group of sequence circuits, there being one sequence circuit for each character which is to be identified. Each of the sequence circuits does not look for a particular combination of signals to all occur at once as was the case in the Greanias et al. application.

In the present invention, the detection of a first set of conditions allows a switch a predetermined period of time to receive a second set of conditions. If the second set of conditions occurs within the prescribed time, then another switch is allowed a predetermined number of scans to look for still another set of conditions. This action continues until the required sets of conditions have been received in the proper sequence, at which time an output signal is produced representative of the identity of the character scanned. Inasmuch as characters seldom are perfectly formed a tolerance is allowed in the configuration of the character by supplying alternate sets of conditions which may be met in order to progress through the sequence circuits. In addition the path through a circuit may be blocked if certain conditions are sensed which should not be sensed in scanning a character which that circuit is to identify.

The present invention is capable of recognizing characters formed of continuous lines such as those normally produced by typewriters and other printing apparatus, as well as those characters formed of discontinuous marks which are sometimes referred to as fragmentary characters.

In view of the above, it is another object of this invention to furnish an improved apparatus for analyzing intelligence manifestations and recognizing sequences therein to produce identification signals.

Another object of the invention is to provide a character sensing apparatus which may be used to identify characters formed of either continuous lines or a plurality of discontinuous marks.

Another object of the invention is to provide a circuit which is responsive only to video signals of at least a predetermined time duration and to produce therefrom signals having a prescribed minimum time duration.

Another object of this invention is to furnish a character sensing system capable of recognizing characters which are scanned in one of a plurality of different patterns.

Another object of the invention is to provide a circuit which receives the signals produced in scanning a character in a plurality of scans and detects from these signals the fact that character portions in a plurality of size categories have been sensed during a scan and the sequence during a scan in which different sized portions are sensed.

Still another object of this invention is to provide an improved character sensing apparatus in which merged characters may be identified.

A further object of the invention is to provide an improved character sensing system which detects the fact that signals representing two or more different characters have been produced from scanning the same character.

A still further object of this invention is to provide an improved character sensing system for identifying each of a series of characters and for detecting an abnormal spacing therebetween.

Another object of the present invention is to provide an improved character sensing system for indicating the fact that a character has been scanned but sufficient information was not obtained during the scanning operation to identify the character.

Another object of the invention is to provide an improved character sensing apparatus in which characters are scanned in a plurality of vertical scans to produce character signals, the character signals during each scan being analyzed to detect which of several size categories the total distance between the upper and lower contours of a character sensed during a scan fall within.

Another object of the invention is to provide an improved character sensing system in which the slope of the upper contour of the character may be analyzed whether each scan through the character is from the top to the bottom thereof or vice versa.

Another object of the invention is to provide an improved character sensing system in which a plurality of scans are made through the character, there being circuitry provided for detecting the relative altitude between the portions of the upper contour of the character sensed on spaced apart scans.

Another object of the invention is to provide an improved character sensing apparatus which is responsive to a succession of signals representing the sensing of predetermined character elements within predetermined time intervals during the scanning of a character.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a block diagram of the present invention;

FIG. 2 is a schematic diagram of one form of scanning apparatus;

Figure 3A:
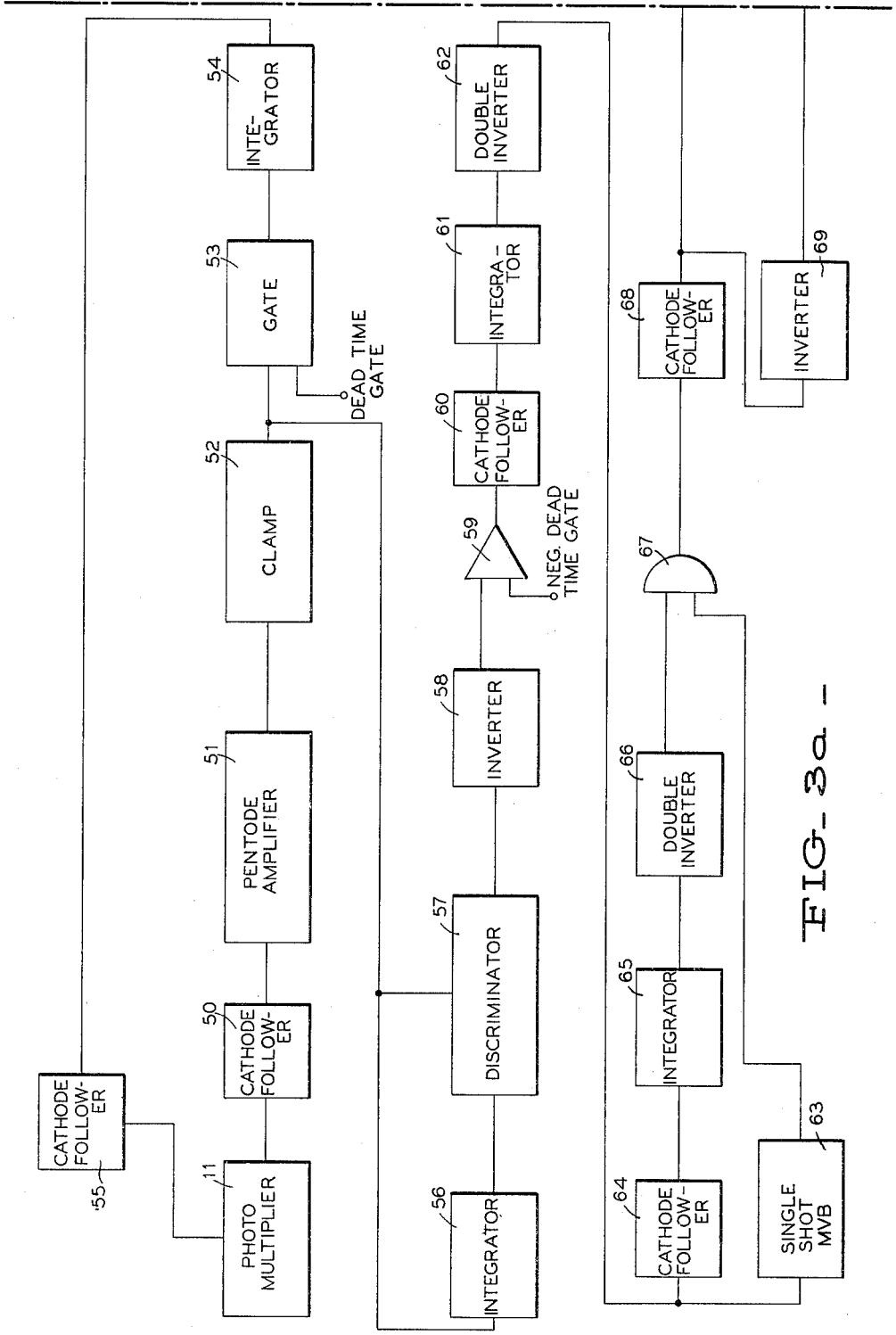
Figure 3B:
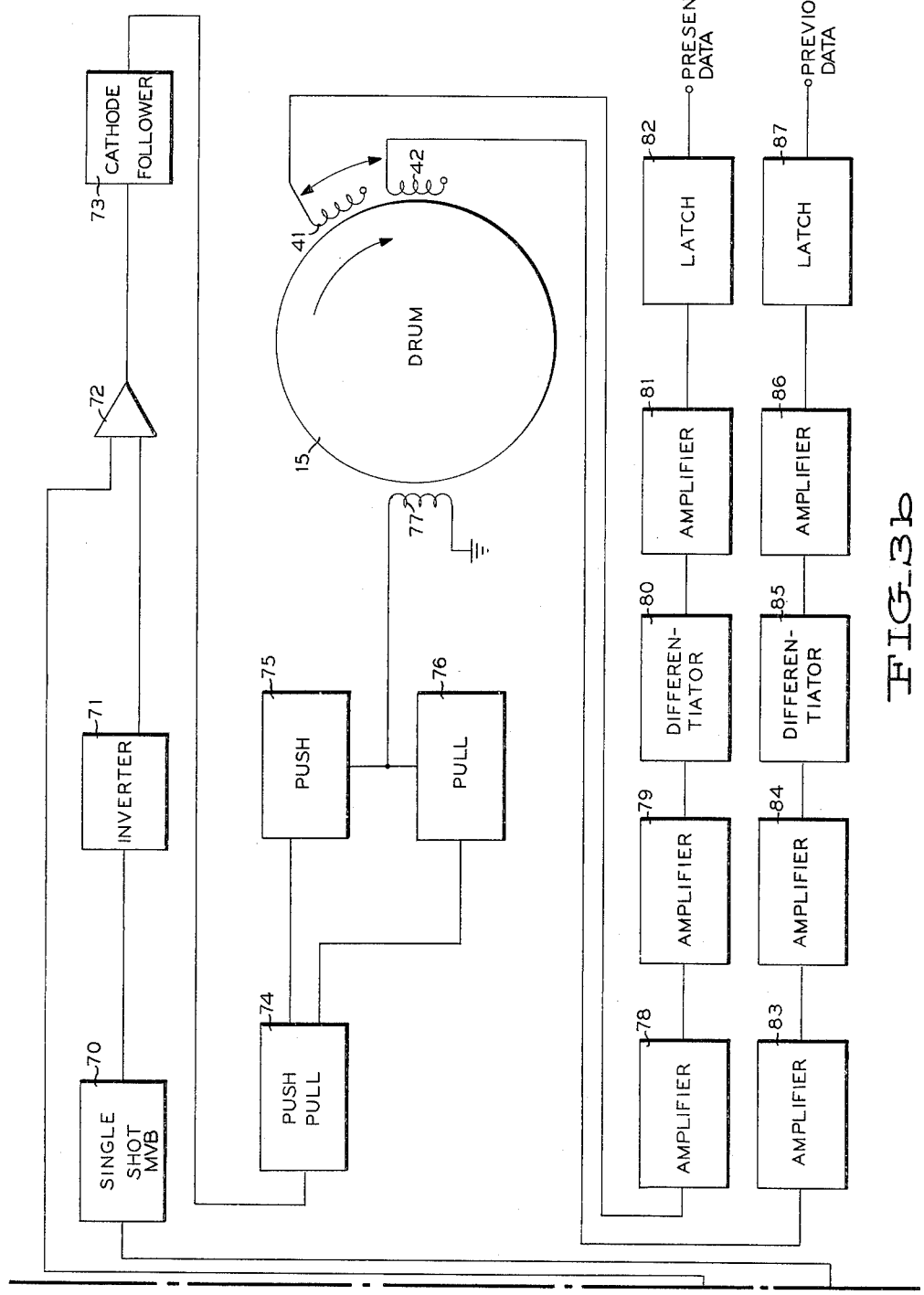
Figure 8:
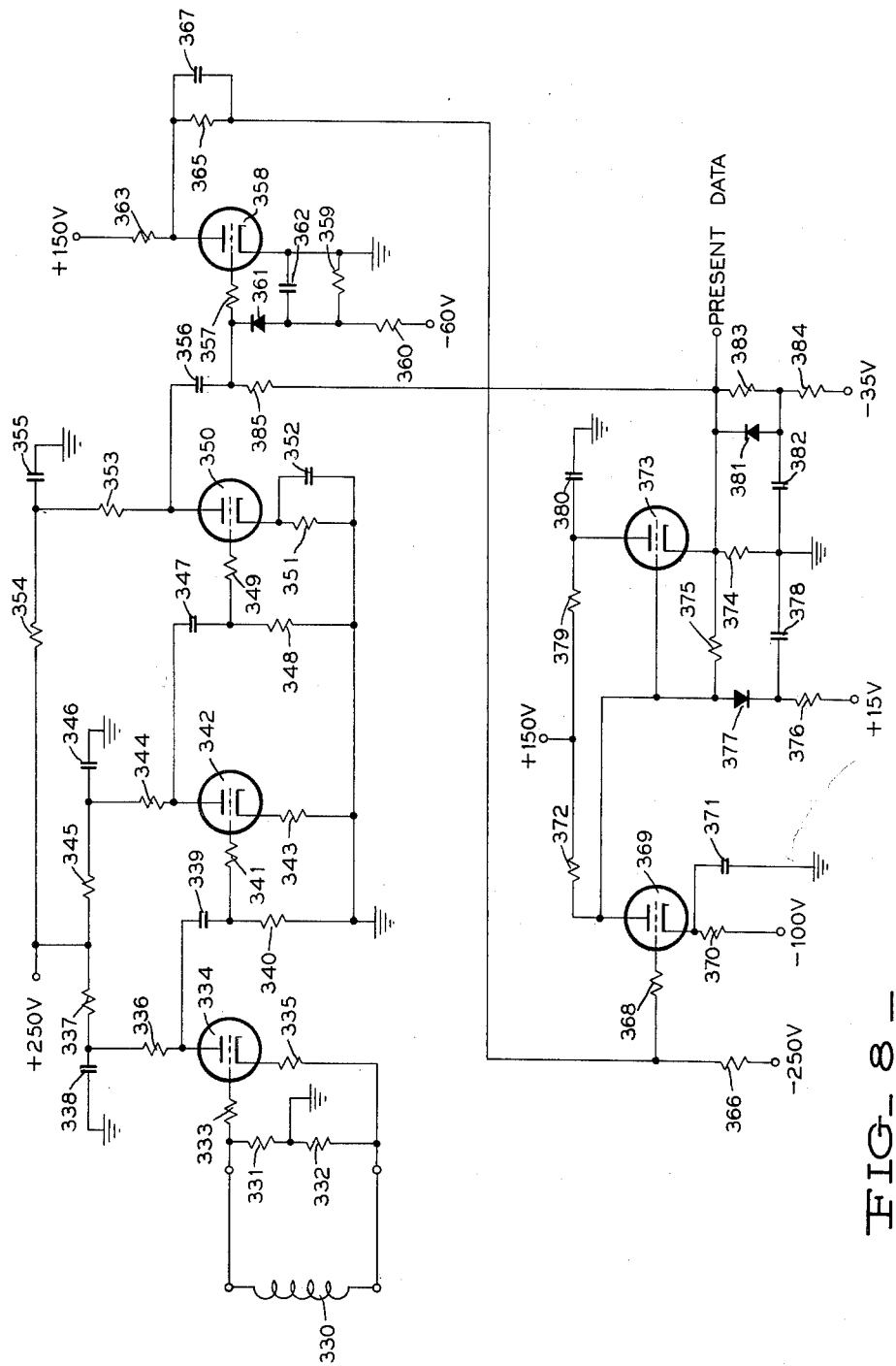
Figure 13A:
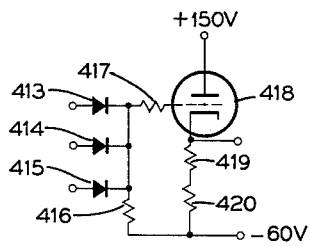
Figures 13B, 13C:
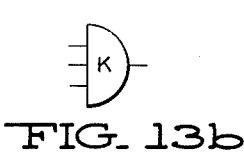

FIGS. 3a and 3b form a block diagram of the video improvement and storage circuits;

FIG. 4 is a schematic diagram of the photomultiplier and its associated control and amplifying circuits;

FIG. 5 is a schematic diagram of the automatic contrast control and clipping control circuit;

FIG. 6 is a schematic diagram of the minimum black and minimum white circuit;

FIG. 7 is a schematic diagram of a push-pull type of write amplifier;

FIG. 8 is a schematic diagram of a read amplifier;

FIGS. 9a, 10a, 11a, 12a, 13a, 14a, 15a, 16a, 17a, 18a, 19a, 20a and 21a are schematic diagrams of various typical circuits used in the present invention which are shown hereinafter in block form as illustrated in FIGS. 9b, 10b, 11b, 12b, 13b, 14b, 15b, 16b, 17b, 18b, 19b, 20b and 21b, respectively;

FIGS. 12c and 13c are the block representation of a three-position switch without a cathode follower output and a logical OR circuit without a cathode follower output, respectively.

Figure 28:
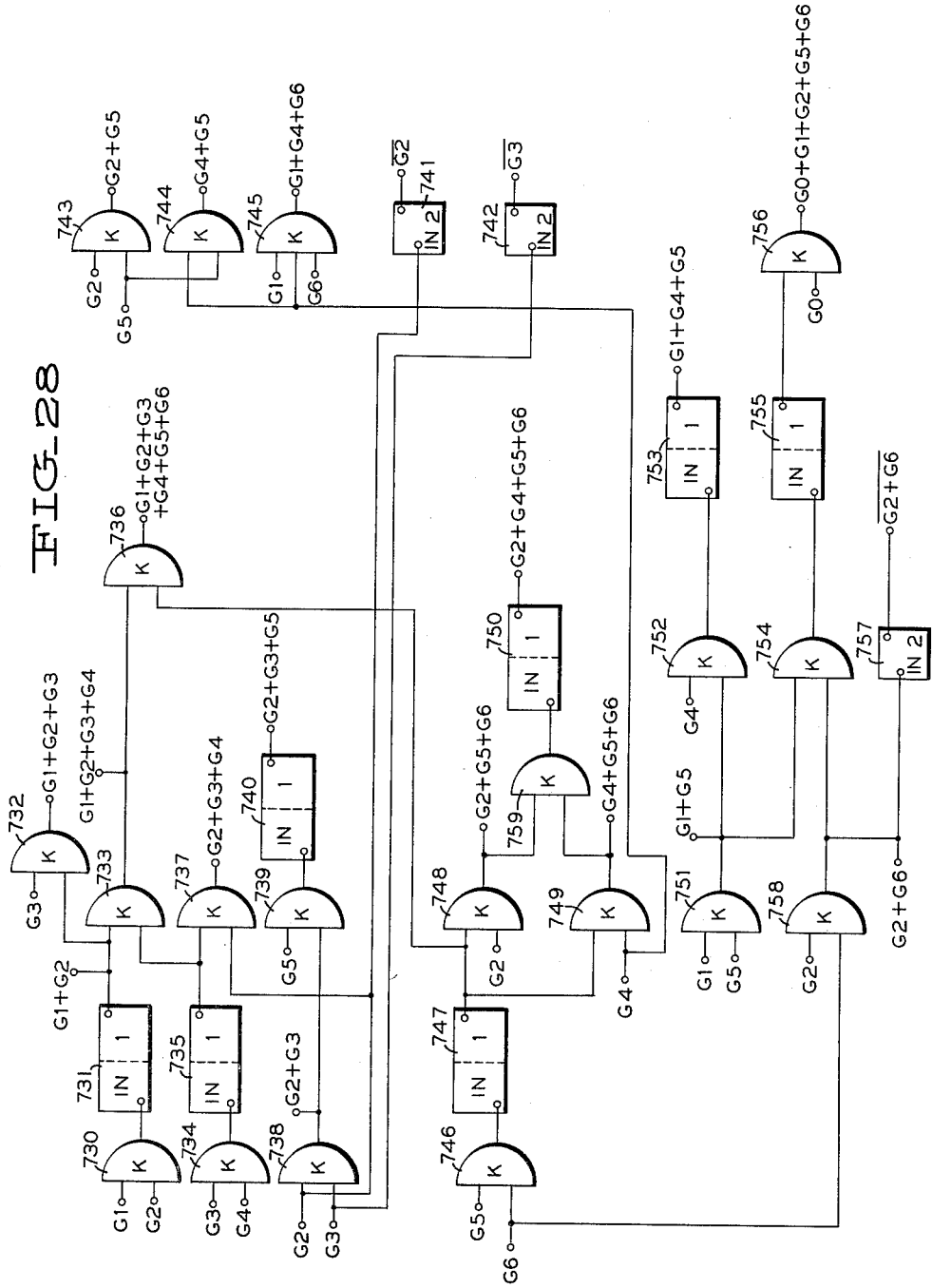
Figure 50:
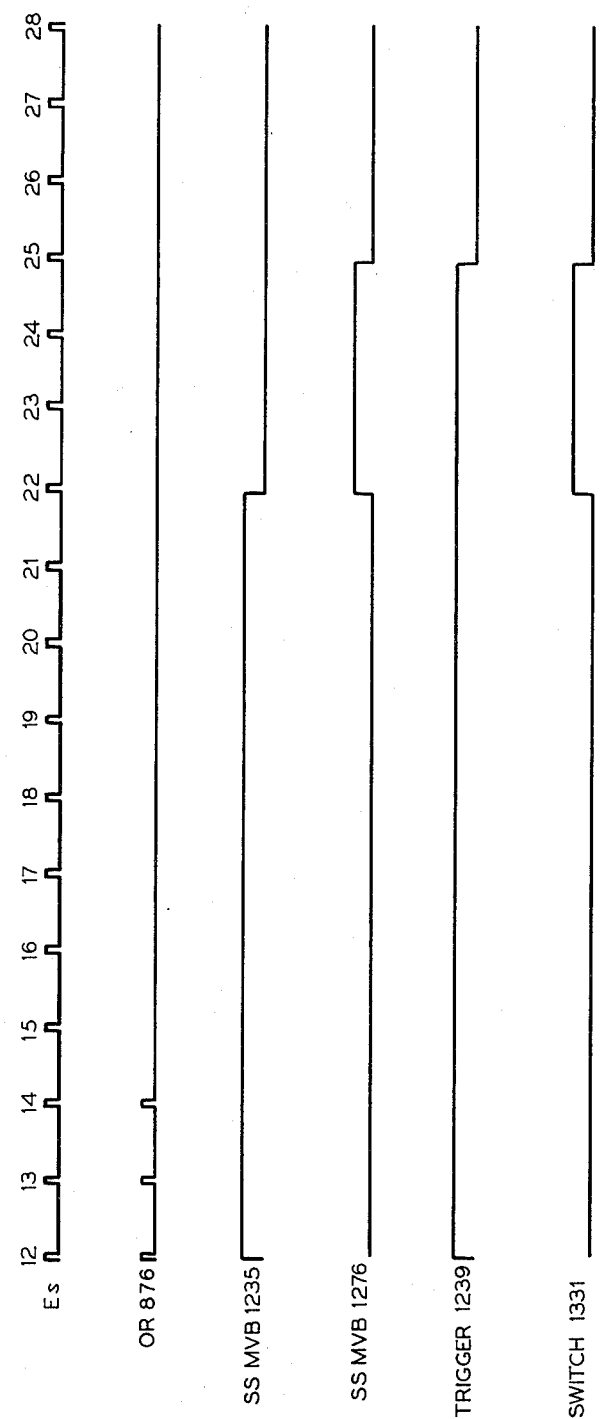

FIGS. 22a and 22b form a detailed block diagram of the G CODING circuits;

FIGS. 23a and 23b form a detailed block diagram of the H, K CODING circuits;

FIGS. 24a and 24b form a schematic block diagram of the J CODING circuits;

FIGS. 25 and 26 disclose two methods by which characters may be scanned, the method shown in FIG. 25 being for producing H CODING signals, and the method shown in FIGS. 26 being for producing K CODING signals;

FIG. 27 is a detailed block diagram of the circuits for generating various sample and reset pulses;

FIG. 28 discloses a mixing circuit for the signals produced from FIGS. 22a and 22b;

FIG. 29 discloses a mixing circuit for the signals supplied from FIGS. 23a and 23b;

FIG. 30 shows a mixing circuit for the signals produced from FIGS. 24a and 24b;

FIGS. 31 through 44 are switching circuits used in recognizing characters from the G, H and J signals;

FIG. 45 shows a switching circuit for determining whether minimum character requirements have been met during a scanning operation;

FIGS. 46a and 46b form the output circuit for the signals produced from FIGS. 31 through 44;

FIG. 47 is a timing diagram for a plurality of sync and reset pulses produced from the circuit shown in FIG. 48;

FIGS. 49 and 50 are timing diagrams which show, by way of example the signals at various points in the circuits disclosed in scanning the character "2";

FIGS. 51 through 60 are switching circuits used in recognizing characters from G, K and J signals.

In the description to follow various signal conditions are symbolically represented by using techniques developed to represent logical expressions. To represent the presence of a signal, a symbol alone is used. When it is desired to represent the absence of a particular signal, a bar is placed over the symbol. For example, if the symbol G1 is used to represent the existence of a particular signal, the symbol $\overline{G1}$ represents the absence of that particular signal. Normally the presence of a signal is represented as a positive pulse, and the absence of a signal is represented by a negative pulse. There are times, however, where it is necessary to use the presence of a condition to turn a trigger ON. Here, the positive pulse may be inverted to produce a negative pulse to turn the trigger ON. However, the input to the trigger would represent the presence of the signal even though it is a negative pulse.

Various OR conditions may be represented by a plus signal. For example, to represent the fact that either a signal representing G1 or H1 is present, the expression $G1+H1$ may be utilized to represent this fact. This expression, however, does not preclude the possibility of both G1 and H1 being present. If signals representing either G1 or H1 are not present, the expression $\overline{(G1+H1)}$ would represent this fact. There are also circumstances where it is desirable to express the fact that there may be either the presence of one signal or the absence of another signal. Thus, the expression $G1+\overline{H1}$ would represent such a condition.

There are a number of triggers illustrated in the circuits which are adapted to be reset after the end of each scan by the END OF SCAN RESET signal. These triggers are arranged with an asterisk under one side thereof. The side under which the asterisk is located is normally conducting with the trigger in its reset condition.

Several inverters are used in the circuits for trigger resetting purposes. In addition, two or more inverters as well as two or more cathode followers may be combined to form a logical OR circuit. Where an inverter is used to plate reset a trigger, the plate of the inverter is connected directly to the plate of the side of the trigger which is to be placed into conduction, so that both plates are connected to a single positive D.C. potential through the same resistor. That is, the plate of the inverter is not connected to its own normal source fo plate potential but instead uses the plate potential of one side of a trigger. Such inverters are provided with an infinity symbol in the drawings.

Where two or more inverter circuits are combined to form an OR circuit, the plate resistor and potential of one of the circuits is shared by the remaining inverter circuits. Those inverter circuits which do not utilize their own source of plate potential are provided with an infinity symbol.

Where two or more cathode follower circuits are combined to form an OR circuit, the cathode resistor and potential of one of the circuits is shared by the remaining cathode follower circuits. Those cathode follower circuits which do not utilize their own source of cathode potential are provided with an infinity symbol.

Reference is made to FIG. 1 which discloses a block diagram of the present invention. The block 10 comprises means for making a plurality of successive vertical scans through a character on a document. Each scan progresses from the top to the bottom of the character with successive scans progressing from right to left across the character.

The document containing the character is fully illuminated so that successive minute areas of the character and the surrounding area are allowed to be viewed by the photomultiplier 11. The photomultiplier produces a signal which varies with the intensity of light viewed thereby, which signal is supplied to a contrast and clipping control circuit 12. In the contrast control portion of the circuit, the signal level is looked at for a brief interval near the end of a scan. This portion of the signal is integrated and used as a feedback signal to the photomultiplier to control the plate voltage supplied thereto, thereby compensating for differences in character and background colors, variations in photomultiplier sensitivity, and variations in character illumination. The signal clipping portion of the circuit comprises an integrating circuit which is adapted to produce an output signal which is a function of the time integral of the input signals. These output signals are fed to a clipping circuit which is adapted to also receive the video signals from the photomultiplier circuit. In the clipping circuit, only those video signals which rise above the clipping level will be allowed to produce output signals. Due to the fact that the clipping control circuit comprises a tube which goes from cutoff to full conduction in the event an output signal rises above the clipping level, the output signals representing character data will be of this fixed amplitude. Thus, too, where a signal does not rise above the clipping level, a fixed amplitude signal is produced. The signals produced by exceeding the clipping level are considered to be character data or "black" signals. The signal level obtained where the video signals do not rise above the clipping level are background or "white" signals. Thus, one signal level represents character data and the other level represents background data.

A minimum black-minimum white circuit is provided in block 13 and is adapted to receive the bipolar signals from the contrast and clipping control circuit. In the block 13, those signals representing character data which are less than three microseconds in duration are filtered out completely. However, those which are at least three microseconds in duration are stretched to at least four microseconds. Thus, the minimum black signal produced is four microseconds in duration. If the signals are more than four microseconds in duration, then the signal from the circuit 13 representing the character data will be as long as the input signal representing the character data. In the event the input signal to the minimum black-minimum white circuit contains a white signal of less than three microseconds duration, this white signal will be filtered out and the output signal will be indicated as being for character data rather than background data. However, if a white signal is at least three microseconds in duration, a minimum white signal of at least four microseconds duration will be produced. In other words, to review the circuit 13, those signals which represent character data and are at least three microseconds in duration will produce at least a four microsecond output pulse, and those white signals which are at least three microseconds in duration will produce output signals of at least four microseconds in duration.

The bipolar output signals from the minimum black-minimum white circuit 13 are supplied to a block labelled write amplifier and provided with reference numeral 14. This circuit performs the usual function of increasing the amplitude of the signal and providing sufficient power to write the information in storage on the track of a magnetic drum 15. It should be noted at this point that the method of magnetic recording used is known as the non-return-to-zero method. That is, the bipolar signals which are written on the drum write over those signals which were written on the drum during a prior revolution. A read head is provided on the drum 15 which is adapted to supply information therefrom to a read amplifier 16. As the drum rotates further, the same information read out at read amplifier 16 will be supplied to a read amplifier 17. The delay between the readout to the amplifiers 16 and 17 is equal to three scans through the character. Thus, the output from amplifier 16 may be considered to be for a present scan while that from amplifier 17 may be considered that from the third previous scan.

The signals supplied from read amplifier 16 are analog in time but digital in level, there being an upper or "black" level which represents character data, and a lower or "white" level which represents the background. A block having reference numeral 18 applied thereto is adapted to receive the present data signals from read amplifier 16 and produce output signals identified as G0, G1, G2, G3, G4, G5, G6 and G7. The black signals obtained on each scan are analyzed to obtain signals representing various lengths and combinations of vertical lines. The first such vertical line to be considered is a single crossover X. A signal representing X is produced by scanning a line which produces a signal of up to ten microseconds duration. If a black signal is received which is between ten and nineteen microseconds in duration there is an indication that a small vertical line has been produced, i.e. V$s$. If the signal supplied to the circuit during a scan is of more than nineteen microseconds in duration, there is the indication that a larger vertical line has been scanned. This condition produces a signal V$m$. Thus, during a scan signals are produced representing the length of the various crossovers and are identified as X, V$s$ and V$m$. The coding G0 is represented by the fact that no signals are produced during a scan. The coding G1 is represented by the fact that either a signal X or a signal V$s$ or a signal V$m$ is produced during a scan.

An output signal representing G2 will be produced if there is an indication that during a single scan there occurred a first signal, representing either X, V$s$ of V$m$ followed by another signal, representing either X, V$s$ or V$m$, and that signals representing G4, G5 or G6 are not produced during the scan. However, if a V$s$ signal or a V$m$ signal occurs anywhere in a scan containing two crossovers, a G4 or G5 or G6 will be produced. Therefore, the G2 condition is limited to a scan containing an X signal followed by another X signal. A signal G3 will be indicated if three signals representing either X, V$s$ or V$m$ in any combination are produced. This signal may be termed a three crossover indication.

A signal representing G4 will be produced if either a signal representing V$m$ or V$s$ is followed by a signal representing X in a scan, or if a signal representing V$m$ is followed by a signal representing V$s$. A signal representing G5 is indicated when a signal representing X is followed by a signal representing either V$m$ or V$s$, or when a signal representing V$s$ is followed by a signal representing V$m$. A signal representing G6 will be produced in the event a signal representing V$m$ is followed by a signal representing V$m$, or if a signal representing V$s$ is followed by a signal representing V$s$. A signal representing G7 will be produced anytime there is a signal representing G3 and in addition a signal representing V$s$ or V$m$.

The signals representing G0, G1, G2, G3, G4, G5, G6 and G7 are supplied to a circuit labelled SEQUENCING CIRCUIT and identified by reference numeral 21.

The delayed scan signals from amplifier 17 as well as the present scan signal from read amplifier 16 are supplied to a block identified by reference number 19 and labelled H, K CODING. This circuit is adapted to produce output signals which represent either H0, H1, H2, H3 and H4, or signals representing K0, K1, K2, K3 and K4. The H component signals are utilized where scanning is in accordance with that previously described, i.e. where vertical scans are made from the top to the bottom of the character with successive scans progressing across the character from right to left. There are instances, however, where it may be desired to scan the characters from bottom to top and from left to right.

In order to get the same information from the circuit 19 regardless of which of the two scanning methods is used, it is necessary to merely make a small change in plug wiring. Basically, circuit 19 is utilized to detect the configuration of the upper contour of a character. The configuration is detected by measuring the difference between the altitude of the upper contour of the character for the present scan and the altitude of the upper contour of the character for the delayed scan. The H CODING can of course utilize the first crossover signal on the present and delayed scans. It is merely necessary to compare the beginning of the crossover signal from the present scan with the beginning of the first crossover signal on the third previous scan. If the time difference between these two signals is less than three microseconds in duration, a signature component H0 will be indicated. If the beginning of the first crossover signal on the present scan is followed by the beginning of the first crossover signal for the delayed scan within a period of three to nine microseconds, a signal H1 is produced. Where the beginning of the first crossover signal for the delayed scan follows the beginning of the first crossover signal for the present scan by more than nine microseconds, a signal H3 is produced. The signals H1 and H3 are positive slope indications. That is, there has been an increase in altitude between the present scan and the previous scan. To produce an H2 signal, the beginning of the first crossover signal in the delayed scan must occur between three and nine microseconds before the beginning of the first crossover signal in the present scan. Where the time difference is more than nine microseconds a signal representing H4 will be produced. From the above, it is seen that the signal representing H1 indicates a small increase in altitude in the present scan over that found in the previous scan. A signal representing H3 represents a large increase in altitude in the present scan over the previous scan. The signal representing H2 represents a small decrease in altitude from the first crossover on the present scan to the first crossover in the previous scan. A signal representing H4 is a large decrease in altitude from the first crossover on the present scan to the first crossover on the prior scan.

In the K CODING cricuit, the characters are being scanned from bottom to top. It is desirable to still look at the upper contour of the character. Thus, it is necessary to take the end of the last crossover indication on the present scan and compare it with the end of the last crossover indication on the previous scan. A corollary may be worked out in that signals H1 and K2, H3 and K4, H0 and K0, H2 and K1 and H4 and K3 represent identical information.

The block 20 which is labelled J CODING is adapted to receive the information from read amplifier 16 which represents present scan data. Outputs from the block 20 are signals representing J1, J2, J3, J4, J5, J6 and J7. This circuit is utilized to determine the total distance between the upper and lower contours of a character, which contours are sensed on each scan. The distance is measured in time and will be proportional to the difference between the time the scanner enters the upper contour of the character and the time the scanner leaves the lower contour of the character. In the event this time difference is eight microseconds or less in duration, an output signal representing J1 will be produced. If the duration between the entering of the first portion of the character and the leaving of the last portion of the character during a scan is between eight and eighteen microseconds an output signal representing J2 is produced. If the aforementioned time duration is between eighteen and twenty-eight microseconds, an output signal representing J3 is produced. If the time duration is between twenty-eight and thirty-eight microseconds, an output signal representing J4 is produced. If the time duration is between thirty-eight and forty-eight microseconds, an output signal representing J5 is produced. If the time duration is between forty-eight and fifty-eight microseconds an output signal representing J6 is produced. A signal representing J7 will be produced if the time duration is more than fifty-eight microseconds. The output from the circuits 18, 19 and 20 are supplied to a block 21 which is labelled SEQUENCING CIRCUIT. Basically, in the sequencing circuit, a separate circuit is provided for each of the characters which are scanned. Each circuit looks for particular sequences of G, H and J signals and if these sequences occur, an output signal is produced. The characters identified by the embodiment illustrated are the numerals 1, 2, 3, 4, 5, 6, 7, 8, 9 and 0 and the special characters such as the —, $, ◊ and *.

For purposes of illustration, a typical scanning mechanism is shown in FIG. 2. This device is a form of image dissecting apparatus in which successive areas of the character and its surrounding background are allowed to be viewed by a photomultiplier. The characters on the document 30 may be standard typewritten characters having a height of approximately one-tenth inch. The document is illuminated brightly by light sources 31 and 32. As the document moves in the direction indicated, an image of the character is transmitted through a lens system 33 and projected onto a disc 34. This disc is mounted on a shaft 35 which also has a narrow magnetic drum 36 mounted thereon. Both the drum and the disc are adapted to be driven from a pulley 37 which is connected to the output shaft of a motor 38.

Disc 34 is provided with a number of radially extending slits near the outer periphery thereof, there being seventy-five such slits in the present embodiment. These slits are provided with a reference numeral 43. There is a stationary or fixed slit 39 which is provided in a block 44, this slit being arranged such that the radial slits pass thereby. The radial slits are normal to the fixed slit. It is seen, therefore, that as the image moves past the fixed slit, the radial slits will make successive vertical scans through the character, these scans progressing from right to left across the character. Thus, the photomultiplier 11 is allowed to view elemental areas of the character and its surrounding background. The area viewed is approximately .005 inch square this being determined by the width of the fixed slit and the width of the radial slits.

As has been previously described, the output of the photomultiplier is fed through a contrasting and clipping control circuit, a minimum black-minimum white circuit and a write amplifier, and is supplied to a write head 40 which is mounted on the drum 36. The information which is written on the drum is adapted to be picked up by a read head 41 which produces information described as relating to a present scan, and by a read head 42 which produces information described as being on a scan which occurred three scans previously.

In FIG. 1 there was illustrated a basic block diagram of the entire system. In FIG. 3 there is illustrated a block diagram of that portion of the system from the photomultiplier 11 through the write and read amplifiers. This diagram shown in FIG. 3 is still in block form but will serve to illustrate the action which occurs in the more detailed circuits which will be described with regard to FIGS. 4 through 8.

The output signal from the photomultiplier 11 will be of varying voltage, the amplitude of which will be dependent upon the amount of light supplied to the photomultiplier in scanning the character. The more light that is received results in a lower voltage, whereas the darker areas, such as those on the character, will produce higher amplitude levels. The output of the photomultiplier is fed through a cathode follower 50 to a two stage pentode amplifier 51. The output of this amplifier is clamped to a predetermined voltage in a clamp circuit 52 and supplied to a gate 53. The other input to this gate is an inverted end of scan signal which in effect begins just before and terminates just after the dead time signal which is produced by going from one radial slit to the next on the scanning disc. It will be seen that this gate will allow a portion of the signal produced by the background surrounding the character to be supplied to an integrator 54. The amplitude of the voltage supplied will be dependent to a large extent upon the amount of light viewed just before the dead time begins and just after the dead time ends. This voltage is integrated in the circuit in block 54 and supplied through a cathode follower 55 to serve as a feedback to the photomultiplier 11. That is, the cathode of the cathode follower 55 controls the potential on the plate of the photomultiplier. Under these circumstances, it is possible to utilize this signal to compensate for variations in light intensity, line voltage, various colors of paper on which the characters are written and various other conditions. This circuit, which includes the gate 53, the integrator 54 and the cathode follower 55 may be termed the contrast control for the photomultiplier.

The output of clamp circuit 52 is also supplied to an integrator 56 which produces an output signal which approximates the time integral of the video signals. The output of this integrator is utilized to determine the clipping level in a discriminator 57. These video signals are also supplied to the discriminator such that those signals which rise above the clipping level will cause output signals of fixed amplitude to be supplied from the discriminator. The output of the discriminator is supplied through an inverter 58 to a gate 59. Since the video signals supplied from the clamp 52 will also include the relatively positive voltage supplied at the dead time, i.e. that voltage caused by the fact that one radial slit has terminated its passage across the fixed slit and the next radial slit has not yet begun its passage, it is necessary to now supply a dead time gate signal to the switch 59. In this manner, it is possible to eliminate the signal produced by the photomultiplier during the dead time so that only those signals relating to the actual characters and the surrounding background are allowed to pass through the switch 59.

The output of switch 59 is supplied through a cathode follower 60 to an integrator 61. The object of this integrator is to filter out all black signals which are less than three microseconds in duration and also to filter out all white signals which are less than three microseconds in duration. That is, until the input signal supplied to the integrator has lasted at least three microseconds, it is not possible for the double inverter 62 to supply a positive output signal. Thus, there is a three microsecond delay in supplying these video signals at the output of the double inverter 62. Inasmuch as the integrator 61 has a three microsecond delay in the input signal thereto, it will also produce a three microsecond delay in the trailing edge of the input signal thereto. It is desirable in the present circuit to always produce at least a four microsecond pulse in the output providing there has been a pulse of at least three microseconds. This four microsecond pulse is necessary due to the circuitry which is utilized in reading and writing on the magnetic drum. Therefore, the output from the double inverter 62 is supplied through a single-shot multivibrator 63 which will produce an output pulse of four microseconds duration to an OR circuit 67.

In view of the fact that it is desirable to know if the output from the double inverter 62 is longer than four microseconds, this output is supplied through a cathode follower 64 to an integrator 65 which produces a two microsecond delay. The object of this integrator is to filter out those signals which may result from being only slightly larger than three microseconds, which signal would appear as a mere sliver of a signal at the input to the single-shot multivibrator 63 and not result in a four microsecond output pulse therefrom. Thus, for example, if a pulse of extremely short duration is supplied from the double inverter 62, it would be filtered out in the integrator 65. This integrator has a time constant such that it must receive a signal at least two microseconds in duration before it will supply an output through a double inverter 66 to the OR circuit 67.

Let it be assumed first that the signal supplied from the double inverter 62 is of only one microsecond duration. This will be sufficient to initiate a four microsecond pulse from the single-shot multivibrator 63 and will produce a four microsecond output pulse from the OR circuit 67. On the other hand, let it be assumed that the output of the double inverter 62 is of ten microseconds duration. In this event, a ten microsecond pulse will be supplied to the OR circuit 67 from the double inverter 66 and a shorter four microsecond pulse will be supplied from a single-shot multivibrator 63. Inasmuch as circuit 67 is an OR circuit, the longer of the pulses would be represented in the output therefrom.

The output of the OR circuit 67 is supplied through a cathode follower 68 and an inverter 69 to a single-shot multivibrator 70. It will be seen that at the termination of the relatively positive voltage from the OR circuit 67, which indicates the end of a character portion, that the output of the inverter 69 will become relatively positive. That is, a relatively positive voltage will be supplied from the inverter when the background of the character is indicated as being scanned. This signal is supplied to a single-shot multivibrator 70 which also produces a four microsecond output pulse. Thus, the single-shot multivibrator 70 assures that a minimum white signal of four microseconds will be produced at the end of a black signal. The output of this four microsecond pulse from the single-shot multivibrator 70 is supplied through an inverter 71 to a switch 72.

The four microsecond pulse from the single-shot multivibrator 70 will appear as a four microsecond negative pulse at the switch 72. This means that should black signals again occur within one or two microseconds after the single-shot 70 initiated its four microsecond pulse, the relatively positive voltage appearing at cathode follower 68 due to the new black signal will not be allowed to pass through the switch 72 until after the termination of the four microsecond pulse in the single-shot multivibrator 70. The output of this switch will therefore include the four microsecond pulse indicating a white signal, this signal being supplied through the cathode follower 73. The output of this cathode follower will therefore be a digital signal in which one level will indicate black signals and a lower level will indicate white signals. The minimum black signal which can be produced will be of four microseconds duration and the minimum white signal which can be produced will be of four microseconds duration.

The output from the cathode follower 73 is supplied to a "push-pull" driver 74. One output of the driver 74 is supplied through a "push" circuit 75 which causes current to flow in one direction in the write coil 77, while at alternate times another portion of the output from the driver 74 is supplied through "pull" circuit 76 to cause current to flow in the opposite direction to the coil 77 of the write head indicated as 40 in FIG. 2. Thus, it is possible to cause the signals supplied to the push-pull driver 74 to be written on the drum such that sequential areas on the track of the drum will be magnetized in one direction or the other as a function of black and white signals.

The drum 15 rotates in the direction indicated. A coil of the read head 41 is arranged to pick up or read the magnetized signals written on the drum by write head coil 77. The signal thus produced is supplied to amplifiers 78 and 79 and to a differentiating circuit 80. The differentiator 80 serves to differentiate the pulses supplied thereto by the amplifier 79 such that an output can be supplied through an amplifier 81 to turn a latch 82 ON at a time when a black signal is beginning, for example, and to turn the latch 82 OFF at the trailing edge of the black signal.

In order to obtain information relative to the third previous scan from that obtained at the head 41 the head 42 is provided with a coil which is positioned adjacent to drum 15 to supply signals through the amplifiers 83 and 84 to the differentiating circuit 85. This circuit functions in the same manner as the circuit 80 and will turn a latch 87 ON through an amplifier 86 at the beginning of a black signal, and will turn the latch OFF at the trailing edge of the black signal. Thus, information regarding the third previous scan is obtained.

Reference is now made to FIG. 4 which discloses the photomultiplier circuit. There is provided a photomultiplier tube 11 which is adapted to have its cathode connected to a conventional power supply 100. The positive terminal of supply 100 is grounded, and the negative terminal is connected through a resistor 101 and across a condenser 102 to the cathode of the photomultiplier. The resistor 101 and the capacitor 102 are utilized for filtering purposes. The voltage appearing on the cathode of the photomultiplier is approximately −1650 volts D.C. The dynodes of the photomultiplier are placed at varying potentials by the use of a bleeder network which is comprised of a plurality of resistors 103, 104, 105, 106, 107, 108, 109, 110 and 111.

Filtering capacitors 112 and 113 are placed in shunt with the resistors 103 and 104, respectively, the upper end of resistor 103 being connected to ground potential. The plate of the photomultiplier is connected to ground through resistors 114 and 170, the latter being the cathode resistor of a cathode follower 115. The details of generating the voltage at the cathode of the cathode follower will not be described at this time, but it should be appreciated from the previous description that it is this cathode follower which produces the contrast control voltage to vary the potential at the plate of the photomultiplier.

The output of the photomultiplier is coupled by way of an capacitor 116 to a triode 117 which is connected as a cathode follower. Thus, in the cathode circuit of the triode 117, resistors 118 and 119 are provided, the lower end of resistor 119 being connected to ground. At the mid-point between resistors 118 and 119, the grid return resistor 120 is provided. The plate of triode 117 is connected through a resistor 121 to a positive source of D.C.

potential. In addition, a filtering capacitor 122 is utilized between the plate and ground.

The output of the triode 117 from the cathode thereof is the video signal, this signal being supplied as an input to a capacitor 130 in FIG. 5. Referring now to FIG. 5, the input is supplied through the capacitor 130 and a resistor 131 to the control grid of a pentode 132. A resistor 133 is provided between the cathode of the pentode and ground, and a grid return resistor 134 is provided between the control grid and ground. The plate of the pentode is connected to a positive source of D.C. potential through resistors 135 and 136, there being the usual decoupling capacitor 137 between the resistors 135 and 136 and ground. One of the grids of the pentode is connected to the cathode while the other grid is connected to a point between the resistor 138 and capacitor 139, the upper end of resistor 138 being connected to a positive source of D.C. potential and the lower end of capacitor 139 being connected to ground.

The output from the pentode 132 is taken from the plate thereof and supplied through a capacitor 140 to the control grid of another pentode 141. This pentode is connected in a manner similar to pentode 132, there being provided a cathode resistor 142 and a grid return resistor 143. The plate resistors referenced as 144 and 145, are connected between the plate of the pentode and a source of D.C. potential. A decoupling capacitor 146 is connected between ground and a point between the resistors 144 and 145. As before, the screen grid of the pentode is connected to the point between resistor 147 and capacitor 148, the upper end of the resistor being connected to a positive source of D.C. potential and the lower end of the capacitor being connected to ground.

From the above, it is seen that the video signal is amplified in two stages and will appear in the same phase as originally presented to pentode 132, but with increased amplitude, at the plate of pentode 141. The output of this stage is supplied through a capacitor 149 to the cathode of a diode 150. The plate of this diode is connected through a resistor 152 to ground, there being a capacitor 151 in shunt with the resistor. The potential appearing at the plate of the diode 150 is determined in addition by a resistor 153 which is connected to a negative source of D.C. potential, thereby causing the voltage on the plate of the diode to be at approximately —20 volts D.C. This means that the video signal appearing at the cathode of the diode 150 will be referenced to approximately —20 volts. That is, the minimum level signal at the cathode will be —20 volts D.C. and all changes will be above this point. The signal on the cathode of diode 150 appears at the control grid of a triode 155. It is noted that the grid return resistor 154 is connected to the plate of the diode 150.

The triode 155 is connected as a cathode follower and has resistors 156 and 157 connected between the cathode and a negative source of D.C. potential.

The circuit now to be described is that which is utilized to generate the contrast control voltage which is supplied back to the plate of the photomultiplier 11. Reference is made to a diode 159 whose cathode is connected to the cathode of the triode 155. The plate of diode 159 is commoned with the plate of the diode 160 whose cathode is adapted to receive the DEAD TIME GATE signal. This DEAD TIME GATE signal is a positive pulse which begins just before the dead time caused by one radial slit leaving the fixed slit and another slit entering the fixed slit, and ends just after the dead time. Diodes 159 and 160 along with resistor 161 form a switch so that the output at the plates of the diodes is a portion of the photomultiplier signal occurring near the dead time.

The output from the command plates of diodes 159 and 160 is supplied through a resistor 162 to the control grid of a triode 163, this triode being connected as an inverter. The plate of this triode is connected through a resistor 164 to a positive source of D.C. potential, there being a capacitor 165 in shunt with the resistor 164. The function of this capacitor and resistor arrangement in the plate circuit is to integrate the signal which is supplied to the grid of the triode 163, thereby producing a voltage which is an integral function of the input signal at the grid. This voltage will appear at the plate of the triode 163 which is connected to the upper end of a divider formed by resistors 167 and 168. The output from the mid-point of the divider is adapted to be supplied back to FIG. 4 and passes through a resistor 169 to the control grid of the triode 115. As previously mentioned, this triode is connected as a cathode follower which includes a cathode resistor 170. The output may be taken from the cathode and supplied through the resistor 114 to the plate of the photomultiplier 11. It is thus seen that as the voltage level varies at the plate of the triode 163, the voltage level will also vary at the plate of the photomultiplier 11. By integrating the signal supplied from the diodes 159 and 160, it is possible to produce a signal which will compensate for the variations in light intensity, video amplifier gain, and line voltage variations, as well as variations in background density upon which the characters are printed.

To this point there has been described the manner of obtaining an output signal from the photo-multiplier and compensating this signal for certain variations which may result in the circuitry for the background of a document itself. The video output signal appears at the cathode of the triode 155 and is supplied to the cathode of a diode 171. The plate of this diode is common to the plate of a diode 172 whose cathode is connected to receive a negative DEAD TIME GATE signal. That is, since the signal produced by the photomultiplier during the dead time has not yet been taken out of the signal appearing at the cathode of triode 165, it is necessary to now eliminate this signal in the remaining circuitry. During the times when the DEAD TIME GATE signal is supplied to switch 172, no output can be supplied therefrom to the plates of the diode. Thus, there is formed a logical AND circuit comprising diodes 171 and 172, and resistor 173, the resistor being connected to a source of positive D.C. voltage.

There are two paths by which current may flow between the plates of diodes 171 and 172 and the upper side of a capacitor 176. In the event the voltage appearing at the plates of diodes 171 and 172 is higher than that appearing at the upper side of capacitor 176, current is allowed to flow through resistor 174 and the diode 175 to charge capacitor 176. This capacitor will be charged at a rate which is determined by the value of the resistor 174, the value of the forward resistance of the diode 175, and the value of the capacitor 176. During intervals when the potential appearing at the plates of diodes 171 and 172 is below that on the upper side of capacitor 176, current is allowed to flow through the resistor 178 to discharge the capacitor at a rate determined by the value of the resistor 178 and the value of the capacitor 176.

It will be seen that the video signal appearing at the plates of diodes 171 and 172 is integrated and supplied to the grid of a twin-triode 177. The cathodes of this twin-triode are connected through a resistor 179 to ground. They are also connected through a resistor 180 to a negative source of D.C. potential. It is noted that there is also provided a voltage divider comprised of resistors 181 and 182 which are connected between the negative source of D.C. potential and ground. At the mid-point between resistors 181 and 182, there is provided a connection to a capacitor 185, and thence to ground, and to a resistor 184 whose other side is connected through a resistor 183 to the cathode of the diode 171. It will be remembered that this cathode is receiving the output from the cathode of the triode 155 which is the video signal. Thus, the level of the video signal appearing between the resistors 184 and 186 is determined by the RC network connected between the cathode of resistor 177 and ground.

The other end of resistor 186 is connected to the control grid of a triode 187 which is connected as an inverter. The plate of this triode is connected through resistor 188 to a positive source of D.C. potential. The triode 187 serves as the discriminator and operates in the following manner. A voltage appearing at the cathode of twin-triode 177 appears at the cathode of triode 187 thus determining the discriminating or clipping level which will be applied to the video signals appearing at the control grid of the triode 187. Those signals which are sufficient to cause the tube to conduct will produce an output signal of fixed amplitude. When the tube is not conducting, the plate will return to the supply D.C. potential.

The output from the plate of triode 187 is supplied to the upper end of a voltage divider which is comprised of resistors 189 and 191 connected in series to a negative D.C. potential. A capacitor 190 is connected in shunt across the resistor 189 and serves as a high frequency pass to the signals appearing at the plate of triode 187. The output voltage at the mid-point between resistors 189 and 191 is connected to the control grid of a triode 192 which is connected as an inverter. The cathode of this triode is connected to a negative source of D.C. potential and the plate is connected through a resistor 193 to a relatively low positive D.C. potential. Thus, the inverter serves as a low level inverter. The output supplied from the plate of triode 192 is the video output which is supplied to the cathode of the diode 200 in FIG. 6.

Referring to FIG. 6 it is seen that diode 200 and diode 201 are part of a switch which utilizes the resistor 202 for connection to a positive source of D.C. potential. Here again, the negative DEAD TIME GATE which is a negative signal is supplied to the cathode of the diode 201 so that only those video signals produced at times other than during the dead time gate are allowed to appear by way of resistor 203 at the control grid of a triode 204. This triode is connected as a cathode follower, the plate thereof being connected to a positive source of D.C. potential and the cathode thereof being connected to a negative source of D.C. potential through a resistor 205. The cathode of triode 204 is connected through a resistor 207 to the upper side of a capacitor 206, the other side of this capacitor being connected to a negative source of D.C. potential. The time constant of the circuit comprising resistor 207 and capacitor 206 is such that any positive signal supplied thereto which is less than three microseconds in duration will not be sufficient to raise the potential on the upper side of the capacitor 206 to cause the triode 209 to go into conduction. That is, with the upper side of the capacitor 206 connected by way of a resistor 208 to the control grid of triode 209, it is required that a signal be longer than three microseconds in duration before triode 209 will be caused to go into conduction. Thus, there is introduced into any signal longer than three microseconds duration, a three microsecond delay in the leading edge as well as a three microsecond delay in the trailing edge.

Assuming now that the input to the integrator comprising resistor 207 and capacitor 206 is longer than three microseconds in duration, triode 209 will be caused to go into conduction so that the plate thereof, which is connected via resistor 210 to a positive source of D.C. potential, will supply an output through a divider consisting of resistors 212 and 213 and speedup capacitor 211 to the grid of triode 215 via grid limiting resistor 214. Triode 215 is connected as an inverter. The cathode of this triode is connected to a negative source of D.C. potential and the plate is connected through a resistor 216 to a relatively low source of D.C. potential. It will be seen that the potential appearing at the upper side of the capacitor 206 will appear at the output of the plate of the triode 215 in increased amplitude but of the same phase. That is, triodes 209 and 215 serve as a double inverter.

As previously mentioned, the potential appearing at the plate of triode 215 will be delayed by three microseconds from that supplied from the cathode of triode 204. This delay is introduced by the fact that it takes three microseconds for the capacitor 206 to charge sufficiently to cause tube 209 to conduct. In addition, it takes three microseconds after the termination of the signal at the cathode of the triode 204 for the capacitor 206 to discharge to the point where the triode 209 will not conduct. This means that if a signal of, for example, six microseconds duration should be interrupted by a white signal of two microseconds duration, this two microseconds signal will not appear at the plate of triode 215. In other words, this white signal will be lost. This is desirable since it is not unusual for small white signals to appear when scanning character portions, this being caused by ink density variations in the printing of the characters.

In the event that an output signal is supplied from the plate of triode 215, it is desired that this signal last at least four microseconds. The time of four microseconds is set largely for the benefit of the drum recording circuit. In order to produce a signal at least four microseconds in duration, the output of the plate of triode 215 is supplied to a single-shot multivibrator which includes an OR circuit comprising diodes 217 and 218. The cathodes of this OR circuit are connected through a resistor 220 to a negative source of D.C. potential. When a relatively positive voltage appears at the plate of triode 215, a positive signal will appear at the cathode of diode 217 which is supplied through a current limiting resistor 221 to the control grid of the left half of the twin-triode 219. In this circuit the right half of the twin-triode is normally conducting so that the plate of the right half is normally relatively negative, this plate being connected to a relatively low positive D.C. potential through a resistor 222. As soon as the left half of the tube begins conducting by the occurrence of a positive voltage at the control grid thereof, the plate of the left half, which is connected to a relatively high positive source of D.C. potential by way of a resistor 223, serves to couple a negative voltage through a capacitor 224 and resistor 225 to the control grid of the right half of the twin-triode 219, thereby turning the right half off. It is noted that a resistor 226 is connected between the capacitor 224 and ground. As soon as the right half of the twin-triode 219 ceases conduction, a relatively positive voltage is supplied from the plate thereof to the diode 218. This supplies a relatively positive voltage to the control grid of the left half of the twin-triode. This means that even though the input signal to diode 217 may have terminated by this time, the left half will continue to conduct. As soon as the capacitor 224 discharges sufficiently to allow the right side of the twin-triode to go into conduction again, the relatively positive voltage which previously appeared at the plate of the left half will now become a relatively negative voltage and will serve to cut off the left half of the tube. Thus, when the left half of the tube is cut off, a relatively positive voltage is supplied from the plate thereof to turn the right side of the tube further on. The time constant for this single-shot multivibrator is determined by the value of the capacitor 224 and the value of the resistor 226. As previously mentioned, the time constant for this single-shot multivibrator is set at four microseconds. Therefore, a four microsecond pulse will be produced from the plate of the right half of twin-triode 219 and will be supplied to the plate of a diode 243.

There are instances when the video input signal to the circuit shown in FIG. 6 is only slightly more than three microseconds in duration. Thus, all but a very sharp spike may be filtered out by the integrator and this sharp spike may appear at the plate of triode 215. This spike may not be sufficient to cause a single-shot multivibrator to initiate a four microsecond pulse. In the event it is not sufficient, it is desirable to eliminate this spike. In addition, if the signal appearing at the plate of triode 215 is longer than four microseconds in duration, it is desired that the output signal represent this fact. Thus, the plate of the triode 215 is connected through a resistor 227 to the control grid of the triode 228. The last-mentioned triode is connected as a cathode follower in that its plate is connected to a positive source of D.C. potential and its cathode is connected through a resistor 229 to a negative source of D.C. potential. It is noted that the cathode is also connected through a resistor 230 to the upper side of a capacitor 231, the lower side of said capacitor being connected to ground. Thus, voltages appearing on the cathode of triode 228 are used to charge the capacitor through the resistor 230 and the back resistance of diode 232 in parallel, the time constant being determined by the value of the resistor 230, the back resistance of diode 232, and the value of the capacitor 231. This time constant is normally set so that a signal must be at least two microseconds in duration before the upper side of the capacitor 231 will rise sufficiently to cause the control grid to supply enough voltage to turn triode 234 on. That is, it takes two microseconds before sufficient voltage is built up on the upper side of the capacitor to supply a sufficient voltage through the resistor 233 to turn the triode 234 on. The function of diode 232 is to allow the capacitor to discharge very quickly when an input signal is terminated at the plate of triode 215.

The plate of triode 234 is connected through a resistor 235 to a positive source of D.C. potential. The output at the plate is supplied through a capacitor 236 to the mid-point of a voltage divider which is comprised of resistors 237 and 238. The upper side of resistor 237 is connected through the resistor 235 to a positive source of D.C. potential and the lower side of resistor 238 is connected to a negative source of D.C. potential. The output from the mid-point of the divider is supplied through a resistor 239 to the control grid of a triode 240, the cathode of this triode being connected to a negative source of D.C. potential. The plate of the triode 240 is connected to a relatively low positive D.C. potential by way of a resistor 241. Thus, it is seen that if the voltage appearing at the upper side of the capacitor 231 is sufficiently positive to cause tube 234 to conduct, an amplified form of this voltage will appear at the plate of triode 240. That is, triodes 234 and 240 serve as a double inverter for those signals supplied from the plate of triode 215 which are longer than two microseconds in duration. There is provided a diode 242 and a diode 243 which form an OR circuit with a resistor 275. It is seen that one side of the resistor is connected to a negative source of D.C. potential and the other side is connected to the commoned cathodes of diodes 242 and 243.

The output of the plate of triode 240 is connected to the plate of diode 242 and the output of the plate of the right half of the twin-triode 219 is connected to the plate of the diode 243. Thus, if the video input signal supplied to diode 200 is more than three microseconds in duration, but less than four microseconds in duration, a four microsecond pulse will be supplied from the single-shot multivibrator through the diode 243 and through resistor 244 to the control grid of a triode 245. If the input signal is only slightly more than three microseconds in duration and is not sufficient to cause the single-shot multivibrator to produce a four microsecond pulse, this signal is filtered out in the integrator comprising capacitor 231 and resistor 230. However, if the signal is, for example, ten microseconds in duration, this signal will be supplied through the diode 242 and the resistor 244 to the control grid of the triode 245. Thus, all signals over four microseconds in duration will be supplied from the triode 240, whereas those under four microseconds but more than three microseconds in duration will be supplied from the single-shot multivibrator.

It is noted that the cathode of triode 245 is connected by way of a resistor 246 to a negative source of D.C. potential. The cathode is also connected through resistors 247 and 248 to a much higher negative D.C. potential, there being a capacitor 249 in shunt with the resistor 247. Thus, resistors 247 and 248 form a divider from the cathode of the triode 245 so that a voltage may be supplied from the midpoint of this divider through a resistor 250 to the control grid of a triode 251. This triode is connected as an inverter, the plate thereof being connected through a resistor 252 to a relatively positive D.C. source of potential. It has been discussed to this point the manner in which a minimum black signal is produced. That is, any black signal more than three microseconds in duration appears at least four microseconds in duration at the output of the triode 251. If there is a white area which produces a white signal less than three microseconds in duration it will be remembered that this white signal is filtered out. Eventually it will appear as a black signal at the plate of the triode 251. However, if a white signal more than three microseconds in duration is produced, it is desired that this white signal last at least four microseconds. Thus, any time the voltage at the plate of the triode 251 rises, it is an indication that a white signal of at least three microseconds duration has been supplied as an input to the FIG. 6 circuit. Any time the plate of triode 251 rises, it will initiate a four microsecond pulse from a single-shot multivibrator which will now be described.

The output of triode 251 is supplied to the plate of diode 253, the cathode of this diode being commoned with the cathode of a diode 254. Diodes 253 and 254 form an OR circuit which utilizes a resistor 257 which is connected to a negative source of D.C. potential. When a relatively positive voltage is supplied to the plate of diode 253, it will result in a positive voltage being supplied to the control grid of the left half of the twin-triode 256 by way of resistor 258. This causes the left half of the tube to go into conduction and draw current through the plate resistor 259. A negative voltage is supplied from the plate through the capacitor 260 and the resistor 261 to turn the right side of the twin-triode off. The capacitor 260 is allowed to charge negatively because of the resistor 262. As the right half of the twin-triode goes off, the plate thereof will rise toward the positive source of D.C. potential connected to the resistor 255. This rising voltage is supplied through the diode 254 to the left half of the twin-triode through the diode 254 thus holding the left half in conduction. At the end of four microseconds, capacitor 260 will be discharged sufficiently to allow the right half of the twin-triode to again begin conducting, thereby cutting off the left half. The output of the plate of the right half will be a positive pulse of four microseconds and is supplied to the upper end of a voltage divider comprising resistors 263 and 265. The lower end of resistor 265 is connected to a negative source of D.C. potential and a capacitor 264 is arranged in shunt with resistor 263. The mid-point between resistors 263 and 265 is connected by way of a resistor 266 to the grid of the triode 267. The four microsecond pulse supplied to the control grid of triode 267 will appear as a negative four microsecond pulse at the plate of the triode, said plate being connected through a resistor 268 to a positive source of D.C. potential.

A switch is formed by diodes 269 and 270 whose plates are commoned and connected by a resistor 271 to a positive source of D.C. potential. Thus, as long as the negative four microsecond pulse obtained at the plate of triode 267 is in existence, any further black signals from the cathode of triode 245 will not be allowed to pass through a diode 270. However, as soon as the four microsecond white signal is completed from the single-shot multivibrator which produced it, any black signals from the cathode of triode 245 will be allowed to pass through the switch and the resistor 272 and be applied to the control grid of a triode 273. This triode is connected as a cathode follower, there being a resistor 274 connected between the cathode thereof and a negative source D.C. potential. The output is taken from the cathode of the triode. Thus, in FIG. 6, there is produced a signal which will have a minimum black duration of four microseconds as well as a minimum white duration of four microseconds. It will also be seen that any black signal of less than three microseconds duration will appear as a white signal at the output and any white signal of less than three microseconds duration will appear as a black signal at the output.

The black and white output signals from the cathode of triode 273 in FIG. 6 is adapted to be supplied to the upper side of a resistor 280 in FIG. 7. It is seen that resistors 280 and 281 form a voltage divider whose midpoint is connected through a resistor 283 to the control grid of a triode 284. A bypass capacitor 282 is provided in shunt with resistor 280. Thus, the input signals appearing at the upper side of a resistor 280 are set at the proper level to serve as an input to the triode 284. This tube will be turned on for black signals and will be turned off for white signals. The plate of this triode is connected through a resistor 279 to a positive source of D.C. potential. Thus, during intervals when black signals are being supplied to the triode 284, relatively negative voltages will be appearing at the plate of this triode. These voltages are supplied to a divider comprising resistors 285 and 286 and will appear by way of the mid-point of the divider through a resistor 288 at the control grid of a triode 289, there being the usual bypass capacitor 287 provided in shunt with the resistor 285.

The triode 289 therefore will be cut off while the triode 284 is in conduction, and the triode 289 will be in conduction during times when the triode 284 is cut off. The plate of triode 289 is connected through a resistor 290 to a relatively low positive D.C. voltage.

The signals produced from the plate of triode 284 will be used to cause current to flow through the coils 307 in the write head in one direction, and the signals supplied from the plate of triode 289 will be used to cause current to flow through the coil of the write head in the opposite direction. Thus, with the plate of triode 284 connected to the upper end of a divider comprising resistors 291 and 292, a voltage which will be of somewhat lesser amplitude will be supplied through a resistor 294 to the control grid of a triode 297, there being the usual bypass condenser 293 in shunt with the resistor 291. It is also seen that the potential at the mid-point of resistors 291 and 292 is connected through resistors 295 and 296 to the control grids of triodes 298 and 299, respectively. Thus, all of the triodes 297, 298 and 299 are being controlled in parallel. That is, during the intervals that a black signal is supplied as an input to the upper side of resistor 280, triodes 297, 298 and 299 will be cut off. The plates of triodes 297, 298 and 299 are connected together and to ground through resistor 300, in parallel with resistor 306 and a portion of the winding 307. The cathodes of the triodes 297, 298 and 299 are connected through resistors 301 and 302, and 303, respectively to the upper side of resistor 304, the lower side of said resistor being connected to a negative source of D.C. potential. A filter capacitor 305 is connected also to the upper side of resistor 304 and has its other side connected to ground.

During the white signals supplied as a video input to the upper side of resistor 280, a relatively positive voltage will appear on the plate of triode 284 which will cause triodes 297, 298 and 299 to all go into conduction. This means that the plates will draw current through resistor 300, in parallel with resistor 306 and the write head coil 307 from ground. That is, in writing representations on the drum of white signals supplied as a video input, the current flow is from ground through the coil 307 and resistor 306 in multiple with resistor 300, through the triodes 297, 298 and 299 and the resistors 301, 302, and 303, respectively, and through the resistor 304 to the negative source of D.C. potential.

To write on the drum a representation of a black signal, the output of the plate of triode 289, which is in phase with the video signals supplied to the upper side of resistor 280, is connected to the upper end of a voltage divider comprising resistors 308 and 309, the upper side of resistor 309 being connected to a positive source of D.C. potential. A bypass capacitor 310 is provided across resistor 308. The output from the mid-point between resistors 308 and 309 is supplied through a resistor 311 to a triode 314. Also, the output at the mid-point between resistors 308 and 309 is supplied through resistors 312 and 313 to the control grids of triodes 315 and 316. Thus, all of the triodes 314, 315 and 316 will be supplied relatively positive signals in coincidence with the black signals in the video input. This will turn all of the tubes into conduction in parallel and will cause current to flow through resistors 320, 321 and 322, which are connected to the plates of triodes 314 and 315 and 316, respectively. The cathodes of triodes 314, 315 and 316 are connected to resistors 317, 318 and 319, respectively, and thence to the circuit comprising winding 307 and resistor 306 connected in series to ground, and shunted by resistor 300. Thus, all of the triodes 314, 315 and 316 will conduct and cause current to flow from the positive source of D.C. potential through the plate resistors, the three triodes, the resistors 317, 318 and 319, and the resistor 300 in parallel with the resistor 306 and the coil 307 to ground. This causes a representation of a black signal to be placed on the drum.

After the information is recorded on the drum, it is picked up at two separate stations. The first station is used to pick up the information recorded on the drum to generate what will be termed PRESENT SCAN DATA. The second station picks up the information which will be termed DELAYED SCAN DATA. The read amplifier circuit which is used to receive the information from a read head at each station is the same for both stations. Therefore, only one read amplifier will be described.

Reference is made to FIG. 8 which shows the coil 330 of one of the read heads positioned adjacent the drum. The two ends of the coil 330 are connected to the opposite ends of a voltage divider comprising resistors 331 and 332. The mid-point between these resistors is connected to ground potential. The upper end of the voltage divider is connected through a resistor 333 to the control grid of a triode 334. The lower end of the divider is connected through a resistor 335 to the cathode of the triode 334. Thus, by dividing the output at the opposite ends of the coil 330 and supplying inputs to the control grid and cathode of the triode 334, it is possible to compensate for crosstalk between the lines connected to the coil.

The plate of triode 334 is connected through resistors 336 and 337 to a positive source of D.C. potential, there being the usual decoupling capacitor 338 provided between the interconnection of resistors 336 and 337, and ground. The output from the triode 334 is taken from the plate thereof and supplied through a capacitor 339 and a resistor 341 to the control grid of a triode 342. The grid return path is through the resistor 341 and the resistor 340. The cathode of triode 342 is connected through a resistor 343 to ground and the plate is connected through the resistors 344 and 345 to the positive source of D.C. potential. As before, there is provided a capacitor, designated by reference numeral 346, which serves as a decoupler in the plate circuit.

The output at the plate of triode 342 is supplied to a differentiating circuit which is comprised of a capacitor 347 and a resistor 348. The output is taken from the mid-point between the capacitor and resistor and supplied through a resistor 349 to the control grid of a triode 350. In recording on the drum it will be remembered that during the recording of a black signal, magnetization of an area was according to one flux direction and during the recording of a white signal magnetization was according to the opposite flux direction.

When the read head detects a flux pattern, indicative of a change from white to black, it produces a 0 to 180 degrees portion of a sinusoidal waveform. When this signal is differentiated in the circuit comprising capacitor 347 and resistor 348, a full sinusoidal waveform is produced with the 180 degrees point on the differentiated sine wave corresponding in time to the 90 degrees point of the flux waveform. Thus, the differentiator causes the read amplifier to respond to flux peaks. Similarly, when the read head detects a flux pattern, indicative of a change from black to white, it produces a 180 to 360 degrees portion of a sinusoidal waveform. When this signal is differentiated a full inverted sinusoidal waveform is produced.

Therefore, at the control grid of triode 350 a negative pulse corresponding to the positive peak in the flux pattern for a white to black signal change is produced. Likewise at this point a positive pulse corresponding to the negative peak in the flux pattern for a black to white change is produced. Triode 350 is connected as an inverter and the output is taken from the plate. The cathode of this triode is connected through a parallel RC network, comprising a resistor 351 and capacitor 352, to ground. The plate is connected through the resistors 353 and 354 to a positive source of D.C. potential, there being the usual decoupling capacitor 355 provided in the plate circuit. The output of the plate is supplied through a capacitor 356 and a resistor 357 to the control grid of a triode 358 which is the first stage of a latch. The cathode of triode 358 is connected directly to ground and the grid resistor 357 has one end thereof connected to the cathode of a diode 361, the plate of said diode being connected to the mid-point of a voltage divider comprising resistors 359 and 360. One end of resistor 359 is connected to ground and one end of resistor 360 is connected to a negative source of D.C. potential. Capacitor 362 is connected in multiple with resistor 359. This produces a negative potential at the mid-point between the resistors 359 and 360 so that the input signal appearing at the input side of resistor 357 cannot go below this negative potential.

As previously mentioned, triode 358 is the firts half of a latch. The plate of this triode is connected through a resistor 363 to a positive source of D.C. potential. The output from the plate is supplied to the upper end of the voltage divider which is comprised of resistors 365 and 366, the lower end of the resistor 366 being connected to a negative source of D.C. potential. The usual high frequency bypass capacitor 367 is provided in shunt with resistor 365. The mid-point between resistors 365 and 366 is connected through a resistor 368 to the control grid of the second half of the latch which is formed by the triode 369. It is seen that when a positive signal is supplied to the control grid of triode 358, the triode goes into conduction and a negative voltage is supplied therefrom to turn the triode 369 off, thus allowing a positive voltage to be supplied from the plate of this triode to the control grid of a triode 373. The plate of triode 369 is connected to a positive source of D.C. potential through a resistor 372. The triode 373 is connected as a cathode follower, in that its cathode is connected through a resistor 374 to ground.

It is noted that the cathode of triode 373 is also connected to the grid by way of a resistor 375, the grid also being connected through a diode 377 and a resistor 376 to a positive source of potential. It will be seen that the maximum voltage that can be supplied to the grid of the triode 373 is determined by the voltage at the upper side of resistor 376. That is, any time the voltage rises above this voltage, diode 377 will conduct and not allow the voltage to go higher. The capacitor 378 is connected between the diode 377 and ground and is used for filtering purposes. The plate of the triode 373 is connected through a resistor 379 to the positive source of D.C. potential, there being the usual filter capacitor 380 provided in the plate circuit.

The output which is taken from the cathode of triode 373 is supplied across a diode 381 which is connected to one side of a capacitor 382, the other side of said capacitor being connected to ground. The plate of the diode 381 is connected through a resistor 384 to a negative source of D.C. potential and the cathode of diode 381 is connected to one side of resistor 383 whose other side is connected to the plate of the diode. The output from the cathode of triode 373 is also supplied through a resistor 385 and through resistor 357 to the control grid of the triode 358. This input to the triode 358 from the cathode of the triode 373 will be a relatively positive voltage. In other words, the latch is turned ON by the occurrence of a positive pulse from the plate of triode 350 and is kept on by the occurrence of a positive voltage from the cathode of triode 373. As soon as the trailing edge of a black signal, for example, occurs, the plate of triode 350 will drop and will cut the triode 358 off. When this occurs, a relatively positive voltage is supplied from the plate of triode 358 to the control grid of triode 359, causing this triode to begin conduction. This causes the plate of triode 359 to drop and supply a relatively negative voltage through triode 373 to the control grid of triode 358, thereby keeping the latch OFF. Thus, it will be seen that it is possible to obtain a digital output from the cathode of triode 373, there being an upper level for a black signal and a lower level for a white signal.

Reference is made to FIG. 1 which discloses a block 22 which is labelled SYNC GENERATOR. This block includes a read amplifier which receives signals from the sync track of the drum. That is, the sync track is provided with a plurality of equally spaced magnetized spots along the track, there being one such spot for each radial slit on the scanning disc. Each spot is positioned such that it will be sensed by the magnetic head associated with the sync track at the time a radial slit has completed its traversal of the fixed slit. Referring to FIG. 48, the read amplifier for receiving the sync track information is provided with reference numeral 23. The output from the read amplifier is a pulse having a positive leading edge which is used by the trigger 24 to generate a seven microsecond pulse which is labelled Es. This is the END OF SCAN pulse. Trigger 25 also receives the output of the read amplifier and produces therefrom a twelve microsecond pulse termed the DEAD TIME GATE. An inverter 26 receives this signal and produces a signal labelled NEGATIVE DEAD TIME GATE. The time relationships of these pulses, as well as the END OF SCAN RESET pulse Esr which will be described later, are shown in FIG. 47.

Before making a detailed description of the G CODING, H, K CODING, and J CODING circuits, there will be described a number of typical circuits which are represented in block form in the coding circuits. Since these circuits would normally be constructed as pluggable units, the "pins" referred to in the following description denote terminals of the circuit.

Reference is made to FIG. 9a for the details of a cathode follower type CF1 which will be shown hereinafter as illustrated in FIG. 9b. This cathode follower comprises a triode 390 which is adapted to receive an input from a pin 3 through a resistor 391. The cathode is connected through resistors 392 and 393 to a negative source of D.C. potential and the plate is directly connected to a positive source of D.C. potential. The output from the cathode follower may be taken from the cathode at pin 5. The operation of this cathode follower is conventional in that the cathode follows the grid input voltage.

Reference is made to FIG. 10a which shows the details of another type of cathode follower circuit which will hereinafter be represented as shown in FIG. 10b. This circuit comprises a triode 394 which is adapted to receive its input through a resistor 395 from pin 3. The cathode is connected through resistors 396 and 397 to a negative source of D.C. potential, the plate is directly connected to a positive source of D.C. potential, and the output may be taken from pin 5. The difference between the circuit shown in FIGS. 10a and 9a is that the resistors in the cathode circuit of FIG. 10a are of smaller ohmic value to allow heavier loads to be carried by the triode 394.

FIG. 11a discloses a cathode follower circuit of the type CF3, which hereinafter will be illustrated as shown in FIG. 11b. This cathode follower utilizes a divider input and is identical with the type CF1 shown in FIG. 9a, except for the divider input. It comprises a triode 398 whose grid is adapted to receive an input signal from the mid-point of a divider which is comprised of resistors 399 and 400, the upper side of the resistor being connected to pin 3 which receives the input. The lower end of the divider is connected to a negative D.C. potential. A bypass capacitor 401 is provided in shunt with resistor 399. The output from the mid-point of the divider is supplied through a resistor 402 to the control grid of the triode 398. Resistors 403 and 404 are provided in a cathode circuit and connect the cathode to a negative source of D.C. potential, and the plate is directly connected to a positive source of D.C. potential. The output may be taken from the cathode at pin 5.

FIG. 12a shows the details of a combined three position switch and cathode follower. This circuit will be shown hereinafter as in FIG. 12b. Note that FIG. 12b illustrates a triangle in which there is provided the letter K, the triangle indicating that it is a switch and the letter K indicating that it includes a cathode follower output. The switch portion of this circuit comprises diodes 405, 406 and 407 whose plates are common together and connected through a resistor 408 to a positive source of D.C. potential. It should be realized that three diodes are shown by way of example only and other numbers of diodes can be used. The output from the switch is taken from the commoned plates. If only this portion of the circuit is needed, an output may be taken directly from the plates. This much of the circuit may be illustrated as in FIG. 12c. That is, the letter K is not provided in the triangle. However, to use the cathode follower, an output may be taken from the commoned plates of the diodes through a resistor 409 to the control grid of a triode 410, the plate of said triode being connected to a positive source of D.C. potential. The cathode of the triode is connected through resistors 411 and 412 to a negative source of D.C. potential. The output from the cathode follower is taken from pin 7.

FIG. 13a discloses the details of a logical OR circuit with a cathode follower output. This may be illustrated hereinafter as shown in FIG. 13b. The OR circuit portion of FIG. 13a comprises diodes 413, 414 and 415, the cathodes of said diodes being connected through a resistor 416 to a negative source of D.C. potential. The actual number of diodes is not restricted to three as shown. If only this portion of the OR circuit is used, a block will be provided as shown in FIG. 13c. That is, the block includes a semicircle without the letter K therein. However, if it is desired to use a cathode follower output for this OR circuit, there is provided a resistor 417 which couples the commoned cathodes of the diodes 413, 414 and 415 to the control grid of a triode 418. The plate of the triode is connected to a positive source of D.C. potential and the cathode is connected to a negative source of D.C. potential through resistors 419 and 420. The cathode follower output may be taken from pin 7.

Figure 14A:
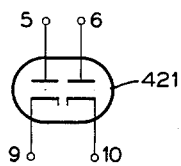
Figure 14B:
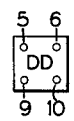

Reference is made to FIG. 14a which discloses the details of a diode unit of the type DD1. This circuit merely comprises a twin vacuum diode 421 which may be illustrated as shown in FIG. 14b. This circuit is used primarily for resetting purposes.

Figure 15A:
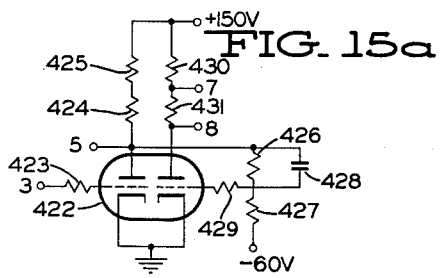
Figure 15B:
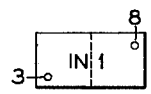

Reference is made to FIG. 15a which discloses the details of a double inverter circuit of the type IN1 which will hereinafter be shown as illustrated in FIG. 15b. This circuit comprises a twin-triode 422, the left half of which has a grid connected to pin 3 by way of a resistor 423. A relatively positive voltage to pin 3 will cause the voltage of the left plate of the twin-triode to drop because of current flow through the plate resistors 424 and 425 which are connected to a positive source of D.C. potential. When the plate voltage of the left half drops, the change is reflected in the voltage divider comprising resistors 426 and 427, there being a bypass capacitor 428 in shunt with the resistor 426. The output from the mid-point of the divider is supplied through a resistor 429 to the grid of the right half of the twin-triode. A retention of the left half plate voltage causes the right half to cut off. A direct plate output is taken from pin 8 and a tapped plate at pin 7 is taken from between resistors 430 and 431 which connect the plate of the right half to the positive source of D.C. potential. Thus, for a positive input, there is provided a positive output from pin 8 and pin 7. The difference between the voltages at pins 8 and 7 is one of level and amplitude only.

Figure 16A:
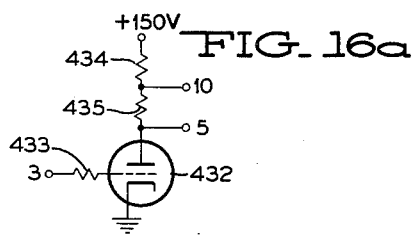
Figure 16B:
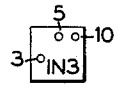

Reference is made to FIG. 16 which discloses a single stage inverter of the type IN3. This inverter will be illustrated hereinafter as shown in FIG. 16b. The circuit is quite conventional in that it includes a triode 432 whose cathode is grounded and whose control grid is connected to pin 3 through the resistor 433. The plate of the triode is connected through resistors 434 and 435 to a positive source of D.C. potential. The full plate output is taken at pin 5 and the tapped plate output at pin 10.

Figure 17A:
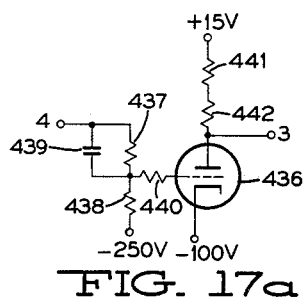
Figure 17B:

FIG. 17a discloses another form of inverter which will be illustrated hereinafter as shown in FIG. 17b. This inverter utilizes a divider input, in that the input signals supplied to pin 4 are applied to the top end of the voltage divider comprising resistors 437 and 438, the lower end of said divider being connected to a source of negative potential. A capacitor 439 is arranged in shunt with resistor 437 and serves as a bypass of the resistor for high frequency transients. The output from the midpoint of the divider is supplied through a resistor 440 to the control grid of a triode 436. The cathode of this triode is connected to a negative source of D.C. potential and the plate is connected to a positive source of D.C. potential by way of resistors 441 and 442. The output is taken directly from the plate at pin 3. This inverter is utilized where conditions call for a low level input and a low level output signal.

Reference is made to FIG. 18 which discloses a single-shot multivibrator or trigger which is labelled TR1. This trigger is adapted to generate positive pulses of varying widths in response to positive going input signals. The positive going input signals are adapted to be supplied via pin 3 to the plate of a diode 443 whose cathode is connected through a resistor 444 to the control grid of the left half of a twin-triode 445. This causes the left half, which has been cut off, to begin conducting. Current begins to flow from the positive source of D.C. potential through the resistor 451 and the left-hand tube section to ground and thus produces a drop in voltage at the plate. The output of the plate is suplied to charge a condenser 446 through a resistor 448 which is connected to ground. The decrease in potential at the point between the capacitor 446 and the resistor 448 is supplied through a resistor 447 to the control grid of the right half of the twin-triode 445, thereby turning this half off. When this occurs, no current is drawn through a resistor 449 and the increased output from the right plate is supplied through a diode 450 to maintain the left half in conduction. As soon as capacitor 446 is sufficiently discharged to allow the grid of the right half of the twin-triode to begin to conduct again, the plate voltage of the right half drops and allows the left half to be cut off by way of the diode 450 and resistor 444 unless the potentials at the plate of diode 443 is still positive. The grid return for the left half of the twin triode is by way of resistor 444a. Thus, it is seen that a positive going input pulse will result in a positive going output pulse at pin 5, the duration of this pulse being determined by the value of capacitor 446 and the value of resistor 448. For convenience the resistor value may be fixed and different sized capacitors may be used for different time constants as indicated by the dotted showing for capacitor 446. This circuit will be shown hereinafter as FIG. 18b.

Reference is made to FIG. 19a which discloses the details of a trigger of the type TR3. This circuit will be utilized hereinafter in the form shown in FIG. 19b. This trigger is a gated memory type of device in that a signal must be received during the time a gate signal is applied to the trigger before the trigger is turned ON. Once the trigger is turned ON, it will remain ON until the gate signal terminates. The trigger comprises a twin-triode 455 whose cathodes are commoned and connected to a negative source of D.C. potential. The right half of the twin-triode is normally conducting and under these circumstances current is drawn through the resistor 467 in the plate circuit of the right half. There is no current drawn through the plate resistor 462 in the plate circuit of the left half of the tube when the trigger is OFF. The plate of the right half of the tube is normally supplied a relatively negative voltage to the plate of a diode 454. Diode 454, in conjunction with diode 452 and resistor 456 forma a logical OR circuit. That is, with the cathodes of these diodes connected together and to one end of the resistor 456 whose other end is connected to a negative source of D.C. potential, a relatively positive input to pin 5 or from the plate of the right half of the twin-triode will raise the commoned cathodes of the diodes to this relatively positive input.

Diodes 452a and 453 and resistor 457 form a switch which requires relatively positive inputs to the cathodes of each diode in order to produce an output signal. The gate signal is adapted to be applied to pin 4 which is connected to the cathode of diode 452a. Once a relatively positive gate signal is supplied to pin 4, the switch awaits a relatively positive input to pin 5. When these two inputs occur in coincidence, a relatively positive output signal is supplied from the switch to the upper end of a voltage divider which is comprised of resistors 458 and 459, the lower end of this divider being connected to a negative source of D.C. potential. A high frequency bypass capacitor 460 is arranged in shunt with resistor 458.

The relatively positive potential at the mid-point of the divider is supplied through a resistor 461 to the control grid of the left half of the twin-triode, thus turning the trigger ON. As soon as the left half of the twin-triode 455 goes into conduction, a current is caused to flow through the resistor 462 and the potential at the plate of the left half drops, thereby supplying a negative voltage to the top of the divider which comprises resistors 463 and 464, the lower end of this divider being connected to a negative D.C. potential. A bypass capacitor 465 is provided in shunt with resistor 463. The output at the mid-point of the divider is supplied through a resistor 466 to the grid of the right half of the twin-triode, thereby allowing no current flow through resistor 467, allowing the plate of the right half to go relatively positive. This potential is supplied to the plate of diode 454 which will of course supply an input to the cathode of diode 453. Thus, as long as the gate signal is supplied to pin 4, an output will be supplied from pin 7 which is relatively positive in nature. The output of pin 7 will go negative as soon as the gate signal at pin 4 is terminated. That is, when the gate signal at pin 4 terminates, there is no longer a coincidence of inputs to diodes 452 and 453, thereby allowing the left side of the twin-triode to be cut off. This, in turn, causes the right side to begin conducting.

Reference is made to FIG. 20a which discloses a low level trigger of the type TR6 which will be illustrated hereinafter as shown in FIG. 20b. This trigger is very conventional in nature and has the capability of having two inputs supplied to the right side thereof and one input to the left side thereof. This trigger comprises a twin-triode 468 in which the right half is normally considered to be the half that is conducting when the trigger is OFF. Under these circumstances, the plate of the right half will draw current through the resistor 469 and will supply a relatively negative voltage to the top of a divider which is comprised of resistors 470 and 471, there being a negative D.C. potential connected to the lower end of the resistor 471. A capacitor 478 is provided in shunt with the resistor 470. The output at the mid-point of the divider is supplied through a resistor 472 to the control grid of the left half of the twin-triode. Since this voltage is relatively negative in nature, it will maintain the left half cut off. With the left half cut off, the plate thereof draws no current through resistor 473 and will provide a relatively positive voltage to the upper end of a divider which is comprised of resistors 474 and 475, the lower end of resistor 475 being connected to a negative source of D.C. potential. Here again a bypass condenser 476 is arranged in parallel with a resistor 474. The output at the mid-point of the divider is supplied through a resistor 477 to the control grid of the right side of the twin-triode. As is well understood in the operation of triggers, negative pulses to pins 6 or 7, which are connected by way of capacitors 480 or 481, respectively, to the grid of the right half of the twin-triode, will result in the right side of the twin-triode being cut off and the left side being placed in conduction, thereby turning the trigger ON. After the trigger is turned ON, a negative pulse supplied to pin 3 and through the capacitor 479 to the control grid of the left half of the twin-triode, will result in the left half being cut off and the right half being placed in conduction, thereby turning the trigger OFF.

Reference is made to FIG. 21a which discloses a resettable type of single-shot multivibrator which will be illustrated hereinafter as shown in FIG. 21b. In this circuit there is provided an input pin 4 which is connected to the plate of a vacuum diode 482, the cathode thereof being connected to the upper side of a capacitor 483, the lower side of which is connected to a negative source of D.C. potential. A resistor 483a is arranged in shunt with capacitor 483. Pin 4 is also connected to the plate of a diode 484 whose cathode is connected to a positive source of D.C. potential. Positive pulses supplied to pin 4 will be clipped so that they cannot go above the voltage at the cathode of diode 484, and will be allowed to be supplied through the vacuum diode 482 to charge the capacitor 483. The rate of discharge of the capacitor is determined by the value of the capacitor and the value of the resistor 483a. The potential at the upper side of the capacitor is supplied through a resistor 485 to the control grid of the left half of a twin-triode 486. The right half of the twin-triode is normally biased into conduction, and the left half is placed in conduction when the voltage across capacitor 483 rises above a predetermined value, causing current to be drawn through resistor 487. As this occurs, a negative going voltage will be applied from the plate of the left side to charge a capacitor 488 through a resistor 490. The output at the upper side of the resistor 490 is supplied through a resistor 489 to the right side of the twin-triode 486, thereby causing the right side to be cut off. Since no current will flow through resistor 491, a relatively positive voltage will appear at pin 9 which is the output signal. It will be seen that if a first pulse is applied to pin 4, it will cause a relatively positive output from pin 9, the duration of which output is determined by the value of capacitor 483, and the value of resistor 483a. However, if before the capacitor 483 is discharged to allow the right side of the twin-triode to go into conduction again, a second pulse is supplied to pin 4, the circuit will be regenerated. This can occur over and over again as long as the pulses supplied to pin 4 are supplied close enough together to keep capacitor 483 from discharging and turning the left side of the twin-triode 486 off, providing however, that the string of pulses is not longer than the time constant set by capacitor 488 and resistor 490. In practice, such a long string of pulses is never received. As long as the right side of the twin-triode is not in conduction, a relatively positive voltage is supplied from pin 9 as the output.

Reference is now made to FIGS. 22a and 22b which disclose the circuitry for generating the signature components G0, G1, G2, G3, G4, G5, G6 and G7. The first portion of this circuit is utilized to take the information obtained during the present scan and to determine how many of the signals are of a first duration, how many of a second duration and how many of a third duration. If a black signal is less than ten microseconds' duration, an output representing a single crossover X will be produced. If a black signal is between ten and nineteen microseconds in duration, an output signal representing a small vertical line, i.e. $Vs$, is produced. If a signal is more than nineteen microseconds in duration, an output signal representing a medium vertical line, i.e. $Vm$ is produced. To produce these signals, the present data is supplied to a single-shot multivibrator 500 which, from the leading edge of the relatively positive present data black signals, generates a two microsecond pulse. This pulse is a positive pulse and is supplied through cathode followers 501 and 502 to each of two triggers 503 and 504. These triggers are connected as resettable single-shot multivibrators and are arranged to supply output pulses of fixed durations for a single pulse input. The width of the positive output pulse from the trigger 503 is ten microseconds. The duration of the pulse from the trigger 504 is nineteen microseconds. The present data input is also supplied through an inverter 505 to a single-shot multivibrator 506. It will be seen that the leading edge of the present data is a positive going voltage so that the output from the inverter to the trigger 506 will be a negative going voltage. Since this trigger is responsive only to positive going pulses, no action will occur at this time. However, on the trailing edge of the present data, i.e. the trailing edge of the black signal, the input to the inverter is a negative going voltage which produces a positive going voltage as the output from the inverter. This causes the single-shot multivibrator 506 to generate a two microsecond pulse which is utilized to sample the switches 507, 508 and 509.

If trigger 503 is still providing a relatively positive output pulse, by the time the two microsecond pulse is supplied to the switch 507 from the trigger 506, an output signal will be supplied from this switch through an inverter 512 to an OR circuit 513, thereby indicating to the OR circuit that a crossover has been determined in which the signal produced by the crossover was ten microseconds or less in duration. If the sample pulse from trigger 506 to the switch 508 occurs after the trigger 503 has terminated its positive output pulse the input from the trigger 503 to an inverter 510 will be relatively negative. The output from the inverter will therefore be relatively positive to supply an input to a switch 508. If the two microsecond pulse from trigger 506 occurs before the end of the nineteen microsecond pulse from trigger 504, a relatively positive output signal will be supplied from the trigger 504 to the switch 508. Thus, an output signal representing a small vertical line $Vs$ will be produced from the switch 508, and will be supplied through a cathode follower 514 to the OR circuit 513.

In the event the two microsecond pulse from switch 503 occurs after trigger 504 has produced its nineteen microsecond output pulse, the output from the trigger 504 will be relatively negative and will cause the inverter 511 to produce a relatively positive input signal to the switch 509. Therefore, an output signal representing a long vertical line is produced, this signal being termed $Vm$. The output of switch 509 is supplied through a cathode follower 515 to the OR circuit 513.

An output from the OR circuit 513 will indicate the fact that either a signal representing X, a signal representing $Vs$, or a signal representing $Vm$ has been supplied to the OR circuit. Each output from the OR circuit may be expressed as $X+Vs+Vm$. The output of the OR circuit is fed through an inverter 516 to a trigger ring which is comprised of triggers 517, 519, 520 and 521. The asterisk under the triggers represents the side of the trigger which is normally conducting when the trigger is in its reset condition. The input to cause a trigger to be in a particular reset condition is a reset signal after the end of a scan which is labelled R*. It is noted that the asterisk is under the left side of the trigger 517. This means that the left side of this trigger is reset to be conducting. Thus, the first signal supplied from inverter 516 will turn trigger 517 OFF, which, in going OFF, will turn trigger 519 ON. It will be seen that successive signals from OR circuit 513 and inverter 516 will cause the successive triggers in the ring to be turned ON.

If no signals are supplied from the OR circuit 513 during a scan, trigger 517 will supply a relatively positive output voltage to a switch 522. This switch receives the END OF SCAN signal $Es$. If trigger 517 is ON when the signal $Es$ is produced, an output is supplied through a cathode follower 523 to represent the signature component G0. That is, G0 represents the fact that there was an absence of either a signal representing X, a signal representing $Vs$ or a signal representing $Vm$. This may be expressed as $G0=\overline{X+Vs+Vm}$. However, if one signal was supplied from the OR circuit 513 indicating that either a signal X or a signal $Vs$ or a signal $Vm$ was received thereby, trigger 519 will be ON. This will allow a positive voltage to be supplied from the right side thereof to a switch 524 which also receives the END OF SCAN SAMPLE pulse. That at the END OF SCAN time an output will be supplied from the switch 524 through the cathode follower 525 to represent the signature component G1. Thus, the expression $$G1=X+Vs+Vm$$

is represented. In the event, two output signals are supplied from OR circuit 513 indicating that either two signals representing X, two signals representing $Vs$, two signals representing $Vm$, a signal representing X and a signal representing $Vs$, a signal representing X and a signal representing $Vm$, or a signal representing $Vs$ and a signal representing $Vm$, were supplied to the OR circuit 513. In any event, these signals from the OR circuit 513 will cause trigger 520 to be turned ON. In the event this occurs, the right side of this trigger will be relatively positive and will supply an input to the switch 526 which also receives the END OF SCAN SAMPLE pulse $Es$. It will be noted, however, that an additional input is supplied to switch 526. This input will be relatively positive providing there is an absence of the signature component signals G4, G5 and G6, i.e.

$$\overline{G4+G5+G6}$$

In the event all of the inputs to the switch 526 are relatively positive in coincidence, an output signal will be supplied therefrom to the cathode follower 527 to indicate the signature component G2. It will be seen, however, that in any scan during which two input signals were supplied from OR circuit 513, and one of the two signals was identified as either Vs or Vm, one of the signature components G4, G5 or G6 will be present, thereby limiting the G2 output to the condition of an X signal followed by another X signal. In the event three output signals are supplied during a scan from the OR circuit 513, trigger 521 will be ON thereby supplying a relatively positive voltage from the right side thereof to the switch 528. At END OF SCAN time an output will be supplied from the switch and through the cathode follower 529 to indicate G3.

The signature component G4 represents the fact that a signal representing Vs or Vm is followed during a scan by a signal X, or that a signal representing Vm is followed by a signal representing Vs.

The signature component G5 is represented by the fact that a signal representing X is followed during a scan by signals representing either Vs or Vm, or that a signal representing Vs is followed by a signal representing Vm.

A signal representing the signature component G6 is produced where a Vs signal is followed by another Vs signal, or where a Vm signal is followed by another Vm signal.

The signature component G7 is represented when either a Vs or Vm signal is produced in the same scan with a G3 signal.

In order to implement the signature components G4, G5, G6 and G7, there is provided an inverter 530 which is adapted to receive the output signals from the cathode follower 512 representing X. This inverter output is supplied to the right grid of a trigger 531 and will turn this trigger ON. At the same time, the signal from the inverter 530 is used to turn a trigger 532 OFF in the event it has been turned ON. That is, if trigger 532 had been turned ON, it will be turned OFF by the occurrence of a signal representing X. A signal representing Vs is supplied from the switch 508 through the cathode follower 514 to each of two inverters 533 and 534. The output of the inverter 533 is tied to an inverter 539 which is adapted to receive the output of switch 509, which represents Vm, through the cathode follower 515. Thus, the output from inverters 533 and 539 will represent either Vs or Vm, i.e., $Vs+Vm$, and is supplied to the left side of trigger 531 to turn this trigger OFF, if it has previously been turned ON, and to the right side of trigger 532 to turn this trigger ON. At the same time, the signal representing $Vs+Vm$ is supplied to turn a trigger 536 ON.

The inverter 534 supplies the signal representing Vs to turn a trigger 535 OFF, if it has been turned ON, to turn triggers 537 and 538 ON, and to turn trigger 538 OFF. That is, the first Vs signal supplied to trigger 538 will turn the trigger ON and the second Vs signal will turn the trigger OFF.

The signal representing Vm is supplied from the switch 509 through the cathode follower 515 to inverters 539 and 540, as previously mentioned. The output of inverter 540, which represents Vm, is supplied to turn trigger 537 OFF, if it has been turned ON and to turn trigger 535 ON. Also, the output from inverter 540 is connected to both sides of trigger 541. That is, the first time a Vm signal is produced it will turn a trigger 541 ON, and the second time a Vm signal is produced the trigger 541 will be turned OFF. It should be remembered that all of the signals which are now being described must occur on a single scan, since each of the triggers described to this point are turned OFF at the END OF SCAN RESET time, i.e. E$sr$.

Thus, trigger 535 will produce a negative going pulse when, during a scan, a signal representing Vm has been followed by a signal representing Vs, i.e. $Vm \rightarrow Vs$. The trigger 531 will supply a negative going pulse providing that during a scan there is an indication that a signal X has been followed by a signal representing Vs or Vm, i.e. $X \rightarrow Vs+Vm$. The trigger 537 will supply a negative going pulse if a signal representing Vs is followed by a signal representing Vm, i.e. $Vs \rightarrow Vm$. Trigger 538 will supply a negative going pulse if a signal representing Vs is followed by a signal representing Vs, i.e. $Vs \rightarrow Vs$. Trigger 541 will supply a negative going pulse providing a signal representing Vm is followed by a signal representing Vm, i.e. $Vm \rightarrow Vm$. Trigger 532 will supply a negative going pulse providing a signal representing Vs or Vm is followed by a signal representing X, i.e.

$$Vs+Vm \rightarrow X$$

Negative going pulses from the outputs of triggers 535, 531, 537, 538, 541 and 532, which are indicative of the above-mentioned conditions, are used to set up conditions for providing the G4, G5 and G6 signature components. For example, a negative going pulse from the output of either trigger 532 or 535 will turn on trigger 542. In the event trigger 542 is turned ON, an output is supplied therefrom to a switch 548. Another input to this switch is the END OF SCAN signal E$s$ and the remaining input is fed from the trigger 521 through an inverter 549. That is, if trigger 521 is not turned ON to indicate three crossovers during a scan, the output of the inverter 549 will be relatively positive and if the remaining inputs to switch 548 are relatively positive, an output signal can be supplied therefrom through the cathode follower 550 to indicate G4. However, if three crossovers have been seen during a scan to turn the trigger 521 ON, switch 548 would be inhibited through the inverter 549. Thus, the circuit for the expression $$G4=(Vs+Vm) \rightarrow X+Vm \rightarrow Vs$$

has been described.

The trigger 543 can be turned on by a negative going pulse from either trigger 531 or trigger 537. Thus, a relatively positive output from trigger 543 is representative of the fact that a signal X is followed by Vs or Vm, or that a signal Vs is followed by a signal Vm. The output of trigger 543 is supplied to a switch 551 which receives the END OF SCAN signal E$s$, as well as the output of inverter 549. Thus, if three crossovers were not seen on this scan, a signal may be supplied from the switch 551 through the cathode follower 552 to produce an output signal representing G5. This output may be expressed as $G5=X \rightarrow (Vs+Vm)+Vs \rightarrow Vm$.

Trigger 544 is arranged to receive a negative going pulse from either trigger 538 or 541. Thus, if it receives signals representing $Vs \rightarrow Vm$ or $Vm \rightarrow Vm$, an output signal will be supplied from the right side thereof to a switch 553. This switch is also connected to receive the output of inverter 549 as well as the END OF SCAN signal E$s$. In the event three crossovers have not been seen on this scan, an output will be supplied from this switch at the END OF SCAN time through the cathode follower 554 to represent G6. This signature component may be expressed $(Vs \rightarrow Vs)+(Vm \rightarrow Vm)$. The signature component G7 is indicative of the fact that either Vs or Vm have occurred on the scan and that three crossovers have been seen by the scanner. The output of trigger 536 will be relatively positive if either Vs or Vm have occurred. This relatively positive voltage is supplied to the switch 555 along with the END OF SCAN signal E$s$. The other input to this switch comes from trigger 521 which will be relatively positive in the event three crossovers have been seen. Thus, the output from switch 555, which is supplied through a cathode follower 556, will indicate a G7 condition, i.e, $(Vs+Vm) \cdot G3$. It will be noted that trigger 536 is adapted to be reset by the END OF SCAN RESET signal to inverter 557. The remaining triggers are also reset to their prescribed condition by the END OF SCAN RESET signal E*sr*.

It will be remembered that a signal representing $\overline{G4+G5+G6}$ was supplied to switch 526. That is, if signals representing G4, G5 or G6 were in existence, then switch 526 is inhibited. To produce this input to switch 526, the outputs from triggers 542, 543 and 544 are supplied to an OR circuit 546. If a relatively positive output is produced from any one of these triggers, a relatively positive output will be supplied from the OR circuit to an inverter 547. Thus, the output voltage from the inverter will be relatively negative and inhibit switch 526.

The H, K CODING circuit is illustrated in FIGS. 23*a* and 23*b*. It has been previously mentioned that in the preferred embodiment of the present invention, the characters are scanned from the top to the bottom thereof in successive vertical scans which progress from right to left across the character. This scanning arrangement may be used where information is being read from a record card, low order first, and stored until the card arrives at a punch station. At this time, the stored information is supplied to the punch to cause the card to be punched. There are certain applications where it is desirable to read the information on a card high order first. Thus, with the card turned around, the characters will appear upside down. Now the scanner scans the highest order character first and the scanning of the character is from the bottom to the top, each scan progressing from the left side of the character to the right side.

Reference is made to FIG. 25 which discloses the first described method of scanning the character "2". It is seen that the delayed scan is three scans previous to the present scan. In the H CODING, it is desirable to measure within limits the vertical distance between the point where the delayed scan enters the upper contour of the character and the point where the present scan enters the upper contour. This vertical distance may be termed the change in altitude, i.e. ΔH. The signals representing this vertical distance are H0, H1, H2, H3 and H4. A signal H0 will be produced when the time difference between the beginning of the first black signal on the present scan and the first black signal on the delayed scan is less than five microseconds. A signal H1 will be produced when the time difference between the beginning of the first black signal on the present scan and the first black signal on the delayed scan is between five and eighteen microseconds, where the first black signal on the present scan occurs before the first black signal on the prior scan. A signal H2 is produced where the time difference is between five and eighteen microseconds but where the first black signal on the delayed scan occurs before the first black signal on the present scan. A signal H3 will be produced when the first black signal on the present scan precedes by a time greater than eighteen microseconds the first black signal on the delayed scan, or where there are black signals on the present scan and no black signals on the delayed scan. A signal H4 will be produced when the first black signal on the delayed scan precedes the first black signal on the present scan by a time greater than eighteen microseconds or where there are black signals on the delayed scan and no black signals on the present scan.

Reference is made to FIG. 26 which discloses the second described method of scanning the character "2." Here again, the delayed scan is three scans previous to the present scan. In the K CODING circuit, it is desired to measure within limits the vertical distance between the point where the delayed scan leaves the upper contour of the character and the point where the present scan leaves the upper contour. This vertical distance may be termed the change in altitude ΔH. The signals representing this vertical distance are K0, K1, K2, K3 and K4. It will be seen that in both FIGS. 25 and 26, the vertical distance ΔH is measured on the upper contour of the character. A signal representing K0 will be produced where the time difference between the trailing edge of the last black signal on the present scan and the last black signal on the delayed scan is less than five microseconds. A signal representing K1 is produced where the trailing edge of the last black signal on the present scan occurs between five and eighteen microseconds after the trailing edge of the last black signal on the delayed scan. A signal representing K2 will be produced where the trailing edge of the last black signal on the delayed scan occurs between five and eighteen microseconds later than the trailing edge of the last black signal on the present scan. A signal representing K3 will be produced where the trailing edge of the last black signal on the present scan occurs more than eighteen microseconds after the trailing edge of the last black signal on the delayed scan. A signal representing K4 will be produced where the trailing edge of the last black signal on the delayed scan occurs more than eighteen microseconds after the trailing edge of the last black signal on the present scan.

In order to use the circuit to scan the characters in the conventional manner to produce the H CODING signals, a pair of plug hubs shown to be connected by a solid line and labelled CARD is provided as seen in FIG. 23*a*. One of the hubs is connected to a positive D.C. voltage while the other of the hubs is connected through a resistor 560 whose midpoint is tied to a negative D.C. voltage. The negative voltage which is connected to the mid-point of resistor 560 will thus be applied directly to inverters 561 and 562, thereby keeping them cut off. It is seen also that a negative voltage is supplied to each of the switches 563 and 564, thereby inhibiting these switches during the operation for H CODING signals. On the other hand, the positive D.C. voltage causes a voltage drop across the upper half of the resistor 560 and provides a relatively positive input to an inverter 565 whose plate is commoned with the plate of an inverter 567. It is thus seen that in this manner inverter 565 is held conducting continuously so that its plate will hold the inverter 567 inoperative. An inverter 566 is also connected to the positive D.C. voltage connected to the plug hubs, the plate of this inverter being tied to the plate of an inverter 568. Inverter 566 will remain conducting during the H CODING operation and will hold the inverter 568 inoperative during this time.

Let it be assumed for the present that in scanning a character the first black signal on the present scan occurs prior to the first black signal on the delayed scan. Referring to a cathode follower 569, a relatively positive output signal will be supplied to a switch 570 at the beginning of the first black signal produced during a scan. Since the inverter 562 is now cut off by the negative D.C. voltage previously mentioned as being supplied thereto, and since trigger 576 is reset to the OFF condition at the end of each scan, the upper input to AND circuit 570 will be relatively positive. Thus, the first positive pulse produced as the scanner enters the upper portion of the contour of the character on the present scan passes through the switch 570 and through a cathode follower 571 to each of the single-shot multivibrators 573, 574, and 575. It is noted that the cathode follower 572 has its cathode tied to the cathode of the cathode follower 571. However, since cathode follower 572 is connected to the plates of inverter 565 and 567 which are presently inoperative, no signals will pass through this cathode follower which will have any action on the single-shot multivibrators 573, 574 and 575.

The trigger 573 is adapted to produce an output signal which is of two microseconds duration. This trigger 574 is adapted to provide an output signal of five microseconds duration. The trigger 575 is adapted to provide an output signal which is of eighteen microseconds duration. The two microsecond pulse from the single-shot multivibrator 573 is supplied to a trigger 576 which turns the trigger ON. This causes the left side of trigger 576 to supply a negative going voltage to the switch 570 and thereby prevents any more character data from coming in through the switch 570 until the next scan.

It will be appreciated at this time that the output of single-shot multivibrator 573 is a two microsecond pulse which begins at the beginning of the time the scanner first enters the upper contour of the character on the present scan. The five microsecond pulse as well as the eighteen microsecond pulse from single-shot multivibrators 574 and 575, respectively, begin at the same time but end at varying times thereafter.

The two microsecond pulse from trigger 573 is also supplied to each of the switches 563, 577 and 578. However, since switch 563 is presently inoperative, and triggers 577 and 578 are adapted to receive information produced during a delayed scan, and since a delayed scan has not yet produced any information, no output will be produced from the switches.

The first black signal on the delayed scan is supplied through a cathode follower 579 to a switch 580. Since the inverter 561 is presently inoperative and since trigger 586 is reset to the off condition at the end of each scan, a relatively positive voltage is supplied to the switch 580, allowing the positive pulse representing the first black signal on the delayed scan to pass through the switch and through a cathode follower 581 to each of the single-shot multivibrators 583, 584 and 585. Here again the cathode of cathode follower 581 is tied to the cathode of cathode follower 582. However, since the input to the cathode follower 582 is tied to the plates of two inverters which are now held relatively negative, no output signal can be supplied through the cathode follower 582.

Single-shot multivibrator 583 produces a two microsecond pulse which beings at the same time that the first black signal begins during the delayed scan. Triggers 584 and 585 are adapted to respectively supply five microsecond and eighteen microsecond output pulses therefrom. In each case these pulses are initiated at the same time that the first black signal begins during the delayed scan. The output of trigger 583 is fed to a trigger 586 to turn this trigger ON. Therefore, a relatively negative voltage is supplied from the left side of trigger 586 which will inhibit the switch 580, thereby allowing no more black signals to be supplied through the switch during this particular scan. The output of single-shot multivibrator 583 is also supplied to each of the switches 564, 587 and 588. It will be remembered that switch 564 is inoperative due to the fact that one input line thereto is connected to a negative voltage. However, switches 587 and 588 will not both be inoperative. Thus, it is seen that if the five microsecond pulse produced from single-shot multivibrator 574 has now terminated, the output from the right side of this single-shot multivibrator will be relatively negative and will result in a positive voltage being applied to the switch 587. The other input to this switch is a relatively positive voltage from the single-shot multivibrator 575 since it is assumed that this single-shot multivibrator is still supplying an eighteen microsecond output pulse. That is, the sample pulse from single-shot multivibrator 583 is supplied to switch 587 at a time which is between five and eighteen microseconds following the time when the first black signal was produced on the present scan. In this event, an output signal will be supplied through the switch 587 and the inverter 591 to turn a trigger 592 ON.

In the event the eighteen microsecond pulse from the single-shot multivibrator 575 has terminated before the sample pulse is supplied to switch 588 from the single-shot multivibrator 583, a relatively positive voltage will be supplied through the inverter 590 to the switch 588. The other voltage supplied to switch 588 comes by way of the right side of the trigger 576 which was turned ON by the two microsecond pulse from the single-shot multivibrator 573. Thus, the two microsecond pulse from the single-shot multivibrator 583 serves as a sample for the switch 588 and will produce an output signal therefrom through the inverter 593 to turn a trigger 594 ON.

Triggers 592 and 594 are utilized to remember the occurrence of H1 and H3, respectively. Thus, if trigger 592 is ON, the right side thereof will be relatively positive to raise one of the input leads to a switch 595 which is also connected to receive the END OF SCAN signal Es. If these two inputs are relatively positive in coincidence, an output signal is supplied to cathode follower 596 representing H1.

The output of trigger 594 will be relatively positive if it is turned ON and will supply this voltage to a switch 597. The other input to this switch is the END OF SCAN signal Es. If these two inputs are relatively positive in coincidence an output signal will be supplied from the switch to the cathode follower 598 and produce a signal representing H3. Thus, the signal H1 indicates that the first black signal on the present scan occurred between five and eighteen microseconds before the first black signal on the delayed scan and the signal representing H3 indicates that the first black signal on the present scan occurred more than eighteen microseconds before the first black signal on the delayed scan.

Let it now be assumed that the character "2" which is illustrated in FIG. 25 is being scanned and that the distance ΔH is between five and eighteen microseconds. It is seen in this case that the first black signal produced in the delayed scan will precede the first black signal in the present scan. Therefore, when the first black signal in the delayed scan is produced, a relatively positive voltage will be supplied through the cathode follower 579 to the switch 580, there being an output signal supplied therefrom through the cathode follower 581 to each of the single-shot multivibrators 583, 584 and 585. The two microsecond pulse produced from single-shot multivibrator 583 is supplied to trigger 586 to turn it ON. This causes the left side of the trigger to inhibit switch 580. At the same time the two microsecond pulse supplied from the single-shot multivibrator 583 samples the condition of switches 587 and 588. However, since no black signals have been supplied as yet on the present scan, these switches will not have received any information relative thereto.

If now a black signal is produced during the present scan, a relatively positive voltage will be supplied through the cathode follower 569 and the switch 570 to a cathode follower 571. The output of the cathode follower 571 is supplied to the single-shot multivibrators 573, 574 and 575 which produce pulses having a duration of two microseconds, five microseconds and eighteen microseconds, respectively. The two microsecond pulse from the trigger 573 turns the trigger 576 ON which inhibits the switch 570 and allows no more of the input data to pass therethrough. At the same time the output of the single-shot multivibrator 573 serves as a sample pulse to the switches 577 and 578. If it is assumed that the difference ΔH between the first black signal on the delayed scan and the first black signal on the present scan is between five and eighteen microseconds, it will be seen that the five microsecond pulse from the single-shot multivibrator 584 will have already terminated, thereby providing a negative voltage to the inverter 599. The output of this inverter is a positive voltage which is supplied to the switch 577. Since the eighteen microsecond pulse is still being supplied from the single-shot multivibrator 585, it will supply a relatively positive voltage to the switch 577. At the time the sample pulse is supplied from the single-shot multivibrator 573, an output will be supplied from switch 577 through the inverter 601 to turn a trigger 602 ON.

If the difference in time between the first time the scanner enters the upper contour of the character of the delayed scan and the upper contour of the character on the present scan is greater than eighteen microseconds, the output of the single-shot multivibrator 585 will be relatively negative, which, when supplied through the inverter 600, results in a positive voltage being supplied to the switch 578. This switch also receives the relatively positive voltage from trigger 586 which is presently ON. Thus, an output signal may be supplied through the switch 578 and the inverter 603 to turn a trigger 604 ON.

In the event trigger 602 had been turned ON, a relatively positive voltage would have been supplied therefrom to the switch 605 which also receives the END OF SCAN signal Es. This produces a signal from the switch 605 to the cathode follower 606 representing H2. If trigger 604 is turned ON, it will bring up switch 607 so that at END OF SCAN time a signal will be supplied through the switch to the cathode follower 608, thus producing an output signal representing H4.

The output from the right side of each of the triggers 592, 594, 602 and 604 is supplied to an OR circuit 609. In the event, any one of these triggers is turned ON, a relatively positive voltage will be supplied through the OR circuit 609 to an inverter 610, thereby producing an output from this inverter in the from of a negative voltage which will inhibit the switch 611. However, if none of the triggers 592, 594, 602 or 604 were turned ON during the scan, the output from the OR circuit 609 will be relatively negative and will cut off the inverter 610, thereby allowing a relatively positive voltage to be supplied therefrom to a switch 611. Another input to the switch 611 is indicative of the fact that there is a presence of data on the present scan. This input is obtained from the left side of the trigger 517 in FIG. 22b. That is, if a signal representing either X, Vs or Vm is supplied during the present scan, trigger 517 will be turned OFF and turn a trigger 518 ON. Thus, the left side of the trigger 517 will be relatively positive and will indicate data on the present scan to the switch 611. Another input to the switch 611 is the END OF SCAN signal Es. The remaining input to switch 611 is supplied from the right side of a trigger 612. This trigger is adapted to be reset ON by the END OF SCAN RESET signal Esr which is applied to the left side thereof. If, during the scanning of a character, a relatively positive signal is supplied to the delayed data input lines, an output is supplied from the cathode follower 579 through the inverter 613 to turn trigger 612 OFF. If the left side of this trigger is relatively positive, it is an indication that data has been seen on the delayed scan. This signal is supplied to the switch 611.

In summary, the switch 611 receives relatively positive inputs when there is not produced a signal representing either H1, H2, H3 or H4 for during a scan, when data occurred on both the present scan and the delayed scan, and at the END OF SCAN time. The output of switch 611 is supplied through a cathode follower 614 to indicate H0.

To this point, the discussion has dealt with examples where information is supplied on both the delayed scan and the present scan. However, this is not always the case. For example, in entering a character there may be data on the present scan and no data on the delayed scan. Under these circumstances, it is always desired to indicate this as an H3 condition, i.e. a large increase in altitude on the present scan compared with the delayed scan. There is provided a switch 615 which is connected to receive the output of the right side of the trigger 612, which output will be relatively positive when no data is seen on the delayed scan. Another input to this switch is the END OF SCAN signal Es and the remaining input is the occurrence of data on the present scan. The output of switch 615 is supplied through cathode follower 616 whose cathode is tied to the cathode of the cathode follower 598, thereby producing an output signal representing H3.

There is provided a switch 617 which is adapted to receive a signal representing G0 from FIG. 22b as well as a signal from the left side of the trigger 612. It will be remembered that the left side of trigger 612 will supply a relatively positive signal providing the data has been seen on the delayed scan. Thus, it is noted that if data is seen on the delayed scan and G0 is seen on the present scan, both inputs to the switch 617 will be relatively positive. The output of this switch is supplied through a cathode follower 618 whose cathode is connected to the cathode of the cathode follower 608, thereby producing an output signal representing H4. From the above it is seen that in entering a character, a signal H3 is produced until data is seen on both scans. In leaving the character a signal H4 is produced as soon as data is not seen on the present scan but it is still seen on the delayed scan.

The rest for triggers 592 and 594 is at END OF SCAN RESET time. An inverter 619 has its plate connected to the cathode of each of the diodes 621 and 622. The plate of diode 622 is tied to the plate of the right side of trigger 592 and the plate of diode 621 is tied to the plate of the right side of trigger 594. When an END OF SCAN RESET pulse is supplied to the inverter 619, each of the triggers 592 and 594 will be turned OFF.

The reset for triggers 602 and 604 is also at END OF SCAN RESET time and is produced from inverter 623 which is adapted to receive the END OF SCAN RESET signal Esr. This signal is supplied from the inverter 623 to the cathode of each of the diodes 625 and 626, the plates of these diodes being connected to the plates of the right sides of triggers 604 and 602, respectively. When the END OF SCAN RESET signal is supplied to the inverter 623, the triggers 602 and 604 are turned OFF.

It will be seen that the plate of the inverter 619 is tied to the plate of the inverter 620 and shares the plate resistor in the inverter 620. Similarly, the plate in the inverter 623 shares the plate resistor in the inverter 624. Thus, an input signal to the inverters 620 or 624 will reset the triggers to which they are connected. However, since the switches 563 and 564, which are respectively connected to supply their output to inverters 620 and 624, are inoperative during the H CODING circuits, resetting does not occur by way of these inverters during the H CODING operation.

Referring now to FIG. 26, it will be seen that to obtain a signal representative of the difference ΔH2, it is necessary to look at the trailing edges of the last black signal for the present scan and the delayed scan. In accomplishing this in the circuit, it is necessary to make a decision regarding the difference between the trailing edges of the black signals on the present scan and the trailing edges of the black signals on the delayed scan to determine ΔH1. Even though a decision is made at one time regarding the difference ΔH1, new black signals on a scan will change the decision. Thus, the decision which is in existence at the end of the scan will be for ΔH2 and it is this indication that will be used to produce one of the signature components K0, K1, K2, K3, and K4.

To use the circuit shown in FIGS. 23a and 23b to obtain the K CODING signals, it is but necessary to change the plug wiring from the two hubs shown as being connected by a solid line and labelled CARD to the two hubs shown as being connected by a dotted line and labelled TAPE. Under these circumstances, a positive voltage is supplied to inverters 561 and 562 which will conduct and inhibit switches 580 and 570, respectively. Also switches 563 and 564 will receive the relatively positive voltages so that if an additional positive voltage is supplied to either of the switches an output signal will be supplied therefrom. At the same time, a relatively negative voltage is supplied from the upper end of the resistor 560 to each of the inverters 565 and 566, thereby cutting these inverters off. This does not mean, however, that the plate of inverter 567 cannot control the plate of the inverter 565. It merely means that control is no longer exercised by the grids of inverters 565 and 566.

Let it be assumed that the first black signal for both the present scan and the delayed scan occur in coincidence in scanning the character "2" shown in FIG. 26. The present scan signal is supplied as a relatively positive voltage to the cathode follower 569 which supplies an output to the switch 570. The switch 570 is inhibited by the fact that the inverter 562 is presently conducting. Therefore, the output of the cathode follower is supplied to the inverter 567 which has its plate tied to the plate of the inverter 565. The relatively negative voltage produced by the inverter 567 is supplied through the cathode follower 572 to each of the single-shot multivibrators 573, 574 and 575. Since these triggers are responsive only to positive going pulses it will be seen that no action occurs in the triggers at this time. However, the plate of inverter 565 will be pulled down so that a negative going output is supplied from the tapped plate of this inverter to each of the triggers 602 and 604 to reset these triggers. It will be remembered that triggers 602 and 604 have already been reset by the END OF SCAN RESET signal. Thus, the negative going voltage from the inverter 565 has no effect on triggers 602 and 604 at this time. However inasmuch as such resetting action may be required at a later time, particularly when more than one crossover is seen during a scan, the action is carried out any time the plate of inverter 565 is pulled down by the occurrence of a new black signal on a present scan.

When a black signal occurs on the delayed scan, a relatively positive voltage is supplied through the cathode follower 579 to the switch 580. However, this switch is inhibited by the fact that inverter 561 is conducting. Therefore, a relatively positive voltage is supplied from the cathode follower 579 to the inverter 568 which supplies a negative going voltage through the cathode follower 582 to each of the single-shot multivibrators 583, 584 and 585. These single-shot multivibrators are unaffected by this negative going voltage and therefore will remain in their present state. Since the plate of inverter 568 is tied to the plate of inverter 566, a relatively negative voltage will be supplied from the tapped plate output of the inverter 566 to the left side of each of the triggers 592 and 594. Since these triggers are already in their reset condition, the negative going voltage from the inverter 566 has no effect thereon at this time.

As shown in FIG. 26, the first black signal on the delayed scan terminates before that on the present scan. Therefore, when the first black signal on the delayed scan terminates, cathode follower 579 will supply a negative going voltage which will cut off the inverter 568. This produces a positive going voltage from the inverter 568 which, when supplied through the cathode follower 582, will initiate pulses from the single-shot multivibrators 583, 584 and 585. The two microsecond pulse from the single-shot multivibrator 583 is supplied to the trigger 586. This pulse has no effect on trigger 586, because throughout K CODING mode of operation, inverter 561 conducts through its left hand plate resistor, holding said trigger ON. Let it be assumed that now the first black signal on the present scan is terminated, and that the difference between the time that it terminates and the time the first black signal on the delayed scan terminated is between five and eighteen microseconds. Thus, when the first black signal on the present scan terminates, a positive going voltage is supplied from the inverter 567 through the cathode follower 572 to initiate positive pulses from the single-shot multivibrators 573, 574 and 575. The two microsecond pulse from the single-shot multivibrator 573 has no effect on trigger 576 for the same reason as previously described for trigger 586. However, the two microsecond pulse from single-shot multivibrator 573 supplies a signal to switches 563, 577 and 578, thereby providing a sample pulse for each of these switches. Since switch 563 is already receiving a relatively positive voltage as one input when the two microsecond pulse from single-shot multivibrator 573 is produced, an output will be supplied therefrom to an inverter 620 which, by way of diodes 621 and 622, resets the triggers 592 and 594 to an OFF condition. Here again this resetting is not necessary at this time but it does assume that the triggers are OFF. When the two microsecond pulse samples the condition of switches 577 and 578 it will find its way through only one of the switches. Since it has been assumed that the difference between the trailing edge of the first black signal on the delayed scan and the trailing edge of the first black signal on the present scan is between five and eighteen microseconds, the output of the right side of the single-shot multivibrator 584 will be relatively negative and the output of the right side of single-shot multivibrator 585 will be relatively positive. Therefore, the relatively negative voltage from the right side of single-shot multivibrator 584 when supplied through inverter 599 will produce a relatively positive voltage as an input to the switch 577. The relatively positive voltage from the right side of single-shot multivibrator 585 is also supplied to switch 577 so that at the time the sample pulse is produced from the single-shot multivibrator 573, an output signal will be supplied from the switch 577 through an inverter 601 to turn the trigger 602 ON.

Now if the difference ΔH1 had been over eighteen microseconds, it is seen that the output of single-shot multivibrator 585 would be relatively negative and would produce a relatively positive voltage to switch 578 when supplied through the inverter 600. This would allow a pulse to be supplied from the switch 578 through the inverter 603 to set the trigger 604.

Insofar as the circuit shown in FIGS. 23a and 23b now knows, there may be no more signals received during a scan. If no more signals were received during the scan, an output signal would be supplied indicating K1 at the END OF SCAN time. However, it will be noted that a second black signal is encountered on the delayed scan. This relatively positive voltage is supplied through the cathode follower 579 and the inverter 568 to pull down the plate of the inverter 566. The tapped output of this plate is a negative going voltage which is supplied to again attempt to reset triggers 592 and 594. Shortly thereafter, a relatively positive voltage will be produced in the present scan since the scanner is now entering a portion of the character. This action causes a relatively positive voltage to be supplied to cathode follower 569 which produces a relatively negative voltage as an output from the inverter 567. The output of this inverter pulls the plate of the inverter 565 down so that the tapped plate output from inverter 565 supplies a negative going voltage to reset trigger 602 which has previously been turned ON.

The next action occurs when the black signal for the delayed scan terminates. At this time, a relatively positive voltage is supplied from the inverter 568 through the cathode follower 582 to initiate pulses from the single-shot multivibrators 583, 584 and 585. The two microsecond pulse from the single-shot multivibrator 583 is supplied to each of the switches 564, 587 and 588. The output of the switch 564 is supplied through an inverter 624 to attempt to reset the triggers 602 and 604 by way of diodes 625 and 626. However, since both of these triggers have already been reset, no action occurs at this time. Inasmuch as the eighteen microsecond pulse from the single-shot multivibrator 575 may now have been terminated, a relatively negative voltage will be supplied from the right side thereof through the inverter 590 to supply a relatively positive voltage to the switch 588. Thus, when the two microsecond pulse from single-shot multivibrator 583 is produced, an output signal will be supplied from the switch 588 through the inverter 593 to cause the trigger 594 to be turned ON. Thus, it is seen that this is a measure between the trailing edge of the second signal on the delayed scan and the trailing edge of the first signal on the present scan. When the second black signal on the present scan terminates, a relatively negative voltage is supplied to the cathode follower 569 which cuts the inverter 567 off. Thus, a positive voltage is supplied from this inverter through the cathode follower 572 to initiate positive pulses in the single-shot multivibrators 573, 574 and 575. The two microsecond pulse from the single-shot multivibrator 573 is used as a sample in the switches 563, 577 and 578. Since the other input to switch 563 is relatively positive at all times, an output will be supplied from the switch through the inverter 620 to reset trigger 594 by way of diode 621.

If it is now assumed that the difference ΔH2 shown in FIG. 26 is between five and eighteen microseconds, the single-shot multivibrator 584 will be supplying a relatively negative output voltage from the right side thereof and the single-shot multivibrator 585 will be supplying a relatively positive voltage from the right side thereof. Therefore, relatively positive voltages will be supplied to the switch 577, which, when sampled will produce an output signal through the inverter 601 to turn the trigger 602 ON.

Since no more black signals are encountered on either of the scans, this trigger will remain ON and will supply a relatively positive voltage to the switch 605. At the END OF SCAN time, the END OF SCAN pulse Es is supplied to the switch 605 which will supply an output through the cathode follower 606 to indicate a K1 condition.

It is seen that the output signal K1 is produced from the same switch which in the H CODING produced the signal H2. It should be apparent from this that the circuit is capable of scanning characters in the manner shown in FIG. 25, as well as in the manner shown in FIG. 26, and will still produce an output signal representative of the difference in altitude along the upper contour of the character.

The J CODING circuit, which is shown in FIGS. 24a and 24b, is used to produce signals representing the distance between the upper and lower contours of a character during each scan. That is, these signals are a function of the time duration between the leading edge of the first black signal and the trailing edge of the last black signal during a scan. There is provided an inverter 629 which receives the END OF SCAN RESET signal and produces a gate signal for the trigger 630. Thus, the input to the trigger is relatively positive at all times except during the END OF SCAN RESET time. The signal Esr may be obtained, for example, from cathode follower in FIG. 27 which will be explained at a later time. The first black signal during each scan arriving at trigger 630 will be allowed to turn trigger 630 ON and the trigger will remain ON as long as the gate signal is supplied. Thus, it will remain ON until the END OF SCAN RESET signal occurs.

A relatively positive voltage is supplied from the right side of the trigger 630 when it is turned ON. The leading edge of this positive voltage will initiate a five microsecond pulse from the single-shot multivibrator 631. This five microsecond pulse is supplied through the cathode followers 632 and 633, which are connected in parallel, to each of the single-shot multivibrators 634, 635, 636, 637, 638 and 639. The output of single-shot multivibrator 634 is an eight microsecond pulse which is supplied directly to a switch 640 and through an inverter 641 to a switch 642. An eighteen microsecond pulse is supplied from the single-shot multivibrator 635 directly to the switch 642 and through an inverter 643 to the switch 644. A twenty-eight microsecond pulse is supplied from the single-shot multivibrator 636 directly to a switch 644 and through an inverter 645 to a switch 646. A thirty-eight microsecond pulse is supplied from the single-shot multivibrator 637 directly to the switch 646 and by way of an inverter 647 to the switch 648. A forty-eight microsecond pulse is supplied from the single-shot multivibrator 638 directly to a switch 648 and by way of an inverter 649 to a switch 650. A fifty-eight microsecond pulse is supplied from the single-shot multivibrator 639 directly to the switch 640 and through an inverter 651 to a switch 652.

The present data signals are also supplied to inverters 653 and 661. The first time a black signal is supplied to the inverter 653, a negative going voltage is supplied from the right side thereof to reset each of a group of triggers 654, 655, 656, 657, 658, 659 and 660. The first black signal supplied to the inverter 661 will supply a negative going voltage to a single-shot multivibrator 662. This single-shot multivibrator is responsive only to positive going voltages. Therefore, the trailing edge of the first black signal will produce a positive going voltage to the single-shot multivibrator 662 and will initiate a two microsecond pulse therefrom which is used to sample each of the switches 640, 642, 644, 646, 648, 650 and 652. Let it be assumed, for example, that the first black signal terminates at a time between twenty-eight and thirty-eight microseconds after it began. Under these conditions, the twenty-eight microsecond pulse from single-shot multivibrator 636 will have terminated and will be supplying a relatively negative voltage to an inverter 645. The output from this inverter will be a relatively positive voltage to the switch 646. However, the thirty-eight microsecond pulse from trigger 637 will still be in existence and since this pulse is relatively positive, a relatively positive voltage is supplied directly to the switch 646. Therefore, when the two microsecond sample pulse at the end of the first black signal is produced from the single-shot multivibrator 662 an output signal will be supplied through the switch 646 and the inverter 666 to turn the trigger 657 ON.

If no more black signals are seen during a scan, the output of trigger 657 will be relatively positive and raise one of the inputs to the switch 671. When an END OF SCAN signal Es is supplied to the switch 671, an output will be supplied therefrom to the cathode follower 678 to indicate J4. Thus, a signal J4 indicates that the time duration between the leading and trailing edges of the black signal was between twenty-eight and thirty-eight microseconds. This is a measure in time of the distance between the upper and lower contours of the character for a particular scan. If a second black signal had been supplied to the inverter 653, the negative going voltage from the inverter would be supplied therefrom to turn the trigger 657 OFF. It will be apparent that if any one of the other triggers have been turned ON, due to a different time duration between the leading and trailing edges of the first black signal, this trigger would have been turned OFF at this time.

The trailing edge of the second black signal produces a relatively positive voltage at the output of the inverter 661 which generates a two microsecond pulse from the single-shot multivibrator 662 to sample the switches 640, 642, 644, 646, 648, 650 and 652. Let it be assumed now that the trailing edge of the second black signal follows by between forty-eight and fifty-eight microseconds the leading edge of the first black signal. Under these circumstances, a relatively negative voltage would be supplied from the right side of the single-shot multivibrator 638 to the inverter 649. The output of this inverter would provide a relatively positive input to the switch 650. On the other hand, a relatively positive voltage would still be supplied from the right side of single-shot multivibrator 639 to the switch 650. When the two microsecond sample pulses from the single-shot multivibrator 652 is supplied to switch 650, an output signal will be supplied therefrom through the inverter 685 and turn the trigger 659 ON. If no more black signals are seen during this scan, an output signal from the trigger 659 will be supplied to the switch 673. At END OF SCAN time, the END OF SCAN signal Es is supplied to the switch 673 which produces an output signal therefrom through a cathode follower 680 to indicate J6.

It should be apparent at this time that one of the triggers 654, 655, 656, 657, 658, 659 and 660 may be turned ON during a single scan. The output of the triggers 654, 655, 656, 657, 658, 659 and 660 will be supplied respectively to the switches 669, 670, 671, 686, 672, 673 and 674. Whichever one of the switches receives a relatively positive output signal at the END OF SCAN time will produce an output signal to an associated cathode follower. Thus, there is provided cathode followers 675, 676, 677, 678, 679, 680 and 681 which are respectively connected to switches 669, 670, 671, 686, 672, 673, and 674.

An output signal J1 will be an indication that the difference between the leading edge of the first black signal and the trailing edge of the last black signal is less than eight microseconds. An output signal representing J2 will be produced when the time duration between the leading edge of the first black signal and the trailing edge of the last black signal is between eight and eighteen microseconds. An output signal J3 represents the fact that the time duration between the leading edge of the first black signal and the trailing edge of the last black signal is between eighteen and twenty-eight microseconds. An output signal J4 is representative of the fact that the time duration between the leading edge of the first black signal and the trailing edge of the last black signal is between twenty-eight and thirty-eight microseconds. An output signal J5 is representative of the fact that the time duration between the leading edge of the first black signal and the trailing edge of the last black signal is between thirty-eight and forty-eight microseconds. An output signal representing J6 will be produced when the time duration between the leading edge of the first black signal and the trailing edge of the last black signal is between forty-eight and fifty-eight microseconds. An output signal J7 will be produced when the time duration between the leading edge of the first black signal and the trailing edge of the last black signal is more than fifty-eight microseconds in duration.

The triggers 654 through 660 are each adapted to be reset at the END OF SCAN time by the END OF SCAN RESET signal $E_{sr}$ which is supplied through an inverter 682. This inverter has its plate tied to the inverter 653 so that when the END OF SCAN RESET signal turns the inverter 682 ON, a relatively negative voltage is supplied from the right side thereof to the left sides of each of the triggers 654 through 660, thus turning the triggers OFF.

To this point in the description there has been explained the manner of obtaining the video information produced in scanning the characters and producing therefrom signals representative of the G, H and K and J CODINGS. In FIGS. 22a, 22b, 23a, 23b, 24a and 24b there were a number of circuits which were adapted to receive the END OF SCAN signal $E_s$ as well as a reset signal $E_{sr}$. Other triggers were indicated as receiving reset signals on the right hand thereof which were designated by the letter R followed by an asterisk. The asterisk under the trigger designated the side of the trigger which was normally conductive when the trigger is in its reset condition. Reference is now made to FIG. 27 which discloses the manner of generating the reset signals.

The sync track of the drum contains magnetized areas at spaced points around the drum which will produce pulses at the end of each scan through the character. These pulses are supplied to a single-shot multivibrator 700 which is connected to produce a five microsecond relatively positive output pulse. This pulse is supplied from the right plate through a cathode follower 701 to each of the cathode followers 702, 703 and 704.

The output of cathode follower 702 becomes the END OF SCAN sampling for the G CODING. Thus, it is labelled $E_s$ for G SAMPLING. The output from cathode follower 703 serves as the END OF SCAN sample for the H, K CODING. Thus, this output is labelled $E_s$ for H, K SAMPLING. The output from the cathode follower 704 is labelled $E_s$ for J SAMPLING and is used in the J CODING circuit.

The output from cathode follower 701 is also supplied to an inverter 705. Therefore, the trailing edge of the five microsecond pulse from the single-shot multivibrator 700 will cause a relatively positive voltage to be supplied from the inverter 705 to a single-shot multivibrator 706. This trigger will supply a five microsecond output pulse which will be relatively positive. This pulse is supplied through a cathode follower 707 to each of a plurality of inverters 708, 709, 710, 711, 712, 713, 714, 715, 716 and 718. It is noted also that the output of cathode follower 707 is supplied to a terminal which is adapted to be connected to the inverter 619 in FIG. 23a.

The output of inverter 708 is used to plate reset the trigger 520. The output of trigger 709 is supplied to two diode units 719 and 720. The two outputs from the diode unit 719 is used to reset triggers 535 and 537 while the two outputs from the diode unit 720 are used to reset the triggers 532 and 538. The output signals from inverters 710, 711, 712, 713, 714, 715 and 716 are used to reset triggers 542, 521, 543, 517, 544, 518 and 612, respectively. The output of inverter 718 is supplied to each of the diode units 721 and 722. The outputs from diode unit 721 are supplied as tne plate reset for triggers 541 and 586 while the outputs from the diode unit 722 is utilized to plate reset the triggers 576 and 531.

In recognizing characters which are scanned from top to bottom on each scan and where the successive scans traverse from right to left across the character, the G, H and J CODINGS are used. Therefore, the sequencing circuits are made up of a plurality of logical diagrams, there being one diagram for each of the characters which is to be identified. Because of the fact that a number of the diagrams for each character contain inputs which are a combination of many other inputs, a plurality of mixing circuits are used to generate some of these special inputs.

The mixing circuit for the G CODING signals is shown in FIG. 28. It will be noted that in this circuit the plus sign is used to indicate an OR condition. For example, if signals representing G1 and G2 are supplied to OR circuit 730, the output therefrom will represent G1 or G2 and may be expressed as $G1+G2$. As shown in the diagram, the output of the OR circuit 730 is supplied through a double inverter 731 to each of the OR circuits 732 and 733. Another input to the OR circuit 732 is a signal representing G3, thereby producing as an output a signal representing $G1+G2+G3$. An OR circuit 734 is arranged to receive signals representing G3 and G4. The output from OR circuit is supplied through a double inverter 735 and will represent $G3+G4$. When this output is supplied to the OR circuit 733, which also receives a signal representing $G1+G2$, there is produced an output signal representing $G1+G2+G3+G4$. This last-mentioned signal is supplied to an OR circuit 736 which is adapted to receive a signal from the double inverter 747. The input to this double inverter is a signal representing $G5+G6$ which is supplied from an OR circuit 746. Therefore, the output from the OR circuit 736 is a signal representing $G1+G2+G3+G4+G5$. There is also provided an OR circuit 738 which receives signals representing G2 and G3. Therefore, the output of this OR circuit is a signal representing $G2+G3$ which is adapted to be supplied to an OR circuit 739 which receives a signal representing G5. The output of the OR circuit 739, when supplied through a double inverter 740, is representative of $G2+G3+G5$.

OR circuits 743, 744, and 745 are adapted to generate certain special combinations of the G component signals. OR circuit 743 is adapted to produce an output representing $G2+G5$ while OR circuit 744 is adapted to produce a signal representing $G4+G5$. The output of OR circuit 745 is a signal representing $G1+G4+G6$. An inverter 741 is arranged to receive an input signal representing G2 and will produce an output signal representing $\overline{G2}$. That is, if a relatively positive signal representing G2 is not present, the output from the inverter will be relatively positive and will indicate $\overline{G2}$. An inverter 742 is adapted to receive the input G3 and produce the output $\overline{G3}$. That is, if the output is relatively positive, there is the indication that there is an absence of G3.

An OR circuit 748 is arranged to receive from the OR circuit 746 a signal representing $G5+G6$. In addition the OR circuit 748 receives a signal representing G2 so that its output is representative of $G2+G5+G6$. This is supplied to an OR circuit 759 whose output is connected to a double inverter 750. The other input to the OR circuit 759 comes by way of the OR circuit 749 which receives a signal representing $G5+G6$ as well as a signal representing G4. Therefore, the output from the OR circuit 749 is a signal representing $G4+G5+G6$. With these signals being supplied to the OR circuit 759, the output of the double inverter will be representative of $G2+G4+G5+G6$.

The OR circuit 751 is adapted to receive the input signals representing G1 and G5 so as to produce an output signal representing $G1+G5$. This output signal is supplied to an OR circuit 752 which also receives a signal representing G4. Thus, the output of the OR circuit 752, when supplied through the double inverter 753, produces an output signal representing $G1+G4+G5$. As an alternative, an OR circuit 754 is arranged to receive a signal representing $G1+G5$ from the OR circuit 751 and in addition a signal representing $G2+G6$ from the OR circuit 758. The output from the OR circuit 754 is supplied through a double inverter 755 to an OR circuit 756 which also receives a signal representing G0. The output signal from the OR circuit 756 will be representative of $$G0+G1+G2+G5+G6$$

The signal representing $G2+G6$ which is supplied from the OR circuit 758 is also supplied to a single stage inverter 757 to produce an output signal representing the absense of this input, i.e. $\overline{G2}+\overline{G6}$.

Reference is now made to FIG. 29 which shows the H mixing circuits. The OR circuit 761 receives signals representing H0 and H1 and will produce an output signal representing $H0+H1$. The signal H0 is also presented to an inverter 760 to produce an output signal representing $\overline{H0}$. The signal representing H1 is supplied through an inverter 762 to produce an output signal representing $\overline{H1}$. The OR circuit 763 is arranged to receive signals representing H0 and H2 so as to produce an output signal representng $H0+H2$. The OR circuit 764 is adapted to receive signals representing H1 and H3 and will supply an input signal representing $H1+H3$ to the double inverter 765. The output of this inverter is supplied to OR circuit 766 which also receives a signal representing H0. Thus, the output of the OR circuit 766 becomes $$H0+H1+H3$$

There is also provided an OR circuit 767 which is arranged to receive signals representing H2 and H4. The output from OR circuit 767 when supplied through the double inverter 768, results in a signal $H2+H4$ which is fed to an OR circuit 769. This OR circuit also receives a signal representing H0 and produces an output signal representing $H0+H2+H4$. An OR circuit 770 is arranged to receive the signals representing H0 and H4 and therefore produces an output representing $H0+H4$.

Reference is now made to FIG. 30 which discloses the mixing circuits for the J CODING signals. By supplying signals representing J6 and J7 to an OR circuit 780, it is possible to produce an output therefrom through a double inverter 781 representing $J6+J7$. An OR circuit 782 is arranged to receive this signal representing $J6+J7$ and in addition a signal representing $J4+J5$ which is received by way of a double inverter 784 from an OR circuit 783. The output of the OR circuit 782 is a signal representing $J4+J5+J6+J7$. An OR circuit 785 is arranged to receive signals representing J5 and J6 so as to produce an output therefrom through a double inverter 786 representing $J5+J6$. This signal is supplied to an OR circuit 787 which also receives a signal representing J7. The output of the OR circuit 787 is supplied through a double inverter 788 to produce a signal representing $J5+J6+J7$. An OR circuit 789 is arranged to receive a signal representing J4 and in addition a signal representing $J5+J6$ which is supplied from the double inverter 786. The output from the OR circuit 789 is a signal representing $J4+J5+J6$. This signal is supplied to an OR circuit 790 which is adapted to receive a signal representing $J3+J4+J5$ from an OR circuit 792. The output of the OR circuit 790 is supplied through a double inverter 793 to produce a signal representing $J3+J4+J5+J6$.

The OR circuit 792 receives its input from an OR circuit 791 to which is supplied signals representing J3 and J4. Thus, the output of the OR circuit 791 is a signal representing $J3+J4$, which signal is supplied to the OR circuit 792 which is also connected to receive the signal representing J5. It is in this manner that the OR circuit 792 can produce an output signal representing $J3+J4+J5$. An OR circuit 794 is arranged to receive signals representing J4 and J7 so as to produce an output signal $J4+J7$. The OR circuit 795 receives signals representing J1 and J2 and will produce an output signal representing $J1+J2$ by way of a double inverter 796. The output from the last-mentioned double inverter is supplied to the OR circuit 797 which also receives a signal representing J3. The output of the OR circuit 797 is a signal representing $J1+J2+J3$. An OR circuit 798 is arranged to receive signals representing J4, J3 and J2, thereby producing an output signal to an OR circuit 799 representing $$J2+J3+J4$$

The last-mentioned OR circuit also receives a signal representing J5 so that the output therefrom when supplied through a double inverter 800 produces a signal representing $J2+J3+J4+J5$.

In the logical circuits to follow, much use is made of the trigger types TR7 and TR3. The type TR7 circuit has characteristics of a trigger as well as a single-shot multivibrator and thus may be referred to equally as well by either term. This circuit is responsive to relatively positive inputs for producing relatively postive outputs which last for a predetermined number of scans following the end of the relatively positive input signal. Thus, for example, the time constant of a type TR7 circuit may be such that it will produce a relatively positively output for three scans following the last relatively positive input thereto. This means that a first input signal may terminate during a first scan and the output from the type TR7 circuit will not terminate until the fourth scan. However, if another relatively positive input should be supplied during the third scan, then the relatively positive output would be extended at least until the sixth scan. This circuit lends itself well to the present invention where a succession of conditions are required in order to identify a character. Thus, if a first condition is met, a switch may be allowed three scans, for example, to receive an indication of a second condition. If this second condition occurs within the three scans, then another switch may be allowed three scans to receive an indication of a third condition, etc.

The type TR3 triggers are used in the sequence circuits as inhibiting devices. In other words, they will normally supply relatively positive outputs unless certain inputs are supplied thereto. If these certain inputs do occur then the signal path through a sequence circuit will be blocked, thus, the inputs to the type TR3 triggers may be considered NOT conditions. In other words, to get past a switch which is connected to receive the output of a type TR3 trigger, the NOT conditions must be absent.

Reference is now made to FIG. 31 which discloses the logical circuit utilized to identify the character "1." An OR circuit 830 is adapted to receive a signal representing G0 and will turn a trigger 831 ON. This trigger is connected as a single-shot multivibrator and will provide an output signal which will be relatively positive for four scans following the last input signal thereto. If within these four scans signals representing G1 and J6+J7 are supplied to the switch 832, an output signal is supplied therefrom to initiate an output from the trigger 833. This trigger is connected to a switch 834 and will supply a relatively positive input thereto for four scans following the last input from the switch 832. If within these four scans, signals representing G1+G2 and J1+J2 are supplied to switch 834, an output signal is supplied therefrom through the OR circuit 835 to initiate a pulse from the trigger 836.

It is noted that there is an alternative path for supplying an input to the OR circuit 835. This alternative path is by way of a trigger 838 which is connected to receive the signal representing G0. Thus, for three scans following the last G0 signal, a relatively positive voltage is supplied therefrom to each of the switches 839 and 840. In the event signals representing G1 and J1+J7 are supplied to the switch 839 within these three scans an output is supplied through the OR circuit 830 to set the trigger 831. The remainder of the circuit connected to trigger 831 has previously been described.

If within three scans following the last G0 signal to the trigger 838, switch 840 receives signals representing G4+G5+G6, H3, and J5+J6+J7, an output signal will be supplied therefrom to the trigger 841. This trigger will produce a relatively positive output signal therefrom for three scans following the last input signal from the switch 840. The output of the trigger 841 is connected to the switch 842 which is connected to receive signals representing G1, H2 and J1. If all of the inputs to this switch are relatively positive in coincidence, an output is supplied therefrom to the OR circuit 835 which will of course set up the trigger 836 to produce a relatively positive output signal which will last for four scans following the last input signal thereto. The output signal from the trigger 836 is supplied to a switch 837.

It is noted that two other inputs are required by the switch 837. One of the other inputs is a signal representing G0 and the remaining input is a signal required from a trigger 844 whose output is relatively positive when the trigger is OFF. The function of this trigger is to block the sequence if it receives an input between the time trigger 836 is turned ON and the time a G0 signal arrives at the input to switch 837. The trigger 844 will be turned ON providing the trigger 836 is presently supplying a relatively positive voltage and providing a switch 843 is presently receiving signals representing $\overline{G2}$ and J5+J6+J7. That is, trigger 844 will conduct only when it is allowed to by the trigger 836 and in addition when it receives an input from the switch 843. The trigger 844 will turn OFF as soon as the output from the trigger 836 terminates. The output from the switch 837 will be relatively positive to represent the character "1" if all of the inputs thereto are relatively positive in coincidence.

Reference is made to FIG. 32 which discloses the logical circuit utilized to identify the character "2." There is provided a switch 850 which is adapted to receive signals representing G4 and J5+J6+J7. The third input to the switch 850 is supplied from an inverter 851 which, if this inverter is not conducting, will be relatively positive. However, switch 850 will be inhibited if signals representing G6 and J5+J6 are supplied to a switch 852 in coincidence within three scans prior to the time the other inputs to the switch 850 occur in coincidence. That is, if switch 852 supplies an input to the trigger 853, this trigger will cause the inverter 851 to conduct for three scans following the last input to the trigger 853. During this time, the inverter 851 will inhibit the switch 850.

Assuming that the inverter 851 does not inhibit the switch 850, an output will be supplied therefrom to the trigger 854. This trigger supplies a relatively positive pulse therefrom which lasts for four scans following the last input thereto. The output from the trigger 854 is supplied to a switch 855 which is adapted to receive in addition signals representing G2+G3+G4, H1+H3, and J6+J7. Providing all of the inputs to the switch 855 occur in coincidence, an output will be supplied therefrom through the OR circuit 856 to the trigger 857.

There are two alternative ways for producing inputs to the trigger 857, the first of which includes a switch 858 which is connected to receive the output of the trigger 854 and signals representing G2, H1, and J4. If all of the signals for the switch 858 occur in coincidence, an output signal is supplied through the OR circuit 856 to the trigger 857.

The third way of producing an input to the OR circuit 856 is by way of a switch 859 which is adapted to receive signals representing G2 and J5+J6, as well as an indication that at least three scans prior to this, signals representing G6 and J5+J6 have not occurred in coincidence. It will be remembered that this condition is created by the switch 852, the trigger 853 and the inverter 851. Thus, if all of the inputs to the switch 859 are relatively positive in coincidence, an output is supplied through the OR circuit 860 to turn a trigger 861 ON. Trigger 861 will remain ON for four scans following the last input thereto.

An alternative circuit for producing an input to the trigger 861 is by way of a switch 862 which receives signals representing G1 and J2, and in addition the signal representing the fact that for at least three scans prior to the time G1 and G2 are both positive in coincidence, there has not been the coincidence of G6 and J5+J6. The output from switch 862 is supplied through the OR circuit 860 to the trigger 861. The output of the trigger 861 is supplied to serve as a first input to a switch 863. The other input to this switch is adapted to be produced by trigger 864. Providing the coincidence of signals G6 and J5 was not present at the inputs to switch 865 during the duration of trigger 861, trigger 864 will remain OFF supplying a relatively positive output signal to the switch 863. If the trigger 864 has been turned ON by the fact that trigger 861 is supplying a positive voltage thereto and the switch 865 is supplying a positive signal thereto, indicative of a G6 and J5 coincidence this trigger will remain ON even after the switch 865 discontinues supplying an input thereto, thereby inhibiting switch 863. However, as soon as the trigger 851 goes OFF, trigger 864 will go OFF.

The remaining input to the switch 863 is supplied from a switch 866 which receives the signals representing G3, H1 and J7. The output of the switch 863 is supplied through the OR circuit 856 to the trigger 857 so that the output therefrom will continue to be relatively positive for four scans following the last input thereto.

A switch 867 is adapted to receive the signal from the right side of the trigger 857 and in addition that supplied from an OR circuit 868. The input to this OR circuit may be obtained from one of three paths. The first of these paths comprises a switch 869 which is adapted to receive signals representing G3 and H0. If these signals occur in coincidence, an output signal will be supplied from the switch 869 and the OR circuit 868 to the switch 867. A switch 870 will supply a relatively positive output signal, providing signals representing G3 and J7 occur in coincidence. Lastly, a signal representing G2, H0 and J5 will be supplied from the switch 871 providing these signals occur in coincidence as inputs to the switch. The output of switch 867 is supplied to a trigger 872 which produces a relatively positive input to a switch 873 for four scans following the last input to the trigger.

The switch 873 is adapted to receive signals representing G5, H0+H2 and J6+J7. Thus, if within four scans after the last input to the trigger 872, the signals representing G5, H0+H2, and J6+J7 occur in coincidence, an output is supplied from the switch 873 to the trigger 874. This trigger will hold one input to each of the switches 875 and 877 up for three scans. If within this time signals representing G2 or G5 and J6 or J7 are supplied to the switch 875, an output will be supplied therefrom and through the OR circuit 876 to produce an output signal indicating the character "2." On the other hand if within three scans after the last input to the trigger 874 signals representing G1, H2+H4 and J1 are supplied in coincidence to the switch 877, an output signal will be supplied therefrom to the cathode follower 876. The third alternate path for supplying an input to the OR circuit 876 is by way of an OR circuit 879 which can receive an input by way of one of two alternate paths. The first path is by way of a switch 878 which is connected to receive the output of the trigger 872. If within four scans after the last input to the trigger 872 signals representing G2, H0 and J6+J7 are supplied to the switch 878, an output will be supplied therefrom through the OR circuit 879 to the trigger 880. Alternatively, if within four scans after the trigger 872 receives its last input signal, signals representing G6, H0 and J7 are supplied to the switch 881, an output will be supplied from the last-mentioned switch through the OR circuit 879 to the trigger 880.

If within three scans after the last input signal to trigger 880, signals representing G2, H2, and J5+J6+J7 are supplied to the switch 882 an output will be supplied from this switch through the OR circuit 876 to represent the character "2."

Reference is now made to FIG. 33 which discloses the logical diagram utilized in recognizing the character "3." There is provided a switch 890 which is adapted to receive input signals representing G6 and J5+J6+J7. If these signals occur in coincidence an output is supplied to turn a trigger 891 ON. This trigger will produce an output signal which will be relatively positive for three scans following the last input thereto. Thus, one input of the switches 892 and 895 will be raised by the right side of the trigger 891 during this period. If within this period of time, signals representing G1+G2+G3+G4, H0, and J6+J7 are supplied to the switch 892, an output will be supplied from this switch to the OR circuit 893. Alternatively, if within the period of time trigger 891 is supplying a relatively positive output voltage, signals representing G5, H0 and J4, are supplied in coincidence to the switch 895, an output signal will be supplied to the OR circuit 893.

The output from the OR circuit 893 is supplied to trigger 894 which produces a signal which will last for three scans following the last input signal thereto. If within these three scans, signals representing G3, H0 and J6+J7 are supplied in coincidence to the switch 896, an output signal will be supplied to turn a trigger 897 ON. This trigger will remain ON for three scans following the last input thereto so that if within these three scans, signals representing G3, H0 and J6+J7 are supplied to a switch 898 in coincidence, an output signal is supplied therefrom to the trigger 899. If within three scans following the last input to the trigger 899, signals representing G1, H0 and J1 are supplied to the switch 900, an output signal will be supplied therefrom through the OR circuit 901 to the trigger 902. Alternatively, if within the three scans after the last input to the trigger 899, input signals representing G2+G5+G6, H0, and J6+J7 are supplied in coincidence to the switch 903, an output signal will be supplied therefrom to the cathode follower 901 to initiate a four scan pulse from the trigger 902. The output of the trigger 902 will remain relatively positive for four scans following the last input thereto and if within this time signals representing G1 and J1+J2 are supplied to the switch 904, an output signal representing the character "3" will be produced therefrom. There is an alternative way of producing a signal representing the character "3" and this is by way of a switch 908.

It will be noted that the output line of the switch 908 is connected to the output line of the switch 904. Under these circumstances, the cathode followers in each of the switches share a common cathode resistor, thereby producing an OR circuit. Reference is made to a switch 905 which is adapted to receive one input from the right side of the trigger 899 and another input from a switch 906. The switch 906 receives signals representing G4+G5+G6, H0 and J7. If all of these signals occur in coincidence, an output is supplied to the switch 905 which will produce an output signal providing three scans have not elapsed from the last input to the trigger 899. The output from switch 905 is supplied to a trigger 907 which will maintain a relatively positive input to the switch 908 for four scans following the last input thereto. In addition, the output of trigger 907 will allow inhibiting trigger 909 to turn ON providing it also receives an input from the switch 910. As shown, the switch 910 will supply a relatively positive output signal providing signals representing G4, H0 and J5+J6 are supplied in coincidence thereto. If the trigger 909 is turned ON by an input signal from the trigger 907 and an input signal from the switch 910, it will remain ON until the output from the trigger 907 goes negative, thereby inhibiting switch 908. The third input to the switch 908 is supplied from a switch 911 which receives signals representing G1 and J1+J2. Thus, if all of the inputs to the switch 908 are relatively positive in coincidence, an output signal representing the character "3" is produced therefrom.

Reference is made to FIG. 34 which discloses the logical circuitry utilized to identify the character "4." In this circuit there is provided a switch 920 which is adapted to receive the signals representing G1+G2 and J1+J2. If these signals occur in coincidence, an output will be supplied to a trigger 921 to initiate a four scan pulse. That is, the trigger 921 will produce a pulse which will last for four scans following the last input thereto. The output of the trigger 921 serves as a first input to a switch 922. The second input to this switch is by way of an inhibiting trigger 923 which it will be noted receives a gating signal from the trigger 921. In addition to the requirement of a gating signal from the trigger 921, there is also required by the trigger a signal from the OR circuit 924 to turn it ON. Input signals to the OR circuit 924 may be by one of two paths, the first of which is from a switch 925 which receives signals representing G3, H0 and J7. The other circuit for producing an input to the OR circuit 924 is by way of a switch 926 which receives signals representing G6 and J7.

If the trigger 923 is turned ON, it will remain ON and supply a relatively negative voltage to the switch 922 as long as the trigger 921 is ON. The remaining input to the switch 922 is supplied by way of a switch 927 which is adapted to receive signals representing G1+G5, H3 and J5+J6+J7. If all of the inputs to the switch 922 occur in coincidence, an output signal will be supplied therefrom to initiate a four scan pulse from the trigger 928.

The output of the trigger 928 is supplied directly to a switch 932 to serve as one of the inputs thereto. Other inputs to this switch are from switches 930 and 931 whose outputs are commoned to form an OR circuit. That is, the cathode of the cathode followers in each of the switches 930 and 931 share a common cathode resistor. Thus, if signals representing G2+G4+G5+G6, H2, and J3+J4+J5+J6 are supplied to the switch 930, or if signals representing G1, H3, and J1, are supplied to the switch 931, an input will be supplied to the switch 932.

The remaining input required by the switch 932 is supplied from inhibiting trigger 929. It will be seen that the gate for this trigger is supplied from the trigger 928, the only other input required to turn it ON being that from the OR circuit 924. Therefore, once a gating signal is supplied from the trigger 928, the trigger 929 will await the signal from the OR circuit 924. If the signal from the OR circuit 924 is supplied, the trigger 929 will remain ON thereby inhibiting switch 932 until the output of trigger 928 goes relatively negative. If all of the inputs to the switch 932 occur in coincidence an output is supplied therefrom through the OR circuit 933 to the trigger 934.

It is seen that there is an alternative way of producing an input to the trigger 934. This path comprises a switch 935 which is adapted to receive the output of the trigger 921 as well as signals representing G3, H3 and J5+J6+J7. If all of the inputs to the switch 935 occur in coincidence, an output is supplied to a trigger 936 which will initiate an output to last for four scans following the last input signal thereto. If within these four scans signals representing G2, H2, and J4 are supplied to the switch 937, an output is supplied therefrom through the OR circuit 933 to the trigger 934.

The output of the trigger 934 will be up for four scans following the last input thereto. This output signal is supplied to serve as one input to the switch 938, and as the gating signal for the inhibiting trigger 939. Thus, if the trigger 939 also receives a signal from the OR circuit 924, a relatively negative signal will be supplied therefrom to the switch 938. The output of the trigger 939 will remain relatively negative until the output pulse from the trigger 934 terminates. Other inputs required by the switch 938 are signals representing H2, J2+J3+J4.

The output of the switch 938 is supplied to a trigger 940 to initiate another pulse which will last for four scans following the last input thereto. If within this period, signals representing G1+G2 and H2+H4 are supplied to the switch 941, an output signal will be supplied therefrom to the trigger 942. Trigger 942 produces a three scan pulse, and if within this time signals representing G1, H2+H4, and J1+J2+J3 are supplied to the switch 943, an output signal representing the character "4" will be produced.

Reference is now made to FIG. 35 which discloses the logical circuitry utilized to identify the character "5." There is provided a switch 950 which will initiate a three scan pulse from the trigger 951 providing it receives signals representing G1+G2+G3, H1, and J5+J6+J7. The output of the trigger 951 will be relatively positive for three scans following the last input thereto. This output is supplied through an inverter 952 to a switch 953. Thus, it is seen that if within the last three scans signals representing G1+G2+G3, H1, and J5+J6+J7 have not been received in coincidence, the output of the inverter 952 will be relatively positive to the switch 953. If in addition to this input, signals representing G5 and J5+J6+J7 are supplied to the switch 953, an output will be supplied therefrom to the trigger 954. This trigger will provide a pulse, which will last for three scans from the last input thereto, to each of the switches 955, 956 and 957. It was noted that the last-mentioned switches are connected through an OR circuit 958 to a trigger 959. Thus, if in addition to the output from trigger 954, signals representing G2+G3+G5, H0, and J6+J7 are supplied to the switch 955, an output will be supplied therefrom through the OR circuit 958 to operate the trigger 959. On the other hand, if signals representing G2, H0 and J3 are supplied to the switch 956 while it is receiving a relatively positive voltage from the trigger 954, an output will be supplied therefrom through the OR circuit 958 to the trigger 959. As a third alternative, if signals representing G2, H4, and J5 are supplied in coincidence while the switch 957 is receiving a relatively positive voltage from the trigger 954, an output signal will be supplied from this switch through the OR circuit 958 to the trigger 959.

The trigger 959 will produce a relatively positive output voltage which will last for three scans following the last input thereto. The switch 960 is connected to receive the output of the trigger 959 and in addition is adapted to receive signals representing G2+G3+G4, H0, and J6+J7. If all of the inputs to the switch 960 occur in coincidence, an output is supplied therefrom through the OR circuit 961 to the trigger 962.

Alternatively, there is provided a switch 963 which, in addition to receiving the output of the trigger 959, receives signals representing G2, H0 and J3. If all of the inputs to this switch are relatively positive in coincidence, an output will be supplied through the OR circuit 961 to the trigger 962. This trigger will produce an output signal which will last for three scans following the last input thereto. This output signal is relatively positive and will raise the inputs to the switches 964 and 965 as well as supply the gating signals to the inhibiting trigger 967.

An output will be supplied from the switch 964 providing the output of trigger 962 is relatively positive and in addition signals are supplied to the switch representing G3+G4, H0, and J6+J7. The output of this switch is commoned with the output of switch 965 and connected to a switch 966. An output may be supplied from the switch 965 providing signals representing G2, H0 and J3 occur in coincidence at a time when the trigger 962 is supplying a relatively positive output voltage. The other input required by the switch 966 is obtained from the trigger 967. If, after the gate signal supplied from trigger 962 to the trigger 967 occurs, an output is supplied from a switch 968, the inhibiting trigger 967 will supply an output signal which will be relatively negative to the switch 966 as long as the output of the trigger 962 remains relatively positive. In order for switch 968 to produce an output signal to the trigger 967 it must receive in coincidence signals representing G1, H0, and J6+J7.

The output of the switch 966 is supplied to a trigger 969 which will supply an output signal which will last for four scans following the last input thereto. The relatively positive voltage from the trigger 969 is supplied to an inhibiting trigger 971 as a gating signal therefor and also to a switch 970. If trigger 969 is still up and trigger 971 receives an input signal from the OR circuit 972, which input signal may be by way of the switch 968, an output signal will be supplied from the trigger 971 to the switch 970. This relatively negative input will last until the trigger 969 discontinues its relatively positive voltage.

Another possible way of obtaining a signal input to the trigger 971 is by way of a switch 973 which is adapted to receive signals representing G4, H2, and J6. If these inputs occur in coincidence to the switch 973, an output is supplied through the OR circuit 972 to the trigger 971.

As previously stated, the switch 970 receives the relatively positive output from the trigger 969 as well as a relatively positive output from the trigger 971, if it remains OFF. The one remaining input required by the switch 970 is that supplied by the switch 974. The last-mentioned switch will supply an output signal providing signals representing G4, H0, and J5+J6 are supplied thereto in coincidence. The output of the switch 970 is supplied to the trigger 975 which will produce an output signal therefrom which will last for three scans from the last input thereto. This output signal is relatively positive and will raise one of the inputs to each of the switches 976 and 978. Switch 976 must receive in addition a signal representing G0 before it will supply an output signal through the OR circuit 977 to produce an identification signal for the character "5." On the other hand, if signals representing G1, H4 and J1 are supplied to the switch 978 while it is receiving a relatively positive voltage from the trigger 975, an output signal will be supplied from the switch 978 through the OR circuit 977 to produce a signal representing the character "5."

It is noted that there is one additional input to the OR circuit 977. This input may come from a circuit which includes the switches 980 and 980a whose outputs are commoned to supply an input to a switch 979. In order for switch 980 to supply an input to the switch 979, it is required that signals representing G4, H2 and J5 be supplied thereto in coincidence. Alternatively, if signals representing G1, H0, and J3 are supplied to the switch 980a in coincidence, an output will be supplied therefrom to the switch 979. The switch 979 also receives the relatively positive voltage from the trigger 969. In addition, the switch 979 receives a relatively positive voltage from the inhibiting trigger 971 if it remains OFF. If the three inputs to the switch 979 are relatively positive in coincidence, an output is supplied therefrom to a trigger 981 which will supply a relatively positive voltage to the switch 949 which will last for three scans following the last input thereto.

The output of trigger 981 is utilized by the inhibiting trigger 982 as the gating signal therefor. That is, if trigger 982 receives an output from the switch 973 through the OR circuit 983 after the output of trigger 981 becomes relatively positive, a relatively negative output signal will be supplied from the inhibiting trigger 982 to the switch 949. Alternatively, trigger 982 may be turned ON following the gating signal supplied thereto from the trigger 981 by an output from the switch 984. That is, if signals representing G6, H2, and J5 are supplied in coincidnce to the switch 984, an output will be supplied therefrom through the OR circuit 983 to the trigger 982. In any event, the negative output at trigger 982 will last only as long as the output of the trigger 980. An additional input required by the switch 949 is a signal representing G0. The output of the switch 949 is supplied through the OR circuit 977 to produce a signal representing the character "5."

Reference is now made to FIG. 36 which discloses the logical circuitry utilized to identify the character "6." There is provided a switch 990 which must receive inputs from three sources. The first of these inputs arrives from an OR circuit 991 which may receive inputs from any one of three alternate sources. The first possible input to the OR circuit 991 is from a switch 992 which receives signals representing G2+G3+G5, H3, and J6+J7. The second possible input to the OR circuit 991 is from a switch 993 which receives signals representing G2, H3, and J3+J4. The third possible input to the OR circuit 991 is from a switch 994 which is adapted to receive signals representing G3, H4, and J7.

The second input to the switch 990 is supplied from a trigger 998. This trigger is adapted to receive its input from an OR circuit 995 which may receive inputs from one of two alternate switches. The first switch is a switch 996 which receives signals representing G1 and J1+J2+J3. The second switch which supplies an input to the OR circuit 995 is one labelled 997. This last-mentioned switch is adapted to receive signals representing G5 and J7. Thus, if signals representing G1 and J1+J2+J3 or signals representing G5 and J7 are produced, an output will be supplied from the OR circuit 995 to initiate a three scan pulse from the trigger 998. As soon as this signal is initiated from the trigger 998, a gating signal is supplied to a trigger 999 which will produce a relatively positive voltage. This positive output signal from trigger 999 to switch 990 will last only so long as the output of the trigger 998 lasts. If signals representing G2, H1, and J6 are supplied to a switch 1000 following the gating signal from the trigger 998 to the trigger 999, the trigger 999 will supply a negative output signal to the switch 990. As before, the negative output of the trigger 999 will last only so long as the output of the trigger 998 lasts.

The output of the switch 990 is supplied to a trigger 1001 which will supply a signal which will last for three scans following the last input thereto. A switch 1002 is adapted to receive the relatively positive voltage from the trigger 1001 and in addition signals representing G3, $\overline{H1}$, and J6+J7. The output of the switch 1002 is adapted to supply an input to a trigger 1003, which trigger will supply an output signal which will be relatively positive for three scans following the last input thereto. Switch 1004 is adapted to receive signals representing G3, $\overline{H1}$, and J7, in addition to the signal from the right side of trigger 1003. If all of the inputs to trigger 1004 occur in coincidence, an output signal will be supplied therefrom to a trigger 1005. This trigger is adapted to supply one of the inputs to a switch 1006, the other inputs thereto being signals representing G2+G3, H2, and J5+J6+J7.

The output of the switch 1006 is used to initiate a signal from the trigger 1007 which will last for three scans following the last input to the trigger. The output of the trigger 1007 will supply a relatively positive voltage to each of the switches 1008 and 1010 which will last for three scans from the last input to the trigger 1007 from the switch 1006. An OR circuit 1009 is adapted to receive an input from either of the switches 1008 and 1010. Switch 1008 will supply a signal to the OR circuit providing signals representing G1+G4+G5, H2, and $$J3+J4+J5$$

are supplied thereto while the trigger 1007 is supplying a positive voltage. The output of the switch is supplied through the OR circuit 1009 to represent the character "6." Alternatively, positive if while the trigger 1007 is supplying a relatively positive voltage to the switch 1010, additional signals are supplied to this switch representing G1, H4, and J3, an output will be supplied therefrom to the OR circuit 1009 to represent the character "6."

It will be seen that there is a third input to the OR circuit 1009. Referring to the switch 1011, one of the inputs thereto is from the right side of trigger 1005. Therefore, if the inputs to this switch representing G4, H2 and J5+J6+J7 are supplied while the output of trigger 1005 is relatively positive, an output will be supplied from the switch through the OR circuit 1012 to the trigger 1014. Alternatively, signals representing G1, H2 and J1 are supplied to a switch 1013 while the output of the trigger 1005 is relatively positive, an output will be supplied from the switch 1013 through the OR circuit 1012 to the trigger 1014. A switch 1015 is now allowed three scans from the last input from the OR circuit 1012 to receive the signals representing G1, H2, and J3+J4 in coincidence. If all of the inputs to the switch 1015 are relatively positive in coincidence, an output is supplied therefrom through the OR circuit 1009 to represent the character "6."

Reference is now made to FIG. 37 which discloses the logical circuitry utilized to identify the character "7." There is provided a switch 1020 which must receive input signals from three sources. The first of these sources is from an OR cricuit 1021 which may receive inputs by way of two possible paths. The first of these paths is from a switch 1022 which will supply a relatively positive signal to the OR circuit 1021 providing signals representing H0 and J3+J4+J5+J6 occur in coincidence. Alternatively, if signals representing G5 and J3+J4+J5 are supplied to the switch 1019, an output will be supplied therefrom to the OR circuit 1021. The second input to the switch 1020 comes from a trigger 1023 which will supply an input to the switch which will last for three scans following the last input thereto from the switch 1024. In order to produce an output from the switch 1024 signals representing G1 and J1+J2+J3 must be received in coincidence. As soon as the trigger 1023 initiates its relatively positive output potential, a gating signal is supplied to a trigger 1025 which will produce a relatively positive voltage. This trigger will supply a relatively positive voltage to the switch 1020, until a signal from the switch 1026 representing that G2+G6 and J6 occur in coincidence. The trigger 1025 will supply a relatively negative output voltage to the switch 1020 only as long as the output of the trigger 1023 is relatively positive.

The output of the trigger 1020 is supplied to a trigger 1027 which will initiate a four scan pulse and supply a relatively positive voltage to the switch 1028 which will last for four scans from the last input thereto. Thus, within these four scans signals representing $$G0+G1+G2+G5+G6$$

H0, and J6+J7 must be received in coincidence by the switch 1028. The output of this trigger is used to initiate a relatively positive voltage from the trigger 1029. If within the four scans following the last output of switch 1028 to the trigger 1029, inputs representing G1, H0 and J1+J2 are supplied to the switch 1030, an output will be supplied therefrom to the trigger 1031. The output from trigger 1031 is used by the switch 1032. Other inputs to this switch are G1, H0 and J1+J2. Thus, if within three scans from the last signal produced by switch 1030, signals representing G1, H0 and J1+J2 occur in coincidence, an output signal will be supplied from switch 1032 representing the character "7."

Reference is now made to FIG. 38 which discloses the logical circuitry for identifying the character "8." Reference is made to an OR circuit 1040 which is adapted to receive inputs from a number of alternate sources. A switch 1041 will initiate a pulse from the trigger 1042 providing signals representing G6 and H5 occur in coincidence. For four scans following the last output of switch 1041, switches 1043 and 1044 will receive relatively positive voltages from the trigger 1042. Other inputs to the switch 1043 which must be received within these three scans are $G1+G2+G3+G4$, $H1+H3$, and $J5+J6+J7$. Other inputs which must be received by the switch 1044 in order to produce an output signal are G3, H1, and J7. Thus, outputs from either of the switches 1043 or 1044 will result in producing an output from the OR circuit 1040 to the trigger 1053.

Alternatively, there is provided an OR circuit 1045 which is adapted to receive input signals from either the switch 1046 or the switch 1047. A signal will be supplied from the switch 1046 providing signals representing G6, $\overline{H0}$, and $J4+J5+J6$ occur in coincidence. An output will be supplied from the switch 1047 providing signals representing $G4+G5$, H3, and $J4+J5$ are received thereby in coincidence. The trigger 1048 will supply a relatively positive output signal to the switch 1049 which will last for four scans following the last input to the trigger 1048 from the OR circuit 1045. Within these four scans, signals representing G3, H1, and J7 must occur in coincidence at the switch 1049 before an output will be supplied from the switch 1049 to the OR circuit 1040.

Alternatively, there is provided a switch 1050 which will supply an output signal to the trigger 1051 providing signals representing G5 and J4 are received thereby in coincidence. Thus, within three scans from the last signal from switch 1050 signals representing $G1+G2+G3+G4$, H3, and $J5+J6+J7$ must be supplied to this switch 1052. The output of the switch 1052 is commoned with the output of the switch 1049 in OR fashion.

A switch 1054 is connected to receive the output of the trigger 1053 and must receive an input from an OR circuit 1055 within three scans following the last output from the OR circuit 1040. In order to produce this signal from the OR circuit 1055, signals representing G3, H0 or J6+J7 must be supplied to the switch 1056, or signals representing G2, $H0+H4$, and J4 must be supplied to the switch 1057. If either of these switches supply an output to the OR circuit 1055, the input to switch 1054 will be raised. If trigger 1053 is still supplying a relatively positive voltage thereto, an output signal is supplied to a trigger 1056. This trigger initiates a pulse which will last for three scans following the last input thereto. If within these three scans another signal is supplied from the OR circuit 1055, the switch 1057 will supply an output signal to the trigger 1058.

Switches 1059, 1060 and 1061 are connected to receive the output of the trigger 1058. Thus, if within four scans from the last input from switch 1057 to the trigger 1058, signals representing G6, H2, $J4+J5$ are supplied to the switch 1059, an output signal is supplied therefrom to the OR circuit 1062. On the other hand, if signals representing G4, H4, and J4 are supplied to the switch 1060 while the output of the trigger 1058 is still relatively positive, an output is supplied from the switch 1060 to the OR circuit 1062. As a third possibility, switch 1061 is adapted to be connected to receive the relatively positive voltage from the trigger 1058 and in addition signals representing G5, H2, and J4. The output of the switch 1061 is supplied to the OR circuit 1062.

All outputs from the OR circuit 1062 are representative of the character "8."

There is an alternative way of producing an output signal representing the character "8." A switch 1063 is adapted to receive the relatively positive voltage from the trigger 1056. If in addition to this relatively positive voltage, switch 1063 also receives signals representing G3, H0, and J7, an output will be supplied therefrom to the trigger 1064. The output of the trigger 1064 will be relatively positive for four scans following the last input thereto from the switch 1063. This relatively positive voltage is supplied to a switch 1065 which requires an additional input from the trigger 1066. It is seen that a signal must not be supplied from the switch 1067 while the trigger 1064 is supplying a relatively positive output. That is, the output of the trigger 1066 will be a relatively positive voltage as long as the trigger 1064 provides a positive signal and the switch 1067 does not receive signals representing G5, H0 and J7 in coincidence.

The last input to the switch 1065 is from an OR circuit 1068 which is adapted to receive its inputs from either of the switches 1069, 1070 or 1071. Switch 1069 will produce an output signal providing it receives signals representing G6, $H0+H2+H4$, and $J4+J5+J6$. Switch 1070 will produce an output providing it receives in coincidence signals representing $G4+G5$, $H0+H2$, and $J4+J5$. Switch 1071 will produce an output signal providing it receives in coincidence signals representing $G2+G5$, H4, and J4 in coincidence.

If the switch 1065 receives all the inputs thereto in coincidence an output signal is supplied from the OR circuit 1062 indicative of the identification of the character "8."

Reference is now made to FIG. 39 which discloses the logical circuitry utilized to identify the character "9." There is provided a switch 1081 which is adapted to receive signals representing G1 and $J3+J4+J5$. It is noted that an inverter 1084 is also connected to supply an input to the switch 1081. In order for the switch to provide an output signal inverter 1084 must not receive an input signal. In order for this inverter not to receive an input signal the trigger 1083 must be supplying a relatively negative output voltage. A switch 1082 is adapted to receive signals representing G3 and H0. In the event these signals occur in coincidence a pulse will be produced which lasts for three scans, from the trigger 1083. Thus, it is seen that switch 1081 will produce an output signal if signals representing G3 and H0 have not occurred for three scans prior to the coincidence of signals representing G1 and $J3+J4+J5$.

The output of the switch 1081 is supplied to a trigger 1085 which supplies an output signal to the switch 1086. If within four scans after the last input to the trigger 1085, signals representing H1 and $J5+J6$ are supplied to the switch 1086, an output will be supplied therefrom to the OR circuit 1080. Alternatively, if within four scans after the last output signal from the switch 1081, signals representing G2, $H0+H2$, and $J5+J6$ are supplied to the switch 1087, an output will be supplied from the last-mentioned switch to the OR circuit 1080. There is another path by which an input may be supplied to the OR circuit 1080. This path includes a switch 1089 which is adapted to receive signals representing G1 and $J2+J3+J4+J5$. In addition, the switch 1089 is connected to the inverter 1084. Thus, signals representing G3 and H0 must not have been produced within the last three scans before G1 and $J2+J3+J4+J5$ occur in coincidence. In this event a signal is provided from the switch 1089 to the OR circuit 1088. The output of this OR circuit is used to initiate a relatively positive signal from the trigger 1090. Alternatively, if G3 and H0 have not occurred in coincidence in the three scans preceding the coincidence of $G4+G5$, H3 and J4, an output will be supplied from the switch 1091 through the OR circuit 1088 to the trigger 1090. As in the past, the trigger 1090 will produce a relatively positive voltage to the switch 1092 which will last for four scans following the last input signal to the trigger 1090. The other input required by switch 1092 is one from the switch 1093 which is adapted to receive signals representing G2, H1, and J6. The output of the switch 1092 is supplied through the OR circuit 1080 to the trigger 1094.

It has been shown that the trigger 1094 can receive inputs through the OR circuit 1080 from one of several alternate paths. In any event it will produce an output signal which will last for three scans on the last input thereto.

Switches 1095 and 1096 are adapted to receive the relatively positive voltages from the trigger 1094. If while switch 1095 is receiving this relatively positive voltage from the trigger 1094 is also receives signals representing G3, $H0+H1$, and $J6+J7$, an output will be supplied therefrom through the cathode follower 1097 to the trigger 1098. Alternatively, if the switch 1096 receives signals representing G2, H0 and J4 in coincidence with the relatively positive output of the trigger 1094, an output signal is supplied therefrom through the OR circuit 1097 to the trigger 1098. The output of the trigger 1098 will remain relatively positive for four scans following the last input thereto. Switches 1099 and 1100 are connected to receive the relatively positive outputs from the trigger 1098. Switch 1099 is adapted to receive signals $G3+G4$, H0, and $J6+J7$. If all of these signals occur in coincidence with a relatively positive voltage from trigger 1098 an output is supplied from the switch 1099 through the OR circuit 1101 to set the trigger 1102. If switch 1100 receives signals representing G2, H0, and J4, while it is receiving an output from the trigger 1098, it will produce an output signal which will be fed through the OR circuit 1101 to the trigger 1102.

The output of the trigger 1102 will be relatively positive for four scans following the last input thereto and will serve as an input to the switch 1103. Another input to the switch 1103 is from the trigger 1104 which utilizes the output of the trigger 1102 as the gate input therefor. A signal input to the trigger 1104 may be from either of the switches 1105 or 1106. Switch 1105 will produce an output signal if signals representing G5, H0, and J7 occur in coincidence. Switch 1106 will produce an output signal providing signals representing G6, H2, and J5 occur in coincidence. The output of the trigger 1104 will remain relatively positive only as long as the trigger 1102 supplies a relatively positive voltage and the switch 1105 or the switch 1106 does not produce an output signal.

The remaining input required by the switch 1103 may be supplied from either of the switches 1107 or 1108. Switch 1107 will produce an output signal providing signals representing G1, H2, and $J1+J2+J3$ occur in coincidence. Switch 1108 will produce an output signal providing signals representing G4, H2 and $J4+J5$ occur in coincidence. In the event all of the inputs to the switch 1103 occur in coincidence, an output signal will be supplied therefrom representing the character "9."

Figure 40:
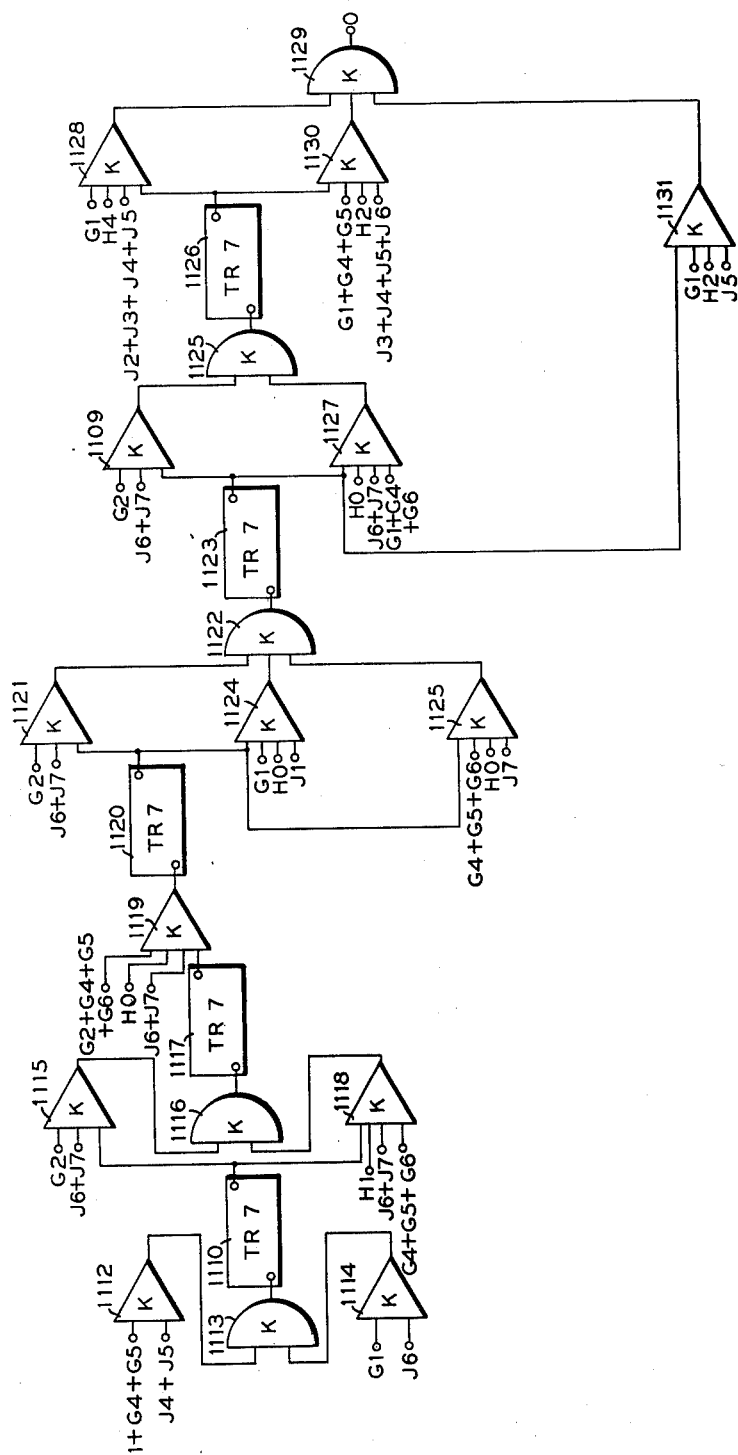

Reference is made to FIG. 40 which discloses the circuitry utilized to identify the character "0." There is provided a trigger 1110 which is adapted to receive an input from the OR circuit 1113. This OR circuit may receive inputs from either of the switches 1112 or 1114. Switch 1112 will produce an output signal providing signals representing $G1+G4+G5$ and $J4+J5$ occur in coincidence. Switch 1114 will produce an output signal providing signals representing G1 and J6 occur in coincidence. The output of trigger 1110 will last for four scans following the last input from the OR circuit 1113.

The output of the trigger 1110 is supplied to each of the switches 1115 and 1118. Switch 1115 will produce an output providing it is receiving a relatively positive voltage from the trigger 1110 and is also receiving signals representing G2 and $J6+J7$. The output from the switch 1115 is supplied through the OR circuit 1116 to the trigger 1117. Alternatively, if the switch 1118 receives signals representing $G4+G5+G6$, H1, and $J6+J7$ along with a relatively positive output from the trigger 1110, it will supply an output signal through OR circuit 1116 to trigger 1117. A switch 1119 is connected to receive a relatively positive voltage from the trigger 1117 and is adapted to receive in addition signals representing $G2+G4+G5+G6$, H0 and $J6+J7$. If all of these remaining input signals are supplied to the switch 1119 while the trigger 1117 is supplying a relatively positive voltage thereto, an output is supplied therefrom to the trigger 1120. This trigger raises one input to each of the switches 1121, 1124 and 1125 for a period of three scans following the last output from the switch 1119. Thus, if within this time a switch 1121 receives a signal representing G2 and $J6+J7$, it will supply an output signal to an OR circuit 1122. The output of the OR circuit 1122 is fed to a trigger 1123. Alternatively, if within this period of time a switch 1124 receives signals representing G1, H0, and J1, it will supply an output signal through the OR circuit 1122 to trigger 1123. As another alternative, if the switch 1125 receives signals representing $G4+G5+G6$, H0, and J7 while the output of the trigger 1120 is relatively positive, an output signal will be supplied from this switch through the OR circuit 1122 to the trigger 1123.

The output of the trigger 1123 will supply relatively positive inputs to each of the switches 1109 and 1127 for three scans following the last input from the OR circuit 1122. If within this time switch 1109 receives signals representing G2 and $J6+J7$, an output signal will be supplied therefrom through the OR circuit 1125 to the trigger 1126. Alternatively, if the switch 1127 receives signals representing $G1+G4+G6$, H0, and $J6+J7$ while the output from the trigger 1123 is relatively positive, an output will be supplied to the trigger 1126 through the OR circuit 1125.

The trigger 1126 will raise one input to each of the switches 1128 and 1130 for a period of four scans following the last input thereto from the OR circuit 1125. An output will be produced from switch 1128 provided during these three scans it receives signals representing G1, H4, and $J2+J3+J4+J5$. If during the time trigger 1126 is supplying a relatively positive voltage to the switch 1130, the last-mentioned switch also receives signals representing $G1+G4+G5$, H2 and $J3+J4+J5+J6$, an output signal will be supplied from the switch to the OR circuit 1129. It is seen that an output from either of the switches 1128 or 1130 will result in an output signal from the OR circuit 1129 representing the character "0."

There is an alternative path for producing a signal representing the character "0" and this is by way of a switch 1131. If the switch 1131 receives signals representing G1, H2, and G5 while it is still receiving a relatively positive voltage from the trigger 1123, it will supply an output signal to the OR circuit 1129 which will produce a signal representing the character "0."

Figure 41:
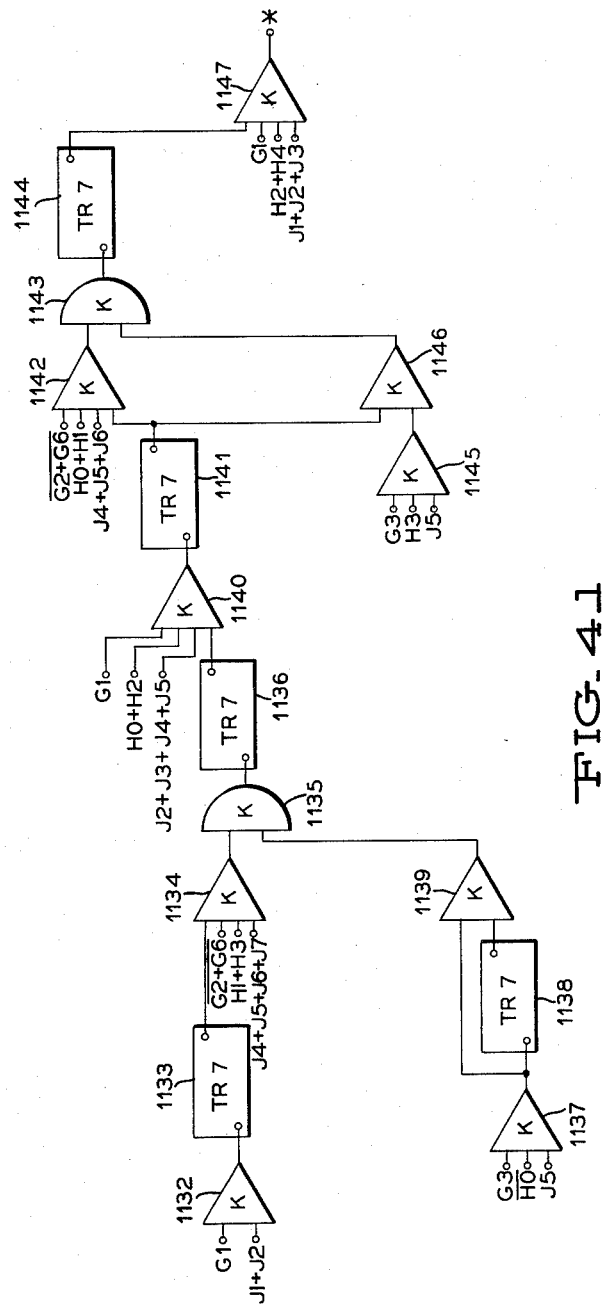

Reference is now made to FIG. 41 which discloses the logical circuitry utilized to identify the asterisk. The asterisk is one of the special characters which the present machine is capable of identifying. There is provided a switch 1132 which is adapted to receive signals representing G1 and J1+J2. The output of the switch 1132 initiates a pulse from the trigger 1133 which will last for four scans following the last input thereto from the switch 1132. The output of the trigger 1133 is supplied to a switch 1134 which also receives signals representing $\overline{G2}+\overline{G6}$, H1+H3, and J4+J5+J6+J7. If these additional inputs occur in coincidence while the trigger 1133 is supplying a relatively positive voltage, an output will be supplied from the switch 1134 through the OR circuit 1135 to the trigger 1136.

Alternatively, an input may be supplied to the trigger 1136 by way of a switch 1137 which is adapted to receive signals representing G3, $\overline{H0}$, and J5. The output of this switch is supplied to a trigger 1138 which will supply a relatively positive output voltage to the switch 1139. Switch 1139 also receives the output of the switch 1137. Therefore, if switch 1137 again supplies an output after the trigger 1138 is turned ON, an output signal will be supplied from the switch 1139 through the OR circuit 1135 to the trigger 1136.

The output of the trigger 1136 will raise one of the inputs to the switch 1140 for a period equal to three scans from the last output from the OR circuit 1135. If within this period of time, signals representing G1, $\overline{H0}$+H2, and J2+J3+J4+J5 are supplied to the switch 1140, an output will be supplied from the switch 1140 to the trigger 1141.

Trigger 1141 has its output connected to each of the switches 1142 and 1146. Switch 1142 is adapted to receive, in addition, signals representing $\overline{G2}+\overline{G6}$, $\overline{H0}$+H1, and J4+J5+J6. Thus, if these signals are fed to the switch 1142 while it is still receiving a relatively positive voltage from the trigger 1141, an output signal will be supplied therefrom through the OR circuit 1143 to the trigger 1144. Alternatively, the switch 1144 may receive an input signal by way of switches 1145 and 1146. That is, if switch 1145 receives signals representing G3, H3, and J5 in coincidence, an output will be supplied therefrom to the switch 1146. If switch 1146 is presently receiving a relatively positive voltage from the trigger 1141, it will supply an output signal through the OR circuit 1143 to the trigger 1144.

The output of trigger 1144 is supplied to a switch 1147 which must receive within the three scan period following the last input signal thereto signals representing G1, H2+H4, and J1+J2+J3. Thus, in the event all of the inputs to the switch 1147 occur in coincidence a signal will be produced representing the "*."

Figure 42:
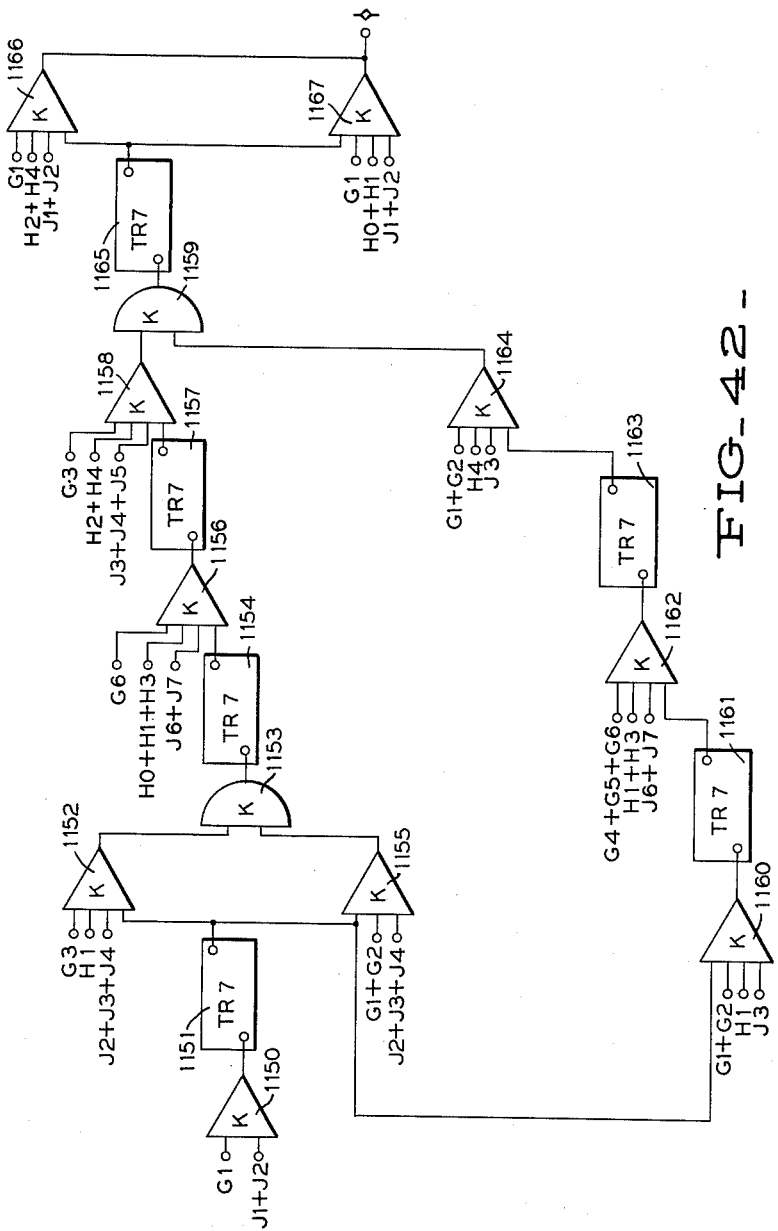

To identify the special character known as lozenge, reference is made to FIG. 42. To identify this special character there is provided a switch 1150, which is adapted to receive signals representing G1, and J1+J2. The output of the switch 1150 is supplied to a trigger 1151 which will produce a relatively positive voltage which will last for three scans following the last input thereto from the switch 1150. The output of switch 1151 is supplied to each of the switches 1152 and 1155. If during these three scans, switch 1152 receives signals representing $\overline{G3}$, H1, and J2+J3+J4, an output will be supplied therefrom through the OR circuit 1153 to the trigger 1154.

Alternatively, a switch 1155 is adapted to receive signals representing G1+G2 and J2+J3+J4. In addition it is connected to receive the output of the trigger 1151 and will supply an output signal providing all of its inputs are relatively positive. The output of the switch 1155 is supplied through the OR circuit 1153 to the trigger 1154. If within four scans from the last input to the trigger 1154 input signals representing G6, $\overline{H0}$+H1+H3, and J6+J7 are supplied to a switch 1156, an output is supplied therefrom to the trigger 1157. If within four scans from the last input to the trigger 1157, signals representing $\overline{G3}$, H2+H4, and J3+J4+J5 are supplied to the switch 1158, an output will be supplied from the switch 1158 through the OR circuit 1159 to the trigger 1165.

There is an alternative path by which an input may be supplied to the trigger 1165 which will now be described. There is provided a switch 1160 which is connected to receive a relatively positive output of the trigger 1151. This switch also is connected to receive signals representing G1+G2, H1, and J3. If all of the inputs to the switch 1160 are relatively positive in coincidence, an output signal will be supplied to the trigger 1161. This trigger will produce an output signal which will last for a period of four scans following the last input thereto from the switch 1160. The switch 1162 is connected to receive the output of the trigger 1161 and in addition is arranged to receive signals representing G4+G5+G6, H1+H3, and J6+J7. If all of the inputs to this switch are relatively positive in coincidence, an output is supplied to trigger 1163. The output from trigger 1163 will be relatively positive for four scans following the last signal from the switch 1162. If within these four scans, signals representing G1+G2, H4, and J3 are supplied to the switch 1164, an output is supplied from this switch through the OR circuit 1159 to the trigger 1165.

The output of trigger 1165 is supplied to each of the switches 1166 and 1167. Switch 1166 must receive in addition to the relatively positive voltage from the trigger 1165, signals representing G1, H2+H4, and J1+J2. In the event all of these inputs to the switch 1166 occur in coincidence, an output signal representing the lozenge, i.e. "◊" will be produced. Alternatively, if during the three scans folowing the last output signal from the OR circuit 1159 to the trigger 1165, signals representing G1, $\overline{H0}$+H1, and J1+J2 are supplied to the switch 1167, an output signal will be supplied from the switch 1167 to represent the "◊."

Figure 43:
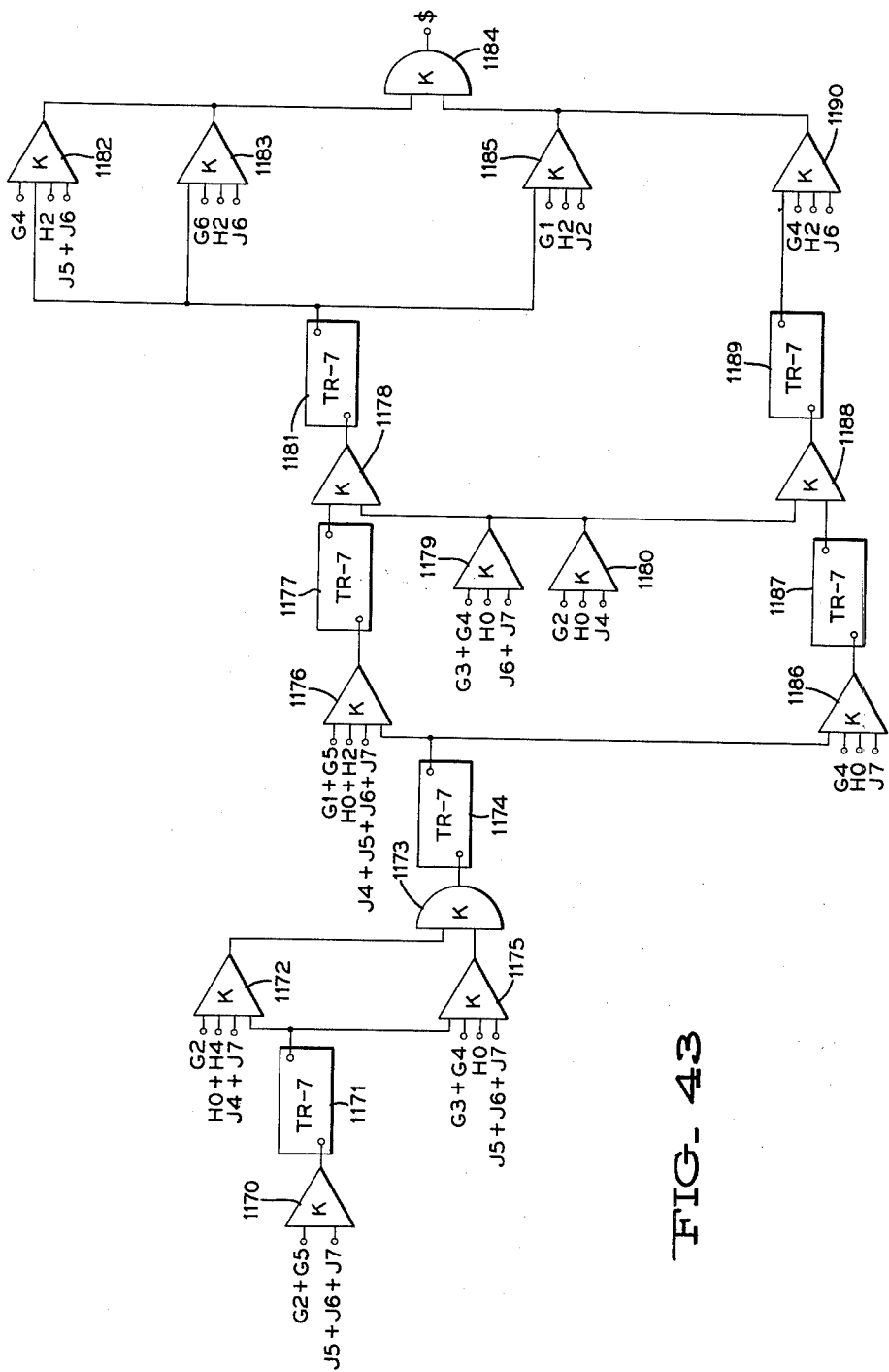

Reference is now made to FIG. 43 which discloses the logical circuitry utilized to identify the dollar sign, i.e. "$." There is provided a switch 1170 which is adapted to receive signals representing G2+G5 and J5+J6+J7. If these two signals occur in coincidence, an output signal representing this fact is supplied to a trigger 1171 which will raise one of the inputs to each of the switches 1172 and 1175 for four scans following the last output of switch 1170. If during this time signals representing G2, $\overline{H0}$+H4, and J4+J7 are supplied to the switch 1172, an output will be supplied therefrom through the OR circuit 1173 to the trigger 1174. Alternatively, if during this four scan period, signals representing G3+G4, H0, and J5+J6+J7 are supplied to the switch 1175, an output signal will be supplied through the OR circuit 1173 to the trigger 1174.

One input to each of the switches 1176 and 1186 will be held up for a period of three scans following the last output signal from the OR circuit 1173. Referring to the switch 1176, it is seen that signals representing G1+G5, $\overline{H0}$+H2, and J4+J5+J6+J7 are adapted to be supplied thereto. If these remaining inputs are supplied while the trigger 1174 is still supplying a relatively positive output voltage, an output signal will be supplied from the switch 1176 to the trigger 1177. The output of the trigger 1177 is supplied to serve as one input to a switch 1178. There are two paths by which the second input to the switch 1178 may be provided. The first of these paths is from a switch 1179 which will supply a signal to switch 1178 provided signals representing G3+G4, H0, and J6+J7 are supplied in coincidence. Switch 1180 will produce an output signal to the switch 1178 providing signals representing G2, H0, and J4 occur in coincidence. The output from the switch 1178 is supplied to the trigger 1181 which will raise one input to each of the switches 1182, 1183, and 1185. If within four scans of the last output of the switch 1178, signals representing G4, H2 and J5+J6 are supplied to the switch 1182, an output signal will be supplied therefrom through the OR circuit 1184 to represent the dollar sign. If within the four scan period signals representing G6, H2, and J6 are supplied to the switch 1183, an output signal will be supplied through the OR circuit 1184 to represent the dollar sign. If within the aforementioned four scans, signals representing G1, H2, and J2 are supplied to the switch 1185, it will also supply an output signal indicating the recognition of the dollar sign. As previously stated, switch 1186 is also connected to receive the output of the trigger 1174. Therefore, if within three scans from the last input to the trigger 1174, signals representing G4, H0 and J7 are received by the switch 1186, an output signal will be supplied therefrom to a trigger 1187. If within three scans from the last input to the trigger 1187, an output is supplied from either of the switches 1179 or 1180 to the switch 1188, an output will be supplied from the switch 1188 to the trigger 1189. The trigger 1189 will remain ON for four scans following the last input from the switch 1188. Thus, if the switch 1190 receives the relatively positive output from the trigger 1189 and also receives signals representing G4, H2 and J6, an output signal will be produced representing the dollar sign.

Reference is made to FIG. 44 which discloses the logical circuitry utilized to identify a dash, i.e. "—." The dash is another special symbol which this present invention is capable of recognizing. Trigger 1202 which may be turned ON by signals representing J4+J5+J6+J7. An output is supplied through a trigger 1202 which will last for three scans following the last input thereto. An inverter 1201 is adapted to supply an input to a switch 1200. Therefore, if signals representing G1 and J1+J2 are supplied to the switch 1200 more than three scans after the trigger 1202 has been turned ON, an output will be supplied from the switch 1200 to the trigger 1203. Another way of looking at this is that if for the three previous scans signals representing J4+J5+J6+J7 have not been produced, and instead signals representing G1 and J1+J2 are produced in coincidence, an output is supplied from the switch 1200. The output of the trigger 1203 will last for three scans following the last input thereto. This output is used directly by the switch 1204 and by way of an OR circuit 1206 which serves as the gate input to a switch 1207. Thus, if the trigger 1207 receives a signal input representing J6+J7 after the trigger 1203 has been turned ON, it will supply a relatively negative voltage to a switch 1204. Trigger 1207 will produce a relatively positive voltage if it receives a relatively positive voltage from OR circuit 1206 and it does not receive a signal input representing J6+J7. The other input to the switch 1204 is supplied from a switch 1205 which is adapted to receive signals representing G1, H0, and J1+J2. If all of the inputs to the trigger 1204 are relatively positive in coincidence an output is supplied therefrom to a trigger 1208. The output of this trigger is supplied directly to the switch 1209 and in turn through the OR circuit 1206 to serve as the gate input to the trigger 1207.

As long as a gate signal is supplied to the trigger 1207 the trigger will remain ON providing it has not received J6+J7 after the gate signal was supplied. Therefore, it will supply an output to the switch 1209. The other input to this switch is a signal from the switch 1205. The output of switch 1209 is used to initiate a pulse from trigger 1210 which lasts for three scans from the last output from switch 1209. The output of the trigger 1210 is also used by way of the OR circuit 1206 to serve as the gate signal to the trigger 1207. The remaining input to the switch 1211 is the output from the switch 1205.

Trigger 1213 is adapted to receive the output of the switch 1211 and will produce a relatively positive output signal to the switch 1214 which also is connected to receive the output of the switch 1205. If both the inputs to the switch 1214 are relatively positive in coincidence, an output signal is supplied to a trigger 1215. Thus, for three scans following the last output of the switch 1214, the switch 1216 may look for signals representing G1 and J1+J2 in coincidence. In the event this condition exists, an output signal representing the special character, the dash, is produced.

There has now been described the manner of obtaining signals representing the identity of each of the digits zero through nine and certain special characters. It should be apparent that sequences can also be drawn for alphabetic characters in the light of the teachings of the invention.

Once a particular sequence is satisfied a character signal is produced. It is possible to produce several character identity signals from a particular circuit while scanning a character which the circuit is adapted to recognize. The first signal is accepted and the remainder of the signals representing the same character which are produced within a predetermined number of scans are not used. While normally formed characters would satisfy only one of the sequence circuits, it is possible to find characters which are sufficiently degraded to satisfy two or more of the sequences. Obviously, only one of the sequences should have been satisfied. Also, it is desirable to know when a blank space has been scanned, i.e., a space which is at least more than a normal space between characters.

There are instances when video signals are produced in scanning what is supposed to be a blank space but which may contain information of a meaningless nature. For example, specks and other foreign material may cause video signals. It is desirable to know whether this is the case, and for this reason a circuit is provided which determines whether minimum character requirements have been met during a number of scans.

The circuit now to be described takes the first character identity signal from a logical circuit and looks to see whether a character identity signal is produced for a different character within ten scans. If a character identity signal for another character is produced within ten scans, a signal is produced which will indicate conflict. Where minimum character requirements are met but no character identity signals are produced within a predetermined number of scans, a MISS signal is produced. The CONFLICT and MISS conditions are combined and both are referred to as an UNCERTAINTY. Lastly, where minimum character requirements are not met and character identity signals are not produced over a predetermined number of scans, a signal indicating a BLANK is produced.

Reference is made to FIG. 45 which discloses a circuit for producing a signal representing the fact that during a series of scans, minimum character requirements have been detected. That is, enough video signals have been produced to indicate that a character, rather than specks or other meaningless marks has been scanned. A signal representing this fact is termed MCR and is generated by the circuit shown in FIG. 45. Referring to FIG. 45, there is provided a trigger 810 and a plurality of switches 811, 813, 815, and 817, each of which switches is adapted to receive a signal representing G1+G2+G3+G4+G5+G6. Let these signals be referred to as input signals.

If an input signal is supplied to the trigger 810, a relatively positive voltage will be supplied from the right side thereof to the switch 811. If another input signal is supplied to the trigger 810 within three scans, an output will be supplied from the switch 811 to the trigger 812 and initiate a pulse of three scan duration from this trigger. If after the trigger 812 is set up, another input signal is supplied, the switch 813 will produce an output signal to the trigger 814. This causes trigger 814 to be set up for three scans and will raise the input to the switch 815 for this period. If within the three scans another input signal is supplied, the output from switch 815 sets up the trigger 816. The output from this trigger will be relatively positive for three scans. Therefore, if another input signal is supplied thereto during this time an output signal will be supplied from switch 817 through an OR circuit 818 to a trigger 819. Here again, the trigger 819 will supply an output signal which will last for three scans following the last input supplied thereto.

Alternatively, an input signal may be supplied through the OR circuit 818 to the trigger 819 by way of a switch 820. Thus, if there is a signal representing G$\bar{2}$ and a signal representing J5+J6+J7 to the switch 820, an output signal is supplied therefrom to turn trigger 819 ON. The output from the trigger 819 is labelled MCR and will be referred to in this manner later in the description. When a signal representing MCR is produced, it is an indication that a character was scanned rather than meaningless specks or other marks.

Referring now to FIGS. 46a and 46b, signals representing the characters "1," "2," "3," "4," "5," "6" and "7" are obtained from FIGS. 31, 32, 33, 34, 35, 36 and 37, respectively, and supplied to an OR circuit 1230. Signals representing the characters "8," "9," "0," "*," "$," "◇" "—" are obtained from FIGS. 38, 39, 40, 41, 42, 43 and 44, respectively, and supplied to the OR circuit 1231. The outputs from OR circuits 1230 and 1231 are connected to cathode followers 1232 and 1233, respectively. It will be noted that the output from the cathode followers last-mentioned are commoned, thereby forming an OR circuit, and supplied over a line 1229 to the single-shot multivibrators 1235 and 1236, shown in FIG. 46b, as well as an inverter 1234 and the OR circuits 1279 and 1296.

When a character is identified, for example, the character "3," an input is supplied to the OR circuit 1230 which in turn supplies an output through the cathode follower 1232 to the single-shot multivibrators 1235 and 1236. The single-shot multivibrator 1236 is adapted to supply a relatively positive output voltage which has a duration of approximately fourteen scans. The output signal from the single-shot multivibrator 1236 is supplied through cathode followers 1237a and 1237b, which are arranged in parallel, and serves as the gate input to each of the triggers 1238, 1239, 1240, 1241, 1242, 1243, 1244, 1245, 1246, 1247, 1248, 1249, 1250 and 1251. It will be seen that other inputs are supplied to the last-mentioned group of triggers. These inputs are obtained from the character input lines connected to the OR circuits 1230 and 1231. Thus, input signals representing the characters "1," "2," "3," "4," "5," "6," and "7" are supplied as the signal inputs to the triggers 1238, 1239, 1240, 1241, 1242, 1243, 1244, respectively. Those signals representing the characters "8," "9," "0," "*," "$," "◇," and "—" are supplied as the signal input to the triggers 1245, 1246, 1247, 1248, 1249, 1250 and 1251, respectively.

The outputs from the triggers 1238 through 1251 are supplied to the inverters 1252 through 1265, respectively. Each of the inverters 1252 through 1265 is arranged normally with two plate resistors, there being a tap point between the two plate resistors. The common line shown as connecting each of these inverters is connected to the tap point on each of the inverters. Only one of the inverters has its own plate supply, i.e. the upper resistor of inverter 1252 is connected to a positive source of D.C. voltage. All of the remaining inverters utilize the D.C. voltage in the inverter 1252. This common output connection from each of the inverters is connected through the voltage regulator tubes 1256 and 1257 to the upper end of a voltage divider which is comprised of resistors 1268 and 1269, the lower end of the resistor 1269 being connected to a negative source of D.C. potential. The mid-point of the divider is connected through a resistor 1270 to a double inverter 1271. The output of the double inverter 1271 will normally be at a predetermined level when one and only one of the inverters 1252 through 1265 is conducting. However, if two or more of these inverters go into conduction at one time, a voltage drop is caused at the input to the double inverter 1271 and thereby results in a voltage drop at the output of the double inverter.

Let it be assumed that during the scanning of a document that a signal representing the character "3" is supplied to the OR circuit 1230. The output of the OR circuit is supplied through cathode follower 1232 and over the line 1249 to the single-shot multivibrators 1235 and 1236. As described heretofore, the output of the single-shot multivibrator 1236 is positive for approximately fourteen scans and will serve as the gate input to each of the triggers 1238 through 1251. The character input representing the character "3" is also connected to the trigger 1240 and serves as the signal input thereto. The trigger 1240 will remain ON until the end of the fourteen scans.

At the same time that the input signal was supplied to the single-shot multivibrator 1236, the single-shot multivibrator 1235 also began the generation of a relatively positive output signal. The duration of the relatively positive output signal from the single-shot multivibrator 1235 is only ten scans. Thus, when this output is supplied to an inverter 1275, the output of the inverter will be relatively negative until the end of the ten scan period. As soon as the ten scan period is over, the output of the inverter 1275 becomes a positive going voltage and initiates a three scan pulse from the single-shot multivibrator 1276. This three scan pulse is supplied as a sample pulse to a switch 1277 which is also connected to receive the output from the left side of a trigger 1272. Trigger 1272 is normally reset OFF so that if an identity signal for only one character is supplied to the OR circuit 1230 previously described by the time the three scan sample pulse is produced, a relatively positive pulse will be supplied from the switch 1277 to the cathode follower 1278, thereby producing an output signal representing the fact that only one character was recognized.

Let it now be assumed that within two scans after the character "3" input signal to the OR circuit 1230 that a character "5" input signal was also supplied to the OR circuit 1230. It will be seen that this character "5" input signal is connected as a signal input to the trigger 1242 whose gate input is presently being supplied from the single-shot multivibrator 1236 by way of cathode followers 1237a and 1237b. Therefore, the trigger 1242 will be turned ON. This will cause both the inverters 1254 and 1256 to be in conduction. In view of this, the voltage drop at the mid-point of the divider comprising resistors 1268 and 1269 will be greater than it was with only one of the inverters conducting and will result in a negative going voltage from the double inverter 1271. This negative going voltage is supplied to trigger 1272 in FIG. 46b and turns trigger ON. With this trigger turned ON, the right side thereof will supply a relatively positive output voltage to a switch 1273. Also, a relatively negative output voltage will be supplied from the left side of the trigger 1272 to the switch 1277.

When ten scans have been completed, and the output of the single-shot multivibrator 1235 becomes relatively negative, a positive going voltage is supplied from the inverter 1275 to generate a positive pulse from the single-shot multivibrator 1276 which will last approximately three scans. This three scan pulse is now used as the second input to the switch 1273, it being seen that switch 1277 is inhibited by the fact that trigger 1272 is turned ON. An output is supplied from switch 1273 through a cathode follower 1274 when a conflict arises and serves as an output signal representing an UNCERTAINTY. That is, more than one character has been recognized within ten scans of each other.

At the same time that the recognition of a character was obtained and an input signal supplied to the single-shot multivibrators 1235 and 1236, a signal was also supplied to each of the OR circuits 1279 and 1296. The output of the OR circuit 1279 is supplied to a single-shot multivibrator 1280 which generates an eighteen micosecond output signal. The relatively positive output signal from circuit 1280 is supplied through an inverter 1281 to the cathode of a diode 1282. There is provided a resistor 1284 which is connected between the plate of the diode 1282 and a positive source of D.C. potential, there being a capacitor 1283 connected in shunt with the resistor 1284. The capacitor is adapted to be charged by the output of inverter 1281 over the eighteen microsecond interval at a rate determined by the value of the capacitor 1283. It will take approximately thirty scans for the capacitor to discharge through the resistor 1284 to the point where the inverter 1285 is allowed to go into conduction, provided, of course, no further inputs are supplied to OR circuit 1279 during this interval.

As soon as the inverter 1285 goes into conduction, it supplies a negative going voltage through a resistor 1286 to an inverter 1287, the output of the last-mentioned inverter being a positive going voltage which is supplied to a single-shot multivibrator 1288 to produce an output signal of approximately one scan duration. This output signal is fed to a switch 1290 which is adapted to receive another input from a trigger 1293.

It will be remembered that in the circuit described in FIG. 45 that an output signal labelled MCR was obtained. This output signal which represents the fact that minimum character requirements were obtained during the scanning of the character, is supplied to a switch 1291 which also is connected to receive the output from the inverter 1275. The output of this inverter is relatively negative until the end of the ten scan pulse produced by the trigger 1235. Therefore, if after ten scans have been completed from the last recognition signal, an MCR signal is supplied to the switch 1291, an output will be supplied from this switch through the inverter 1292 to turn trigger 1293 ON. It should be noted that trigger 1293 was turned OFF by way of inverter 1234 when the last character identity signal resulted in an input to each of the single-shot multivibrators 1235 and 1236. If this trigger is turned ON, indicating that minimum character requirements have been obtained for the character presently being scanned, the output of the right side thereof will be relatively positive and will allow an output through the switch 1290 to the cathode follower 1294. The output of the cathode follower 1294 is commoned with the output of the cathode follower 1274 to supply an output which is herein labelled UNCERTAINTY. That is, it has been at least thirty scans since the last character signal was produced and during this time an MCR signal was produced.

At the end of the thirty scan delay which produced the signal from the trigger 1288 to the switch 1290 it is seen that a signal is also supplied from the trigger 1288 to the single-shot multivibrator 1295. This single-shot multivibrator supplies a relatively positive output signal which is of one and one-half scans duration, the trailing edge of the output of the trigger 1295 being utilized to turn trigger 1293 OFF so that it can await another minimum character requirements signal which follows by more than ten scans the production of a character identity signal.

It will be seen that an UNCERTAINTY signal would not have been produced in the manner just described had a new character signal been received before the completion of the thirty scan delay which culminated in an output from the trigger 1288 to the switch 1290. That is, if a new character signal had been supplied to the OR circuit 1230 before the thirty scan delay was completed, an output would be supplied from the OR circuit through the cathode follower 1232 to the line 1229. This line is connected to supply a signal to OR circuit 1279 which will initiate an eighteen microsecond signal from the single-shot multivibrator 1280. This recharges capacitor 1283 so that it will remain sufficiently charged for another thirty scans to prevent an output from the single-shot multivibrator 1228 to the switch 1290.

At the same time that the first character identity signal was supplied to initiate the thirty scan delay in the circuit just described, a signal is also supplied to an OR circuit 1296. This circuit is adapted to initiate a twenty scan delay. The output of the OR circuit 1296 is supplied to a trigger 1297 which generates an eighteen microsecond relatively positive pulse. This results in a relatively negative eighteen microsecond pulse from the inverter 1298 which is supplied to the cathode of the diode 1299. The plate of this diode is connected through a resistor 1300 to a positive source of D.C. voltage, there being a capacitor 1301 connected in shunt with resistor 1300. The value of the capacitor 1301 and the value of the resistor 1300 are such that the capacitor will charge negatively during the eighteen microsecond relatively negative voltage from the inverter 1298 and will remain sufficiently negative to keep the inverter 1302 cut off until twenty scans have elapsed. However, at the end of twenty scans, the output of the inverter 1302 will be a relatively negative going voltage which, when supplied through the resistor 1303 and the inverter 1304, will produce a positive going voltage to a single-shot multivibrator 1305. This single-shot multivibrator will supply an output pulse which will be relatively positive for approximately one scan. The output of this single-shot multivibrator is supplied back to the OR circuit 1296 to initiate another twenty scan delay and in addition is supplied to serve as one input to a switch 1306.

The other input to the switch 1306 is supplied from the trigger 1293. That is, if the trigger 1293 is OFF, a relatively positive voltage is supplied from the left side thereof to the switch 1306. However, if the trigger is ON, indicating that minimum character requirements have been supplied to the switch 1291, a relatively negative voltage is supplied to the switch 1306.

Assuming that minimum character requirements have not been obtained and that a twenty scan delay has been produced as a result of the circuit described above an output will be supplied through the switch 1306 to the cathode follower 1307 to indicate that a BLANK has been sensed. The output of the cathode follower 1307 is also fed back to initiate a new thirty scan delay in the circuit previously described as having the OR circuit 1279 as the input thereto.

There is an alernative means for initiating a twenty scan delay in the circuit having the OR circuit 1296 as the input means. If after thirty scans have passed and an output is supplied from the trigger 1288 to the switch 1290, a signal is also supplied to OR circuit 1296 to initiate a new twenty scan delay.

The operation of the circuit shown in FIGS. 46a and 46b described to this point will now be summarized. The fact that a character is recognized in one of the circuits shown in FIGS. 31 through 44 results in an input signal to OR circuits 1230 or 1231. This supplies an output to the single-shot multivibrators 1235 and 1236 and at the same time to the OR circuits 1279 and 1296. The single-shot multivibrator 1236 initiates a pulse which will last for fourteen scans while the single-shot multivibrator 1235 initiates a pulse which will last for ten scans. The input of a signal to the OR circuit 1279 initiates a thirty scan delay and the input to the OR circuit 1296 initiates a twenty scan delay. At the end of ten scans, the output of trigger 1235 is utilized to generate a three scan sample pulse for a switch 1277. If during a ten scan interval since the last character signal, there has not been another character signal, the output of the double inverter 1271 will be at such a level that it will not turn a trigger 1272 in FIG. 46b ON. That is, only one character has been recognized. The left side of this trigger will be relatively positive and is connected to supply this voltage to the switch 1277. Thus, an output will be supplied from the switch 1277 through the cathode follower 1278 to indicate that a valid character identity signal has been produced. At the end of the fourteenth scan following the last character signal the gate supplied to each of the triggers 1238 through 1251 is taken away by the fact that the single-shot multivibrator 1236 now supplies a relatively negative output signal. Thus, there is the requirement in this circuit that once an input signal is received indicating the identification of one of the characters, another input signal must not be received within ten scans.

It has now been described how a thirty scan delay is initiated by the fact that an input is supplied to the OR circuit 1279 and how a twenty scan delay is initiated by supplying a signal to the OR circuit 1296. It is seen that if a new input signal is not supplied to the OR circuit 1296 within twenty scans from the last input signal, an output signal will be supplied from the single-shot multivibrator 1305 to the switch 1306. If during this time a signal representing MCR has not been supplied to the switch 1291, trigger 1293 will remain OFF. In this event, the left side of trigger 1293 will be relatively positive and will supply an input to the switch 1306. Since the switch 1306 also receives a relatively positive voltage from the single-shot multivibrator 1305, an output will be supplied from the switch 1306 and the cathode follower 1307 to indicate that a BLANK has been sensed. That is, twenty scans have elapsed since the last character signal and during these twenty scans a minimum character requirement signal has not been received. Thus, the scanner must be scanning a blank space. The output of cathode follower 1307 is also used to initiate a new thirty scan delay in the circuit having OR circuit 1279 as the input means. However, if within twenty scans, a minimum character signal has been produced it will be seen that trigger 1293 will be turned ON. This, of course, inhibits switch 1306 but does allow the switch 1290 to receive a relatively positive input from the trigger 1293. If after thirty scans a new character data input signal is not supplied over the line 1229, an output will be supplied from single-shot multivibrator 1288 which will be allowed to pass through the switch 1290 and the cathode follower 1294 to indicate an UNCERTAINTY. That is, thirty scans have passed since the last character signal and during these thirty scans enough information has been seen to produce a minimum character requirement signal. This is sufficient to cause the system to produce an UNCERTAINTY signal.

In the event that only twenty-nine scans elapsed from the last character data signal, and then a new character data signal is produced, the OR circuit 1279 will receive another input and cause an eighteen microsecond output from the trigger 1280. This immediately causes the capacitor 1283 to begin charging and to prevent a signal from being supplied through the inverters 1285 and 1287 to produce a signal from the single-shot multivibrator 1288 for another thirty scans. This illustrates that as long as character input signals occur at a frequency of not less than every thirty scans the single-shot multivibrator 1288 will not be allowed to produce an output signal. This is necessary of course since it is not desired to indicate an uncertainty condition if character signals are occurring within the proper frequency. However, if more than one character signal occurs it will be remembered that this is detected in the input to the double inverter 1271. In the event more than one character signal is detected within a ten scan period, the output of the double inverter 1271 will be a negative going voltage and turn the trigger 1272 ON. Thus, the output from the right side of the trigger will be relatively positive and when the trailing edge of the ten scan signal produced by the single-shot multivibrator 1235 initiates a three scan pulse from the single-shot multivibrator 1276, the switch 1273 will receive relatively positive inputs and will supply an output signal to the cathode follower 1274 indicating an UNCERTAINTY. That is, two signals representing different characters have been produced within ten scans of one another.

Referring again to FIG. 46a, the circuit will now be described for producing the final output signal representing the valid identity of a character. It will be remembered that each of the triggers 1238 through 1251 is connected to a different one of the character identity input lines. The outputs from the right sides of triggers 1238 through 1251 are supplied to switches 1330 through 1343, respectively. Each of the switches 1330 through 1343 is connected to receive the output from cathode followers 1278a and 1278b, this output serving as sample for the switches. It will be remembered that the output of cathode followers 1278a and 1278b will be relatively positive for three scans providing a character has been properly identified in one of the sequence circuits. Under these circumstances only one of the triggers 1238 through 1251 will be turned ON when the output of cathode followers 1278a and 1278b is relatively positive. Thus, an output will be produced from only one of the switches 1330 through 1343 to represent the character scanned.

The output signals from the switches 1330 through 1343 may be utilized in any desired manner. For example, they may be placed in storage for later use.

In the sequence circuits shown in FIGS. 31 through 44 for the G, H and J CODING signals produced in FIGS. 22a, 22b, 23a, 23b, 24a and 24b, the single-shot multivibrators of the type TR7 were described as producing a relatively positive output signal which lasted for either three or four scans following the last input thereto. That is, the value of the RC network in the single-shot multivibrators was adjusted to be such that the single-shot multivibrators would not revert to their OFF condition until either three or four scans following the last input thereto. The use of these time periods was chosen for use with a particular type of character. To be specific, all of the sequences described are those used to recognize characters produced by the type 719 Wire Printer manufactured by International Business Machines Corporation. These characters are formed from a 5 x 7 matrix of black dots, each character comprising a number of black dots which are positioned in a manner to present the appearance of a character.

There may be circumstances in scanning even the wire printed characters where it is desirable to alter the time duration of the single-shot multivibrators of the type TR7. For example, there may be conditions where it is necessary to vary the time durations from those described. If a character appears in a somewhat degraded form, the information expected to occur within a three scan period may not appear until the fourth scan. Therefore, it is necessary to make whatever changes in the sequence circuits which may be required by the characters being scanned. If characters of other type fonts are scanned, other sequence circuits may be required. Thus, the sequence circuits which have already been described are meant to be illustrative only.

It will be remembered that under certain circumstances it is desirable to scan the characters in vertical scans which move from the bottom of the character to the top thereof, the successive scans progressing from left to right across the character. This was the reason that in FIGS. 23a and 23b an arrangement was shown for producing K coding signals. That is, the K CODING signals are used rather than the H CODING signals when the characters are scanned in the manner just described. However, in scanning the characters in this fashion, it is necessary to use a different group of sequence circuits. In the G CODING circuits shown in FIGS. 22a and 22b, as well as the J CODING circuits shown in FIGS. 24a and 24b, outputs will be produced according to the definitions previously described.

The sequence circuits for recognizing characters according to the G, K and J CODING arrangements are illustrated in FIGS. 51 through 60, the last digit in each figure number representing the character identified in that circuit.

Figure 51:
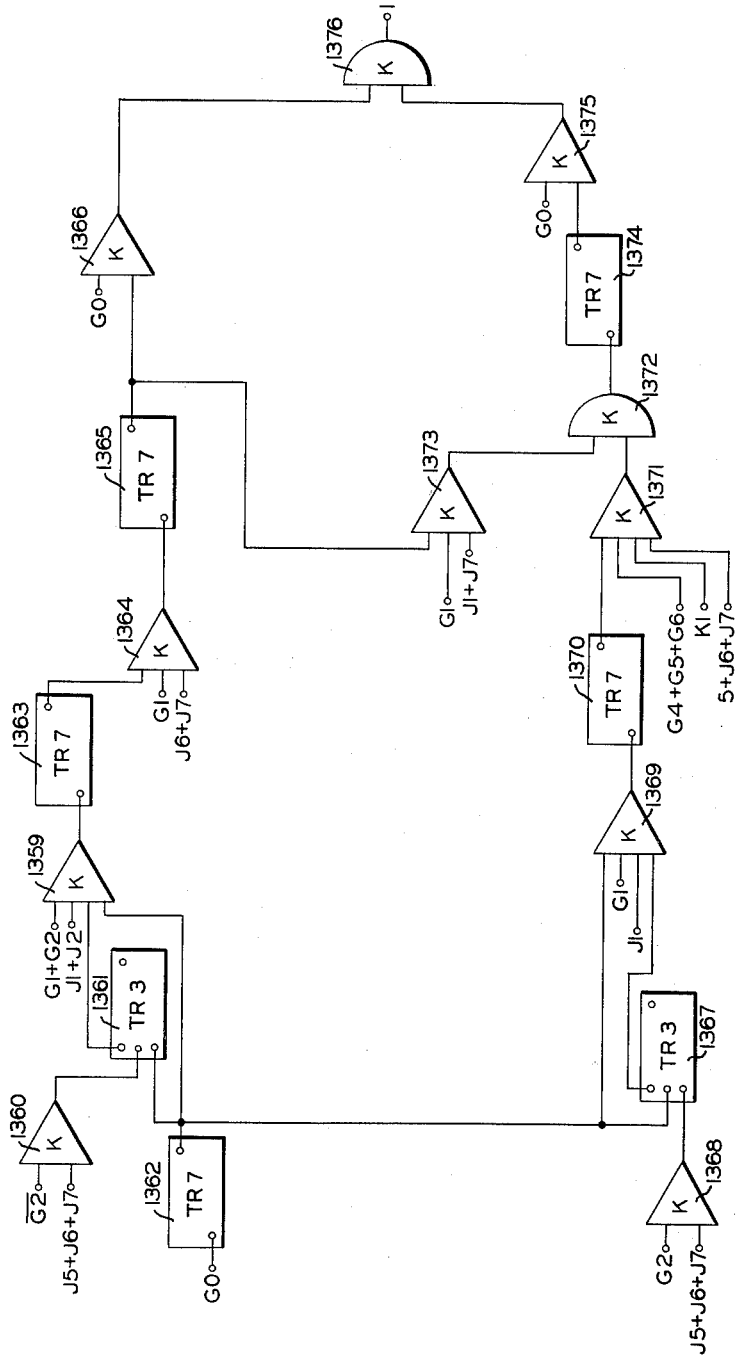

Reference is made to FIG. 51 which discloses the logical circuitry utilized to identify the character "1" for the G, K and J CODING signals.

There is provided a switch 1359 which is connected to receive the normally relatively positive output from trigger 1361, signals representing $G1+G2$, $J1+J2$, and the output of a single-shot multivibrator 1362. It is required that switch 1359 receive relatively positive inputs in coincidence in order to supply a relatively positive output to a single-shot multivibrator 1363. Thus, it is required that single-shot multivibrator 1362 receive an input signal representing G0, and that within four scans from the last G0 signal, signals representing $G1+G2$ and $J1+J2$ must be received in coincidence at switch 1359. In addition, trigger 1361 must not receive signals representing $\overline{G2}$ and $J5+J6+J7$ until after this switch has produced an output. Should trigger 1361 receive an output from switch 1360 before an output is supplied from switch 1359 it is seen that trigger 1361 will be turned ON, providing of course that the single-shot multivibrator 1362 is ON, and thus the output of trigger 1361 will go relatively negative and inhibit switch 1359.

The single-shot multivibrator 1363 is adapted to supply an output signal to a switch 1364, this output signal being relatively positive for four scans following the last input thereto from the switch 1359.

Other signals required by the switch 1364 in order to produce an output to a single-shot multivibrator 1365 are signals representing G1 and $J6+J7$. The single-shot multivibrator 1365 is arranged to produce an output signal which will last for four scans following the last input signal thereto from the switch 1364. The output of this single-shot multivibrator is supplied to a switch 1366 which must receive in addition a signal representing G0. If the two inputs to the switch 1366 are relatively positive in coincidence, an output signal will be supplied therefrom through an OR circuit 1376 to represent the character "1."

There is an alternative path for producing an output signal representing the character "1." This path is by way of a switch 1369 which is adapted to receive signals representing G1 and J1 and in addition the outputs of single-shot multivibrator 1362 and trigger 1367. If signals representing G1 and J1 are received by switch 1369 in coincidence while the single-shot multivibrator 1362 is supplying a relatively positive output potential, and before signals representing G2 and $J5+J6+J7$ are supplied in coincidence to switch 1368, an output signal will be supplied from switch 1369 to the single-shot multivibrator 1370. In other words, signals representing G1 and J1 must occur in coincidence within four scans from the last G0 signal but before signals representing G2 and $J5+J6+J7$ occur in coincidence. Should switch 1368 produce an output signal to trigger 1367 while it is receiving the relatively positive output from the single-shot multivibrator 1362, trigger 1367 will be turned ON and inhibit switch 1369. If all of the inputs to the switch 1369 are relatively positive in coincidence, an output signal is supplied therefrom to a single-shot multivibrator 1370. This single-shot multivibrator is adapted to supply a relatively positive output signal to a switch 1371 which will last for three scans following the last input thereto from the switch 1369. Within these three scans signals representing $G4+G5+G6$, K1, and $J5+J6+J7$ are required to occur in coincidence. The output from the switch 1371 is supplied through an OR circuit 1372 to a single-shot multivibrator 1374.

An alternate way of getting an input to the single-shot multivibrator 1374 is by way of a switch 1373. That is, if switch 1373 is still receiving a relatively positive input from the single-shot multivibrator 1365, and also receiving signals representing G1 and $J1+J7$, an output signal will be supplied therefrom through the OR circuit 1372 to the single-shot multivibrator 1374. A relatively positive signal will be supplied from the single-shot multivibrator 1374 which will last for three scans following the last input thereto from the OR circuit 1372. If within these three scans a switch 1375 receives a signal representing G0, an output signal will be supplied from the switch 1375 through the OR circuit 1376 to produce a signal representing the character "1".

Figure 52:
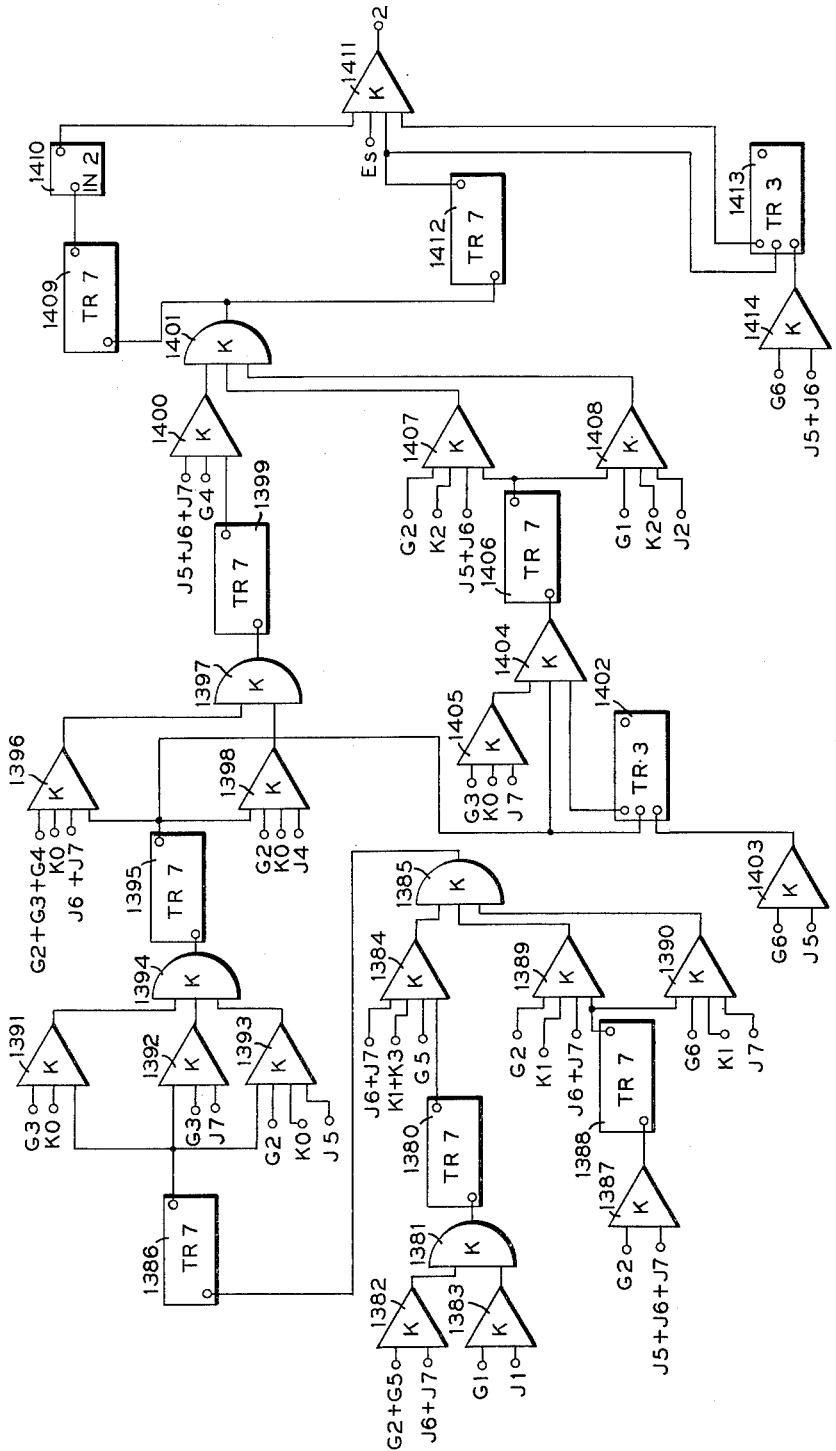

Reference is now made to FIG. 52 which discloses the logical circuit utilized to recognize the character "2". There is provided a single-shot multivibrator 1380 which is adapted to produce a relatively positive output signal for a period of three scans following the last input thereto from the OR circuit 1381. There are two paths for supplying an input to the OR circuit 1381. The first path is from a switch 1382 which is adapted to receive signals representing $G2+G5$ and $J6+J7$. The second path for producing an input to the OR circuit 1381 is from a switch 1383 which is adapted to receive signals representing G1 and J1.

The output of the single-shot multivibrator 1380 is supplied to a switch 1384 which also is adapted to receive signals representing G5, $K1+K3$, and $J6+J7$. If all of the inputs to the switch 1384 are relatively positive in coincidence, an output signal is supplied therefrom through an OR circuit 1385 to a single-shot multivibrator 1386 which produces a relatively positive output signal for four scans following the last input signal thereto from the OR circuit 1385.

There are other ways of producing an input to the OR circuit 1385. A switch 1387 is provided which is adapted to receive signals representing G2 and $J5+J6+J7$. The output of the switch 1387 is supplied to a single-shot multivibrator 1388 which is adapted to produce a relatively positive output signal for three scans following the last input thereto from the switch 1387. A switch 1389 is adapted to receive the output of the single-shot multivibrator 1388 and in addition signals representing G2, K1 and $J6+J7$. Thus, if all of the input signals to the switch 1389 are relatively positive in coincidence, an output signal will be supplied to the OR circuit 1385. Alternatively, if while the trigger 1388 is supplying a relatively positive output signal, signals representing G6, K1, and J7 are supplied to a switch 1390, an output will be supplied from the switch to the OR circuit 1385.

As previously mentioned, the single-shot multivibrator 1386 will supply a relatively positive output voltage therefrom which will last for four scans following the last input thereto from the OR circuit 1385. If within these four scans signals representing G3 and K0 are supplied to a switch 1391, or signals representing G3 and J7 are supplied to a switch 1392, or signals representing G2, K0 and J5 are supplied to a switch 1393, a signal will be supplied through the OR circuit 1394 to a single-shot multivibrator 1395. This single-shot multivibrator will produce a relatively positive output signal to the switches 1396 and 1398 for four scans following the last input thereto from the OR circuit 1394. If within this period of time signals representing $G2+G3+G4$, K0, and $J6+J7$ are supplied to the switch 1396 in coincidence, an output signal is supplied therefrom through the OR circuit 1397 to a single-shot multivibrator 1399. Alternatively, if within the four scan period signals representing G2, K0 and J4 are supplied to the switch 1398, an output is supplied from the switch through the OR circuit 1397 to the single-shot multivibrator 1399. This single-shot multivibrator is adapted to supply an output signal which is relatively positive for four scans following the last input thereto from the OR circuit 1397. If within these four scans, signals representing G4 and $J5+J6+J7$ are supplied to the switch 1400, an output signal will be supplied from the switch through the OR circuit 1401 to single-shot multivibrators 1409 and 1412.

An alternative path for supplying an input to OR circuit 1401 is from a switch 1404 which is connected to receive the output from the single-shot multivibrator 1395 and the normally positive output from the trigger 1402. Another input to switch 1404 comes from the switch 1405 which receives signals representing G3, K0 and J7. A switch 1403 is connected to receive signals representing G6 and J5. Thus, in order for switch 1404 to produce an output, it is required that switch 1405 produce an output while the single-shot multivibrator 1395 is supplying a relatively positive output potential but before switch 1403 produces an output. That is, if switch 1403 supplies an input to trigger 1402 while it is receiving a relatively positive input from the single-shot multivibrator 1395, trigger 1402 will be turned ON and inhibit switch 1404.

If all of the inputs to the switch 1404 are relatively positive in coincidence, an output signal is supplied to a single-shot multivibrator 1406 which will produce a relatively positive output voltage which will last for four scans following the last output from the switch 1404. If within these four scans, signals representing G2, K2 and $J5+J6$ are supplied to a switch 1407 or signals representing G1, K2, and J2 are supplied to a switch 1408, OR circuit 1401 will receive an input signal.

The single-shot multivibrators 1409 is adapted to produce an output signal which will last for two scans following the last output signal from the OR circuit 1401. The output of the single-shot multivibrator 1409 is supplied through an inverter 1410 to a switch 1411. Another input required by the switch 1411 is the end of scan signal Es. Still another signal required by the switch 1411 is supplied from a single-shot multivibrator 1412 which will produce a signal of three scans duration following the last output from the OR circuit 1401. Thus, the single-shot multivibrator 1412 will supply a relatively positive output for one scan after the single-shot multivibrator terminates its relatively positive output. It is seen that trigger 1413 normally supplies a relatively positive output to the switch 1411. However, should trigger 1413 receive an input from a switch 1414, which receives signals representing G6 and $J5+J6$, while it is receiving a relatively positive input from the single-shot multivibrator 1412, it will be turned ON and supply a relatively negative voltage to inhibit switch 1411. Thus, switch 1411 must produce its output before trigger 1413 is turned ON, this output representing the character "2".

Figure 53:
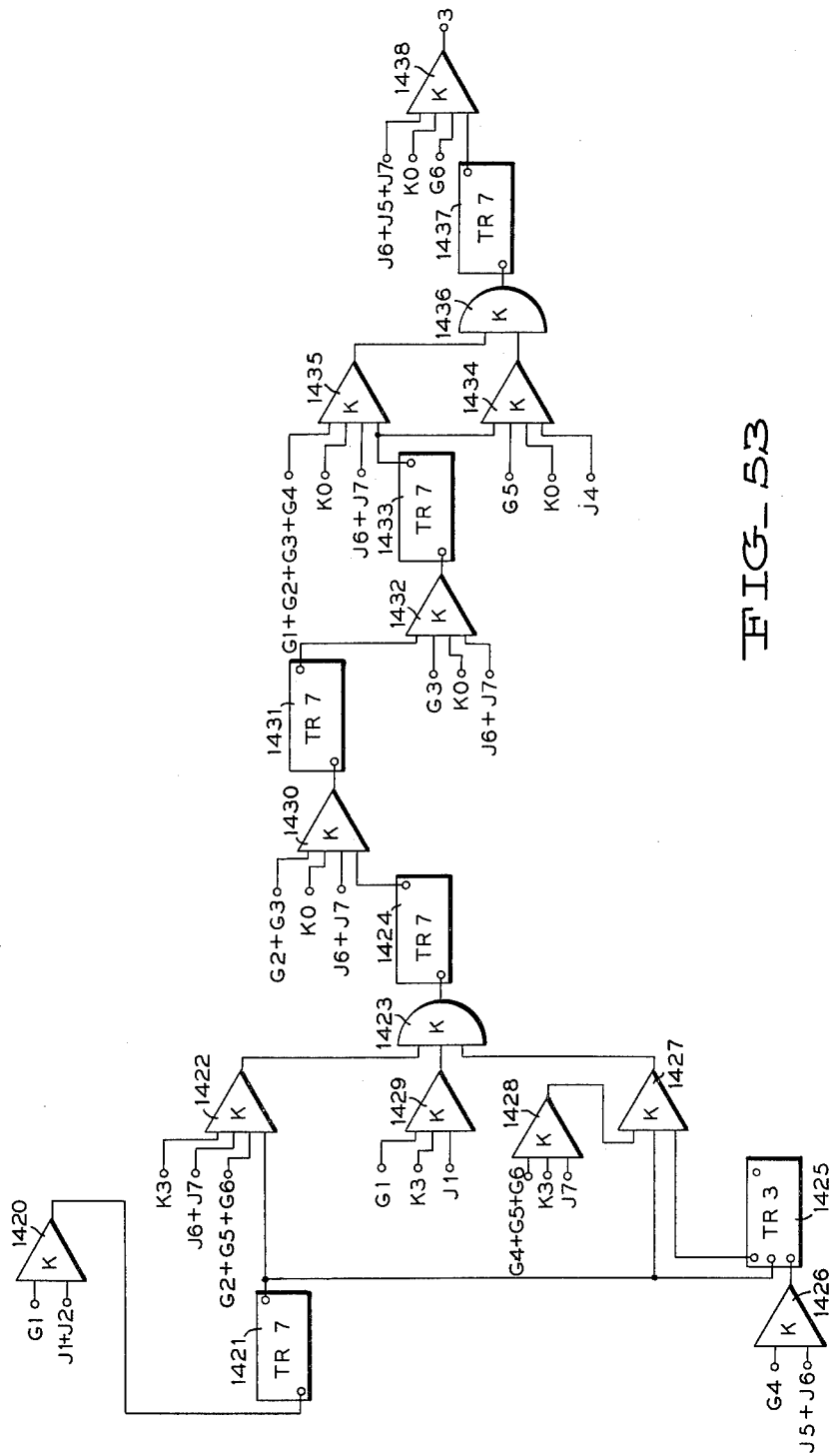

Reference is now made to FIG. 53 which discloses the logical circuitry utilized to identify the character "3." There is provided a switch 1420 which is adapted to receive signals representing G1 and $J1+J2$ and supply an input signal to a single-shot multivibrator 1421. This single-shot multivibrator will produce a relatively positive output signal which will last for four scans following the last input thereto from the switch 1420. If within these four scans signals representing $G2+G5+G6$, K3, and $J6+J7$ are supplied in coincidence to the switch 1422, an output signal will be supplied from this switch through the OR circuit 1423 to a single-shot multivibrator 1424. Alternatively, the single-shot multivibrator 1424 may receive an input signal from the OR circuit 1423 providing switch 1429 receives signals representing G1, K3 and J1 in coincidence within the aforementioned four scan period.

There is provided a trigger 1425 which is adapted to receive the output of the single-shot multivibrator 1421 as a gating signal. If after this gating signal is produced, an output signal is provided from the switch 1426 representing the fact that G4 and $J5+J6$ have occurred in coincidence, a relatively negative signal will be supplied from the trigger 1425 to the switch 1427, thereby inhibiting the switch. This output signal will terminate as soon as the output signal of the single-shot multivibrator 1421 terminates. However, as soon as the last-mentioned output signal terminates, switch 1427 will be inhibited. This means that in order for switch 1427 to produce an output signal it must receive an input signal from switch 1428, which receives signals representing $G4+G5+G6$, K3 and J7, before the relatively positive output from the single-shot multivibrator 1421 terminates, and in addition, before switch 1426 supplies an input to the trigger 1425. If all of the inputs to the switch 1427 are relatively positive in coincidence, an output signal will be supplied from the switch through the OR circuit 1423 to the single-shot multivibrator 1424.

The output of the single-shot multivibrator 1424 will be relatively positive for three scans following the last input thereto from the OR circuit 1423. If within these three scans signals representing $G2+G3$, K0, and $J6+J7$ are supplied in coincidence to a switch 1430, an output signal will be supplied from this switch to a single-shot multivibrator 1431. If within the three scans following the last output signal from the switch 1430 to the single-shot multivibrator 1431, signals representing G3, K0 and $J6+J7$ are supplied to the switch 1432, an output signal will be supplied from the switch to a single-shot multivibrator 1433. This single-shot multivibrator will produce an output signal which will last for three scans following the last input thereto from the switch 1432. If within these three scans, signals representing $G1+G2+G3+G4$, K0 and $J6+J7$ are supplied to a switch 1435, an output signal will be supplied from the switch 1435 through the OR circuit 1436 to a single-shot multivibrator 1437. Alternatively, if within these three scans signals representing G5, K0 and J4 are supplied to the switch 1434, an output will be supplied from the switch 1434 through the OR circuit 1436 to the single-shot multivibrator 1437.

The single-shot multivibrator 1437 will supply an output signal which will be relatively positive for three scans following the last input thereto from the OR circuit 1436. If within these three scans signals representing G6, K0, and $J5+J6+J7$ are supplied to the switch 1438 in coincidence, an output signal representing the character "3" will be produced.

Figure 54:
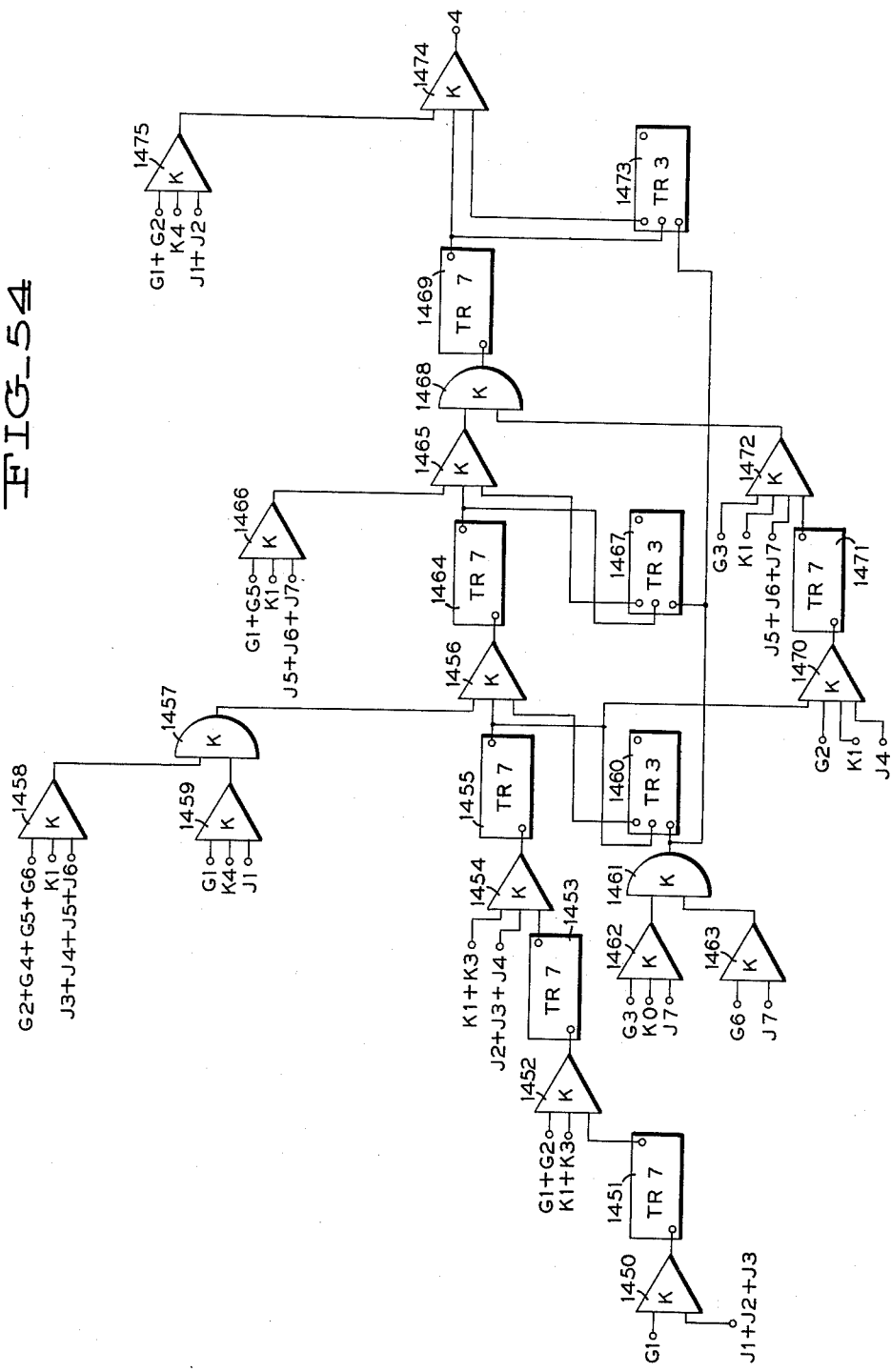

Reference is now made to FIG. 54 which discloses the logical circuitry utilized to identify the character "4." There is provided a switch 1450 which will supply a signal to a single-shot multivibrator 1451 providing signals representing G1 and $J1+J2+J3$ occur in coincidence. The output of the single-shot multivibrator 1451 will be relatively positive for three scans following the last input thereto from the switch 1450. If within these three scans signals representing $G1+G2$ and $K1+K3$ are supplied to the switch 1452, an output signal is supplied from the switch to a single-shot multivibrator 1453.

The single-shot multivibrator 1453 is adapted to supply a relatively positive output signal which will last for four scans following the last input thereto from the switch 1452. If within these four scans signals representing $K1+K3$ and $J2+J3+J4$ are supplied to the switch 1454, an output signal will be supplied therefrom to a single-shot multivibrator 1455. The output of this single-shot multivibrator will be relatively positive for a period of four scans following the last input thereto from the switch 1454. A switch 1456 is adapted to receive the output of the single-shot multivibrator 1455 as well as an input from an OR circuit 1457. This OR circuit may receive signals from switch 1458 representing the fact that the signals $G2+G4+G5+G6$, K1 and $J3+J4+J5+J6$ have occurred in coincidence, or a switch 1459 which represents the fact that signals G1, K4 and J1 have occurred in coincidence. Another input required by the switch 1456 comes from a trigger 1460 which receives a gate signal from the single-shot multivibrator 1455. If after the gate signal is supplied to the trigger 1460, it also receives a signal from the OR circuit 1461, it will inhibit switch 1456. The OR circuit 1461 may receive an input from a switch 1462 providing this switch receives in coincidence signals representing G3, K0 and J7. If switch 1463 receives signals representing G6 and J7 in coincidence an output will be supplied from this switch to the OR circuit 1461. Thus, it is seen that switch 1456 must produce its output by receiving an input from OR circuit 1457 in coincidence with the relatively positive output from the single-shot multivibrator 1455 before trigger 1460 is turned ON.

If all of the inputs to the switch 1456 are relatively positive in coincidence, an output is supplied therefrom to a single-shot multivibrator 1464 which will produce a relatively positive output signal for four scans following the last input thereto from the switch 1456. Another input required by the switch 1465 is supplied from a switch 1466 which receives signals representing $G1+G5$, K1 and $J5+J6+J7$. The remaining input to the switch 1465 is from a trigger 1467 which is adapted to receive the output of the single-shot multivibrator 1464 as a gate signal, as well as the output of the OR circuit 1461. Here again, switch 1465 must produce its output before trigger 1467 is turned ON, or else trigger 1467 will inhibit the switch. If all of the inputs to the switch 1465 are relatively positive in coincidence, an output signal is supplied through the OR circuit 1468 to a single-shot multivibrator 1469.

There is an alternative way of producing an input to the OR circuit 1468. There is provided a switch 1470 which is adapted to receive the output of the single-shot multivibrator 1455 as well as signals representing G2, K1 and J4. If all of the inputs to the switch 1470 are relatively positive in coincidence, an input will be supplied to a single-shot multivibrator 1471 which will produce a relatively positive output signal which will last for four scans following the last input thereto from the switch 1470. If within these four scans signals representing G3, K1 and $J5+J6+J7$ are supplied to the switch 1472, an output signal will be supplied from the switch through the OR circuit 1468 to the single-shot multivibrator 1469.

The output of the single-shot multivibrator 1469 will be relatively positive for four scans following the last input thereto from the OR circuit 1468. A switch 1474 is adapted to receive the output of this single-shot multivibrator 1469 and in addition is adapted to receive a signal from the trigger 1473. This trigger receives the output of the single-shot multivibrator 1469 as the gate signal therefrom and also is adapted to receive a signal from the OR circuit 1461. It is seen that trigger 1473 will supply a relatively positive input signal to switch 1474 only if it is not turned ON. This means that switch 1474 must receive an input from switch 1475, which receives signals representing $G1+G2$, K4 and $J1+J2$, while the single-shot multivibrator 1469 is still supplying a relatively positive output, and before trigger 1473 can be turned ON by receiving the output of OR circuit 1461 in coincidence with the relatively positive output from the single-shot multivibrator 1469. The output of the switch 1474 will be representative of the character "4."

Figure 55:
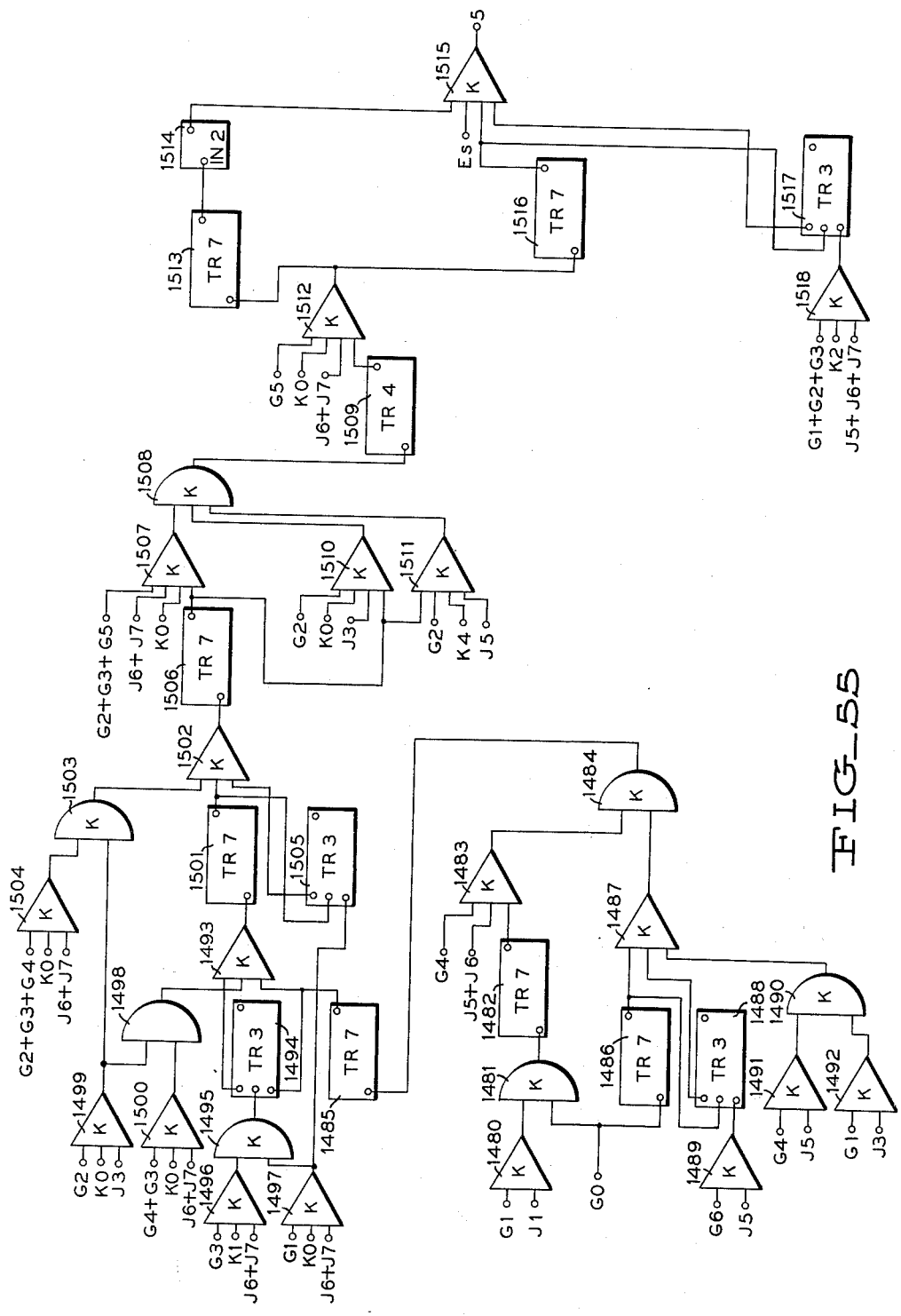

Reference is now made to FIG. 55 which discloses the logical circuit utilized to identify the character "5." There is provided a switch 1480 which is adapted to receive signals representing G1 and J1 and to produce an output signal to an OR circuit 1481. The remaining input to this OR circuit is a signal representing G0. The output of the OR circuit 1481 is supplied to a single-shot multivibrator 1482 which is adapted to produce a relatively positive output signal which will last for three scans following the last output from the OR circuit 1481. Within these three scans signals representing G4 and $J5+J6$ must be supplied to a switch 1483 in order for an output to be supplied from the switch. An OR circuit 1484 is adapted to receive the output of the switch 1483 to supply an input to a single-shot multivibrator 1485.

There is an alternative way of producing an input to the single-shot multivibrator 1485 which includes a single-shot multivibrator 1486 which is connected to receive the signal representing G0 as its input. The output of a single-shot multivibrator 1486 will be relatively positive for three scans following the last signal representing G0 which is produced. The output of the single-shot multivibrator is supplied directly to a switch 1487 and also serves as the gate input to a trigger 1488. The signal input to the last-mentioned trigger is by way of a switch 1489 which is arranged to receive signals representing G6 and J5. Trigger 1488 will supply a relatively positive output only so long as it is not turned ON by a coincidence of outputs from the single-shot multivibrator 1486 and the switch 1489. Another input to the switch 1487 is received from the OR circuit 1490. This OR circuit may receive an input from a switch 1491 which is connected to receive signals representing G4 and J5, or from a switch 1492 which is connected to receive signals representing G1 and J3. Thus, switch 1487 will produce an output only if it receives an input from OR circuit 1490 while the single-shot multivibrator 1486 is supplying a relatively positive output signal, and before trigger 1488 receives an input from switch 1489. The output of the switch 1487 is supplied through the OR circuit 1484 to the single-shot multivibrator 1485. This single-shot multivibrator will supply a relatively positive output signal which will last for four scans following the last output of the OR circuit 1484.

A switch 1493 is adapted to receive the output from the single-shot multivibrator 1485 and will also receive an input from a trigger 1494. This trigger receives the output of the single-shot multivibrator 1485 as the gating signal and the output of an OR circuit 1495 as its second input signal. OR circuit 1495 may receive an input signal from a switch 1496 or a switch 1497. Switch 1496 is adapted to receive signals representing G3, K1 and $J6+J7$ while switch 1497 is adapted to receive input signals representing G1, K0 and $J6+J7$. Thus, trigger 1494 will supply a relatively positive input to switch 1493 only so long as it is not turned ON by receiving the gating signal from the single-shot multivibrator 1485 and a second input from the OR circuit 1495 in coincidence. A third input required by the switch 1493 is supplied from the OR circuit 1498. This OR circuit is adapted to receive an input from a switch 1499 or from a switch 1500. Switch 1499 receives signals representing G2, K0 and J3 while switch 1500 receives signals representing $G3+G4$, K0 and $J6+J7$. Thus, switch 1493 must receive an input from OR circuit 1498 while the single-shot multivibrator 1485 is supplying a relatively positive output and before trigger 1494 is turned ON.

If all of the inputs to switch 1493 are relatively positive in coincidence, an output is supplied to a single-shot multivibrator 1501 which produces a relatively positive output signal which lasts for three scans following the last input thereto from the switch 1493. Switch 1502 is adapted to receive the output from the single-shot multivibrator 1501 and also receives an input from a trigger 1505. If switch 1497 supplies a signal input to the trigger 1505 during the time that the trigger 1505 is receiving an input from the single-shot multivibrator 1501, the trigger 1505 will supply an output to the switch 1502 which will inhibit the switch until the relatively positive output signal from the single-shot multivibrator 1501 ends. Another input required by the switch 1502 is supplied from an OR circuit 1503 which may receive input signals from the switch 1499 or 1504. Switch 1499 has already been described. Switch 1504 is adapted to receive signals representing $G2+G3+G4$, K0 and $J6+J7$.

If all of the inputs to the switch 1502 are relatively positive in coincidence, an output is supplied to a single-shot multivibrator 1506 which is adapted to supply a relatively positive output signal which lasts for three scans following the last input from the switch 1502. If within these three scans, a switch 1507 receives signals representing $G2+G3+G5$, K0 and $J6+J7$, an output will be supplied from the switch 1507 through an OR circuit 1508 to a single-shot multivibrator 1509. Alternatively, if within the three scans a switch 1510 receives signals representing G2, K0 and J3, an output will be supplied from this switch through the OR circuit 1508 to the single-shot multivibrator 1509. A third manner of obtaining an input to the OR circuit 1508 is from a switch 1511. This switch is connected to receive the output from the single-shot multivibrator 1506 as well as signals representing G2, K4 and J5.

The single-shot multivibrator 1509 will produce a relatively positive output signal which will last for three scans following the last input thereto from the OR circuit 1508. If within these three scans signals representing G5, K0 and J6+J7 are supplied to the switch 1512 an output will be supplied from this switch to each of the single-shot multivibrators 1513 and 1516.

The single-shot multivibrator 1513 produces an output signal which will last for two scans following the last input thereto from the switch 1512. The output of the single-shot multivibrator 1513 is supplied through an inverter 1514 to a switch 1515. Thus, switch 1515 will not receive a relatively positive voltage from the inverter 1514 until the end of the relatively positive output of single-shot multivibrator 1513. The single-shot multivibrator 1516 is adapted to supply a pulse which will last for three scans following the last input thereto from the switch 1512. Another input to the switch 1515 is supplied from a trigger 1517 which is adapted to receive a gating signal from the single-shot multivibrator 1516 and also another input signal from the switch 1518 which is connected to receive signals representing G1+G2+G3, K2, and J5+J6+J7. Trigger 1517 supplies a relatively positive output only when it is not turned ON by receiving a relatively positive input from the single-shot multivibrator 1516 and in coincidence therewith an input from switch 1518. The final input required by the switch 1515 is the end of scan signal Es. In the event all of the inputs to the switch 1515 are relatively positive in coincidence, an output signal representing the character "5" will be produced.

Figure 56:
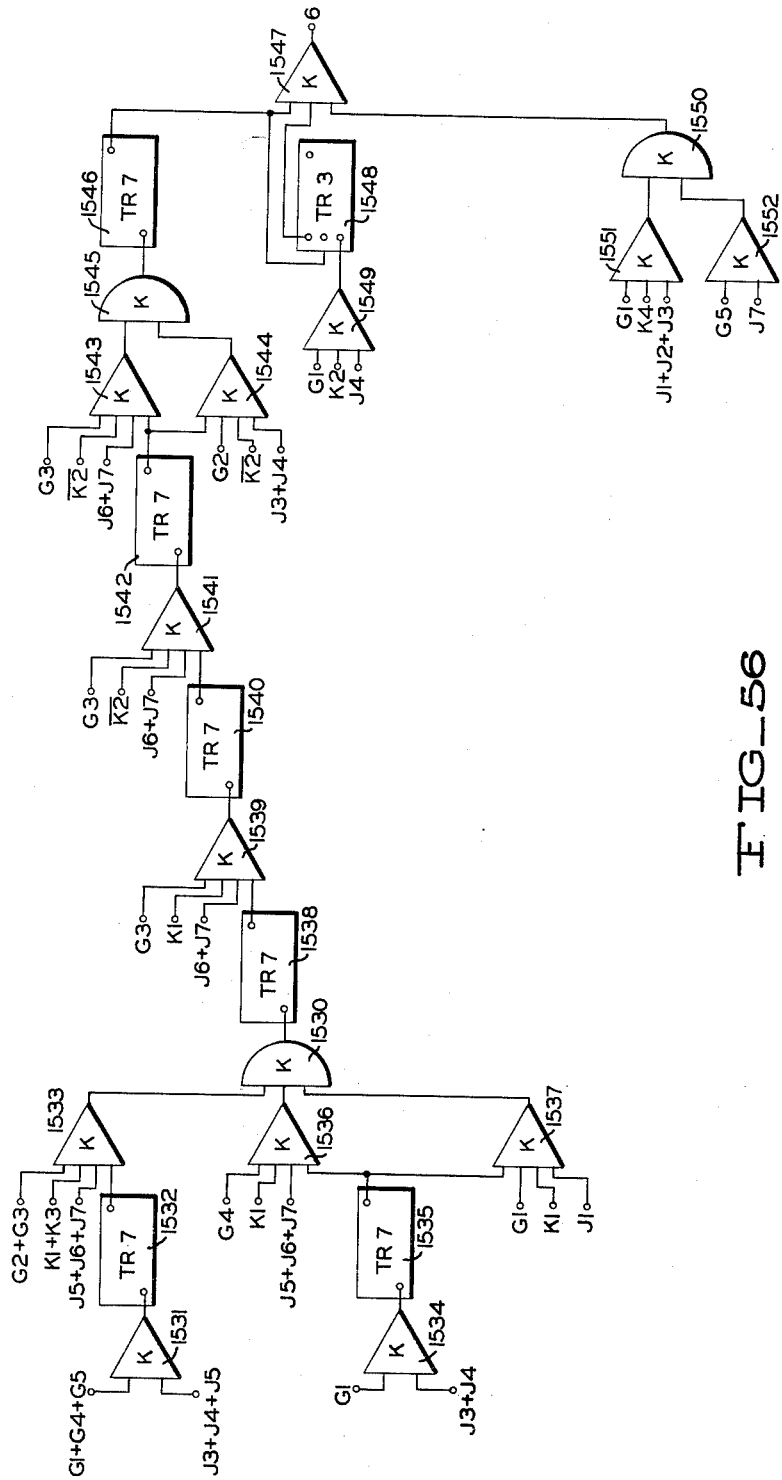

Reference is now made to FIG. 56 which discloses the logical circuitry utilized to identify the character "6". There is provided a switch 1531 which is adapted to receive signals representing G1+G4+G5 and J3+J4+J5. The output of the switch 1531 is supplied to a single-shot multivibrator 1532 which will produce a relatively positive output signal for three scans following the last input thereto from the switch 1531. If within these three scans, signals representing G2+G3, K1+K3, and J5+J6+J7 are supplied to the switch 1533, an ouput signal will be supplied from the switch to the OR circuit 1530.

Another input to the OR circuit 1530 is supplied by a circuit now to be described. There is provided a switch 1534 which is arranged to receive signals representing G1 and J3+J4. The single-shot multivibrator 1535 will produce a relatively positive output signal which will last for three scans following the last input thereto from the switch 1534. If within these three scans signals representing G4, K1 and J5+J6+J7 are supplied to the switch 1536, an output will be supplied from the switch to the OR circuit 1530. Alternatively, if during these three scans, signals representing G1, K1 and J1 are supplied through a switch 1537, an output will be supplied therefrom to the OR circuit 1530.

The output of the OR circuit 1530 is supplied to a single-shot multivibrator 1538 which is adapted to supply a relatively positive voltage for three scans following the last input thereto from the OR circuit 1530. If within these three scans, signals representing G3, K1 and J6+J7 are supplied to a switch 1539, an output signal is supplied from this switch to a single-shot multivibrator 1540. This single-shot multivibrator is adapted to produce an output signal which lasts for three scans following the last input thereto from the switch 1539. If within these three scans signals representing G3, $\overline{K2}$ and J6+J7 are received by a switch 1541, it will supply a relatively positive input signal to a single-shot multivibrator 1542. The single-shot multivibrator 1542 will produce a relatively positive output signal for three scans following the last input thereto from switch 1541. If within these three scans a switch 1543 receives signals representing G3, $\overline{K2}$ and J6+J7, or a switch 1544 receives signals representing G2, $\overline{K2}$ and J3+J4, an OR circuit 1545 will receive an input signal which will supply an output to a single-shot multivibrator 1546.

The output of the single-shot multivibrator 1546 will be relatively positive for three scans following the last input thereto from the OR circuit 1545. A switch 1547 is adapted to receive the output from the single-shot multivibrator 1546 and in addition is adapted to receive an output from the trigger 1548. This trigger receives the output of the single-shot multivibrator 1546 as its gating signal, and may also receive a signal from a switch 1549 which receives the signals G2, K2 and J4. The output of the trigger will be relatively positive only if it is not turned ON by receiving relatively positive inputs in coincidence. The final input to switch 1547 is supplied from an OR circuit 1550 which is adapted to receive an input from either of the switches 1551 or 1552. Switch 1551 will supply an input to the OR circuit 1550 providing it receives signals representing G1, K4 and J1+J2+J3 in coincidence. If signals representing G5 and J7 are supplied to the switch 1552 in coincidence, it will supply an output signal to the OR circuit 1550.

If all of the inputs to the switch 1547 are relatively positive in coincidence, an output signal representing the character "6" will be produced.

Figure 57:
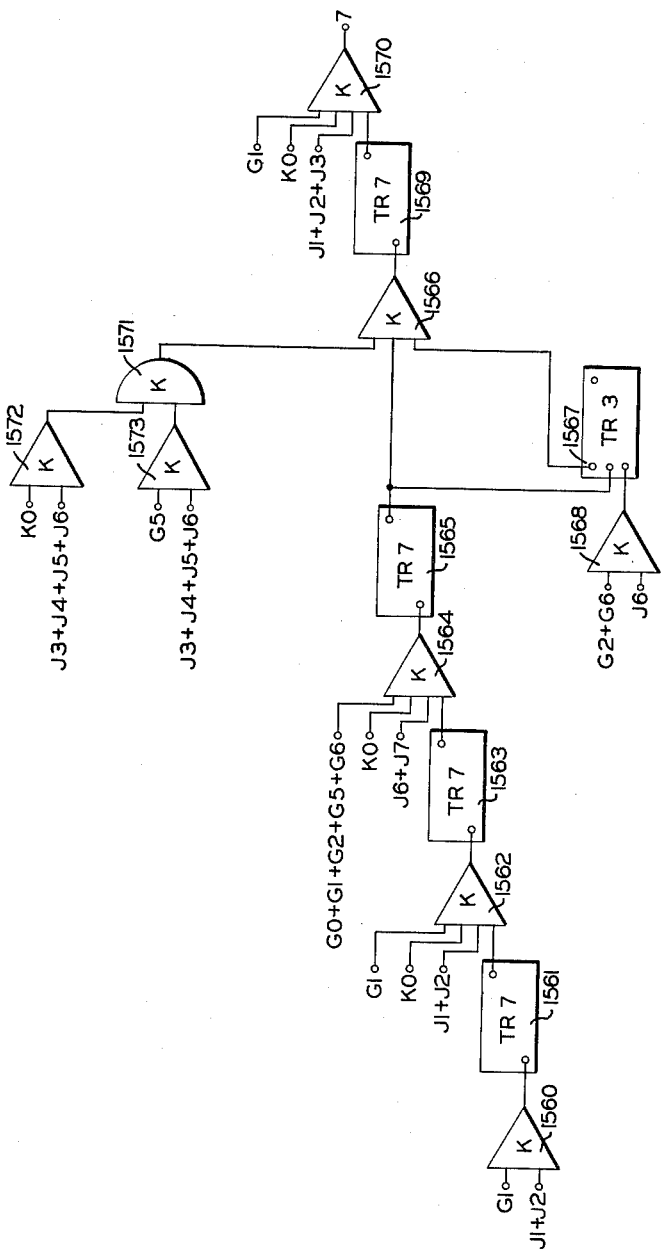

Reference is now made to FIG. 57 which discloses the logical circuitry utilized to identify the character "7". There is provided a switch 1560 which is adapted to receive signals representing G1 and J1+J2 so as to produce an output signal to a single-shot multivibrator 1561. The output of this single-shot multivibrator will be relatively positive for three scans following the last input thereto from the switch 1560. If within these three scans signals representing G1, K0 and J1+J2 are supplied to a switch 1562, an output signal will be supplied from the switch to the single-shot multivibrator 1563. This single-shot multivibrator is adapted to supply relatively positive output signals which will last for four scans following the last input therethrough from switch 1562. If within these four scans signals representing G0+G1+G2+G5+G6, K0 and J6+J7 are supplied to a switch 1564 in coincidence, an output signal will be supplied from the switch to a single-shot multivibrator 1565. This single-shot multivibrator will supply a relatively positive output signal for four scans following the last input thereto to the switch 1564. Switch 1566 is arranged to receive the output of the single-shot multivibrator 1565 as well as the output of a trigger 1567. The trigger 1567 receives its gating signal from the single-shot multivibrator 1565 and also receives a signal from the switch 1568. The last-mentioned switch will supply an output signal to the trigger providing it receives signals representing G2+G6 and J6. Trigger 1567 supplies a relatively positive input to switch 1566 only if it does not receive an input from switch 1568 while it is also receiving a relatively positive input from the single-shot multivibrator 1565. The final input required by the switch 1566 is supplied from an OR circuit 1571 which receives its input from switches 1572 and 1573. Switch 1572 is adapted to receive signals representing K0 and J3+J4+J5+J6. Switch 1573 is adapted to receive signals representing G5 and J3+J4+J5+J6.

If all of the inputs to the switch 1566 are relatively positive in coincidence, an output signal will be supplied to a single-shot multivibrator 1569 which will produce a relatively postive output signal for three scans following the last input thereto from the switch 1566. If within these three scans signals representing G1, K0 and J1+J2+J3 are supplied to a switch 1570, an output signal representing the character "7" will be produced.

Figure 58:
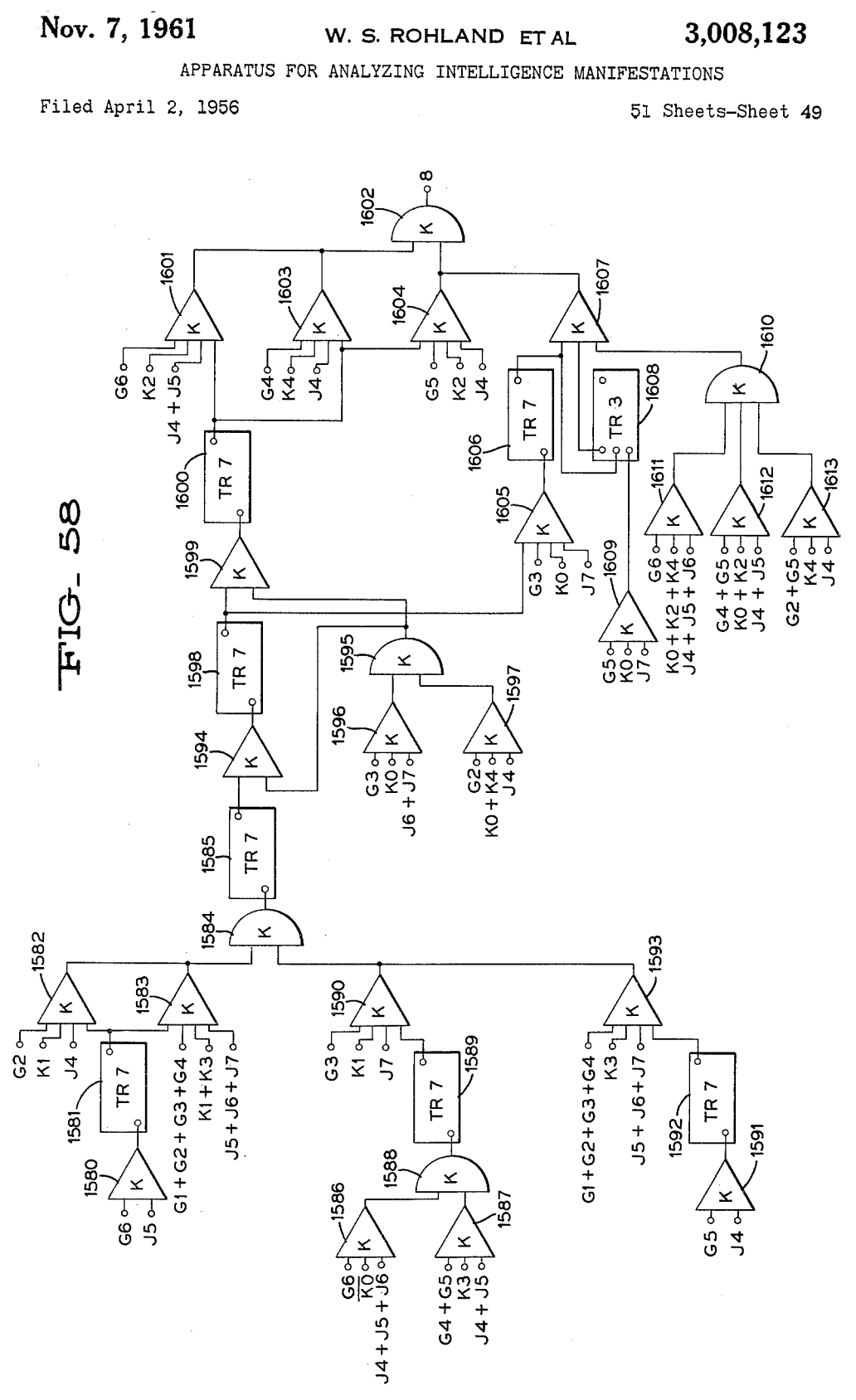

Reference is made to FIG. 58 which discloses the logical circuitry utilized to identify the character "8". There is provided a switch 1580 which is adapted to receive signals representing G6 and J5 so as to supply an output therefrom to a single-shot multivibrator 1581. This single-shot multivibrator will produce a relatively positive output voltage for four scans following the last input thereto from switch 1580. If within these four scans a switch 1582 receives signals representing G2, K1, and J4, an output signal will be supplied from the switch to an OR circuit 1584. Alternatively, if within these four scans signals representing $G1+G2+G3+G4$, $K1+K3$ and $J5+J6+J7$ are supplied to a switch 1583 in coincidence, an output signal will be supplied from this switch to the OR circuit 1584.

It is noted that OR circuit 1584 is adapted to receive another input. This input may arrive from one of two paths. The first path includes switch 1586 which is adapted to receive signals representing G6, $\overline{K0}$ and $J4+J5+J6$. If these signals occur in coincidence at the input of switch 1586, an output will be supplied therefrom to an OR circuit 1588. Alternatively, if signals representing $G4+G5$, K3 and $J4+J5$ are received in coincidence by a switch 1587, this switch will supply an input to the OR circuit 1588. The output of the OR circuit is supplied to a single-shot multivibrator 1589 which is adapted to supply a relatively positive output voltage which will last for four scans following the last input thereto from the OR circuit 1588. If within these four scans signals representing G3, K1 and J7 are received in coincidence by a switch 1590, an output signal will be supplied from this switch to the OR circuit 1584.

The second path for the second input to OR circuit 1584 includes a switch 1591 which will supply an input to a single-shot multivibrator 1592 providing it receives signals representing G5 and J4 in coincidence. If within the three scans after the last input to the single-shot multivibrator 1592, signals representing $G1+G2+G3+G4$, K3 and $J5+J6+J7$ are received by a switch 1593, an output will be supplied from this switch to the OR circuit 1584.

The output of the OR circuit 1584 is supplied to a single-shot multivibrator 1585 which is adapted to produce a relatively positive output voltage for three scans following the last input thereto from the OR circuit. A switch 1594 is adapted to receive the relatively positive output from the single-shot multivibrator 1585 and also a signal from the OR circuit 1595. This OR circuit will supply a relatively positive input signal to the switch 1594 providing it receives a signal from either of the switches 1596 or 1597. Switch 1596 will supply an input to the OR circuit providing it receives signals representing G3, K0 and $J6+J7$. Switch 1597 will supply an input signal to the switch 1595 providing it receives signals representing G2, $K0+K4$ and J4 in coincidence.

If the two inputs to the switch 1594 occur in coincidence, an output signal will be supplied therefrom to the single-shot multivibrator 1598. This single-shot multivibrator will supply a relatively positive output signal for three scans following the last input thereto from the switch 1594. A switch 1599 is adapted to receive the output of the single-shot multivibrator 1598 and in addition the output of the OR circuit 1595. Thus, if switch 1599 receives relatively positive signals in coincidence, it will supply an output signal to a single-shot multivibrator 1600. This single-shot multivibrator will supply a relatively positive output signal to each of the switches 1601, 1603, and 1604 for four scans following the last input thereto from the switch 1599. If within these four scans signals representing G6, K2 and $J4+J5$ are supplied to switch 1601, an output will be supplied from this switch to the OR circuit 1602 which will produce a signal representing the character "8". Alternatively, if within these four scans signals representing G4, K4 and J4 are received by the switch 1603, it will supply an output signal through the OR circuit 1602. Also, if within these four scans, signals representing G5, K2 and J4 are supplied to the switch 1604, an output signal will be supplied therefrom to the OR circuit 1602.

A switch 1605 is adapted to receive signals representing G3, K0 and J7 in addition to the relatively positive output from the single-shot multivibrator 1598. If all of the inputs to the switch 1605 are relatively positive in coincidence, a signal will be supplied therefrom to the single-shot multivibrator 1606. The output of this single-shot multivibrator will be relatively positive for four scans following the last input thereto from the switch 1605. A switch 1607 is adapted to receive the output from the single-shot multivibrator 1606 and in addition inputs from an OR circuit 1610 and a trigger 1608. OR circuit 1610 will supply a relatively positive input signal to the switch 1607 providing it receives a relatively positive input signal from one of the switches 1611, 1612 or 1613. Switch 1611 is adapted to receive signals representing G6, $K0+K2+K4$ and $J4+J5+J6$. Switch 1612 is adapted to receive signals representing $G4+G5$, $K0+K2$ and $J4+J5$. Switch 1613 is adapted to receive signals representing $G2+G5$, K4 and J4. It is noted that the trigger 1608 will supply a relatively positive signal to the switch 1607 only if it is not turned ON by receiving an input from the switch 1609 in coincidence with the relatively positive output signal from the single-shot multivibrator 1606. Switch 1609 is adapted to receive signals representing G5, K0 and J7.

If all of the inputs to the switch 1607 become relatively positive in coincidence, an output signal will be supplied therefrom through the OR circuit 1602 to produce a signal indicating the identity of the character "8."

Reference is made to FIG. 59 which discloses the logical circuitry utilized to identify the character "9." There is provided an OR circuit 1622 which is adapted to receive an input from either of the switches 1620 or 1621. Thus, if switch 1620 receives signals representing G1 and $J1+J2+J3$ in coincidence, or if switch 1621 receives signals representing G4 and $J4+J5$ in coincidence, an output signal will be supplied from the OR circuit 1622 to a single-shot multivibrator 1623. The output of the single-shot multivibrator 1623 will be relatively positive for four scans following the last input thereto from the OR circuit 1622. A switch 1624 is adapted to receive the relatively positive output from the single-shot multivibrator 1623. In addition, the switch 1624 is adapted to receive an output from the trigger 1625. This trigger will supply a relatively positive input signal to the switch 1624 providing it is not turned ON. However, this trigger can be turned ON by receiving an input from the OR circuit 1627 while it is receiving a relatively positive voltage from the single-shot multivibrator 1623.

OR circuit 1627 is adapted to receive an input from either of the switches 1626 or 1628. Switch 1626 is adapted to receive signals representing G5, K1 and J7 while switch 1628 is adapted to receive signals representing G6 and J5. An additional input required by the switch 1624 is received from an OR circuit 1629 which may receive an input from either of the switches 1630 or 1631. Thus, if signals representing $G3+G4$, K1 and J7 are supplied in coincidence to a switch 1630, or if signals representing G2, K1 and J4 are supplied to the switch 1631 in coincidence, an output signal will be supplied from the OR circuit 1629 to the switch 1624.

If all of the inputs to the switch 1624 are relatively positive in coincidence, an input signal will be supplied to a single-shot multivibrator 1632 to produce a relatively positive output signal which will last for four scans following the last input thereto from the switch 1624. If within these four scans signals representing G3, $K0+K1$ and $J6+J7$ are supplied to a switch 1633, or if signals representing G2, K0 and J4 are supplied in coincidence to a switch 1636, an input signal will be supplied to an OR circuit 1634.

The output of the OR circuit 1634 is supplied to a single-shot multivibrator 1635 which will produce a relatively positive output voltage for three scans following the last input thereto from the OR circuit 1634. If within these three scans, signals representing K0 and J5+J6 are received by a switch 1637, an input signal will be supplied to a single-shot multivibrator 1638. The output of this single-shot multivibrator will be relatively positive for four scans following the last input thereto from the switch 1637. If within these four scans signals representing G1, K0+K1+K2 and J3+J4+J5 are received in coincidence by the switch 1639, an output signal will be supplied therefrom to the OR circuit 1640.

Alternatively, if signals representing G2, K0 and J6 are received by the switch 1641 in coincidence with a relatively positive output voltage from the single-shot multivibrator 1635, an output signal will be supplied from the switch to a single-shot multivibrator 1642. This single-shot multivibrator is adapted to produce a relatively positive output voltage for four scans following the last input signal thereto from the switch 1641. If within these four scans signals representing G1, K2 and J2+J3+J4+J5 are received in coincidence by a switch 1643, or if signals representing G4+G5, K2 and J4 are received in coincidence by a switch 1644, an input signal will be supplied to the OR circuit 1640.

The output of the OR circuit 1640 is supplied to each of the single-shot multivibrators 1645 and 1646. The single-shot multivibrator 1645 is adapted to produce a relatively positive output signal for two scans following the last input thereto from the OR circuit 1640, this output signal being inverted in the inverter 1647 and supplied to a switch 1648 which also receives the END OF SCAN signal Es. It is seen, therefore, that switch 1648 will not receive a relatively positive input signal from the inverter 1647 until the end of the relatively positive voltage from the single-shot multivibrator 1645. On the other hand, the single-shot multivibrator 1646 is adapted to produce a relatively positive voltage for three scans following the last input thereto from the OR circuit 1640. The final input to the switch 1648 is from a trigger 1649 which will supply a relatively positive input to the switch providing it is not turned ON. This trigger can be turned ON by receiving a relatively positive voltage from the single-shot multivibrator 1646 in coincidence with an input from the switch 1650, the last-mentioned switch being adapted to receive signals representing G3 and K0.

If all of the inputs to the switch 1648 are relatively positive in coincidence, an output signal representing the character "9" will be produced.

Reference is made to FIG. 60 which discloses the logical circuitry utilized to identify the character "0." There is provided a switch 1660 which is adapted to receive signals representing G1+G4+G5 and J4+J5. If these signals occur in coincidence at the input of the switch 1660, a signal will be supplied therefrom through the OR circuit 1661 to the single-shot multivibrator 1662. Alternatively, if signals representing G1 and J6 are supplied to a switch 1663 in coincidence, a signal will be supplied therefrom through the OR circuit 1661 to the aforementioned single-shot multivibrator. A relatively positive voltage will be supplied from this single-shot multivibrator for four scans following the last input thereto from the OR circuit 1661. Thus, if within these four scans signals representing G2 and J6+J7 are received in coincidence by a switch 1664, or signals representing G4+G5+G6, K1 and J6+J7 are received in coincidence by a switch 1665, an OR circuit 1666 will receive an input signal and supply an output signal to a single-shot multivibrator 1667.

The output of the single-shot multivibrator 1667 will be relatively positive for three scans following the last input thereto from the OR circuit 1666. If within these three scans signals representing G2+G4+G5+G6, K0 and J6+J7 are received by a switch 1668, an output will be supplied from this switch to a single-shot multivibrator 1669. This single-shot multivibrator will produce a relatively positive output voltage for three scans following the last input thereto from the switch 1668. If within these three scans signals representing G2 and J6+J7 are received in coincidence by a switch 1670, an output will be supplied from the switch to an OR circuit 1671. If signals representing G1, K0 and J1 are received by a switch 1673 in coincidence during these three scans, an output signal will be supplied therefrom to the OR circuit 1671. As a third possibility, if signals representing G4+G5+G6, K0 and J7 are received in coincidence to a switch 1674 during this three scan period, an output signal will be supplied from the switch to the OR circuit 1671.

A single-shot multivibrator 1672 is adapted to receive the output of the OR circuit 1671 and will produce a relatively positive output signal for three scans following the last input thereto. If within these three scans signals representing G2 and J6+J7 are received in coincidence by a switch 1675, or signals representing G1+G4+G6, K0 and J6+J7 are received by the switch 1676 in coincidence, an OR circuit 1677 will receive an input signal.

The output of the OR circuit 1677 is supplied to a single-shot multivibrator 1678 which will produce a relatively positive output signal for four scans following the last input thereto from the OR circuit 1677. If within these four scans signals representing G1, K4 and J2+J3+J4+J5 are received by the switch 1679, or signals representing G1+G4+G5, K2 and J3+J4+J5+J6 are received by a switch 1680, an OR circuit 1681 will receive an input signal.

There is another path for supplying an input to the OR circuit 1681 which is by way of a switch 1682. This switch is adapted to receive the relatively positive output signal from the single-shot multivibrator 1672. If at the same time this switch receives signals representing G1, K2 and J5, it will supply a relatively positive output signal to the OR circuit 1681. The output from the OR circuit 1681 is representative of the character "0."

In order that a clearer understanding may be had relative to the operation of one of the sequencing circuits, reference is made to FIG. 49 which illustrates the signals produced at various points in FIG. 32 when scanning a typical character "2." The END OF SCAN pulses Es for seventeen scans are illustrated at the top of the diagram.

During the first scan through the character, none of the G, H or J CODING signals are produced. As illustrated, trigger 853 in FIG. 32 is not ON so that its output is relatively negative and produces a relatively positive output to switch 850 from inverter 851. Signals representing G4, H3 and J6 are produced during the second scan. Since switch 850 requires only G4 and J5+J6+J7, it will produce an output signal to initiate a relatively positive voltage from trigger 854. Switch 855 receives this voltage as well as signals representing G3, H1 and J7 at the end of the fourth scan and turns trigger 857 ON. When signals representing G3 and J7 are supplied to switch 870 at the end of the fifth scan, trigger 872 is turned ON. It is seen that since trigger 857 is ON during scans five through nine, additional G3 and J7 signals during scans six through nine will keep trigger 872 ON until scan fourteen.

When switch 873 receives signals representing G5, H0 and J7 during scan eleven, trigger 874 is turned ON. Thus, when signals representing G5 and J6 occur during scans twelve through fourteen, output signals representing the character "2" are supplied from OR circuit 876 during each of these scans.

Referring now to FIG. 50, there is illustrated a timing diagram of the operation of portions of the circuit shown in FIGS. 46a and 46b for the scans which follow the recognition of the character "2" in the manner described above. It was during scan twelve that the first output signal representing the character "2" was produced from OR circuit 876. This results in a relatively positive output signal from the single-shot multivibrator 1235 which lasts for ten scans. At the same time single-shot multivibrator 1236 supplies a gating signal of fourteen scans duration to trigger 1239 which causes this trigger to produce a relatively positive output voltage for the fourteen scans.

At the end of scan twenty-two, the output of the single-shot multivibrator 1235 goes negative, and by way of inverter 1275, causes single-shot multivibrator 1276 to generate a three scan sample pulse for switch 1331. Since trigger 1239 is also relatively positive at this time, an output signal of three scans duration is produced from switch 1331 representing the character "2."

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for sensing characters comprising scanning means for scanning a character in a plurality of scans and producing signature signals during each scan representing different sizes of a plurality of different characteristics detected during a scan, and sequence storage means connected to said scanning means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof under the control of a preceding combination of signature signals and producing an output signal representing the identity of the character scanned when a predetermined order of said combinations has been stored.

2. Apparatus for identifying characters comprising scanning means for scanning a character in a plurality of scans and producing signals during the intervals portions thereof are sensed, encoding circuit means connected to said scanning means and responsive to said signals for producing a plurality of signature signals representing different sizes of a plurality of characteristics of the character detected on each scan, and sequence storage means connected to said encoding means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof under the control of a preceding combination of signature signals and producing an output signal representing the identity of the character scanned when a predetermined order of said combinations has been stored.

3. Apparatus for interpreting successive sets of intelligence manifestations which form an entity whose identity is to be detected, each set comprising one or more manifestations of variable time duration, comprising scanning means for generating said manifestations, first timing means connected to said scanning means to receive said manifestations and detect which range of a plurality of ranges of time duration the duration of each manifestation within a set falls and producing a signal representing the range detected, second timing means connected to said scanning means to receive said manifestations for timing the occurrence of the first signal in a set with respect to the first signal in another set and producing a signal representing said timing relationship, third timing means connected to said scanning means to receive said manifestations and to detect in which of a plurality of ranges of time duration the time duration between the beginning of the first manifestation in a set and the ending of the last manifestation within a set and producing a signal representing the range detected falls, and sequence storage means connected to said first, second and third timing means to receive the signals from said first, second and third timing means, said sequence storage means comprising a plurality of series of cascade connected storage devices, one of each plurality for each character to be recognized, each of said storage devices providing an output for a predetermined time interval following the supply of an input signal thereto, for selectively storing representations of predetermined combinations of said signals under the control of a preceding combination of signals and producing an output signal representing the identity of the entity.

4. Apparatus for interpreting intelligence manifestations comprising scanning means for scanning said manifestations in a plurality of scans and producing signature signals during each scan representing different sizes of a plurality of different characteristics detected during a scan, a plurality of series of cascade connected storage means connected to said scanning means to receive said signature signals, each of said storage means having a signal input circuit, a control input circuit, and an output circuit, and effective to supply an output signal from said output circuit for a predetermined time interval following the supply of an input pulse to said input circuit, if said control circuit is concurrently energized, the arrangement being such that an output will be supplied from the output circuit of each storage means in a series to the control input circuit for the next storage means in a series for a predetermined time interval following the last input thereto, said storage means being connected to said scanning means to receive an input providing a predetermined combination of signature signals is supplied thereto during the time that its control input circuit is energized, and an output circuit for each of said plurality of series of cascade connected storage means and connected thereto for producing an output signal representing the identity of a manifestation for which a series of storage means is furnished.

5. Apparatus for sensing characters comprising scanning means for scanning a character in a plurality of scans and producing signature signals during each scan representing different characteristics detected during a scan, sequence storage means connected to said scanning means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combination thereof under the control of a preceding combination of signature signals and producing an output signal representing the identity of the character scanned when a predetermined order of said combinations has been stored, and checking circuit means connected to said sequence storage means to receive said output signals to detect the occurrence of at least two signals within a predetermined time which represent the identity of different characters.

6. Apparatus for sensing characters comprising scanning means for scanning a character in a plurality of scans and producing signature signals during each scan representing different sizes of a plurality of different characteristics detected during a scan, sequence storage means connected to said scanning means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof under the control of a preceding combination of signature signals and producing an output signal representing the identity of the character scanned when a predetermined order of said combinations has been stored, and checking circuit means connected to said sequence storage means to receive said output signals for detecting the occurrence of an abnormal spacing between the characters which were scanned to produce the signals.

7. Apparatus for identifying characters comprising scanning means for scanning a character in a plurality of scans and producing signals during the intervals portions thereof are sensed, encoding circuit means connected to said scanning means and responsive to said signals for producing a plurality of signature signals representing different sizes of a plurality of characteristics of the character detected on each scan, and sequence storage means connected to said encoding circuit means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof which occur in coincidence during a scan within a prescribed number of scans from the coincidence of a preceding combination of signature signals and producing an output signal representing the identity of the character scanned when a predetermined order to said combinations has been stored.

8. Apparatus for identifying each of a plurality of characters comprising scanning means for scanning a character in a plurality of scans and producing signals during the intervals portions thereof are sensed, encoding circuit means connected to said scanning means and responsive to said signals for producing a plurality of signature signals representing different sizes of a plurality of characteristics of the character detected on each scan, sequence storage means connected to said encoding circuit means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof under the control of a preceding combination of signature signals and producing output signals representing the identities of the characters scanned, and checking circuit means connected to said sequence storage means to receive said output signals for detecting the occurrence of more than one identity signal for one character which is scanned.

9. Apparatus for identifying each of a plurality of characters comprising scanning means for scanning a character in a plurality of scans and producing signals during the intervals portions thereof are sensed, encoding circuit means connected to said scanning means and responsive to said signals for producing a plurality of signature signals representing different sizes of a plurality of characteristics of the character detected on each scan, sequence storage means connected to said encoding circuit means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof under the control of a preceding combination of signature signals and producing output signals representing the identities of the characters scanned, and means connected to receive said output signals for detecting the fact that a character identity signal is not provided for a character signal which has been scanned.

10. Apparatus for interpreting successive sets of intelligence manifestations which form an entity whose identity is to be detected, each set comprising one or more manifestations of variable time duration, comprising scanning means for generating said manifestations, first timing means connected to said scanning means to receive said manifestations and detect which range of a plurality of ranges of time duration the duration of each manifestation within a set falls and producing a signal representing the range detected, second timing means connected to said scanning means to receive said manifestations for timing the occurrence of the first signal in a set with respect to the first signal in another set and producing a signal representing said timing relationship, third timing means connected to said scanning means to receive said manifestations and to detect in which of a plurality of ranges of time duration the time duration between the beginning of the first manifestation in a set and the ending of the last manifestation within a set and producing a signal representing the range detected falls, sequence storage means connected to said first, second and third timing means to receive the signals from said first, second and third timing means, said sequence storage means comprising a plurality of series of cascade connected storage devices, one of each plurality for each character to be recognized, each of said storage devices providing an output for a predetermined time interval following the supply of an input signal thereto, for selectively storing representations of predetermined combinations of said signals under the control of a preceding combination of signals and producing an output signal representing the identity of the entity, and checking circuit means connected to said timing means and responsive to predetermined ones of said signals from at least said first means for detecting the occurrence of sufficient information in the sets of intelligence manifestations to identify the entity.

11. Apparatus for interpreting successive sets of intelligence manifestations which form an entity whose identity is to be detected, each set comprising one or more manifestations of variable time duration, comprising scanning means for generating said manifestations, first timing means connected to said scanning means to receive said manifestations and detect which range of a plurality of ranges of time duration the duration of each manifestation within a set falls and producing a signal representing the range detected, second timing means connected to receive said scanning means to said manifestations for timing the occurrence of the first signal in a set with respect to the first signal in another set and producing a signal representing said timing relationship, third timing means connected to said scanning means to receive said manifestations and to detect in which of a plurality of ranges of time duration the time duration between the beginning of the first manifestation in a set and the ending of the last manifestation within a set and producing a signal representing the range detected falls, sequence storage means connected to said first, second and third timing means to receive the signals from said first, second and third timing means, said sequence storage means comprising a plurality of series of cascade connected storage devices, one of each plurality for each character to be recognized, each of said storage devices providing an output for a predetermined time interval following the supply of an input signal thereto, for selectively storing representations of predetermined combinations of said signals under the control of a preceding combination of signals and producing an output signal representing the identity of the entity, and an output checking circuit connected to said sequence storage means to receive said output signals for detecting the lack of an output signal for an entity which has been interpreted.

12. Apparatus for interpreting intelligence manifestations comprising scanning means for scanning said manifestations in a plurality of scans and producing signature signals during each scan representing different sizes of a plurality of different characteristics detected during a scan, a plurality of series of cascade connected storage means connected to said scanning means to receive said signature signals, each of said storage means having a signal input circuit, a control input circuit, and an output circuit, and effective to supply an output signal from said output circuit for a predetermined time interval following the supply of an input pulse to said input circuit, if said control circuit is concurrently energized, the arrangement being such that an output will be supplied from the output circuit of each storage means in a series to the control input circuit for the next storage means in a series for a predetermined time interval following the last input thereto, said storage means being connected to said scanning means to receive an input providing a predetermined combination of signature signals is supplied thereto during the time that its control input circuit is energized, an output circuit for each of said plurality of series of cascade connected storage devices and connected thereto for producing an output signal representing the identity of a manifestation for which a series of storage devices is furnished, and checking circuit means connected to said storage means for detecting the production of an output signal from more than one of said output circuits for the same manifestation.

13. Apparatus for interpreting intelligence manifestations comprising scanning means for scanning said manifestations in a plurality of scans and producing signature signals during each scan representing different sizes of a plurality of different characteristics detected during a scan, a plurality of series of cascade connected storage means connected to said scanning means to receive said signature signals, each of said storage means having a signal input circuit, a control input circuit, and an output circuit, and effective to supply an output signal from said output circuit for a predetermined time interval following the supply of an input pulse to said input circuit, if said control circuit is concurrently energized, the arrangement being such that an output will be supplied from the output circuit of each storage means in a series to the control input circuit of the next storage means in a series for a predetermined time interval following the last input thereto, said storage means being connected to said scanning means to receive an input providing a predetermined combination of signature signals is supplied thereto during the time that its control input circuit is energized, circuit means connected to said storage means responsive to another predetermined combination of said signature signals and a control input signal for inhibiting predetermined ones of said storage means, and an output circuit for each of said plurality of series of cascade connected storage devices and connected thereto for producing an output signal in response to the storage of a predetermined order of said combinations.

14. Apparatus for interpreting successive sets of intelligence manifestations which form an entity whose identity is to be detected, each set comprising one or more manifestations of variable time duration, comprising scanning means for generating said manifestations, first timing means connected to said scanning means to receive said manifestations and detect which range of a plurality of ranges of time duration the duration of each manifestation within a set falls and producing a signal representing the range detected, second timing means connected to said scanning means to receive said manifestations for timing the occurrence of the termination of the last manifestation in a set with respect to the termination of the last manifestation in another set and producing a signal representing said timing relationship, third timing means connected to said scanning means to receive said manifestations and to detect in which of a plurality of ranges of time duration the time duration between the beginning of the first manifestation in a set and the ending of the last manifestation within a set falls and producing a signal representing the range detected, and sequence storage means connected to said first, second and third timing means to receive the signals from said first, second and third timing means, said sequence storage means comprising a plurality of series of cascade connected storage devices, one of each plurality for each character to be recognized, each of said storage devices providing an output for a predetermined time interval following the supply of an input signal thereto, for selectively storing representations of predetermined combinations of said signals under the control of a preceding combination of signals and producing an output signal representing the identity of the entity.

15. Apparatus for identifying characters comprising scanning means for scanning a character in a plurality of scans and producing signals during the intervals portions thereof are sensed, encoding circuit means connected to said scanning means and responsive to said signals for producing a plurality of signature signals representing different sizes of a plurality of characteristics of the character detected on each scan, sequence storage means connected to said encoding circuit means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof which occur in coincidence during a scan within a prescribed number of scans from the coincidence of a preceding combination of signature signals and producing an output signal representing the identity of the character scanned when a predetermined order of said combinations has been stored, and checking circuit means connected to said storage means and operative in response to the first output signal obtained during the scanning of a character for detecting within a prescribed number of scans the production of a second output signal representing the identity of a different character and producing an uncertainty signal in the event said second output signal is detected within said prescribed number of scans.

16. Apparatus for sensing characters comprising scanning means for scanning a character in a plurality of vertical scans which progress one after the other across the character and producing signature signals during each scan representing different sizes of a plurality of different characteristics detected during a scan, and sequence storage means connected to said scanning means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing manifestations of predetermined combinations thereof which occur during a scan as the character is scanned under the control of a preceding combination of signature signals which occurred during an earlier scan and producing an output signal representing the identity of the character scanned as soon as a predetermined order of said combinations has been stored.

17. Apparatus for identifying characters comprising scanning means for scanning said characters in a plurality of vertical scans which progress one after the other across the character and producing manifestations during the intervals portions of the character are sensed, first timing means connected to said scanning means to receive said manifestations and detect which range of a plurality of ranges of time duration the duration of each manifestation within a scan falls and producing a signal representing the range detected, second timing means connected to said scanning means to receive said manifestations for timing the occurrence of the termination of the last manifestation during a scan with respect to the termination of the last manifestation in another scan and producing a signal representing said timing relationship, third timing means connected to said scanning means to receive said manifestations and to detect in which of a plurality of ranges of time duration the time duration between the beginning of the first manifestation during a scan and the ending of the last manifestation within a scan falls and producing a signal representing the range detected, and sequence storage means connected to said first, second and third timing means to receive the signals from said first, second and third timing means, said sequence storage means comprising a plurality of series of cascade connected storage devices, one of each plurality for each character to be recognized, each of said storage devices providing an output for a predetermined time interval following the supply of an input signal thereto, for selectively storing representations of predetermined combinations of said signals under the control of a preceding combination of signals providing other predetermined combinations of signals do not occur and producing an output signal representing the identity of the character scanned.

18. Apparatus for identifying characters comprising scanning means for scanning said characters in a plurality of vertical scans which progress one after the other across the character and producing manifestations during the intervals portions of the character are sensed, first timing means connected to said scanning means to receive said manifestations and detect which range of a plurality of ranges of time duration the duration of each manifestation within a scan falls and producing a signal representing the range detected, second timing means connected to said scanning means to receive said manifestations for timing the occurrence of the termination of the last manifestation during a scan with respect to the termination of the last manifestation in another scan and producing a signal representing said timing relationship, third timing means connected to said scanning means to receive said manifestations and to detect in which of a plurality of ranges of time duration the time duration between the beginning of the first manifestation during a scan and the ending of the last manifestation within a scan falls and producing a signal representing the range detected, sequence storage means connected to said first, second and third timing means to receive the signals from said first, second and third timing means, said sequence storage means comprising a plurality of series of cascade connected storage devices, one of each plurality for each character to be recognized, each of said storage devices providing an output for a predetermined time interval following the supply of an input signal thereto, for selectively storing representations of predetermined combinations of said signals under the control of a preceding combination of signals providing other predetermined combinations of signals do not occur and producing an output signal representing the identity of the character scanned, and checking circuit means connected to said sequence storage means to receive the output signals for detecting the production of an output signal within a predetermined time which represents a character different from the character scanned.

19. Apparatus for identifying characters comprising scanning means for scanning a character in a plurality of scans and producing signals during the intervals portions thereof are sensed, time discriminating means connected to said scanning means to receive said signals for eliminating those signals which have a time duration less than a first predetermined time duration and producing a manifestation of at least a second predetermined time duration from those signals having a greater time duration than said first predetermined time duration, encoding circuit means connected to said time discriminating means and responsive to said manifestations for producing a plurality of signature signals representing different sizes of a plurality of characteristics of the character detected on each scan, and sequence storage means connected to said encoding circuit means to receive said signature signals, said sequence storage means comprising a plurality of series of cascade connected storage devices, one of each plurality for each character to be recognized, each of said storage devices providing an output for a predetermined time interval following the supply of an input signal thereto, for selectively storing representations of predetermined combinations thereof under the control of a preceding combination of signature signals and producing an output signal representing the identity of the character scanned when a predetermined order of said combinations has been stored.

References Cited in the file of this patent

UNITED STATES PATENTS

| | | |
|---|---|---|
| 2,616,983 | Zworykin | Nov. 4, 1952 |
| 2,738,499 | Sprick | Mar. 13, 1956 |
| 2,894,247 | Relis | July 7, 1959 |